US012790889B2

(12) United States Patent
Blair et al.

(10) Patent No.: US 12,790,889 B2
(45) Date of Patent: Nov. 10, 2026

(54) SOLAR-POWERED MOTORIZED WINDOW TREATMENT

(71) Applicant: Lutron Technology Company LLC, Coopersburg, PA (US)

(72) Inventors: Edward J. Blair, Telford, PA (US); John H. Bull, Slatington, PA (US); Stuart W. DeJonge, Riegelsville, PA (US); Jeremy M. Fallis, Jr., Bethlehem, PA (US); Charles Fiebig, Frenchtown, NJ (US); David A. Kirby, Zionsville, PA (US); Galen Edgar Knode, Macungie, PA (US); Brent Protzman, Easton, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 45 days.

(21) Appl. No.: 18/593,882

(22) Filed: Mar. 2, 2024

(65) Prior Publication Data

US 2024/0318500 A1 Sep. 26, 2024

Related U.S. Application Data

(60) Provisional application No. 63/510,549, filed on Jun. 27, 2023, provisional application No. 63/488,375, filed on Mar. 3, 2023.

(51) Int. Cl.

*E06B 9/42* (2006.01)
*E06B 9/72* (2006.01)
(Continued)

(52) U.S. Cl.

CPC .................. *E06B 9/42* (2013.01); *E06B 9/72* (2013.01); *H01R 13/6205* (2013.01);
(Continued)

(58) Field of Classification Search

CPC ..... E06B 2009/2476; E06B 2009/6827; E06B 2009/6818; E06B 2009/6845; E06B 9/40;
(Continued)

(56) References Cited

U.S. PATENT DOCUMENTS

| | | | | |
|---|---|---|---|---|
| 3,363,214 A * | 1/1968 | Wright | ............... | H01R 13/6205 439/39 |
| 4,636,579 A | 1/1987 | Hanak et al. | | |

(Continued)

FOREIGN PATENT DOCUMENTS

| | | |
|---|---|---|
| CN | 101418669 A | 4/2009 |
| CN | 102598868 A | 7/2012 |

(Continued)

OTHER PUBLICATIONS

Wacker, A., "Supplying TPS61200 With a Single Solar Cell", Texas Instruments, Aug. 2009, 8 pages.

(Continued)

*Primary Examiner* — Johnnie A. Shablack
(74) *Attorney, Agent, or Firm* — Flaster Greenberg PC

(57) ABSTRACT

A motorized window treatment may be powered (e.g., entirely powered) from solar energy. The motorized window treatment may comprise a roller tube, a covering material extending from the roller tube to a bottom bar, and a motor drive unit configured to rotate the roller tube for adjusting a position of the covering material. The bottom bar may comprise at least one solar cell and an energy storage element electrically coupled to the solar cell. The motorized window treatment may comprise a dock, which may have a base portion electrically coupled the energy storage element of the motor drive unit. The bottom bar may be positioned adjacent to the base portion when the covering material is in a raised position, such that the energy storage element of the (Continued)

bottom bar may discharge through the base portion into an energy storage element of the motor drive unit.

70 Claims, 60 Drawing Sheets

(51) Int. Cl.
*H01R 13/62* (2006.01)
*H02J 50/10* (2016.01)
*H02S 40/38* (2014.01)
*E06B 9/24* (2006.01)
*E06B 9/68* (2006.01)

(52) U.S. Cl.
CPC .............. *H02J 50/10* (2016.02); *H02S 40/38* (2014.12); *E06B 2009/2476* (2013.01); *E06B 2009/6827* (2013.01)

(58) Field of Classification Search
CPC ..... E06B 9/42; E06B 9/56; E06B 9/68; E06B 9/72; H02S 40/38; H02J 50/10; H01R 13/6205
See application file for complete search history.

(56) References Cited

U.S. PATENT DOCUMENTS 4,664,169 A 5/1987 Osaka et al.
5,029,428 A 7/1991 Hiraki
5,040,585 A 8/1991 Hiraki
5,134,347 A 7/1992 Koleda
5,248,919 A 9/1993 Hanna et al.
5,258,076 A 11/1993 Wecker
5,262,710 A * 11/1993 Taylor ................. H01M 50/213 320/113
5,385,478 A * 1/1995 Niekawa ................ H01R 12/79 439/495
5,413,161 A 5/1995 Corazzini
5,760,558 A 6/1998 Popat
5,931,693 A * 8/1999 Yamazaki ........... H01M 50/216 429/96
6,105,318 A 8/2000 Harrison
6,497,267 B1 12/2002 Killo et al.
6,623,276 B2 * 9/2003 Dalmau ............. H01R 13/6205 439/39
6,781,335 B2 8/2004 Osinga et al.
6,812,397 B2 11/2004 Lambey
6,812,662 B1 11/2004 Walker
6,841,971 B1 1/2005 Spee et al.
6,983,783 B2 1/2006 Carmen, Jr. et al.
6,984,951 B2 1/2006 Osinga et al.
7,389,806 B2 6/2008 Kates
7,391,297 B2 6/2008 Cash et al.
7,472,739 B2 1/2009 Heidenreich
7,576,282 B2 8/2009 Heidenreich
7,617,857 B2 11/2009 Froese
7,772,798 B2 8/2010 Rodas et al.
7,839,109 B2 11/2010 Carmen et al.
7,977,904 B2 7/2011 Berman et al.
8,009,042 B2 8/2011 Steiner et al.
8,199,010 B2 6/2012 Sloan et al.
8,228,184 B2 7/2012 Blakeley et al.
8,277,246 B2 * 10/2012 Naskali ................. H02J 7/0045 439/500
8,288,981 B2 10/2012 Zaharchuk et al.
8,299,734 B2 10/2012 Mullet et al.
8,365,800 B2 2/2013 Oh et al.
8,368,328 B2 2/2013 Mullet et al.
8,371,358 B1 2/2013 Mullet et al.
8,410,706 B2 4/2013 Steiner et al.
8,451,116 B2 5/2013 Steiner et al.
8,540,005 B2 9/2013 Baugh et al.
8,632,034 B2 1/2014 Mitchell et al.
8,659,246 B2 2/2014 Mullet et al.
8,791,658 B2 7/2014 Mullet et al.
8,851,141 B2 10/2014 Blair et al.
8,919,419 B2 12/2014 Mullet et al.
8,950,461 B2 2/2015 Adams et al.
9,013,059 B2 4/2015 Altonen et al.
9,045,939 B2 6/2015 Blair et al.
9,115,537 B2 8/2015 Blair
9,148,025 B2 9/2015 Bourgeois et al.
9,488,000 B2 11/2016 Kirby et al.
9,489,005 B2 11/2016 Hausman et al.
9,490,578 B2 * 11/2016 Wu .................... H01R 13/6205
9,598,901 B2 3/2017 Kirby et al.
9,679,696 B2 6/2017 Bhutani et al.
9,810,020 B2 11/2017 Adams et al.
9,831,716 B2 11/2017 Mohammed Suhura et al.
9,955,547 B2 4/2018 Taipale et al.
10,041,292 B2 8/2018 Cooney et al.
10,072,460 B2 9/2018 Cavarec et al.
10,094,169 B2 10/2018 Kirby
10,097,014 B2 10/2018 Pickett et al.
10,113,360 B2 10/2018 Hall et al.
10,119,330 B2 * 11/2018 Brunk ....................... E06B 9/44
10,186,801 B2 * 1/2019 Zantout .................. H05B 47/18
10,187,944 B2 1/2019 Macadam et al.
10,221,620 B2 3/2019 Michel et al.
10,547,190 B2 * 1/2020 Hall .......................... H02J 7/00
10,601,316 B2 3/2020 Kohn et al.
10,604,026 B2 * 3/2020 Stockinger ......... H01R 13/5219
10,655,386 B2 5/2020 Adams et al.
10,690,726 B2 6/2020 Koizumi et al.
10,819,158 B2 10/2020 Pearson
11,078,725 B2 8/2021 Geiger
11,203,899 B2 12/2021 Pereira
11,205,921 B2 12/2021 Hausman et al.
11,268,322 B2 * 3/2022 Campagna ................ E06B 9/50
11,293,224 B2 4/2022 Pereira
11,375,583 B2 6/2022 Dejonge
11,409,248 B2 8/2022 Rebbert et al.
11,532,917 B2 * 12/2022 Kumar .................. H02J 7/0045
11,677,245 B2 6/2023 Dejonge et al.
11,781,378 B2 * 10/2023 Caregnato ............... E06B 9/388 160/310
11,788,348 B2 10/2023 Blair et al.
11,858,317 B2 1/2024 Didier
11,899,201 B2 2/2024 Inoue et al.
11,909,204 B2 2/2024 Blair et al.
11,967,694 B2 4/2024 Gaben
11,996,799 B2 5/2024 Molinero
12,006,018 B2 6/2024 Narvaez-gracia et al.
12,006,070 B2 6/2024 Brown
12,094,990 B1 9/2024 Tao et al.
12,112,897 B2 10/2024 Chen et al.
12,126,114 B1 10/2024 Ruan
12,166,148 B2 12/2024 Fischer et al.
12,206,035 B2 1/2025 Onozaki et al.
12,209,453 B2 1/2025 Valderrama Chaparro
12,218,512 B2 2/2025 Field et al.
12,255,578 B2 3/2025 Zhou
2004/0217739 A1 11/2004 Cummings
2005/0072532 A1 4/2005 Holden et al.
2006/0000558 A1 1/2006 Fennell
2006/0162874 A1 7/2006 Lin
2007/0175599 A1 8/2007 Froese
2007/0284053 A1 12/2007 Mullet et al.
2008/0092075 A1 4/2008 Jacob et al.
2008/0236763 A1 10/2008 Kates
2009/0059574 A1 3/2009 Lewis et al.
2009/0308543 A1 12/2009 Kates
2010/0269988 A1 10/2010 Mullet et al.
2010/0294438 A1 11/2010 Kirby et al.
2010/0307554 A1 12/2010 Migliozzi
2011/0031806 A1 2/2011 Altonen et al.
2011/0036511 A1 2/2011 Dempwolffe
2011/0203748 A1 8/2011 Mullet et al.
2011/0203754 A1 8/2011 Mullet et al.
2012/0073765 A1 3/2012 Hontz et al.
2012/0090797 A1 4/2012 Mullet et al.
2012/0225340 A1 9/2012 Mullet et al.

(56) References Cited

U.S. PATENT DOCUMENTS

| | | | | |
|---|---|---|---|---|
| 2013/0030589 | A1 | 1/2013 | Pessina et al. | |
| 2013/0098561 | A1 | 4/2013 | Mullet et al. | |
| 2013/0233496 | A1 | 9/2013 | Ogden et al. | |
| 2014/0027069 | A1 * | 1/2014 | Oppizzi | E06B 9/40 160/6 |
| 2014/0055061 | A1 | 2/2014 | Chambers et al. | |
| 2014/0305601 | A1 | 10/2014 | Mullet et al. | |
| 2014/0352896 | A1 | 12/2014 | Han | |
| 2015/0226001 | A1 | 8/2015 | Adams et al. | |
| 2015/0240560 | A1 | 8/2015 | Blair et al. | |
| 2015/0247362 | A1 | 9/2015 | Kirby | |
| 2016/0017656 | A1 | 1/2016 | Adreon | |
| 2016/0172868 | A1 | 6/2016 | Sequeira et al. | |
| 2016/0241029 | A1 | 8/2016 | Hodrinsky et al. | |
| 2016/0326801 | A1 | 11/2016 | Ogden et al. | |
| 2017/0123390 | A1 | 5/2017 | Barco et al. | |
| 2017/0284157 | A1 | 10/2017 | Blair et al. | |
| 2017/0356243 | A1 | 12/2017 | Feldstein | |
| 2017/0366091 | A1 | 12/2017 | Langeslag et al. | |
| 2018/0202224 | A1 | 7/2018 | Kumar | |
| 2018/0202225 | A1 | 7/2018 | Lagarde | |
| 2018/0283092 | A1 | 10/2018 | Hall et al. | |
| 2018/0310745 | A1 | 11/2018 | Giri et al. | |
| 2019/0032404 | A1 | 1/2019 | Chacon et al. | |
| 2019/0214845 | A1 | 7/2019 | Hausman et al. | |
| 2019/0277086 | A1 | 9/2019 | Pereira | |
| 2020/0024489 | A1 | 1/2020 | Zhou et al. | |
| 2020/0300037 | A1 | 9/2020 | Blair et al. | |
| 2021/0010326 | A1 | 1/2021 | Pierce et al. | |
| 2021/0180399 | A1 | 6/2021 | Barnes et al. | |
| 2021/0285280 | A1 | 9/2021 | Tomczyk | |
| 2021/0367542 | A1 | 11/2021 | Adams et al. | |
| 2022/0042372 | A1 * | 2/2022 | Alves | E06B 9/262 |
| 2022/0162908 | A1 | 5/2022 | Nien et al. | |
| 2022/0178203 | A1 | 6/2022 | Pereira | |
| 2022/0341259 | A1 | 10/2022 | Chacon et al. | |
| 2022/0381085 | A1 | 12/2022 | Diehl et al. | |
| 2023/0151690 | A1 | 5/2023 | Menendez et al. | |
| 2023/0198254 | A1 | 6/2023 | Dejonge et al. | |
| 2023/0203879 | A1 * | 6/2023 | Deng | E06B 9/50 160/84.02 |
| 2023/0304355 | A1 | 9/2023 | Cooney et al. | |
| 2023/0323734 | A1 | 10/2023 | Bruno et al. | |
| 2024/0011623 | A1 | 1/2024 | Connelly | |
| 2024/0014332 | A1 | 1/2024 | Yao et al. | |
| 2024/0048088 | A1 | 2/2024 | Kim et al. | |
| 2024/0190067 | A1 | 6/2024 | Calvin et al. | |
| 2024/0191909 | A1 | 6/2024 | Moslehi et al. | |
| 2024/0209683 | A1 | 6/2024 | Ribberink | |
| 2024/0213913 | A1 | 6/2024 | Hebeisen et al. | |
| 2024/0274732 | A1 | 8/2024 | Bailat et al. | |
| 2024/0283282 | A1 | 8/2024 | Hausman et al. | |
| 2024/0333201 | A1 | 10/2024 | Ushio et al. | |
| 2024/0364257 | A1 | 10/2024 | De La Fuente Sanchez | |
| 2024/0417991 | A1 | 12/2024 | Lakshminarayanan | |
| 2024/0418035 | A1 | 12/2024 | Tameshtit et al. | |
| 2024/0421758 | A1 | 12/2024 | Huang et al. | |
| 2025/0042549 | A1 | 2/2025 | Mitchell | |
| 2025/0052110 | A1 | 2/2025 | Ribberink | |
| 2025/0059760 | A1 | 2/2025 | Vilhauer et al. | |
| 2025/0075557 | A1 | 3/2025 | Miyamichi et al. | |
| 2025/0116156 | A1 * | 4/2025 | Goddard | F16M 13/02 |
| 2025/0130439 | A1 * | 4/2025 | Yliluoma | H01R 13/6205 |
| 2025/0198234 | A1 * | 6/2025 | Pereira | E06B 9/68 |

FOREIGN PATENT DOCUMENTS

| | | | | |
|---|---|---|---|---|
| CN | 107528486 | A | 12/2017 | |
| CN | 108292857 | A | 7/2018 | |
| CN | 109611012 | A | 4/2019 | |
| EP | 1245782 | A1 | 10/2002 | |
| EP | 2354424 | A2 | 8/2011 | |
| EP | 2631411 | B1 | 9/2014 | |
| EP | 3040506 | A1 | 7/2016 | |
| EP | 3341550 | B1 | 8/2019 | |
| EP | 3904630 | B1 | 1/2023 | |
| JP | 2008007934 | A | 1/2008 | |
| JP | 2009270382 | A | 11/2009 | |
| JP | 2010258023 | A | 11/2010 | |
| JP | 2017186807 | A | 10/2017 | |
| JP | 2021161809 | A | 10/2021 | |
| TW | M326752 | U * | 2/2008 | H01M 10/425 |
| WO | 2002041740 | A1 | 5/2002 | |
| WO | 2007085252 | A1 | 8/2007 | |
| WO | 2017036966 | A1 | 3/2017 | |
| WO | 2017050810 | A1 | 3/2017 | |
| WO | 2017176643 | A1 | 10/2017 | |
| WO | 2021237167 | A2 | 11/2021 | |
| WO | 2022031542 | A1 | 2/2022 | |
| WO | 2023114526 | A1 | 6/2023 | |
| WO | 2025103699 | A1 | 5/2025 | |

OTHER PUBLICATIONS

Xianqing, et al., “Switching Power Supply Principles and Design”, Switching Power Supply Principles and Design, Dec. 31, 2012, 4 pages.

* cited by examiner

SOLAR-POWERED MOTORIZED WINDOW TREATMENT

CROSS-REFERENCE TO RELATED APPLICATIONS

This application claims the benefit of Provisional U.S. Patent Application No. 63/488,375, filed Mar. 3, 2023, and Provisional U.S. Patent Application No. 63/510,549, filed Jun. 27, 2023, the entire disclosures of which are hereby incorporated by reference herein in their entirety.

BACKGROUND

A user environment, such as a residence or an office building for example, may be configured using various types of load control systems. A lighting control system may be used to control the lighting loads in the user environment. A motorized window treatment control system may be used to control the natural light provided to the user environment. A heating, ventilation, and cooling (HVAC) system may be used to control the temperature in the user environment. Each load control system may include various control devices, including control-source devices and control-target devices. The control-target devices may receive messages (e.g., digital messages), which may include load control instructions, for controlling an electrical load from one or more of the control-source devices. The control-target devices may be capable of directly controlling an electrical load. The control-source devices may be capable of indirectly controlling the electrical load via the control-target device. Examples of control-target devices may include lighting control devices (e.g., a dimmer switch, an electronic switch, a ballast, or a light-emitting diode (LED) driver), a motorized window treatment, a temperature control device (e.g., a thermostat), a plug-in load control device, and/or the like. Examples of control-source devices may include remote control devices, occupancy sensors, daylight sensors, temperature sensors, and/or the like.

SUMMARY

As described herein, a motorized window treatment that configured to be mounted to a structure in front of an opening, such as a window, may be powered from (e.g., entirely powered from) solar energy. The motorized window treatment may comprise a first and second mounting brackets configured to be mounted to the structure and a window treatment assembly supported by the first and second mounting brackets. The window treatment assembly may comprise a covering material that extends from top end to a bottom end and is operable between a raised position and a lowered position. The window treatment assembly may further comprise a bottom bar attached to the bottom end of the covering material. The bottom bar may comprise at least one solar cell attached to a rear surface of the bottom bar and a first energy storage element electrically coupled to the solar cell. The motorized window treatment may also comprise a motor drive unit comprising a motor configured to rotate to adjust the covering material between the raised position and the lowered position. The motorized window treatment may comprise a dock having a base portion electrically coupled to the motor drive unit. The bottom bar may be configured to be positioned adjacent to the base portion of the dock when the covering material is in the raised position, such that the first energy storage element of the bottom bar may discharge through the base portion of the dock into a second energy storage element of the motor drive unit. For example, the dock may be integral with the motor drive unit.

In some examples, the window treatment assembly may comprise a roller tube that extends from a first end to a second end, and is rotatably supported by the first mounting bracket at the first end of the roller tube and by the second mounting bracket at the second end of the roller tube. The top end of the covering material may be attached to the roller tube and the bottom bar may be attached to the bottom end of the covering material. The motor drive unit may be received in the roller tube at the second end of the roller tube and supported by the first mounting bracket. The motor drive unit may be configured to rotate the roller tube to adjust the covering material between the raised position and the lowered position.

Also described herein is a motor drive unit having a dock for charging an energy storage element of the motor drive unit from an energy storage element of a bottom bar of a motorized window treatment in which the motor drive unit is installed. The motorized window treatment may comprise a roller tube and a covering material extending from the roller tube to the bottom bar. The covering material may be operable between a raised position and a lowered position via rotation of the roller tube. The bottom bar may comprise at least one solar cell attached to a rear surface of the bottom bar and an energy storage element electrically coupled to the solar cell. The motor drive unit may comprise a motor configured to rotate the roller tube for adjusting a present position of the covering material, an energy storage element for powering the motor, and a control circuit configured to control the motor for adjusting the present position of the covering material between the raised position and the lowered position. The motor drive unit may also comprise the dock, which may have a base portion electrically coupled the energy storage element of the motor drive unit. The control circuit may be configured to adjust the present position of the covering material to the raised position to position the bottom bar adjacent to the base portion of the dock, and the energy storage element of the bottom bar may be configured to discharge through the base portion of the dock into the energy storage element of the motor drive unit.

The base portion of the dock may comprise a contact surface configured to abut against the rear surface of the bottom bar when the covering material is in the raised position. For example, the dock may also comprise a pair of electrical contacts electrically coupled to the energy storage element of the motor drive unit. The pair of electrical contacts of the dock configured to be electrically coupled to a pair of electrical contacts the bottom bar for allowing the energy storage element of the bottom bar to discharge into the energy storage element of the motor drive unit when the covering material is in the raised position. In addition, the dock may comprise at least one magnet configured to be magnetically attracted to at least one of the pair of electrical contacts of the bottom bar. In some examples, the dock may comprise an induction coil electrically coupled to the energy storage element of the motor drive unit. The induction coil may be configured to be inductively coupled to an induction coil on the bottom bar for allowing the energy storage element of the bottom bar to discharge into the energy storage element of the motor drive unit when the covering material is in the raised position.

In addition, the control circuit of the motor drive unit may be configured to automatically determine when to dock the bottom bar and to subsequently adjust the covering material to the raised position to allow the first energy storage element of the bottom bar to discharge through the base portion of the dock into the second energy storage element of the motor drive unit. For example, the control circuit may be configured to determine to dock the bottom bar when a space in which the motorized window treatment is located is vacant. In addition, the control circuit of the motor drive unit may be configured to determine to dock the bottom bar when a magnitude of a storage voltage of the energy storage element of the bottom bar is greater than a threshold. Further, the control circuit of the motor drive unit may be configured to determine to dock the bottom bar when a magnitude of a storage voltage of the energy storage element of the motor drive unit is less than a first threshold. For example, the control circuit of the motor drive unit may be configured to determine to dock the bottom bar when the magnitude of the storage voltage of the energy storage element of the motor drive unit is less than the first threshold and the space in which the motorized window treatment is located is vacant, or when the magnitude of the storage voltage of the energy storage element of the motor drive unit is less than a second threshold that is lower than the first threshold and the space in which the motorized window treatment is located is occupied.

Further, the bottom bar module of the motorized window treatment may be configured to collect solar data in response to the at least one solar cell at a plurality of intermediate positions between the lowered position and the raised position, and the control circuit of the motor drive unit may be configured to store the solar data in a memory of the motor drive unit. For example, the solar data may comprise one or more measurements or operational characteristics of the bottom bar module. In addition, the bottom bar module may be configured to periodically collect the at least one of the one or more measurements or operational characteristics of the bottom bar at a timing interval, which may have a length that is dependent upon whether the covering material is presently moving or not.

As further described herein, the control circuit of the motor drive unit may be configured to determine a magnitude of a solar power being received by the at least one the solar cell of the bottom bar and to determine to adjust the present position of the covering material in response to the magnitude of the determined solar power. The control circuit of the motor drive unit may be configured to calculate the solar power being received by the at least one the solar cell using the solar data stored in the memory of the motor drive unit. For example, the control circuit of the motor drive unit may be configured to use the solar data to determine an optimum position for allowing for the reception of solar power by the at least one solar cell. In addition, the control circuit of the motor drive unit may be configured to use the solar data to determine an upper limit position for controlling the covering material. Further, the control circuit of the motor drive unit may be configured to use the solar data to determine one or more dead zones between the lowered position and the raised position.

In some examples, the motorized window treatment may be a part of a system having a plurality of motorized window treatments, where each of the motorized window treatments may comprise a motor drive unit for adjusting a present position of a covering material of the motorized window treatment, and at least one solar cell configured to receive solar power and produce a storage voltage across an energy storage element of the motor drive unit. The motorized window treatments of the system may be coupled together via a power bus, such that the motor drive unit of a first one of the plurality of motorized window treatments is configured to charge a respective energy storage element of a second one of the motor drive unit of a second one of the plurality of motorized window treatments.

A system may include a plurality of motorized window treatments, where each motorized window treatment may include a motor drive unit for adjusting a present position of a covering material of the motorized window treatment between the raised position and the lowered position. Further, each motorized window treatment may include a bottom bar attached to the bottom end of the covering material. The motor drive unit of each of the plurality of motorized window treatments may be configured to align the present position of their respective covering materials so that the bottom bars of each motorized window treatment are aligned with each other along a façade of a building. For example, each of the plurality of motorized window treatments may include at least one solar cell attached to the bottom bar and an energy storage element electrically coupled to the solar cell, and the at least one solar cell may be configured to receive solar power and produce a storage voltage across the energy storage element. The motor drive unit of each of the plurality of motorized window treatments may be configured to transmit an indication that indicates that the motor drive unit is going to adjust the present position of its covering material to the other of the plurality of motorized window treatments. In some examples, the indication may indicate that the motor drive unit is going to dock its bottom bar. In some examples, the indication may indicate a façade number, and the motor drive units of the other of the plurality of motorized window treatments may be configured to receive the indication, determine that the façade number matches a façade number of the motor drive unit, and adjust the present position of their covering material based on the indication. In some examples, the system may include a system controller that is configured to receive the indication and send the indication to the other motorized window treatments.

A motorized window treatment may be described that is configured to be mounted to a structure. The motorized window treatment may include first and second mounting brackets configured to be mounted to the structure. The motorized window treatment may include a window treatment assembly supported by the first and second mounting brackets. The window treatment assembly may include a covering material that extends from top end to a bottom end and is operable between a raised position and a lowered position. The window treatment assembly may include a bottom bar attached to the bottom end of the covering material. The bottom bar may include a first energy storage element. The motorized window treatment may include a motor drive unit that includes a motor configured to rotate to adjust the covering material between the raised position and the lowered position. The motorized window treatment may include a dock having a base portion electrically coupled to the motor drive unit. The bottom bar may be configured to be positioned adjacent to the base portion of the dock when the covering material is in the raised position, such that a second energy storage element of the motor drive unit is configured to charge the first energy storage element of the bottom bar through the base portion of the dock. In such examples, the bottom bar may not include any solar cells. Further, the bottom bar may be configured to collect data from a sensor circuit of the bottom bar, and the motor drive unity may be configured to receive the data from the bottom bar when the bottom bar is positioned adjacent to the base portion of the dock. The sensor circuit may include a photosensor and the data may include a measured light level (e.g., ambient light level around the motorized window treatment). Such a motorized window treatment may be configured to perform one or more of the procedures described herein (e.g., based on the feedback from the sensor).

DETAILED DESCRIPTION

Figure 1:
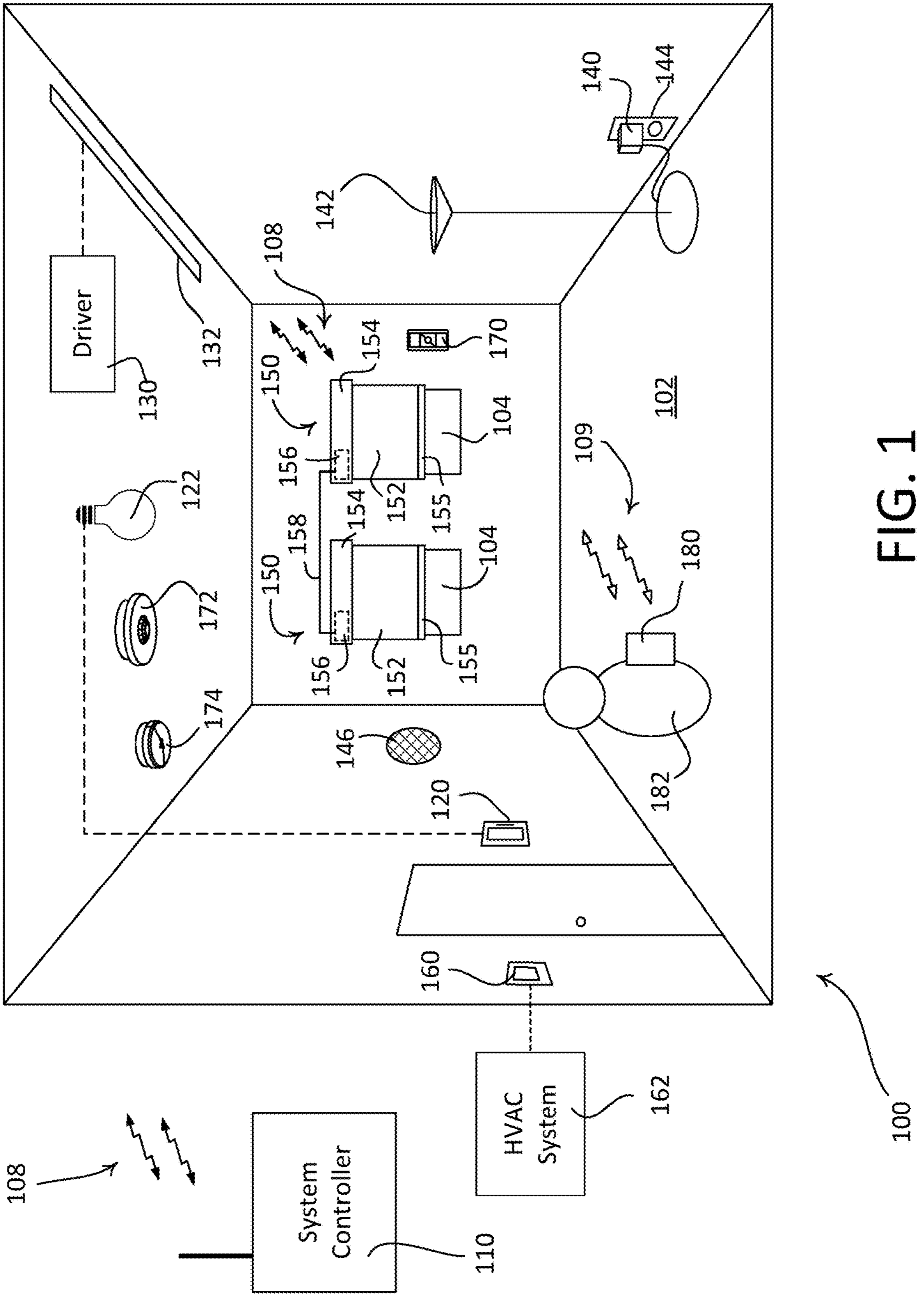
FIG. 1 is a diagram of an example load control system.

FIG. 1 is a diagram of an example load control system 100 for controlling an amount of power delivered from a power source (not shown), such as an alternating-current (AC) power source or a direct-current (DC) power source, to one or more electrical loads. The load control system 100 may be installed in a room 102 of a building. The load control system 100 may comprise a plurality of control devices configured to communicate with each other by transmitting and receiving messages (e.g., digital messages) via wireless signals, e.g., radio-frequency (RF) signals 108. Alternatively or additionally, the load control system 100 may comprise a wired digital communication link coupled to one or more of the control devices to provide for communication between the control devices. The control devices of the load control system 100 may comprise a number of control-source devices (e.g., input devices operable to transmit messages in response to user inputs, occupancy and/or vacancy conditions, changes in measured light intensity, etc.) and a number of control-target devices (e.g., load control devices operable to receive messages and control respective electrical loads in response to the received messages). A single control device of the load control system 100 may operate as both a control-source and a control-target device.

The control-source devices may be configured to transmit messages directly to the control-target devices. In addition, the load control system 100 may comprise a system controller 110 (e.g., a central processor or load controller) configured to communicate messages to and from the control devices (e.g., the control-source devices and/or the control-target devices). For example, the system controller 110 may be configured to receive messages from the control-source devices and transmit messages to the control-target devices in response to the messages received from the control-source devices.

The load control system 100 may comprise one or more load control devices, such as a dimmer switch 120 (e.g., a control-target device) for controlling a lighting load 122. The dimmer switch 120 may be configured to control an amount of power delivered from the AC power source to the lighting load to adjust an intensity level and/or a color (e.g., a color temperature) of the lighting load. The dimmer switch 120 may be adapted to be wall-mounted in a standard electrical wallbox. The dimmer switch 120 also comprise a tabletop or plug-in load control device. The dimmer switch 120 may comprise a toggle actuator (e.g., a button) and an intensity adjustment actuator (e.g., a rocker switch). Actuations (e.g., successive actuations) of the toggle actuator may toggle (e.g., turn off and on) the lighting load 122. Actuations of an upper portion or a lower portion of the intensity adjustment actuator may respectively increase or decrease the amount of power delivered to the lighting load 122 and thus increase or decrease the intensity of the receptive lighting load from a minimum intensity (e.g., approximately 1%) to a maximum intensity (e.g., approximately 100%). The dimmer switch 120 may comprise a plurality of visual indicators, e.g., light-emitting diodes (LEDs), which are arranged in a linear array and are illuminated to provide feedback of the intensity of the lighting load 122. Examples of wall-mounted dimmer switches are described in greater detail in U.S. Pat. No. 9,679,696, issue Jun. 13, 2017, entitled WIRELESS LOAD CONTROL DEVICE, the entire disclosure of which is hereby incorporated by reference.

The dimmer switch 120 may be configured to wirelessly receive messages via the RF signals 108 (e.g., from the system controller 110) and to control the lighting load 122 in response to the received messages. Examples of dimmer switches and other control devices configured to transmit and receive messages are described in greater detail in commonly-assigned U.S. Pat. No. 10,041,292, issued Aug. 7, 2018, entitled LOW-POWER RADIO-FREQUENCY RECEIVER, and U.S. Pat. No. 10,271,407, issued Apr. 23, 2019, entitled LOAD CONTROL DEVICE HAVING INTERNET CONNECTIVITY, the entire disclosures of which are hereby incorporated by reference.

The load control system 100 may comprise one or more remotely-located load control devices, such as a light-emitting diode (LED) driver 130 (e.g., a control-target device) for driving an LED light source 132 (e.g., an LED light engine). The LED driver 130 may be located remotely, for example, in or adjacent to the lighting fixture of the LED light source 132. The LED driver 130 may be configured to receive messages via the RF signals 108 (e.g., from the system controller 110) and to control the LED light source 132 in response to the received messages. The LED driver 130 may be configured to adjust the color temperature of the LED light source 132 in response to the received messages. The load control system 100 may further comprise other types of remotely-located load control devices, such as, for example, electronic dimming ballasts for driving fluorescent lamps.

The load control system 100 may comprise a plug-in load control device 140 (e.g., a control-target device) for controlling a plug-in electrical load, e.g., a plug-in lighting load (e.g., such as a floor lamp 142 or a table lamp) and/or an appliance (e.g., such as a television or a computer monitor). For example, the floor lamp 142 may be plugged into the plug-in load control device 140. The plug-in load control device 140 may be plugged into a standard electrical outlet 144 and thus may be coupled in series between the AC power source and the plug-in lighting load. The plug-in load control device 140 may be configured to receive messages via the RF signals 108 (e.g., from the system controller 110) and to turn on and off or adjust the intensity of the floor lamp 142 in response to the received messages. Alternatively or additionally, the load control system 100 may comprise controllable receptacles (e.g., control-target devices) for controlling plug-in electrical loads plugged into the receptacles. The load control system 100 may comprise one or more load control devices or appliances that are able to directly receive the wireless signals 108 from the system controller 110, such as a speaker 146 (e.g., part of an audio/visual or intercom system), which is able to generate audible sounds, such as alarms, music, intercom functionality, etc.

The load control system 100 may comprise one or more daylight control devices, e.g., motorized window treatments 150 (e.g., control-target devices), such as motorized roller shades, for controlling the amount of daylight entering the room 102. Each motorized window treatment 150 may comprise a covering material 152 (e.g., a window treatment fabric) hanging from a roller tube 154 in front of a respective window 104 with a respective bottom bar 155 connected to a bottom end of the respective covering material 152. The covering material 152 may be wound around and unwound from the roller tube 154 for respectively raising and lowering the covering material 152. Each motorized window treatment 150 may further comprise a motor drive unit 156 located inside of the roller tube 154 and having a motor for rotating the roller tube 154 to raise and lower the covering material 152 for controlling the amount of daylight entering the room 102. The motor drive units 156 may be configured to adjust a present position $P_{PRES}$ of the respective covering material 152 between a raised position $P_{RAISED}$ (e.g., a fully-raised position and/or a fully-open position) and a lowered position $P_{LOWERED}$ (e.g., a fully-lowered position and/or a fully-closed position).

The motor drive units 156 of the motorized window treatments 150 may each be configured to communicate (e.g., transmit and/or receive) messages via the RF signals 108. For example, the motor drive units 156 of the motorized window treatments 150 may each be configured to receive messages (e.g., from the system controller 110) and adjust the present position $P_{PRES}$ of the respective covering material 152 in response to the received messages. The motor drive unit 156 of each of the motorized window treatments 150 may be battery-powered or may be coupled to an external alternating-current (AC) or direct-current (DC) power source. The load control system 100 may comprise other types of daylight control devices, such as, for example, a cellular shade, a drapery, a Roman shade, a Venetian blind, a Persian blind, a pleated blind, a tensioned roller shade system, an electrochromic or smart window, and/or other suitable daylight control device. Examples of battery-powered motorized window treatments are described in greater detail in U.S. Pat. No. 10,494,864, issued Dec. 3, 2019, entitled MOTORIZED WINDOW TREATMENT, the entire disclosure of which is hereby incorporated by reference.

The motor drive units 156 of the respective motorized window treatments 150 may be configured to rotate the respective roller tubes 154 at a respective rotational speed to move the covering materials 152 (e.g., bottom ends of the covering materials) at the same linear speed, such that the positions of the covering materials 152 may remained aligned even when the diameters of the respective roller tubes 154 are different (e.g., particularly when the motorized window treatment 150 are mounted adjacent to each other as shown in FIG. 1). For example, if the diameters of the respective roller tubes 154 are the same, the motor drive units 156 of the respective motorized window treatments 150 may rotate their respective roller tubes 154 at the same rotational speed to move the covering materials 152 (e.g., bottom ends of the covering materials) at the same linear speed. However, if diameters of the respective roller tubes 154 are different, the motor drive units 156 may rotate their respective roller tubes 154 at a rotational speed that is based on the diameter of their respective roller tube 154 to move the respective covering materials 152 (e.g., bottom ends of the covering materials) at the same linear speed. The linear speed of the covering material 152 of a motorized window treatments 150 may refer to the speed at which the bottom end of the covering material moves (e.g., vertically) toward or away from the roller tube 154. The linear speed v of the covering material 152 each of the motorized window treatments 150 may be a function of the rotational speed w and the diameter d of the roller tube 154, e.g., $$v = \frac{1}{2} \cdot d \cdot \omega.$$

Each of the motor drive units 156 of the motorized window treatments 150 may take into account the diameter d of the respective roller tube 154 and control the rotational speed w of the respective motor, such that the linear speed v of the covering material 152 of each of the motorized window treatments 150 may be the same.

Each of the motor drive units 156 may also take into account an amount of the respective covering material 152 wrapped around each of the roller tubes 154 when determining the rotational speed @ at which to rotate the respective motor such that the linear speed v of the covering material 152 of each of the motorized window treatments 150 may be the same. For example, the linear speed v of the covering material 152 each of the motorized window treatments 150 may be a function of the rotational speed w, the diameter d of the roller tube 154, a thickness t of the covering material 152, and a number N of full rotations of the covering material 152 that are presently wound around the roller tube 154, e.g., $$v = \frac{1}{2} \cdot [d + (2 \cdot t \cdot N)] \cdot \omega.$$

Each of the motor drive units 156 may update the number N of full rotations of the covering material 152 that are wound around the roller tube 154 as the roller tube 154 is rotated to move the covering material 152 between the raised position $P_{RAISED}$ and the lowered position $P_{LOWERED}$. Each of the motor drive units 156 may adjust the rotational speed w of the respective roller tube 156 such that the linear speed v of the covering material may be constant between the raised position $P_{RAISED}$ and the lowered position $P_{LOWERED}$ (e.g., the rotational speed w is not constant between the raised position $P_{RAISED}$ and the lowered position $P_{LOWERED}$ and is a function of the number N of full rotations of the covering material 152 that are presently wound around the roller tube 154). Examples of motor drive units configured to the rotational speed of a motor while taking into account the diameter of the roller tube 154 and the amount of the covering material 152 wrapped around each of the roller tube 154 are described in greater detail in U.S. Pat. No. 7,281,565, issue Oct. 16, 2007, entitled SYSTEM FOR CONTROLLING ROLLER TUBE ROTATIONAL SPEED FOR CONSTANT LINEAR SHADE SPEED, the entire disclosure of which is hereby incorporated by reference.

Each of the motorized window treatments 150 may comprise one or more solar cells (e.g., photovoltaic cells) (not shown). For example, the one or more solar cells may be located on the bottom bars 155 of the motorized window treatments 150. The bottom bars 155 may each comprise an energy storage element configured to charge from the one or more solar cells. The motor drive units 156 may be configured to control the respective covering materials 152 to the raised position $P_{RAISED}$ to allow the energy storage element in the bottom bar to discharge into an energy storage element of the respective motor drive unit 156 for producing a storage voltage across the energy storage element. The motor drive units 156 may each be configured to drive the respective motor from the storage voltage produced across the energy storage element in the respective motor drive unit.

The motor drive unit 156 of the motorized window treatments 150 may be coupled together via a power bus 158 (e.g., a DC power bus). The motor drive units 156 of one or more of the motorized window treatments 150 may be configured to charge the energy storage elements of the motor drive unit 156 of one or more of the other motorized window treatments 150 via the power bus 158. The power bus 158 may be electrically coupled to the motor drive units 156 in a daisy-chain configuration (e.g., with the motor drive units 156 coupled in parallel). The power bus 158 may comprise two electrical conductors (e.g., wires) across which the storage voltage of the energy storage element of the motor drive unit 156 of one or more of the motorized window treatments 150 may be coupled for charging the energy storage elements of the motor drive units 156 of the one or more other motorized window treatments 150.

The motor drive units 156 of the motorized window treatments 150 may each be configured to learn the magnitudes of the storage voltages of the energy storage elements of the other motor drive units 156. For example, the motor drive units 156 may each periodically transmit a message including an indication of the magnitude of the storage voltage of the respective energy storage element (e.g., via the RF signals 108). Each of the motor drive units 156 may be configured to determine whether or not to charge the respective energy storage elements of the other motorized window treatments 150 in response to the magnitude of the storage voltage of its energy storage element as well as the magnitudes of the storage voltages of the energy storages elements of the other motorized window treatments 154 received in the messages (e.g., via the RF signals 108).

When the one or more solar cells of a particular motorized window treatment 150 (e.g., the one or more solar cells on the respective bottom bar 155) are not able to receive solar power as efficiently as the solar cells of the other motorized window treatments 150, the motor drive unit 156 of that motorized window treatment 150 may not be able to properly drive its motor to move the covering material 152. The motor drive units 156 of the one or more motorized window treatments 150 may each be configured to charge the energy storage elements of one or more of the other motorized window treatments 150 in response to determining that the one or more of the other motorized window treatments needs to be charged.

The load control system 100 may comprise one or more temperature control devices, e.g., a thermostat 160 (e.g., a control-target device) for controlling a room temperature in the room 102. The thermostat 160 may be coupled to a heating, ventilation, and air conditioning (HVAC) system 162 via a control link (e.g., an analog control link or a wired digital communication link). The thermostat 160 may be configured to wirelessly communicate messages with a controller of the HVAC system 162. The thermostat 160 may comprise a temperature sensor for measuring the room temperature of the room 102 and may control the HVAC system 162 to adjust the temperature in the room to a setpoint temperature. The load control system 100 may comprise one or more wireless temperature sensors (not shown) located in the room 102 for measuring the room temperatures. For example, the thermostat 160 and the wireless temperature sensors may be battery-powered. The HVAC system 162 may be configured to turn a compressor on and off for cooling the room 102 and to turn a heating source on and off for heating the rooms in response to the control signals received from the thermostat 160. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the room 102.

The load control system 100 may comprise one or more input devices (e.g., control-source devices), such as a remote control device 170, an occupancy sensor 172, and/or a daylight sensor 174. The input devices may be fixed or movable input devices. The remote control device 170, the occupancy sensor 172, and/or the daylight sensor 174 may be wireless control devices (e.g., RF transmitters) configured to transmit messages via the RF signals 108 to the system controller 110 (e.g., directly to the system controller). The system controller 110 may be configured to transmit one or more messages to the load control devices (e.g., the dimmer switch 120, the LED driver 130, the plug-in load control device 140, the motorized window treatments 150, and/or the thermostat 160) in response to the messages received from the remote control device 170, the occupancy sensor 172, and/or the daylight sensor 174. The remote control device 170, the occupancy sensor 172, and/or the daylight sensor 174 may also and/or alternatively be configured to transmit messages directly to the dimmer switch 120, the LED driver 130, the plug-in load control device 140, the motorized window treatments 150, and the temperature control device 160.

The remote control device 170 may be configured to transmit messages to the system controller 110 and/or a control-target device via the RF signals 108 in response to an actuation of one or more buttons of the remote control device. For example, the remote control device 170 may be battery-powered. Examples of remote control devices are described in greater detail in commonly-assigned U.S. Pat. No. 9,361,790, issued Jun. 7, 2016, entitled REMOTE CONTROL FOR A WIRELESS LOAD CONTROL SYSTEM, and U.S. Pat. No. 9,633,557, issued Apr. 25, 2017, entitled BATTERY-POWERED RETROFIT REMOTE CONTROL DEVICE, the entire disclosures of which are hereby incorporated by reference.

The occupancy sensor 172 may be configured to detect occupancy and vacancy conditions in the room 102 (e.g., the room in which the occupancy sensors are mounted). For example, the occupancy sensor 172 may be battery-powered. The occupancy sensor 172 may transmit digital messages to the system controller 110 and/or a control-target device via the RF signals 108 in response to detecting the occupancy or vacancy conditions. The system controller 110 may be configured to control load control devices (e.g., the dimmer switch 120, the LED driver 130, and/or the motorized window treatments 152) in response to receiving an occupied command and a vacant command from the occupancy sensor 172. In addition, the load control devices may be responsive to an occupied command and a vacant command received directly from the occupancy sensor 172. Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING, the entire disclosure of which is hereby incorporated by reference.

The daylight sensor 174 may be configured to measure a total light intensity in the room 102 (e.g., the room in which the daylight sensor is installed). For example, the daylight sensor 174 may be battery-powered. The daylight sensor 174 may transmit digital messages (e.g., including the measured light intensity) to the system controller 110 via the RF signals 108 for controlling the intensities of the lighting load 122 and/or the LED light source 132 in response to the measured light intensity. The system controller 110 may be configured to control the load control devices (e.g., the dimmer switch 120, the LED driver 130, and/or the motorized window treatments 152) in response to receiving a message including the measured light intensity from the daylight sensor 174. In addition, the load control devices may be responsive to a message including the measured light intensity received directly from the daylight sensor 174. Examples of RF load control systems having daylight sensors are described in greater detail in commonly-assigned U.S. Pat. No. 8,451,116, issued May 28, 2013, entitled WIRELESS BATTERY-POWERED DAYLIGHT SENSOR, the entire disclosure of which is hereby incorporated by reference.

Each of the input devices (e.g., the system controller 110, the remote control device 170, the occupancy sensor 172, and/or the daylight sensor 174) may be configured to transmit a message to the load control devices (e.g., the dimmer switch 120, the LED driver 130, the plug-in load control device 140, the motorized window treatments 150, and/or the thermostat 160) multiple times during a transmission event. For example, each of the messages of a transmission event may include the same command for controlling one or more of the load control devices. The input devices may be configured to transmit the messages periodically (e.g., at a transmission period $T_{TX}$) during the transmission event. The load control devices that are battery-powered (e.g., the motorized window treatments 150) may be configured to periodically wake up from a sleep state (e.g., at a wake-up period $T_{WAKE-UP}$) to determine if one of the multiple messages of the transmission event is being transmitted. The transmission period $T_{TX}$ and the wake-up period $T_{WAKE-UP}$ may be sized such that each of the load control devices (e.g., the motorized window treatments 150) may not receive each of the multiple messages of the transmission event, but such that most of the load control devices may have received at least one of the messages when a predetermined number of the multiple messages of the transmission event have been transmitted. Each of the motorized window treatments may wait until the predetermined number of the multiple messages of the transmission event have been transmitted before responding to the command. For example, the motorized window treatments may begin adjusting the present positions $P_{PRES}$ of the respective covering materials at a time (e.g., a coordinated action time) that is based on the time at which the predetermined number of the multiple messages of the transmission event have been transmitted (e.g., immediately following when the predetermined number of the multiple messages of the transmission event have been transmitted).

The system controller 110 may be configured to be coupled to a network, such as a wireless or wired local area network (LAN), e.g., for access to the Internet. The system controller 110 may be wirelessly connected to the network. The system controller 110 may be coupled to the network via a network communication bus (e.g., an Ethernet communication link). The system controller 110 may be configured to communicate via the network with one or more network devices, e.g., a mobile device 180, such as, a personal computing device and/or a wearable wireless device. The mobile device 180 may be located on an occupant 182, for example, may be attached to the occupant's body or clothing or may be held by the occupant. The mobile device 180 may be characterized by a unique identifier (e.g., a serial number or address stored in memory) that uniquely identifies the mobile device 180 and thus the occupant 182. Examples of personal computing devices may include a smart phone, a laptop, and/or a tablet device. Examples of wearable wireless devices may include an activity tracking device, a smart watch, smart clothing, and/or smart glasses. In addition, the system controller 110 may be configured to communicate via the network with one or more other control systems (e.g., a building management system, a security system, etc.).

The mobile device 180 may be configured to transmit digital messages via RF signals 109 to the system controller 110 and/or the load control devices, for example, in one or more Internet Protocol packets. For example, the mobile device 180 may be configured to transmit digital messages to the system controller 110 over the LAN and/or via the Internet. The mobile device 180 may be configured to transmit digital messages over the internet to an external service, and then the digital messages may be received by the system controller 110. The load control system 100 may comprise other types of network devices coupled to the network, such as a desktop personal computer (PC), a wireless-communication-capable television, or any other suitable Internet-Protocol-enabled device.

The operation of the load control system 100 may be programmed and configured using, for example, the mobile device 180 or other network device (e.g., when the mobile device is a personal computing device). The mobile device 180 may execute a graphical user interface (GUI) configuration software for allowing a user to program how the load control system 100 will operate. For example, the configuration software may run as a PC application or a web interface. The configuration software and/or the system controller 110 (e.g., via instructions from the configuration software) may generate a load control database that defines the operation of the load control system 100. For example, the load control database may include information regarding the operational settings of different load control devices of the load control system (e.g., the dimmer switch 120, the LED driver 130, the plug-in load control device 140, the motorized window treatments 150, and/or the thermostat 160). The load control database may comprise information regarding associations between the load control devices and the input devices (e.g., the remote control device 170, the occupancy sensor 172, and/or the daylight sensor 174). The load control database may comprise information regarding how the load control devices respond to inputs received from the input devices. Examples of configuration procedures for load control systems are described in greater detail in commonly-assigned U.S. Pat. No. 10,027,127, issued Jul. 17, 2018, entitled COMMISSIONING LOAD CONTROL SYSTEMS, the entire disclosure of which is hereby incorporated by reference.

Figure 2:
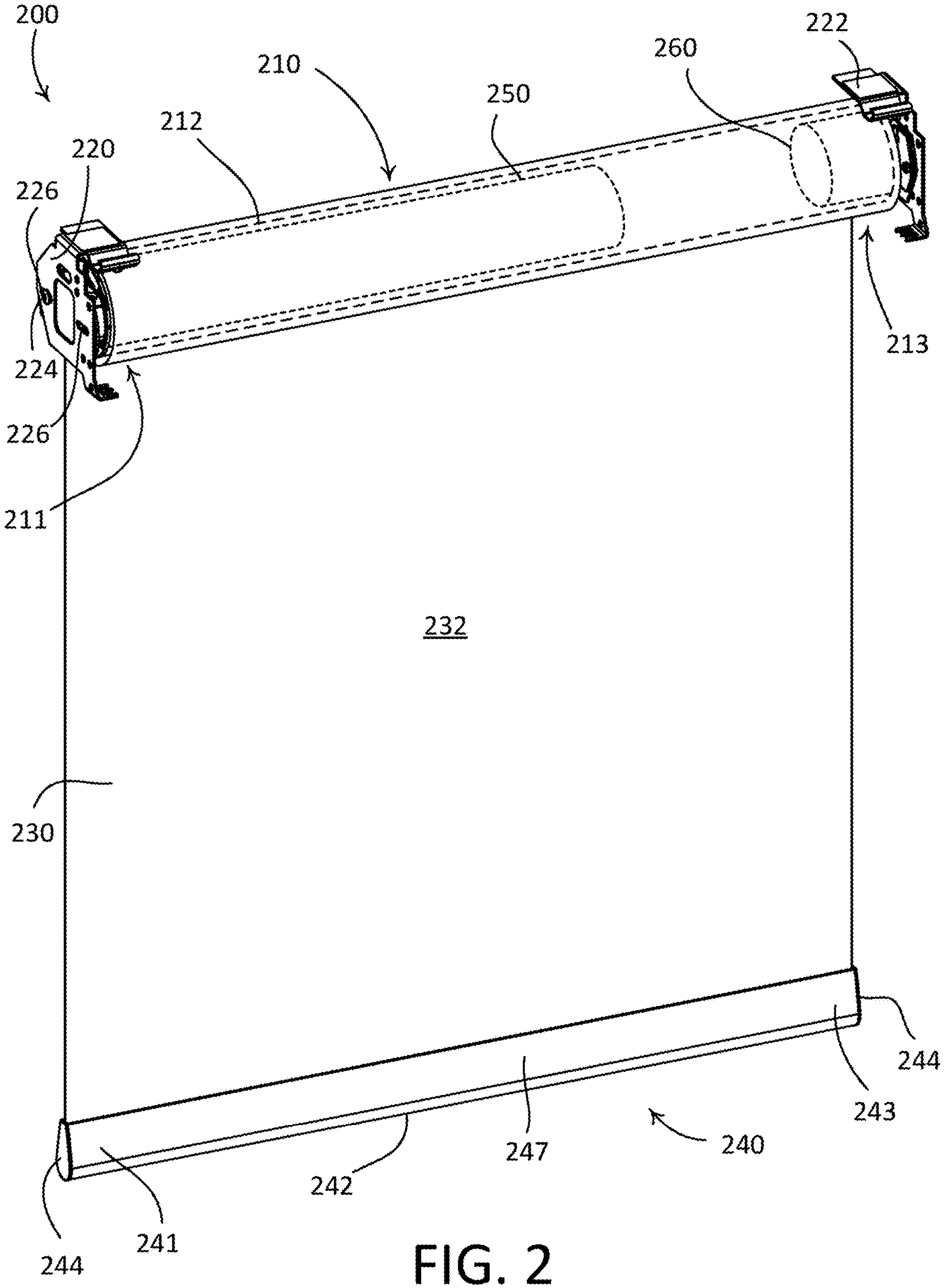
FIG. 2 is a perspective view of an example motorized window treatment.
Figure 3:
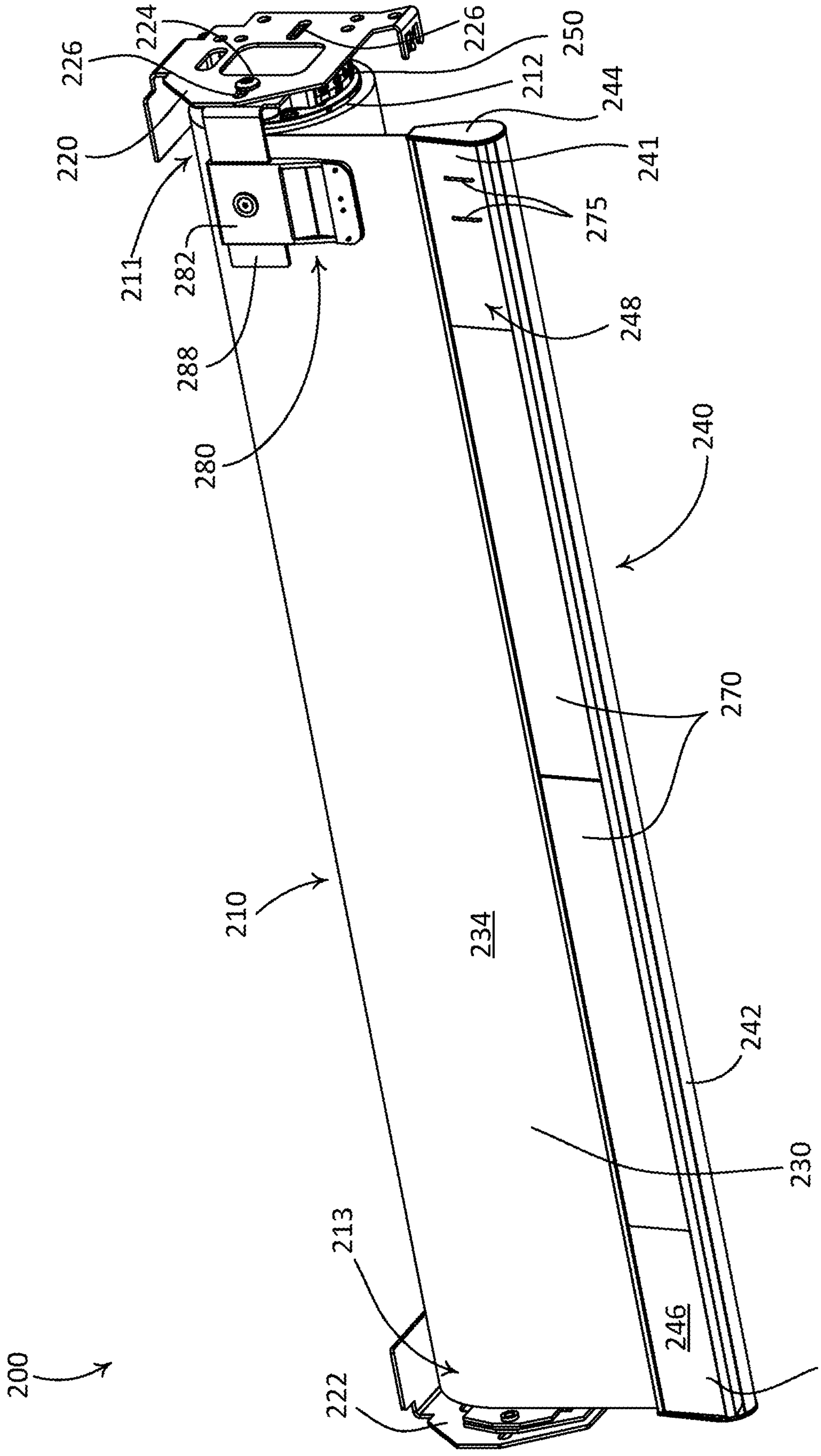
FIG. 3 is a rear perspective view of the motorized window treatment of FIG. 2.

FIG. 2 is a front perspective view and FIG. 3 is a rear perspective view of an example motorized window treatment 200, which may be deployed as one or more of the motorized window treatments 150 of the load control system 100. The motorized window treatment 200 may comprise a window treatment assembly 210 and one or more mounting brackets, such as first and second mounting brackets 220, 222. The first and second mounting brackets 220, 222 may be configured to be coupled to or otherwise mounted to a structure. For example, each of the first and second mounting brackets 220, 222 may be configured to be mounted to (e.g., attached to) a window frame, a wall, or other structure of a building, such that the motorized window treatment 200 may be mounted proximate to an opening (e.g., over the opening or in the opening), such as a window for example. The first and second mounting brackets 220, 222 may be configured to be mounted to a vertical structure (e.g., wall-mounted to a wall) and/or mounted to a horizontal structure (e.g., ceiling-mounted to a ceiling).

Figure 4:
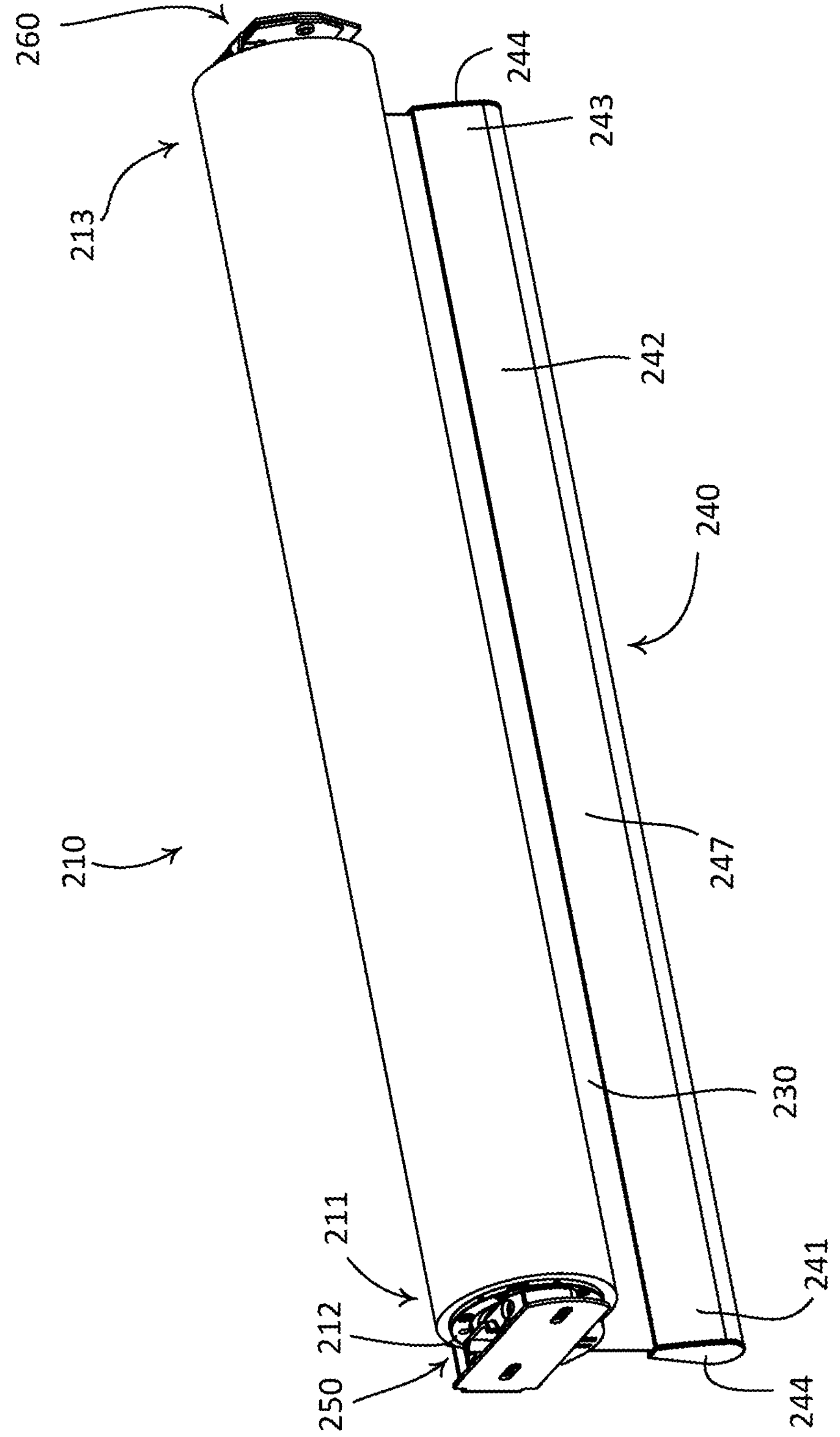
FIG. 4 is a front perspective view of a window treatment assembly of FIG. 2.
Figure 5:
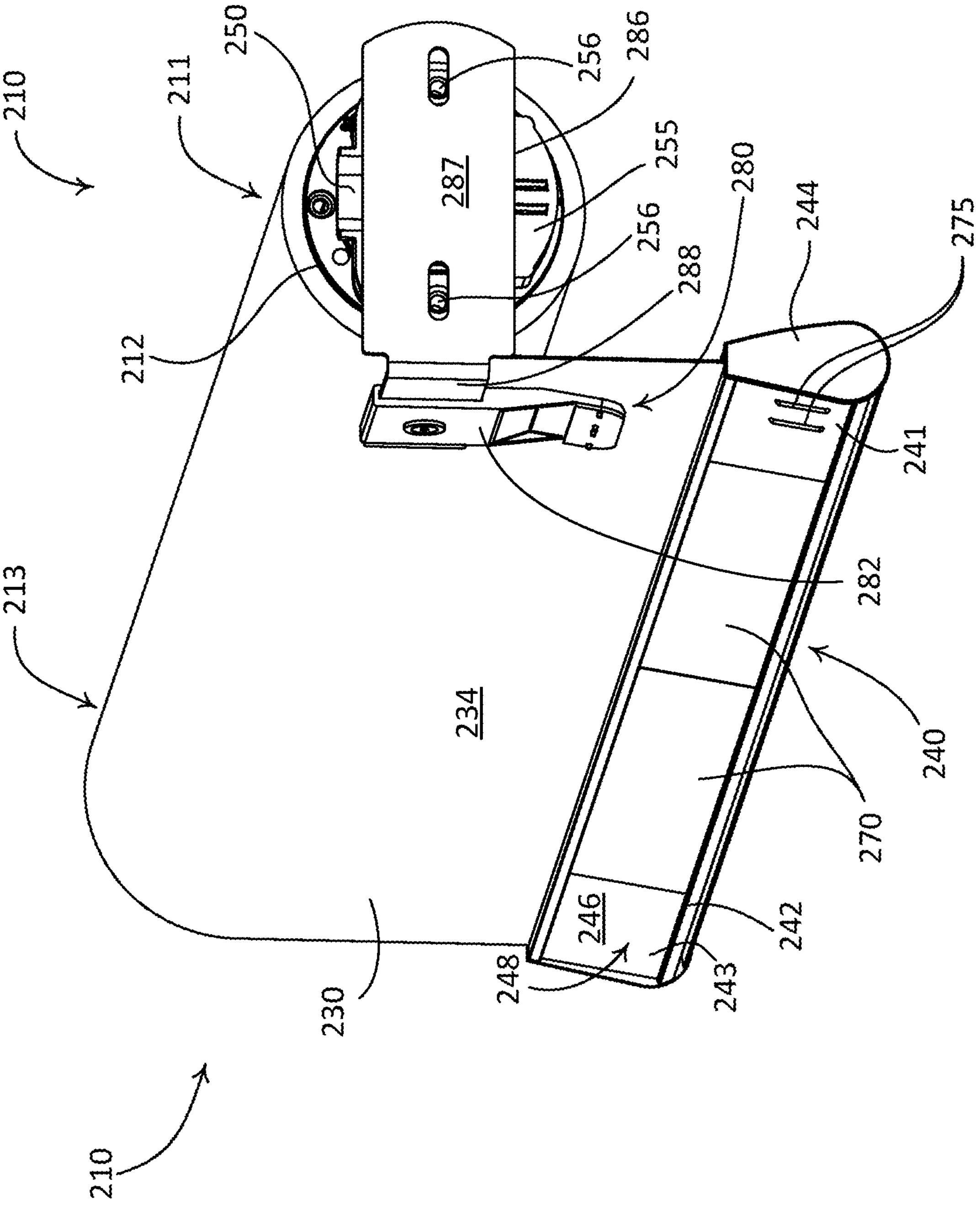
FIG. 5 is a rear perspective view of the window treatment assembly of FIG. 4.
Figure 6:
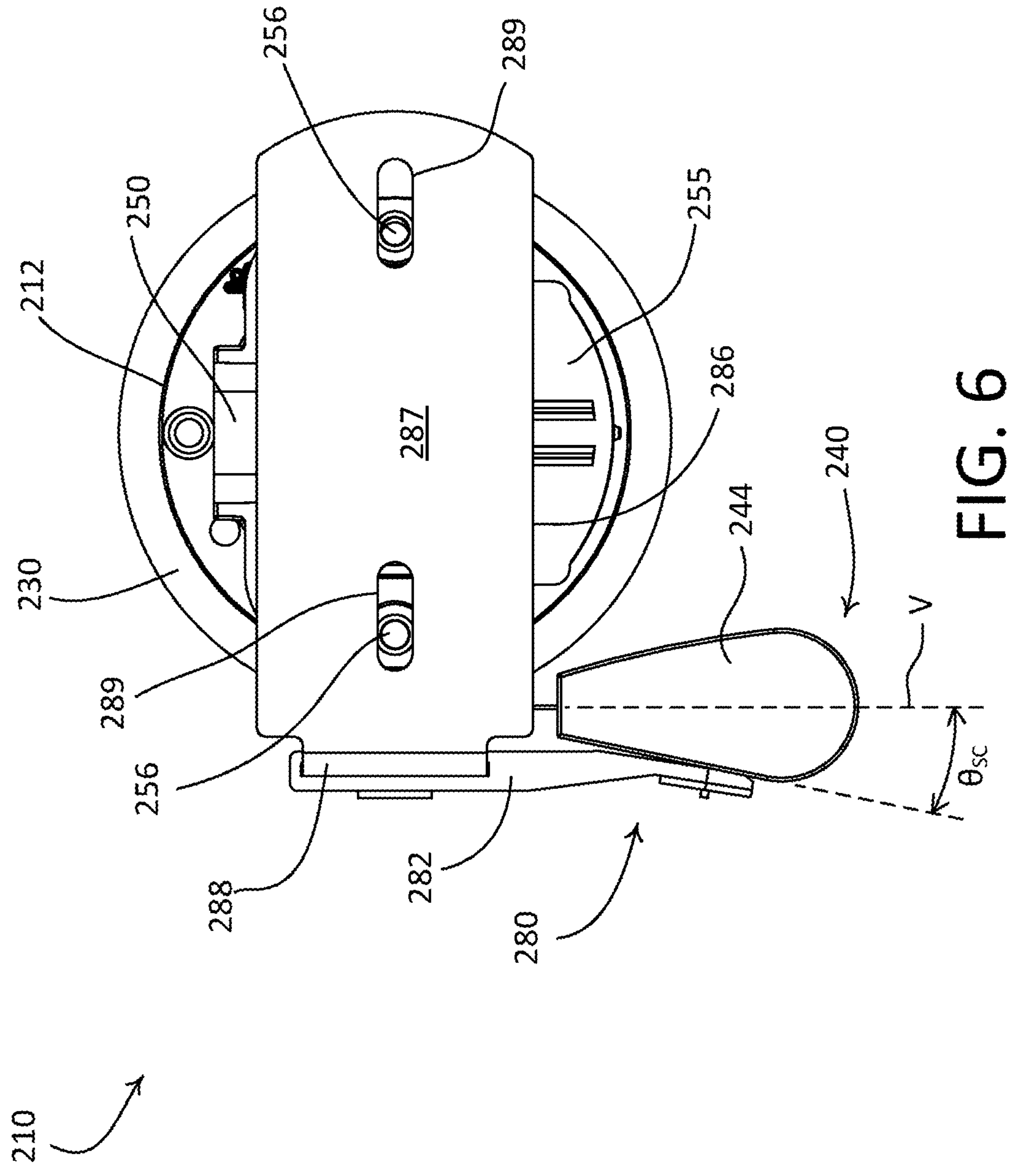
FIG. 6 is a left-side view of the window treatment assembly of FIG. 4.

The window treatment assembly 210 may be coupled to (e.g., supported by) the first and second mounting bracket 220, 222. FIG. 4 is a front perspective view, FIG. 5 is a rear perspective view, and FIG. 6 is a left-side view of the window treatment assembly 210 detached from the first and second mounting brackets 220, 222. The window treatment assembly 210 may include a roller tube 212, a covering material 230 (e.g., a flexible material), a bottom bar 240 (e.g., a hembar), a motor drive unit 250 at a first end 211 of the roller tube 212, and an idler 260 at a second end 213 of the roller tube 212. The motor drive unit 250 may be coupled to (e.g., fixedly coupled to) the first mounting bracket 220 and be rotatably coupled to the roller tube 212 at the first end 211 of the roller tube 212. The idler 260 (FIG. 2) may be coupled to (e.g., fixedly coupled to) the second mounting bracket 222 and rotatably coupled to the roller tube 212 at the second end 213 of the roller tube 212. Other configurations of the motor drive unit 250 and idler 260 are possible. For example, the motor drive unit 250 may be located at the second end 213 of the roller tube 212 and the idler 260 may be located at the first end 211 of the roller tube 212.

The covering material 230 may be windingly attached to the roller tube 212. The covering material 230 may comprise a top end (not shown) attached to the roller tube 212 and a bottom end (not shown) attached to the bottom bar 240. The bottom bar 240 may comprise a housing 242 having first and second ends 241, 243. In some examples, the bottom end of the covering material 230 may be received within the housing 242 and secured to the bottom bar 240 inside the housing 242. The bottom bar 240 may also comprise, for example, end caps 244 connected to the first and second ends 241, 243 of the bottom bar 240. In addition, the bottom bar 240 (e.g., the housing 242) may be configured, for example weighted, to cause the covering material 230 to hang vertically. For example, the covering material 230 may be configured to cover the window that is proximate to the motorized window treatment 200. The covering material 230 may comprise a front surface 232 that faces the space in which the motorized window treatment 200 is mounted and a rear surface 234 that faces the window.

The roller tube 212 of the window treatment assembly 210 may operate as a rotational element of the motorized window treatment 200. The roller tube 212 of the window treatment assembly 210 may be rotatably mounted to (e.g., rotatably supported by) the first and second mounting brackets 220, 222. The first and second mounting brackets 220, 222 may extend from the structure to which the motorized window treatment 200 is mounted. The covering material 230 may be windingly attached to the roller tube 212, such that rotation of the roller tube 212 causes the covering material 230 to wind around or unwind from the roller tube 212. For example, rotation of the roller tube 212 may cause the covering material 230 (e.g., the bottom bar 240) to move between a raised position $P_{RAISED}$ (e.g., a fully-raised position and/or a fully-open position as shown in FIG. 3) and a lowered position $P_{LOWERED}$ (e.g., a fully-lowered position and/or a fully-closed position as shown in FIG. 2).

The covering material 230 may be any suitable material, or form any combination of materials. For example, the covering material 230 may be "scrim," woven cloth, non-woven material, light-control film, screen, and/or mesh. The motorized window treatment 200 may be any type of window treatment. For example, the motorized window treatment 200 may be a roller shade as illustrated, a soft sheer shade, a drapery, a cellular shade, a Roman shade, or a Venetian blind. As shown, the covering material 230 may be a material suitable for use as a shade fabric, and may be alternatively referred to as a flexible material. The covering material 230 is not limited to shade fabric. For example, in accordance with an alternative implementation of the motorized window treatment 200 as a retractable projection screen, the covering material 230 may be a material suitable for displaying images projected onto the covering material. With all types of covering materials, the covering material 230 may have a bottom bar attached at a bottom end of the covering material 230.

Figure 7:
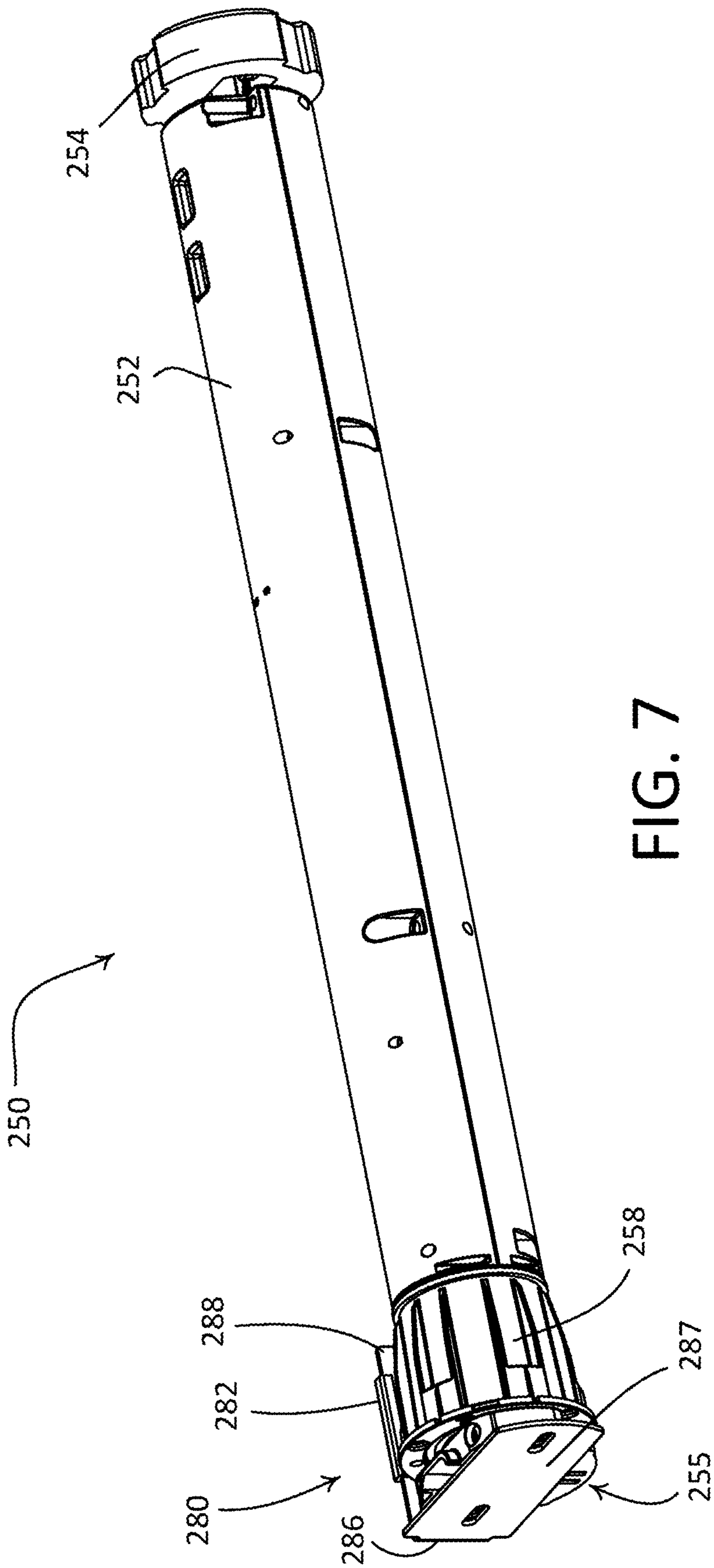
FIG. 7 is a perspective view of a motor drive unit of the window treatment assembly of FIG. 4.
Figure 8:
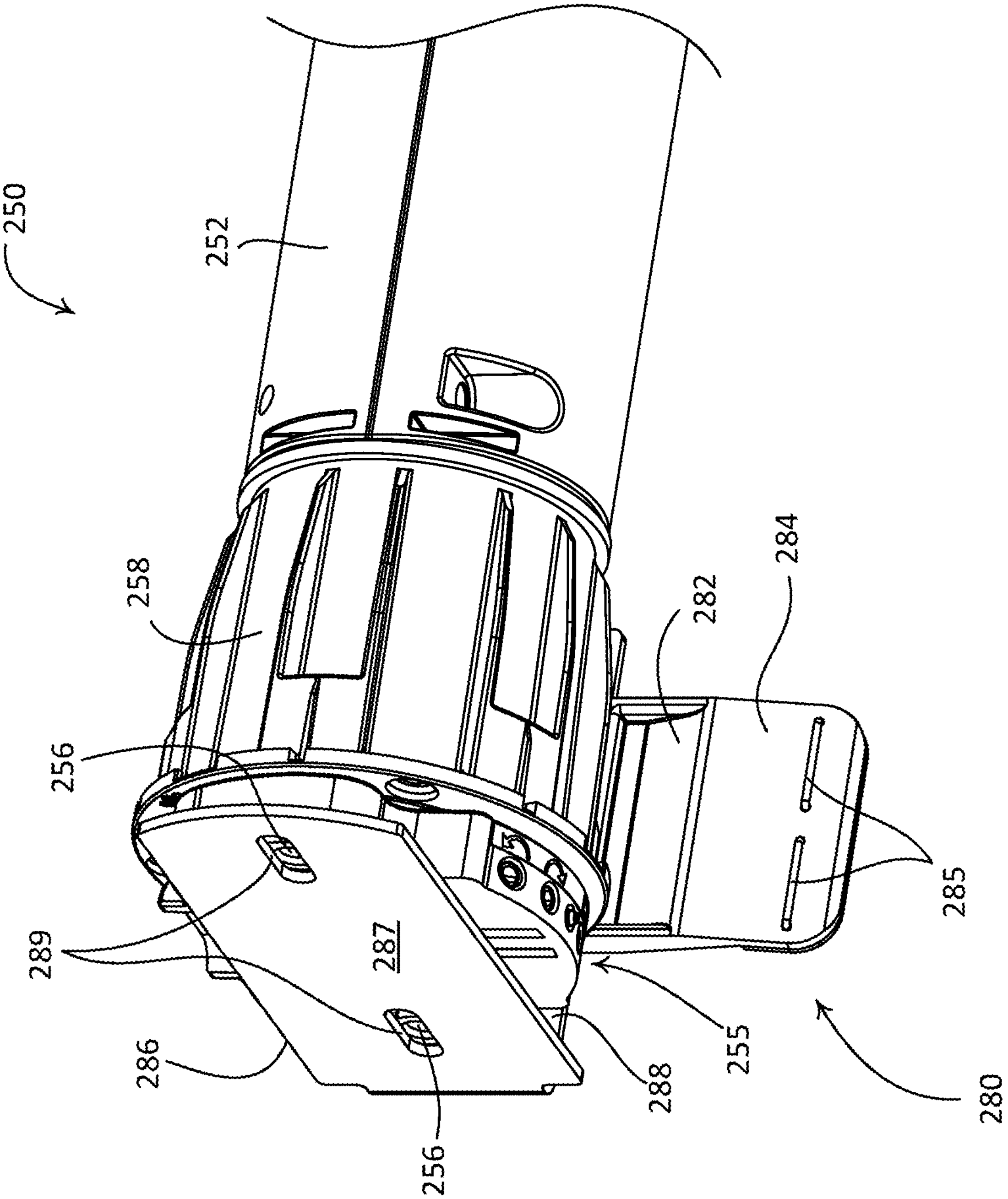
FIG. 8 is a partial enlarged perspective view of the motor drive unit of FIG. 7.
Figure 10:
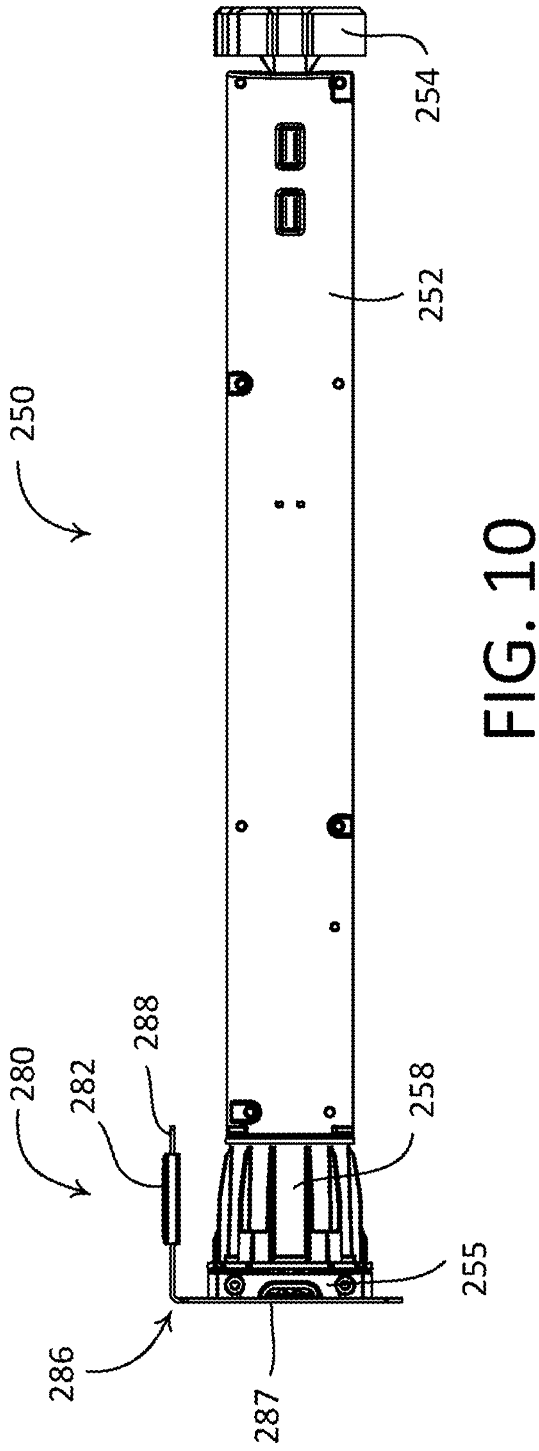
FIG. 10 is a top view of the motor drive unit of FIG. 7.
Figure 9:
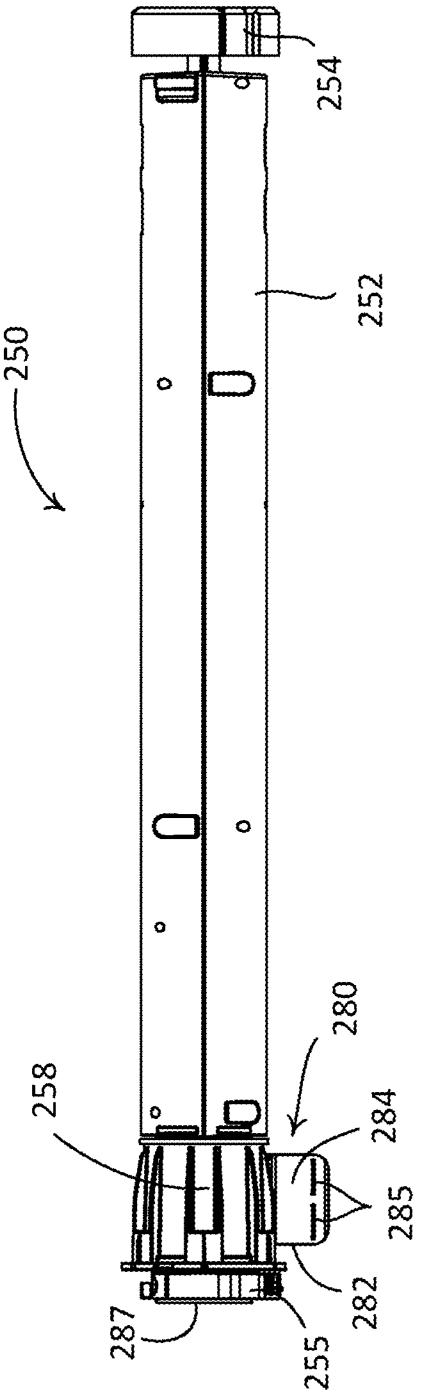
FIG. 9 is a front view of the motor drive unit of FIG. 7.
Figure 11:
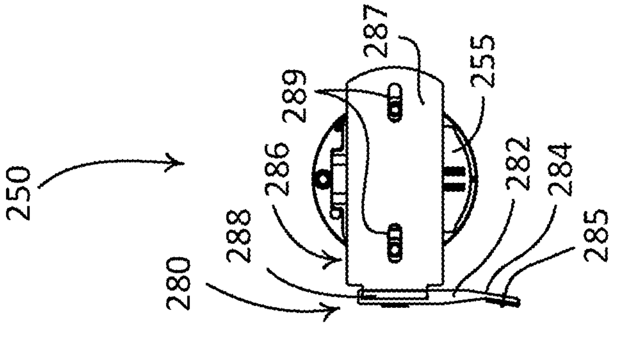
FIG. 11 is a left-side view of the motor drive unit of FIG. 7.

FIG. 7 is a perspective view of an example of the motor drive unit 250. FIG. 8 is a partial enlarged perspective view of the motor drive unit 250. FIG. 9 is a front view, FIG. 10 is a top view, and FIG. 11 is a left-side view of the motor drive unit 250. The motor drive unit 250 may include an enclosure 252 for housing an internal motor (not shown) that may be coupled to a drive coupler 254. The drive coupler 254 may be notched about its outer periphery to facilitate engagement between the drive coupler 254 and an interior surface of the roller tube 212 in which the motor drive unit 250 is received. The motor drive unit 250 may be configured to rotate the drive coupler 254 for rotatably driving the roller tube 212. The motor drive unit 250 may further comprise an end portion 255 that may be coupled to (e.g., supported by) the first mounting bracket 220. For example, the end portion 255 may comprise one or more openings 256 that are configured to receive respective fasteners 224 (e.g., screws as shown in FIGS. 2 and 3). The fasteners 224 may also be received though respective openings 226 in the first and second mounting brackets 220, 222. In some examples, the end portion 255 of the motor drive unit 250 may comprise additional openings (not shown) configured to allow the window treatment assembly 210 to be mounted to other mounting brackets (e.g., other than the first and second mounting brackets 220, 222. The openings 256 and the additional openings may be sized and/or located to allow the window treatment assembly 210 to be mounted to multiple types of mounting brackets (e.g., the first and second mounting brackets 220, 222 as well as other mounting brackets).

The motor drive unit 250 may comprise a bearing assembly 258, which may be located adjacent to the end portion 255 and may be rotatably coupled to the roller tube 212 at the first end 211 of the roller tube 212.

The motor drive unit 250 may be responsive to messages (e.g., digital messages) transmitted by an external device, such as a remote control device, via wireless signals, such as radio-frequency (RF) signals. The motor drive unit 250 may comprise a communication circuit, such as a wireless communication circuit (e.g., an RF transceiver coupled to an antenna, an infrared (IR) receiver, etc.) and/or a wired communication circuit. For example, the antenna may be wrapped around the enclosure 252 of the motor drive unit 250 underneath the bearing assembly 258. The motor drive unit 250 may be configured to control the movement of the covering material 230 in response to a shade movement command received in messages from the remote control device. During a configuration procedure (e.g., an association procedure), the motor drive unit 250 may be associated with the remote control device, such that the motor drive unit 250 may be responsive to the messages transmitted by the remote control device (e.g., via wireless signals). Similarly, as described in more detail herein, the bottom bar 240 may include a communication circuit, such as a wireless communication circuit (e.g., an RF transceiver coupled to an antenna, an infrared (IR) receiver, etc.) and/or a wired communication circuit so that the bottom bar 240 may be configured to communication with the motor drive unit 250.

Figure 12:
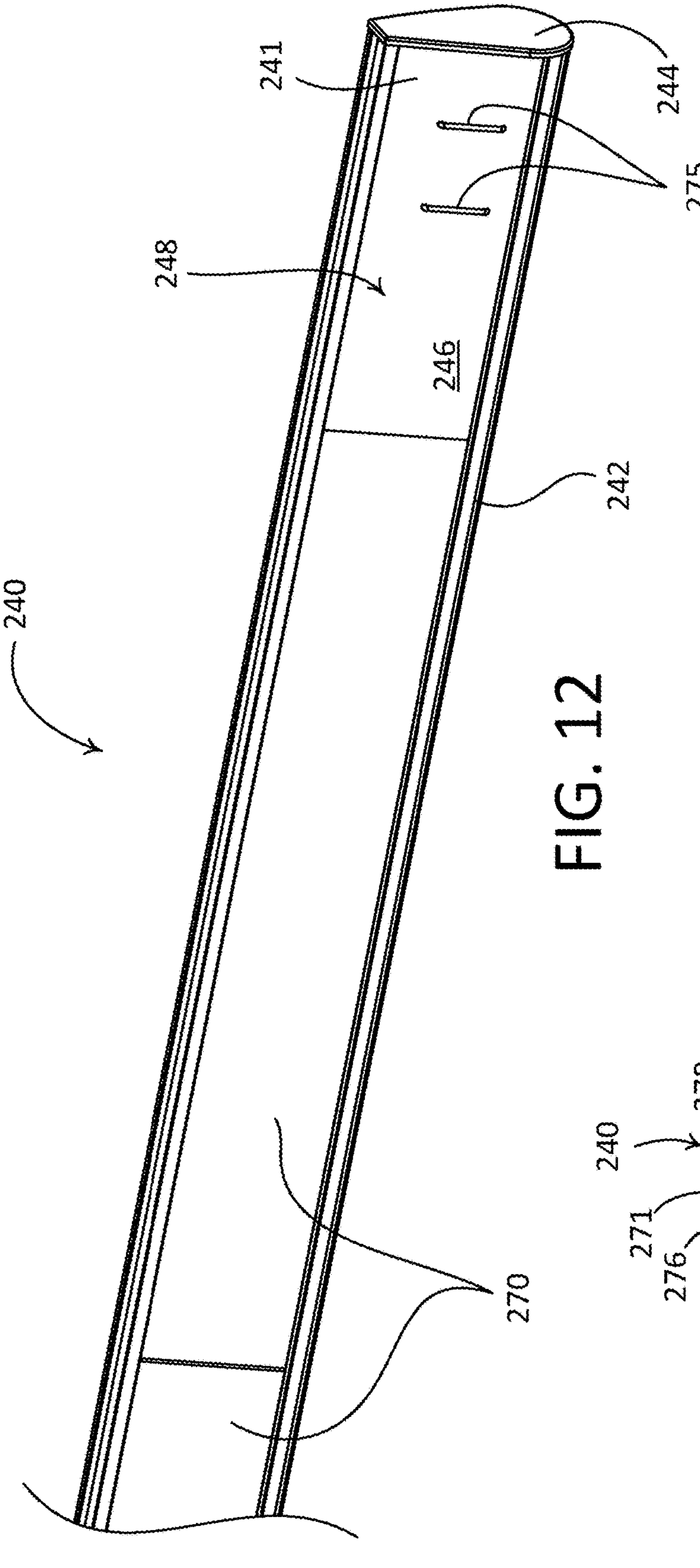
FIG. 12 is a partial enlarged rear perspective view of a bottom bar of the window treatment assembly of FIG. 4.

As shown in FIGS. 3 and 5, the bottom bar 240 may comprise one or more solar cells 270 (e.g., photovoltaic cells). FIG. 12 is an enlarged rear perspective view of the first end 241 of the bottom bar 240. The solar cells 270 may be attached to a rear surface 246 of the housing 242 of the bottom bar 240, such that the solar cells 270 face the window (e.g., that the covering material 230 is configured to cover) and are able to receive solar energy from outside the building (e.g., from the sun). For example, the solar cells 270 may be located within a recess 248 in the housing 242. The rear surface 246 of the housing 242 of the bottom bar 240 may be oriented at an angle $\theta_{SC}$ from a vertical axis V (e.g., with respect to the covering material 230 as shown in FIG. 6), such that the solar cells 270 may be angled up (e.g., towards the sky to maximize the amount of sunlight that may shine on the solar cells 270). The housing 242 and the end caps 244 may define, for example, a teardrop shape as shown in FIG. 6, but could define other shapes, such as a triangular shape or a polygon shape having an angled rear surface. For example, the angle $\theta_{SC}$ at which the solar cells 270 are oriented may be in the range of approximately 5° to 75° (e.g., approximately 30°). The solar cells 270 may be oriented horizontally across the rear surface 246 of the housing 242 of the bottom bar 240. However, in some examples, the solar cells 270 may be oriented vertically (e.g., in parallel with the shade fabric), for instance, across the rear surface 246 of the housing 242 of the bottom bar 240. Further, in some examples, the motorized window treatment 200 may include one or more solar cells 270 attached to an interior surface 247 of the housing 242 of the bottom bar 240 (e.g., receive solar energy from outside the building), for instance, in addition to one or more solar cells 270 being attached to the rear surface 246 of the housing 242 of the bottom bar 240.

Figure 13:
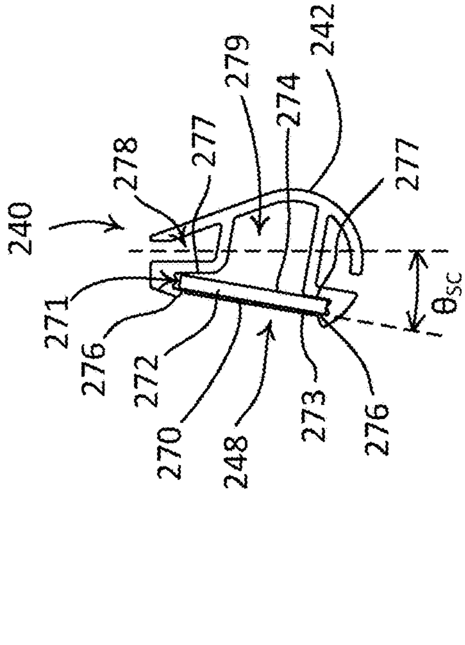
FIG. 13 is a left-side cross section view of the bottom bar of FIG. 12.

FIG. 13 is a left-side cross section view of the bottom bar 240. The bottom bar 240 may comprise a printed circuit board 272 configured to be located in a channel 271, such that an outer surface 273 of the printed circuit board 272 forms at least a portion of the rear surface 246 of the bottom bar 240. The channel 271 in the bottom bar 240 may be formed by flange portions 276 adjacent to the outer surface 273 of the printed circuit board 272 and inner surfaces 277 of the bottom bar 240 adjacent to an inner surface 274 of the printed circuit board 272. For example, the printed circuit board 272 may be configured to be slid into the channel 271 from either the first end 241 or the second end 243 of the bottom bar 240 (e.g., when at least one of the end caps 244 is removed). The solar cells 270 may be located on (e.g., mounted to) the outer surface 273 of the printed circuit board 272. For example, the printed circuit board 272 (e.g., and thus the solar cells 270) may be mounted at the angle $\theta_{SC}$ from the vertical axis V.

The body 242 of the bottom bar 240 may define a first cavity 278 that may be configured to receive the bottom end of the covering material 230. For example, the bottom end of the covering material 240 may be attached to an elongated member (not shown) that may extend through the first cavity 278 (e.g., the from the first end 241 to the second end 243 of the body 242) and may prevent the bottom end of the covering material 230 from being removed from the first cavity 278. In addition, the bottom bar 240 may comprise a second cavity 279 that may also extend from the first end 241 to the second end 243 of the body 242. The second cavity 279 may be configured to receive a weighting member (not shown) for weighting the bottom bar 240 to cause the covering material 230 to hang vertically.

The solar cells 270 of the bottom bar 240 may be electrically connected to one or more energy storage elements (not shown) contained within the housing 242 of the bottom bar 240. The energy storage elements of the bottom bar 240 may comprise, for example, one or more of rechargeable batteries and/or supercapacitors. For example, the energy storage element of the bottom bar 240 may be located in the second cavity 279. The solar cells 270 may be configured to convert the received solar energy into a photovoltaic output voltage, which may be used to charge the energy storage elements located within the housing 242 of the bottom bar 240 (e.g., to generate a storage voltage across the energy storage element). The energy stored in the energy storage elements of the bottom bar 240 may be discharged into the motor drive unit 250 when the bottom bar 240 is close to the motor drive unit 250, for example, when the bottom bar 240 in the raised position $P_{RAISED}$ (e.g., the fully-raised position). For example, the motor drive unit 250 may comprise one or more energy storage elements (not shown) configured to charge from the energy storage elements of the bottom bar 240 when the covering material 230 is in the raised position $P_{RAISED}$. For example, the energy storage elements of the motor drive unit 250 may comprise one or more of rechargeable batteries and/or supercapacitors.

The motorized window treatment 100 (e.g., the motor drive unit 250) may comprise a dock 280 that is configured to facilitate discharging of the energy storage elements of the bottom bar 240 into the energy storage elements of the motor drive unit 250, for example, when the covering material 230 is in the raised position $P_{RAISED}$ (e.g., when the bottom bar 240 is docked). The dock 280 may comprise a base portion 282 that may be located adjacent to the rear surface 234 of the covering material 230 (e.g., adjacent to the window) at the first end 211 of the roller tube 212. The bottom bar 240 may be configured to be positioned adjacent to the base portion 282 of the dock 280 when the covering material 230 is in the raised position $P_{RAISED}$, such that the energy storage elements of the bottom bar 240 may discharge through the base portion 282 of the dock 280 into the energy storage elements of the motor drive unit 250. The base portion 282 of the dock 280 may define a contact surface 284 that may be configured to abut against the rear surface 246 of the bottom bar 240 when the bottom bar 240 is docked (e.g., when the covering material 230 is in the raised position $P_{RAISED}$). The contact surface 284 of the base portion 282 may be oriented at approximately the angle $\theta_{SC}$ from the vertical axis V (e.g., to match the rear surface 246 of the bottom bar 240).

The dock 280 may also comprise two or more electrical contacts 285 (e.g., two horizontally-oriented electrical contacts) located on the contact surface 284 of the base portion 282. The base portion 282 of the dock 280 (e.g., the electrical contacts 285) may be electrically coupled to the motor drive unit 250. For example, the base portion 282 of the dock 280 may be electrically coupled to the motor drive unit 250 via two or more electrical conductors (e.g., wires) extending between the base portion 282 of the dock 280 and the end portion 255 of the motor drive unit 250. The dock 280 may further comprise an attachment member 286 that extends from the end portion 255 of the motor drive unit 250 to the base portion 282. The attachment member 286 may comprise a plate 287 and an arm 288 that is oriented at an angle (e.g., approximately 90°) From the plate 287 (e.g., to bend the attachment member 286 behind the rear surface 234 of the covering material 230). The electrical conductors that extend between the base portion 282 of the dock 280 and the end portion 255 of the motor drive unit 250 may be located internal to or external to the attachment member 286. The plate 287 may comprise openings 289 through which the respective fasteners 224 may extend for coupling the window treatment assembly 210 to the first mounting bracket 220 (e.g., extending through the openings 256 in the first mounting bracket 220 and the openings 256 in the end portion 255 of the motor drive unit 250). For example, the attachment member 286 (e.g., the plate 287) may be affixed to and/or formed as a part of (e.g., integral with) the enclosure 252 and/or the end portion 255 of the motor drive unit 250. In some examples, the attachment member 286 may be affixed to and/or formed as a part of the first mounting bracket 220.

The electrical contacts 285 of the dock 280 may be configured to contact respective electrical contacts 275 (e.g., two vertically-oriented electrical contacts) on the rear surface 246 of the bottom bar 240 (e.g., at the first end 241 of the bottom bar 240) when the bottom bar 240 is docked (e.g., when the covering material 230 is in the raised position $P_{RAISED}$). Each of the electrical contacts 275 of the bottom bar 240 and the electrical contacts 285 of the dock 280 may be, for example, an elongated conductive element (e.g., an uninsulated wire). The electrical contacts 275 of the bottom bar 240 and the electrical contacts 285 of the dock 280 may be located next to each other (e.g., horizontally spaced apart from each other). For example, the electrical contacts 275 of the bottom bar 240 may be oriented vertically and the electrical contacts 285 of the dock 280 may be oriented horizontally to facilitate electrical connection between the respective electrical contacts 275, 285 when the bottom bar 240 is docked. The electrical contacts 275 of the bottom bar 240 may be electrically connected to the energy storage elements in the bottom bar 240, and the electrical contacts 285 of the dock 280 may be electrically connected to the energy storage elements of the motor drive unit 250, such that that the energy storage elements of the motor drive unit 250 may charge from the energy storage elements of the bottom bar 240 when the bottom bar 240 is docked. For example, the electrical contacts 275 of the bottom bar 240 may be biased (e.g., spring-loaded) away from the rear surface 246 and/or the electrical contacts 285 of the dock 280 may be biased (e.g., spring-loaded) away from the contact surface 284 to help establish and/or maintain the electrical contacts between the electrical contacts 275 of the bottom bar 240 and the electrical contacts 285 of the dock 280.

Alternatively or additionally, the electrical contacts 275 may be located on different surfaces of the bottom bar 240, such as on one of the end caps 244. In such examples, the dock 280 and the electrical contacts 285 of the dock 280 may be positioned such that the electrical contacts 285 of the dock 280 are aligned with the end cap 244 of the bottom bar 240.

Since the motor drive unit 250 is powered from (e.g., entirely powered from) the solar cells 270 and is configured to wirelessly communicate with external devices, the window treatment assembly 210 may be mounted to essentially any mounting brackets-even mounting brackets for manually-operated window treatment assemblies. Accordingly, the window treatment assembly 210 may provide a retro-fit solution for upgrading a manually-operated window treatment to a motorized window treatment without the need to replace the mounting brackets and/or run electrical wiring to the new motorized window treatment.

In some examples, the motor drive unit 250 may include electrical terminal (not shown) that are configured to allow for an external power source to jump start the motor drive unit 250 or recharge the motor drive unit 250 (e.g., if the motor drive unit 250 is uncharged and/or not performing well). In some examples, the electrical terminal may be a standard power supply connector (e.g., a USB connector). As such, the motor drive unit 250 (e.g., the energy storage element of the motor drive unit 250) could receive power from an external power source.

Although described in context of the motorized window treatment 200 comprises a bottom bar 240 that includes solar cells 270 and the bottom bar 240 is configured to charge the motor drive unit 210, the motorized window treatment 200 is not always so limited. In some examples, the bottom bar 240 may not be configured to charge the motor drive unit 210. For example, the motor drive unit 210 may be powered from an external source and/or changeable batteries. For instance, in some examples, the bottom bar 240 may include solar cells and the motor drive unit 210 may charge the energy storage element of the motor drive unit 210 when the bottom bar 240 is docked. Alternatively or additionally, the bottom bar 240 may include the solar cells 270, and one or more of the solar cells 270 may be configured to charge the energy storage element in the bottom bar 240 between docking events, or when docking is not possible. In some examples, the bottom bar 240 may not include solar cells 270. For example, the bottom bar 240 may not include solar cells 270 in examples where the bottom bar 240 is not able to or does not need to dock (e.g., when there is a wired connection between the bottom bar 240 and the motor drive unit 210. Finally, in some examples, the bottom bar 240 may include one or more sensors, such as an occupancy sensor, a vacancy sensor, a photosensor, etc., where the bottom bar 240 and/or the motor drive unit 210 may be configured to control the motorized window treatment 200 and/or external devices (e.g., such as lighting loads) based on feedback from the sensor(s). Finally, in some examples, the motor drive unit may be configured to move the covering material 230 to the raised position $P_{RAISED}$ if the motor drive unit 210 detects that the window is open (e.g., based on feedback from one or more sensors).

Figure 14:
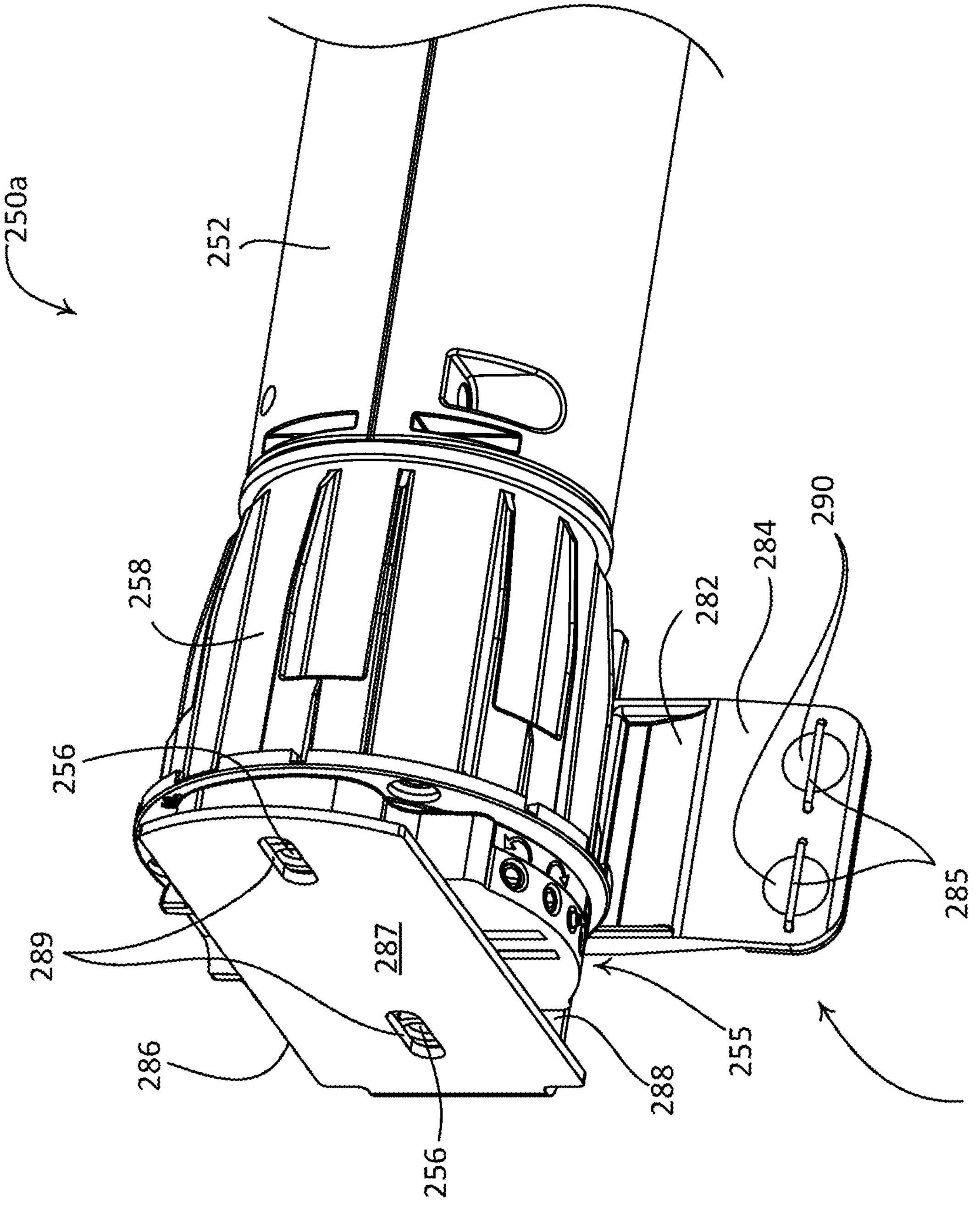
FIG. 14 is a partial enlarged perspective view of another example motor drive unit for use in a motorized window treatment.

FIG. 14 is a partial enlarged perspective view of another example motor drive unit 250*a* for use in a motorized window treatment, such as the motorized window treatments 150 of the load control system 100 shown in FIG. 1 and/or the motorized window treatment 200 shown in FIG. 2. The motor drive unit 250*a* may be the same as the motor drive unit 250 except that the motor drive unit 250*a* may comprise one or more magnets 290. The magnets 290 may be located on the contact surface 284 of the base portion 282 of the dock 280 of the motor drive unit 250*a*. For example, as shown in FIG. 14, each of the magnets 290 may be located behind one of the respective electrical contacts 285 of the dock 280, and may be configured to be magnetically attracted to the respective electrical contacts 275 on the bottom bar 240. The magnets 290 may be configured to pull the electrical contacts 275 of the bottom bar 240 towards the electrical contacts 285 of the dock 280 to facilitate electrical connection between the electrical contacts 275 of the bottom bar 240 and the electrical contacts 285 of the dock 280 when the bottom bar 240 is docked. The bottom bar 240 may have a sufficient weight that may counteract the magnetic attraction between the magnets 290 and the respective electrical contacts 275 on the bottom bar 240 when the motor drive unit 250*a* lowers the bottom bar 240 below the raised position $P_{RAISED}$ (e.g., to undock the bottom bar 240). In some examples, rather than being located behind the electrical contacts 285 of the dock 280, the magnets 290 may be located on other portions of the contact surface 284 of the base portion 282 and may be configured to be magnetically attracted to respective magnets (not shown) on the bottom bar 240. Further, while two magnets 290 are shown in FIG. 14, the motor drive unit 250*a* may comprise more or less magnets.

Figure 15:
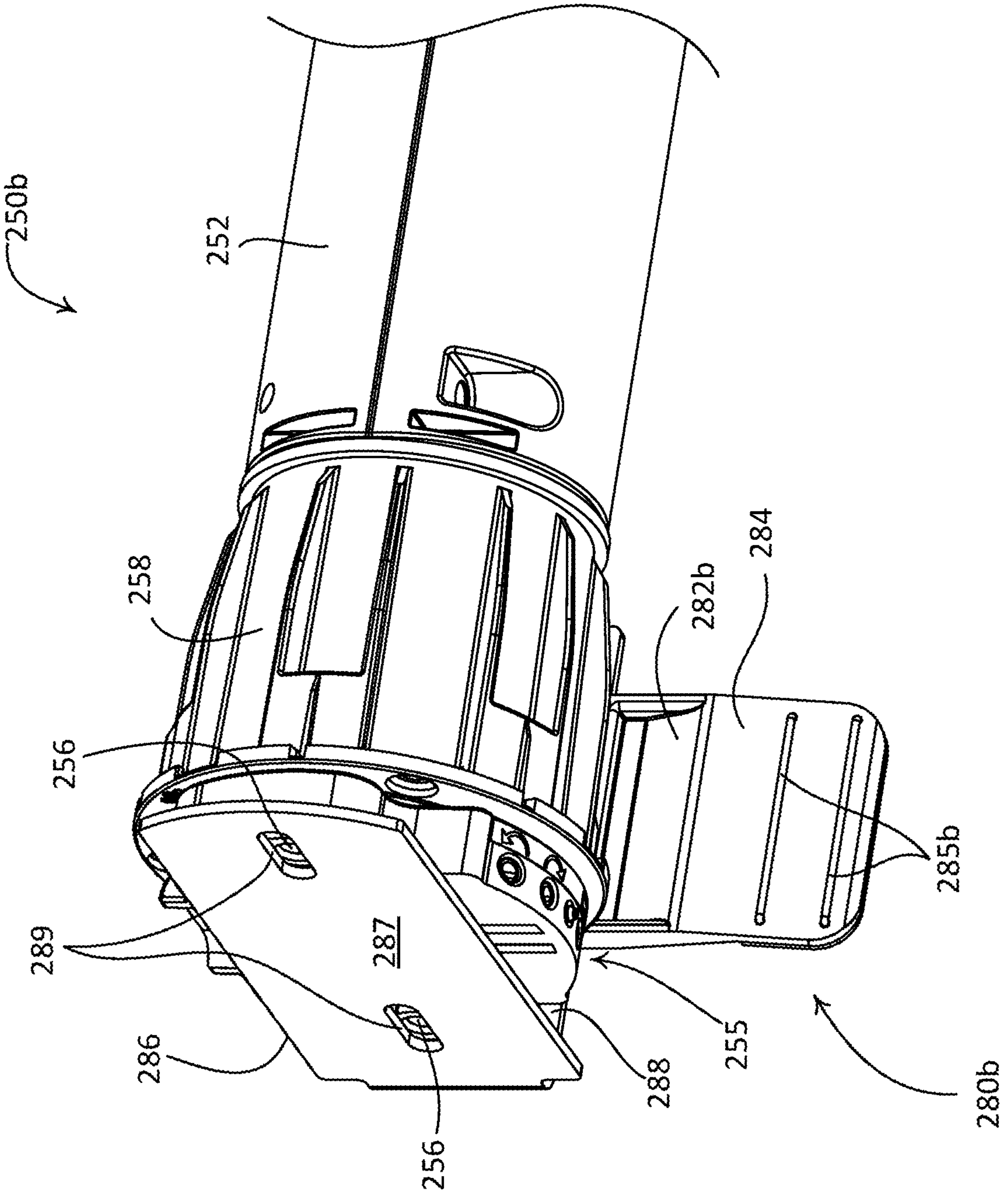
FIG. 15 is a partial enlarged perspective view of another example motor drive unit for use in a motorized window treatment.
Figure 16:
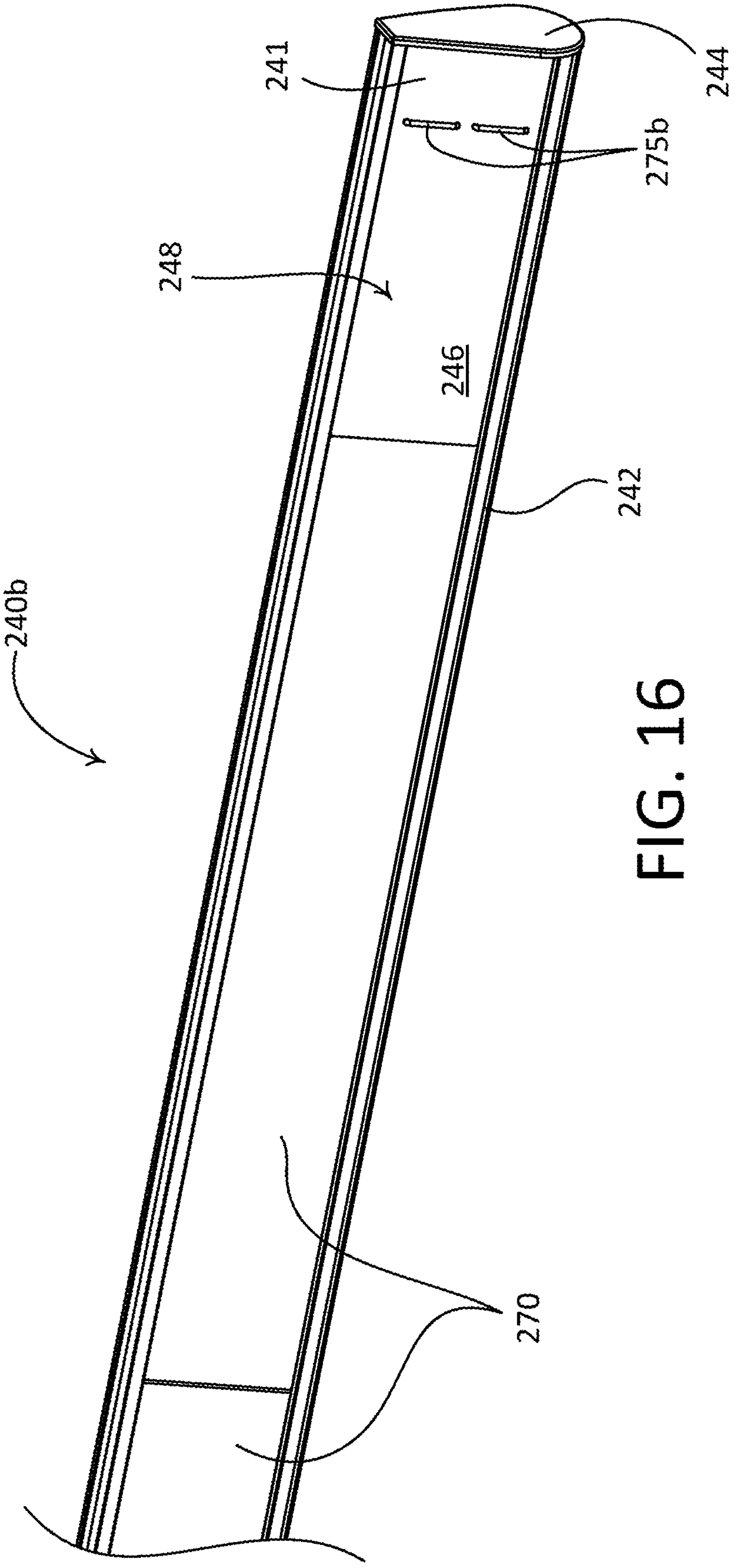
FIG. 16 is a partial enlarged rear perspective view of another example bottom bar for use in the motorized window treatment that includes the motor drive unit of FIG. 15.

FIG. 15 is a partial enlarged perspective view of another example motor drive unit 250*b* for use in a motorized window treatment, such as the motorized window treatments 150 of the load control system 100 shown in FIG. 1 and/or the motorized window treatment 200 shown in FIG. 2. FIG. 16 is a partial enlarged rear perspective view of another example bottom bar 240*b* for use in the motorized window treatment that includes the motor drive unit 250*b*. The motor drive unit 250*b* may comprise a dock 280*b* that may include a base portion 282*b* having electrical contacts 285*b* (e.g., two horizontally-oriented electrical contacts). The electrical contacts 285*b* of the dock 280*b* may be configured to contact respective electrical contacts 275*b* (e.g., two vertically-oriented electrical contacts) on the rear surface 246 of the bottom bar 240*b* (e.g., at the first end 241 of the bottom bar 240*b*) when the bottom bar 240*b* is docked (e.g., when a covering material of the motorized window treatment is in the raised position $P_{RAISED}$). Each of the electrical contacts 275*b* of the bottom bar 240*b* and the electrical contacts 285*b* of the dock 280*b* may be, for example, an elongated conductive element (e.g., an uninsulated wire). The electrical contacts 275*b* of the bottom bar 240*b* and the electrical contacts 285*b* of the dock 280*b* may be vertically spaced apart from each other. For example, the electrical contacts 275*b* of the bottom bar 240*b* may be oriented vertically and the electrical contacts 285*b* of the dock 280*b* may be oriented horizontally to facilitate electrical connection between the respective electrical contacts 275*b*, 285*b* when the bottom bar 240*b* is docked. The electrical contacts 275*b* of the bottom bar 240*b* may be electrically connected to energy storage elements in the bottom bar 240*b*, and the electrical contacts 285*b* of the dock 280*b* may be electrically connected to energy storage elements of the motor drive unit 250*b*, such that that the energy storage elements of the motor drive unit 250*b* may charge from the energy storage elements of the bottom bar 240*b* when the bottom bar 240*b* is docked. For example, the electrical contacts 275*b* of the bottom bar 240*b* may be biased (e.g., spring-loaded) away from the rear surface 246 and/or the electrical contacts 285*b* of the dock 280*b* may be biased (e.g., spring-loaded) away from the contact surface 284 to help establish and/or maintain the electrical contacts between the electrical contacts 275*b* of the bottom bar 240*b* and the electrical contacts 285*b* of the dock 280*b*. While the electrical contacts 275*b* of the bottom bar 240*b* are oriented vertically and the electrical contacts 285*b* of the dock 280*b* are oriented horizontally as shown in FIGS. 15 and 16, the electrical contacts 275*b*, 285*b* may be provided in different orientations, including non-vertical and non-horizontal orientations.

Figure 17:
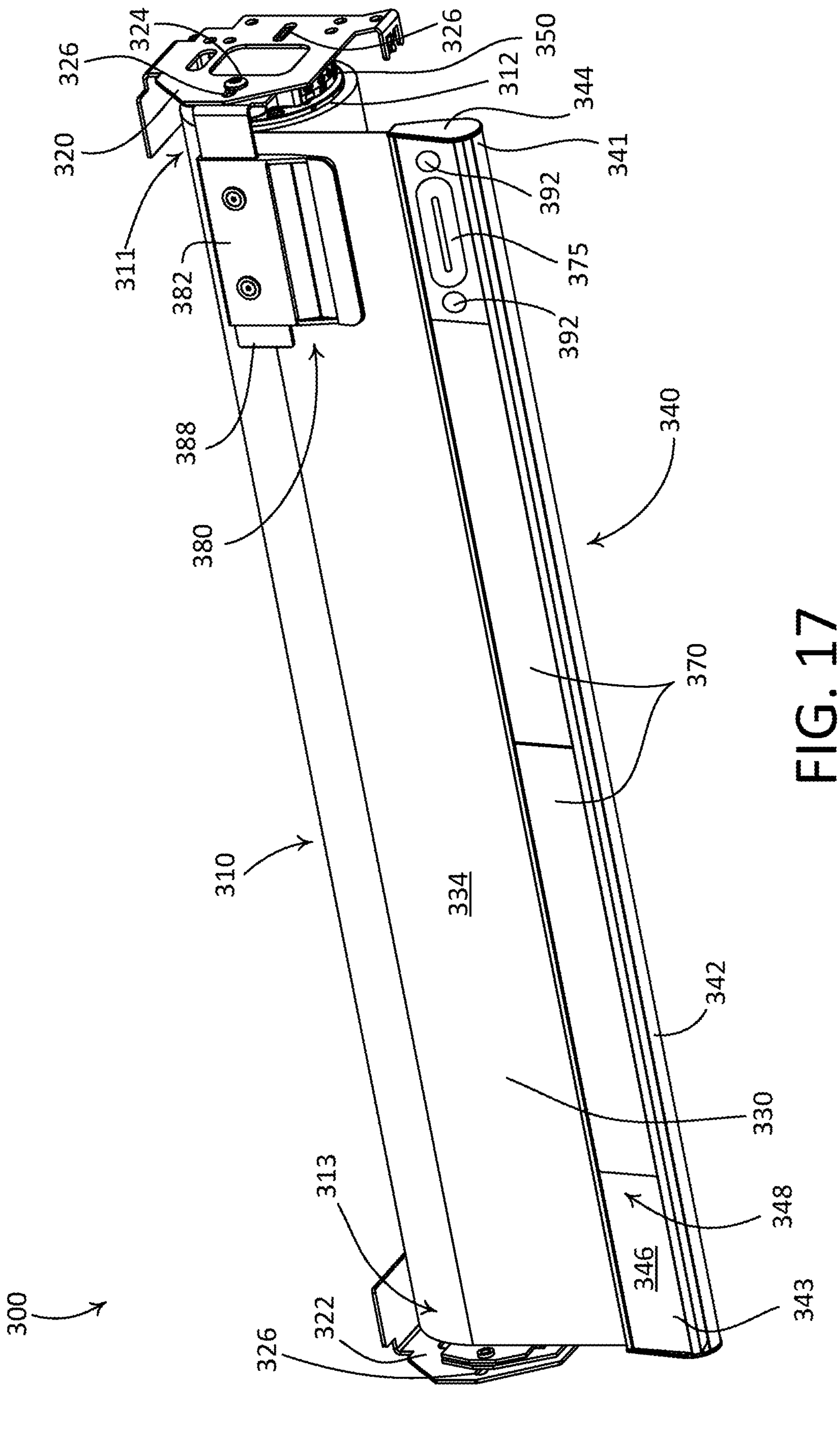
FIG. 17 is a rear perspective view of another example motorized window treatment.

FIG. 17 is a rear perspective view of another example motorized window treatment 300, which may be deployed as one or more of the motorized window treatments 150 of the load control system 100. The motorized window treatment 300 may comprise a window treatment assembly 310 and one or more mounting brackets, such as first and second mounting brackets 320, 322. The first and second mounting brackets 320, 322 may be configured to be coupled to or otherwise mounted (e.g., wall-mounted and/or ceiling-mounted) to a structure (e.g., a window frame, a wall, or other structure of a building), such that the motorized window treatment 300 may be mounted proximate to an opening (e.g., a window). The window treatment assembly 310 may be coupled to (e.g., supported by) the first and second mounting bracket 320, 322. The window treatment assembly 310 may include a roller tube 312, a covering material 330, a bottom bar 340, a motor drive unit 350 at a first end 311 of the roller tube 312, and an idler (e.g., the idler 260) at a second end 313 of the roller tube 312. The motor drive unit 350 may be coupled to (e.g., fixedly coupled to) the first mounting bracket 320 and be rotatably coupled to the roller tube 312 at the first end 311 of the roller tube 312. The idler may be coupled to (e.g., fixedly coupled to) the second mounting bracket 322 and rotatably coupled to the roller tube 312 at the second end 313 of the roller tube 312.

The covering material 330 may be windingly attached to the roller tube 312. In some examples, a bottom end of the covering material 330 may be received within a housing 342 of the bottom bar 340 and secured to the bottom bar 340 inside the housing 342. The bottom bar 340 may comprise, for example, end caps 344 connected to the first and second ends 341, 343 of the bottom bar 340. The bottom bar 340 (e.g., the housing 342) may be configured, for example weighted, to cause the covering material 330 to hang vertically (e.g., to cover the window that is proximate to the motorized window treatment 300). The roller tube 312 of the window treatment assembly 310 may operate as a rotational element of the motorized window treatment 300. The roller tube 312 of the window treatment assembly 310 may be rotatably mounted to (e.g., rotatably supported by) the first and second mounting brackets 320, 322. Rotation of the roller tube 312 may cause the covering material 330 to wind around or unwind from the roller tube 312 to move the covering material 330 (e.g., the bottom bar 340) between a raised position $P_{RAISED}$ (e.g., a fully-raised position and/or a fully-open position) and a lowered position $P_{LOWERED}$ (e.g., a fully-lowered position and/or a fully-closed position).

Figure 18:
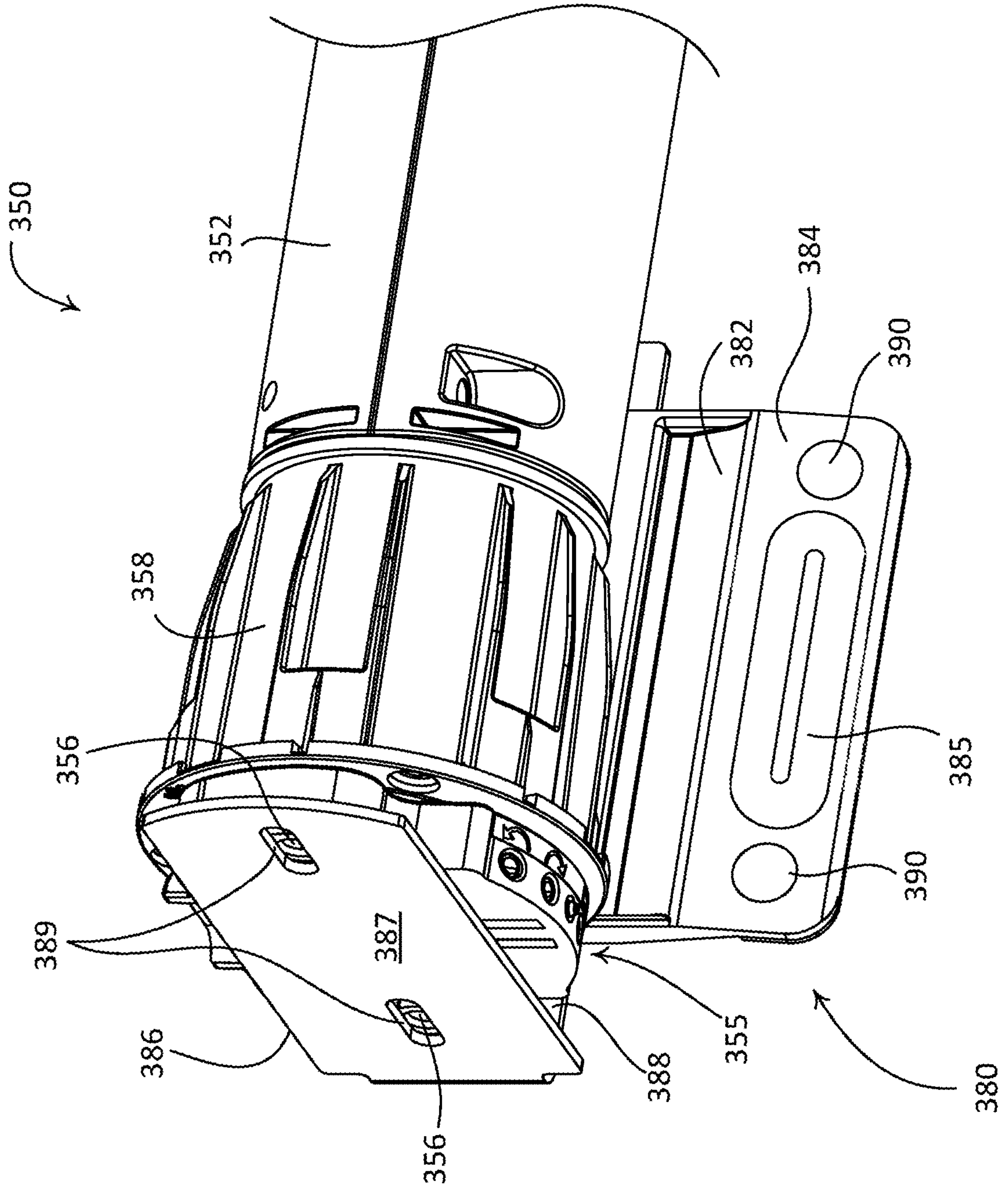
FIG. 18 is a partial enlarged perspective view of a motor drive unit of the motorized window treatment of FIG. 17.

FIG. 18 is a partial enlarged perspective view of an example of the motor drive unit 350. The motor drive unit 350 may include an enclosure 352 for housing an internal motor (not shown) that may be coupled to a drive coupler (e.g., such as the drive coupler 254). The motor drive unit 350 may be configured to rotate the drive coupler for rotatably driving the roller tube 312. The motor drive unit 350 may further comprise an end portion 355 that may be coupled to (e.g., supported by) the first mounting bracket 320. For example, the end portion 355 may comprise one or more openings 356 that are configured to receive respective fasteners 324 (e.g., screws). The fasteners 324 may also be received though respective openings 326 in the first and second mounting brackets 320, 322. In some examples, the end portion 355 of the motor drive unit 350 may comprise additional openings (not shown) configured to allow the window treatment assembly 310 to be mounted to other mounting brackets (e.g., other than the first and second mounting brackets 320, 322). The openings 356 and the additional openings may be sized and/or located to allow the window treatment assembly 310 to be mounted to multiple types of mounting brackets (e.g., the first and second mounting brackets 320, 322 as well as other mounting brackets). The motor drive unit 350 may comprise a bearing assembly 358, which may be located adjacent to the end portion 355 and may be rotatably coupled to the roller tube 312.

As shown in FIG. 17, the bottom bar 340 may comprise one or more solar cells 370 (e.g., photovoltaic cells). The solar cells 370 may be attached to a rear surface 346 of the housing 342 of the bottom bar 340, such that the solar cells 370 face the window (e.g., that the covering material 330 is configured to cover) and are able to receive solar energy from outside the building (e.g., from the sun). The bottom bar 340 may comprise a printed circuit board (e.g., the printed circuit board 272) configured to be located in a channel (e.g., the channel 271) in the housing 342, such that an outer surface of the printed circuit board (e.g., the outer surface 273 of the printed circuit board 272) forms at least a portion of the rear surface 346 of the bottom bar 340. The solar cells 370 may be mounted to the outer surface of the printed circuit board, and may be located within a recess 348 in the housing 342. The rear surface 346 of the housing 342 of the bottom bar 340 may be oriented at an angle from the vertical axis (e.g., such as the angle $\theta_{SC}$ at which the rear surface 246 of the bottom bar 240 is oriented from a vertical axis V as shown in FIG. 6), such that the solar cells 370 may be angled up (e.g., towards the sky to maximize the amount of sunlight that may shine on the solar cells 370).

The solar cells 370 may be electrically connected to one or more energy storage elements (not shown) contained within the housing 342 of the bottom bar 340. For example, the energy storage elements of the bottom bar 340 may comprise one or more of rechargeable batteries and/or supercapacitors. The solar cells 370 may be configured to convert the received solar energy into a photovoltaic output voltage, which may be used to charge the energy storage elements located within the housing 342 of the bottom bar 340 (e.g., to generate a storage voltage across the energy storage element). The energy stored in the energy storage elements of the bottom bar 340 may be discharged into the motor drive unit 350 when the bottom bar 340 is close to the motor drive unit 350, for example, when the bottom bar 340 is docked (e.g., when a covering material of the motorized window treatment is in the raised position $P_{RAISED}$). For example, the motor drive unit 350 may comprise one or more energy storage elements (not shown) configured to charge from the energy storage elements of the bottom bar 340 when the bottom bar 340 is in the raised position $P_{RAISED}$. For example, the energy storage elements of the motor drive unit 350 may comprise one or more of rechargeable batteries and/or supercapacitors.

The motor drive unit 350 may comprise a dock 380 that is configured to facilitate discharging of the energy storage elements of the bottom bar 340 into the energy storage elements of the motor drive unit 350, for example, when the bottom bar 340 is docked. The dock 380 may comprise a base portion 382 that may be located adjacent to a rear surface 334 of the covering material 330 (e.g., adjacent to the window) at the first end 311 of the roller tube 312. The base portion 382 of the dock 380 may define a contact surface 384 that may be configured to abut against the rear surface 346 of the bottom bar 340 when the bottom bar 340 is docked. The contact surface 384 of the base portion 382 may be oriented at approximately the angle $\theta_{SC}$ from the vertical axis (e.g., to match the rear surface 346 of the bottom bar 340).

The base portion 382 of the dock 380 may be electrically coupled to the motor drive unit 350. For example, the base portion 382 of the dock 380 may be electrically coupled to the motor drive unit 350 via two or more electrical conductors (e.g., wires) extending between the base portion 382 of the dock 380 and the end portion 355 of the motor drive unit 350. The dock 380 may be configured to facilitate inductive coupling (e.g., magnetic coupling) between the energy storage elements of the bottom bar 340 and the energy storage elements of the motor drive unit 350. The bottom bar 340 may comprise a first induction coil 375 at the first end 341 of the bottom bar 340. The first induction coil 375 on the bottom bar 340 may be configured to be inductively coupled to a second induction coil 385 on the contact surface 384 of the base portion 382 of the dock 380. The dock 380 may further comprise an attachment member 386 that extends from the end portion 355 of the motor drive unit 350 to the base portion 382. The attachment member 386 may comprise a plate 387 and an arm 388 that is oriented at an angle (e.g., approximately 90°) From the plate 387 (e.g., to bend the attachment member 386 behind the rear surface 334 of the covering material 330). The electrical conductors that extend between the base portion 382 of the dock 380 and the end portion 355 of the motor drive unit 350 may be located internal to or external to the attachment member 386. The plate 387 may comprise openings 389 through which the respective fasteners 324 may extend for coupling the window treatment assembly 310 to the first mounting bracket 320 (e.g., extending through the openings 356 in the first mounting bracket 320 and the openings 356 in the end portion 355 of the motor drive unit 350). For example, the plate 387 of the attachment member 386 may be affixed to and/or formed as a part of (e.g., integral with) the enclosure 352 and/or the end portion 355 of the motor drive unit 350. In some examples, the attachment member 386 may be affixed to and/or formed as a part of the first mounting bracket 320.

The first induction coil 375 of the bottom bar 340 may be configured to be inductively coupled to the second induction coil 385 of the dock 380 when the bottom bar 340 is docked. The first induction coil 375 of the bottom bar 340 may be electrically connected to the energy storage elements in the bottom bar 340, and the second induction coil 385 of the dock 380 may be electrically connected to the energy storage elements of the motor drive unit 350, such that that the energy storage elements of the motor drive unit 350 may charge from the energy storage elements of the bottom bar 340 via the inductive coupling when the bottom bar 340 is docked.

Since the motor drive unit 350 is powered from (e.g., entirely powered from) the solar cells 370 and is configured to wirelessly communicate with external devices, the window treatment assembly 310 may be mounted to essentially any mounting brackets-even mounting brackets for manually-operated window treatment assemblies. Accordingly, the window treatment assembly 310 may provide a retro-fit solution for upgrading a manually-operated window treatment to a motorized window treatment without the need to replace the mounting brackets and/or run electrical wiring to the new motorized window treatment.

Figure 19:
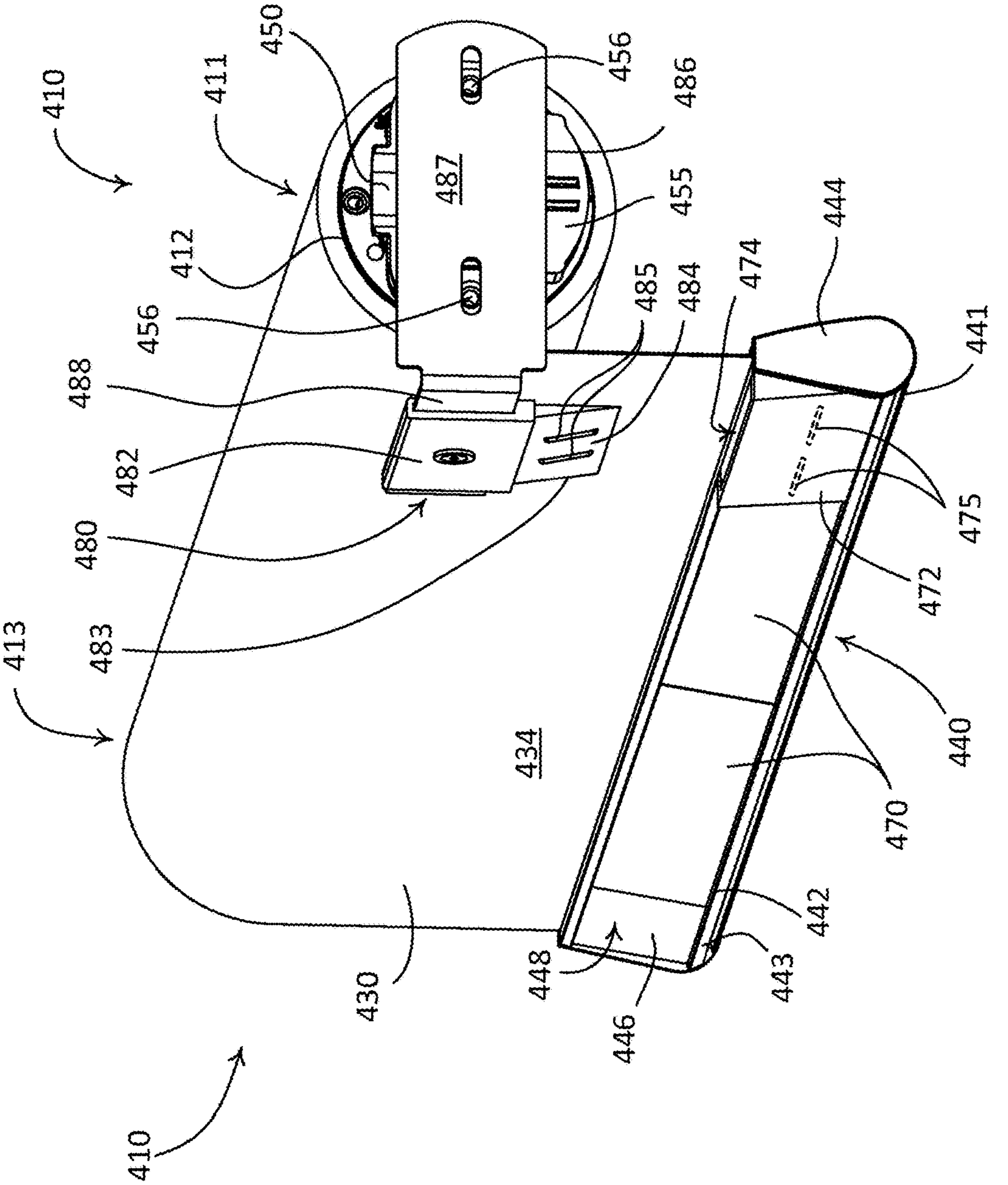
FIG. 19 is a rear perspective view of another example window treatment assembly for use in a motorized window treatment.

FIG. 19 is a rear perspective view of another example window treatment assembly 410 for use in a motorized window treatment, such as the motorized window treatments 150 of the load control system 100 shown in FIG. 1 and/or the motorized window treatment 200 shown in FIG. 2. The window treatment assembly 410 may be coupled to (e.g., supported by) mounting brackets (e.g., such as the first and second mounting brackets 220, 222 and/or the first and second mounting brackets 320, 322) that may be configured to be mounted (e.g., wall-mounted and/or ceiling-mounted) to a structure (e.g., a window frame, a wall, or other structure of a building). The window treatment assembly 410 may include a roller tube 412, a covering material 430, a bottom bar 440, a motor drive unit 450 at a first end 411 of the roller tube 412, and an idler (e.g., the idler 260) at a second end 413 of the roller tube 412. The motor drive unit 450 may be coupled to (e.g., fixedly coupled to) a first mounting bracket and be rotatably coupled to the roller tube 412 at the first end 411 of the roller tube 412. The idler may be coupled to (e.g., fixedly coupled to) a second mounting bracket and rotatably coupled to the roller tube 412 at the second end 413 of the roller tube 412.

The covering material 430 may be windingly attached to the roller tube 412. In some examples, a bottom end of the covering material 430 may be received within a housing 442 of the bottom bar 440 and secured to the bottom bar 440 inside the housing 442. The bottom bar 440 may comprise, for example, end caps 444 connected to the first and second ends 441, 443 of the bottom bar 440. The bottom bar 440 (e.g., the housing 442) may be configured, for example weighted, to cause the covering material 430 to hang vertically (e.g., to cover the window that is proximate to the motorized window treatment 400). The roller tube 412 of the window treatment assembly 410 may operate as a rotational element of the motorized window treatment 400. The roller tube 412 of the window treatment assembly 410 may be rotatably mounted to (e.g., rotatably supported by) the mounting brackets. Rotation of the roller tube 412 may cause the covering material 430 to wind around or unwind from the roller tube 412 to move the covering material 430 (e.g., the bottom bar 440) between a raised position $P_{RAISED}$ (e.g., a fully-raised position and/or a fully-open position) and a lowered position $P_{LOWERED}$ (e.g., a fully-lowered position and/or a fully-closed position).

The motor drive unit 450 may be similar to the motor drive unit 250 of the motorized window treatment 200 and/or the motor drive unit 350 of the motorized window treatment 300. The motor drive unit 450 may include an enclosure (e.g., such as the enclosures 252, 352) for housing an internal motor (not shown) that may be coupled to a drive coupler (e.g., such as the drive coupler 254). The motor drive unit 450 may be configured to rotate the drive coupler for rotatably driving the roller tube 412. The motor drive unit 450 may further comprise an end portion 455 that may be coupled to (e.g., supported by) the first mounting bracket. For example, the end portion 455 may comprise one or more openings 456 that are configured to receive respective fasteners (e.g., fasteners 224, 324), which may also be received though respective openings in the mounting brackets. In some examples, the end portion 455 of the motor drive unit 450 may comprise additional openings (not shown) configured to allow the window treatment assembly 410 to be mounted to other mounting brackets. The openings 456 and the additional openings may be sized and/or located to allow the window treatment assembly 410 to be mounted to multiple types of mounting brackets. The motor drive unit 450 may comprise a bearing assembly (e.g., such as the bearing assembly 258, 358), which may be located adjacent to the end portion 455 and may be rotatably coupled to the roller tube 412.

Figure 20:
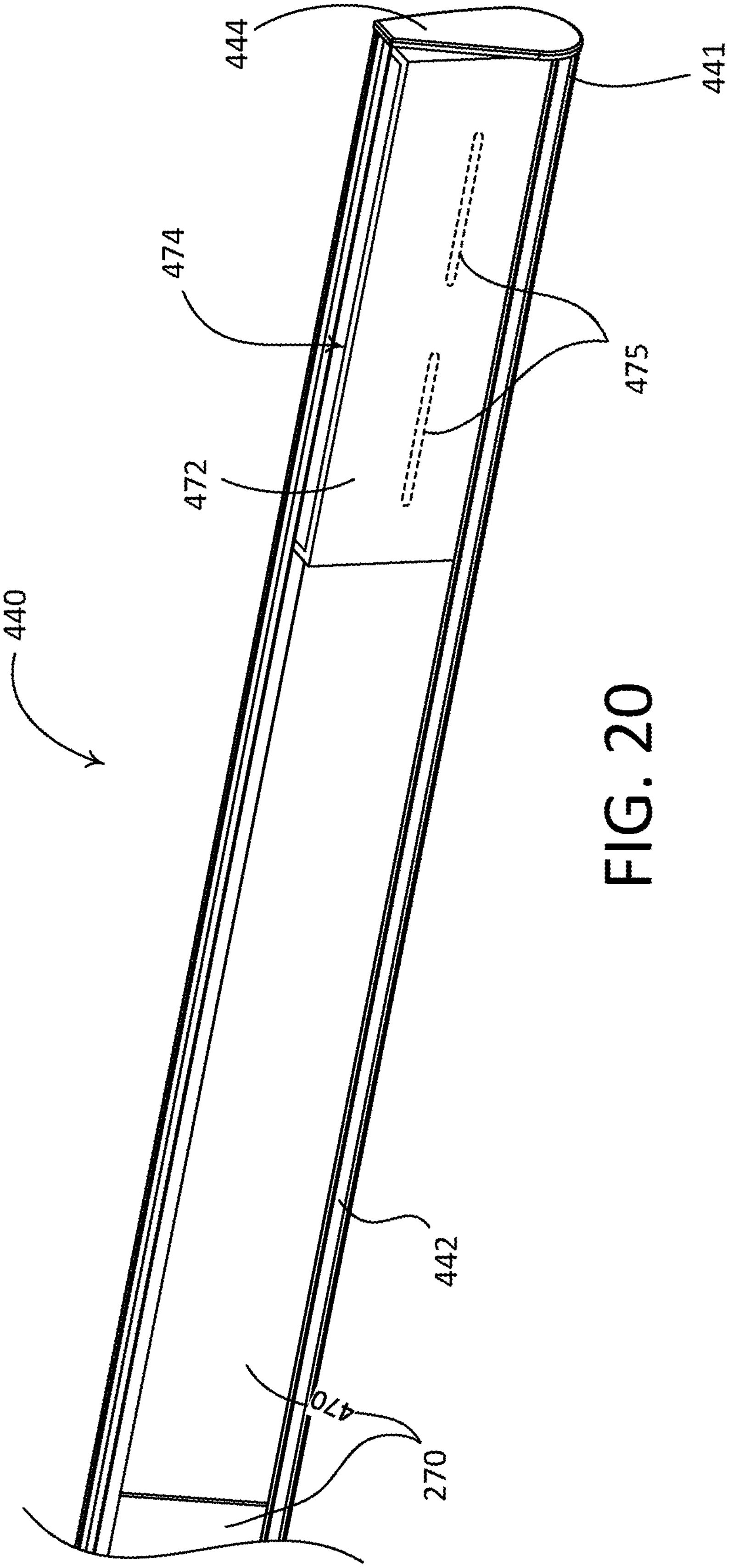
FIG. 20 is a partial enlarged rear perspective view of a bottom bar of the window treatment assembly of FIG. 19.

FIG. 20 is a partial enlarged rear perspective view of the bottom bar 440. The bottom bar 440 may comprise one or more solar cells 470 (e.g., photovoltaic cells). The solar cells 470 may be attached to a rear surface 446 of the housing 442 of the bottom bar 440, such that the solar cells 470 face the window (e.g., that the covering material 430 is configured to cover) and are able to receive solar energy from outside the building (e.g., from the sun). The bottom bar 440 may comprise a printed circuit board (e.g., the printed circuit board 272) configured to be located in a channel (e.g., the channel 271) in the housing 442, such that an outer surface of the printed circuit board (e.g., the outer surface 273 of the printed circuit board 272) forms at least a portion of the rear surface 446 of the bottom bar 440. The solar cells 470 may be mounted to the outer surface of the printed circuit board, and may be located within a recess 448 in the housing 442. The rear surface 446 of the housing 442 of the bottom bar 440 may be oriented at an angle from a vertical axis (e.g., such as the angle $\theta_{SC}$ at which the rear surface 246 of the bottom bar 240 is oriented from the vertical axis V as shown in FIG. 6), such that the solar cells 470 may be angled up (e.g., towards the sky to maximize the amount of sunlight that may shine on the solar cells 470).

The solar cells 470 may be electrically connected to one or more energy storage elements (not shown) contained within the housing 442 of the bottom bar 440. For example, the energy storage elements of the bottom bar 440 may comprise one or more of rechargeable batteries and/or supercapacitors. The solar cells 470 may be configured to convert the received solar energy into a photovoltaic output voltage, which may be used to charge the energy storage elements located within the housing 442 of the bottom bar 440 (e.g., to generate a storage voltage across the energy storage element). The energy stored in the energy storage elements of the bottom bar 440 may be discharged into the motor drive unit 450 when the bottom bar 440 is close to the motor drive unit 450, for example, when the covering material 430 in the raised position $P_{RAISED}$ (e.g., the fully-raised position). For example, the motor drive unit 450 may comprise one or more energy storage elements (not shown) configured to charge from the energy storage elements of the bottom bar 440 when the covering material 430 is in the raised position $P_{RAISED}$. For example, the energy storage elements of the motor drive unit 450 may comprise one or more of rechargeable batteries and/or supercapacitors.

Figure 22:
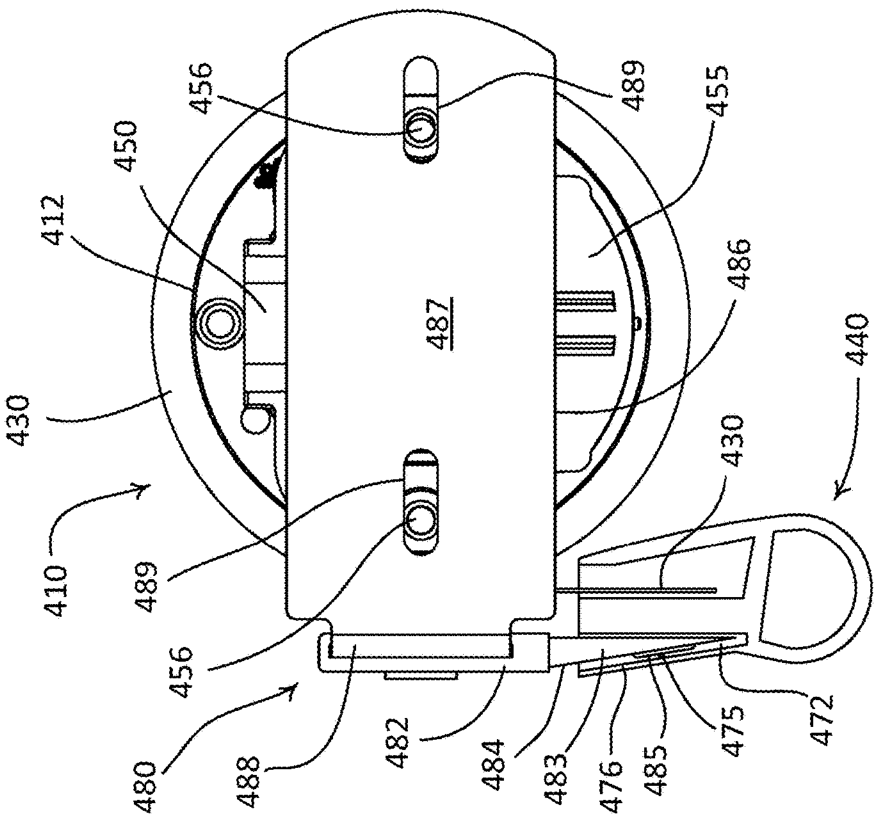
FIG. 22 is a left-side view of the window treatment assembly of FIG. 19 showing the bottom bar in a docked position.
Figure 21:
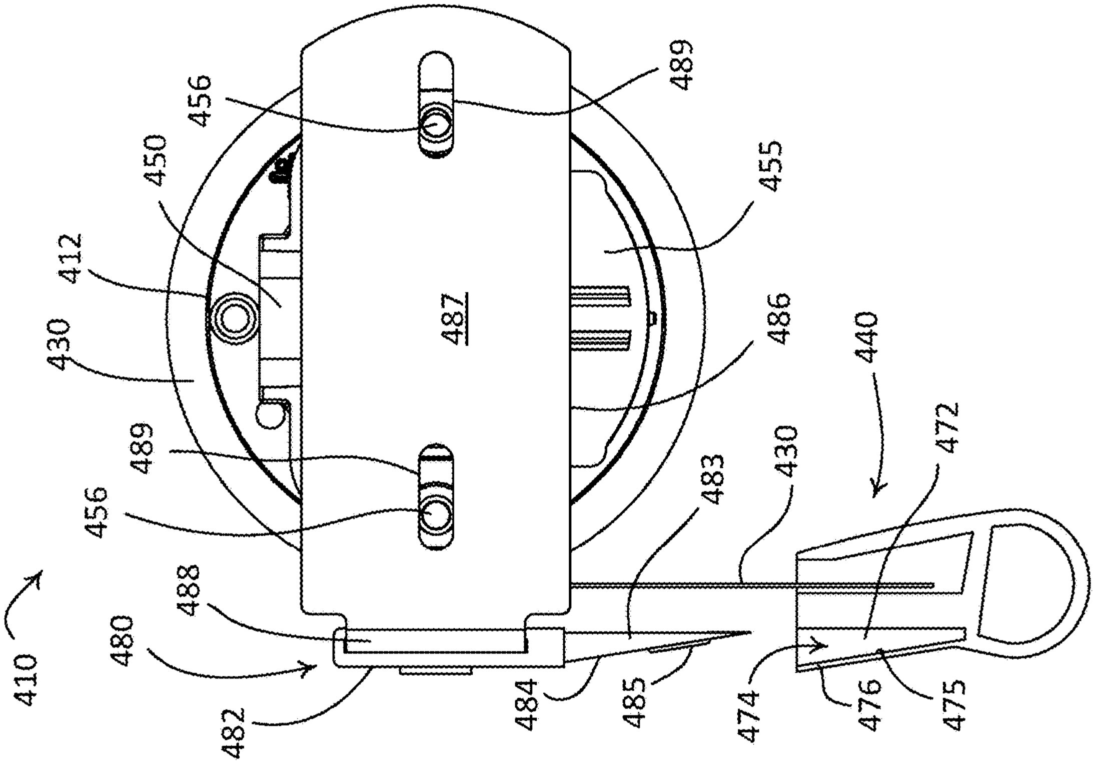
FIG. 21 is a left-side view of the window treatment assembly of FIG. 19 showing the bottom bar in an undocked position.

The bottom bar 440 may comprise a pocket 472 defining a recess 474 and one or more electrical contacts 475 (e.g., two horizontally-oriented electrical contacts) located inside of the recess 474. FIGS. 21 and 22 are left-side views of the window treatment assembly 410 showing the bottom bar 440 in greater detail. In FIGS. 21 and 22, only the bottom bar 440 is shown as a cross-section. The electrical contacts 475 may extend from an outer wall 476 of the pocket 472. The electrical contacts 475 may be electrically connected to the energy storage elements of the bottom bar 440.

The motor drive unit 450 may comprise a dock 480 that is configured to facilitate discharging of the energy storage elements of the bottom bar 440 into the energy storage elements of the motor drive unit 450, for example, when the covering material 430 is in the raised position $P_{RAISED}$ (e.g., when the bottom bar 440 is docked). For example, the bottom bar 440 may be shown in an undocked position in FIG. 21 and a docked position in FIG. 22. The dock 480 may comprise a base portion 482 that may be located adjacent to a rear surface 434 of the covering material 430 (e.g., adjacent to the window) at the first end 411 of the roller tube 412. The base portion 482 of the dock 480 may be electrically coupled to the motor drive unit 450. The base portion 482 of the dock 480 may comprise a wedge portion 483 be configured to be positioned in the recess 474 of the pocket 472 when the covering material 430 is in the raised position $P_{RAISED}$, such that the energy storage elements of the bottom bar 440 may discharge through the base portion 482 of the dock 480 into the energy storage elements of the motor drive unit 450. The wedge portion 483 of the base portion 482 may define a contact surface 484 that may be configured to abut against the outer wall 476 of the pocket 472 when the bottom bar 440 is docked (e.g., when the covering material 430 is in the raised position $P_{RAISED}$).

The dock 480 may also comprise two or more electrical contacts 485 (e.g., two vertically-oriented electrical contacts) located on the contact surface 484 of the base portion 482. The base portion 482 of the dock 480 (e.g., the electrical contacts 485) may be electrically coupled to the motor drive unit 450. For example, the base portion 482 of the dock 480 may be electrically coupled to the motor drive unit 450 via two or more electrical conductors (e.g., wires) extending between the base portion 482 of the dock 480 and the end portion 455 of the motor drive unit 450. The dock 480 may further comprise an attachment member 486 that extends from the end portion 455 of the motor drive unit 450 to the base portion 482. The attachment member 486 may comprise a plate 487 and an arm 488 that is oriented at an angle (e.g., approximately 90°) From the plate 487 (e.g., to bend the attachment member 486 behind the rear surface 434 of the covering material 430). The electrical conductors that extend between the base portion 482 of the dock 480 and the end portion 455 of the motor drive unit 450 may be located internal to or external to the attachment member 486. The plate 487 may comprise openings 489 through which the respective fasteners 424 may extend for coupling the window treatment assembly 410 to one of the mounting brackets (e.g., extending through openings in the mounting bracket and the openings 456 in the end portion 455 of the motor drive unit 450). For example, the attachment member 486 (e.g., the plate 487) may be affixed to and/or formed as a part of (e.g., integral with) the enclosure and/or the end portion 455 of the motor drive unit 450. In some examples, the attachment member 486 may be affixed to and/or formed as a part of the first mounting bracket.

The electrical contacts 485 of the dock 480 may be configured to contact the electrical contacts 475 in the recess 474 of the pocket 472 when the covering material is in the raised position $P_{RAISED}$ (e.g., when the bottom bar 440 is docked). The electrical contacts 475 of the bottom bar 440 and the electrical contacts 485 of the dock 480 may be located next to each other (e.g., horizontally spaced apart from each other). Each of the electrical contacts 475 of the bottom bar 440 and the electrical contacts 485 of the dock 480 may be, for example, an elongated conductive element (e.g., an uninsulated wire). For example, the electrical contacts 475 of the bottom bar 440 may be oriented horizontally and the electrical contacts 485 of the dock 480 may be oriented vertically (e.g., or vice versa). The electrical contacts 475 of the bottom bar 440 may be, for example, biased (e.g., spring-loaded) away from the outer wall 476 of the pocket 472 and/or the electrical contacts 485 of the dock 480 may be biased (e.g., spring-loaded) away from the contact surface 484 of the base portion 482 of the dock 480 to help establish and/or maintain the electrical contacts between the electrical contacts 475 of the bottom bar 440 and the electrical contacts 485 of the dock 480. In some examples, the electrical contacts 485 of the dock 480 may be spring contacts (e.g., such as electrical contacts 585*b* shown in FIG. 27) and the electrical contacts 475 of the bottom bar 440 may be planar pieces of conductive material (e.g., such as electrical contacts 575*b* shown in FIG. 29), or vice versa. In addition, the pocket 472 on the bottom bar 440 and/or the wedge portion 483 of the dock 480 may comprise one or more magnets and/or metallic portions that may be magnetically attracted to each other when the wedge portion 483 is located in the recess 474 of the pocket 472 to pull the electrical contacts 475, 485 together. The electrical contacts 475 of the bottom bar 440 may be electrically connected to the energy storage elements in the bottom bar 440, and the electrical contacts 485 of the dock 480 may be electrically connected to the energy storage elements of the motor drive unit 450, such that that the energy storage elements of the motor drive unit 450 may charge from the energy storage elements of the bottom bar 440 when the bottom bar 440 is docked.

Since the motor drive unit 440 is powered from (e.g., entirely powered from) the solar cells 470 and may be configured to wirelessly communicate with external devices, the window treatment assembly 410 may be mounted to essentially any mounting brackets-even mounting brackets for manually-operated window treatment assemblies. Accordingly, the window treatment assembly 410 may provide a retro-fit solution for upgrading a manually-operated window treatment to a motorized window treatment without the need to replace the mounting brackets and/or run electrical wiring to the new motorized window treatment.

Figure 24:
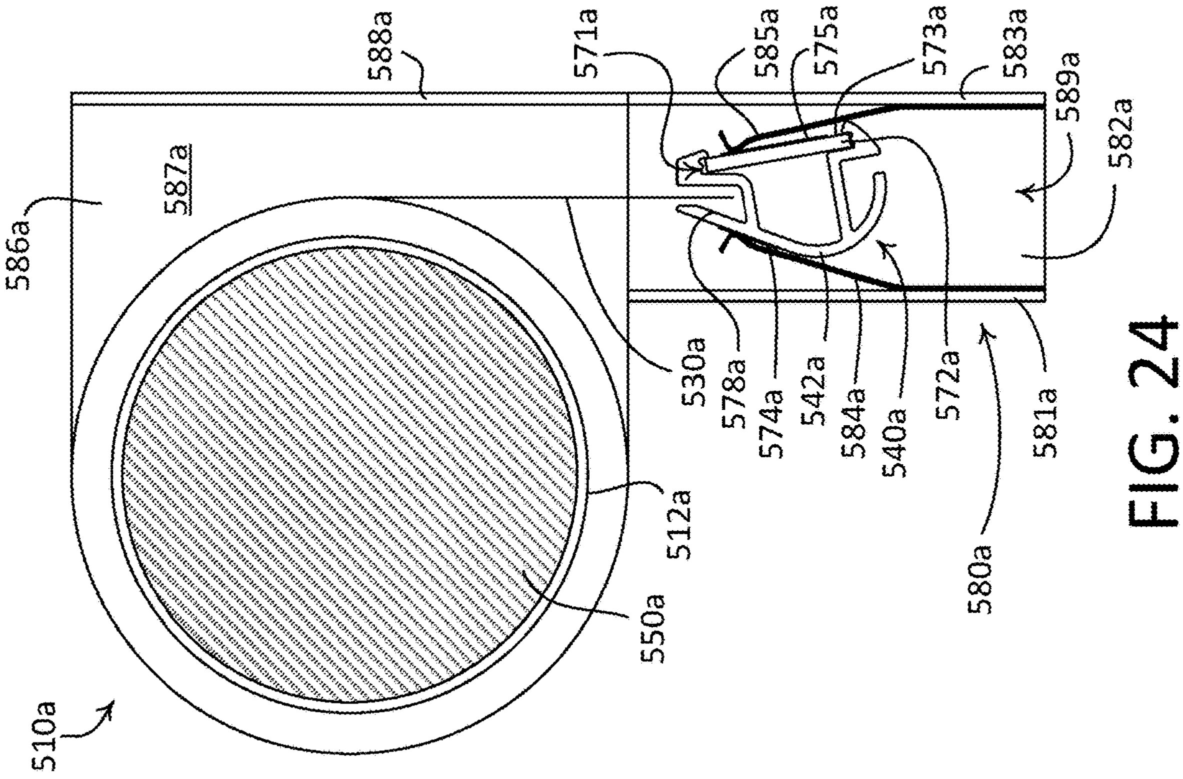
FIG. 24 is a right-side cross-section view of the window treatment assembly of FIG. 23 showing the bottom bar in a docked position.
Figure 23:
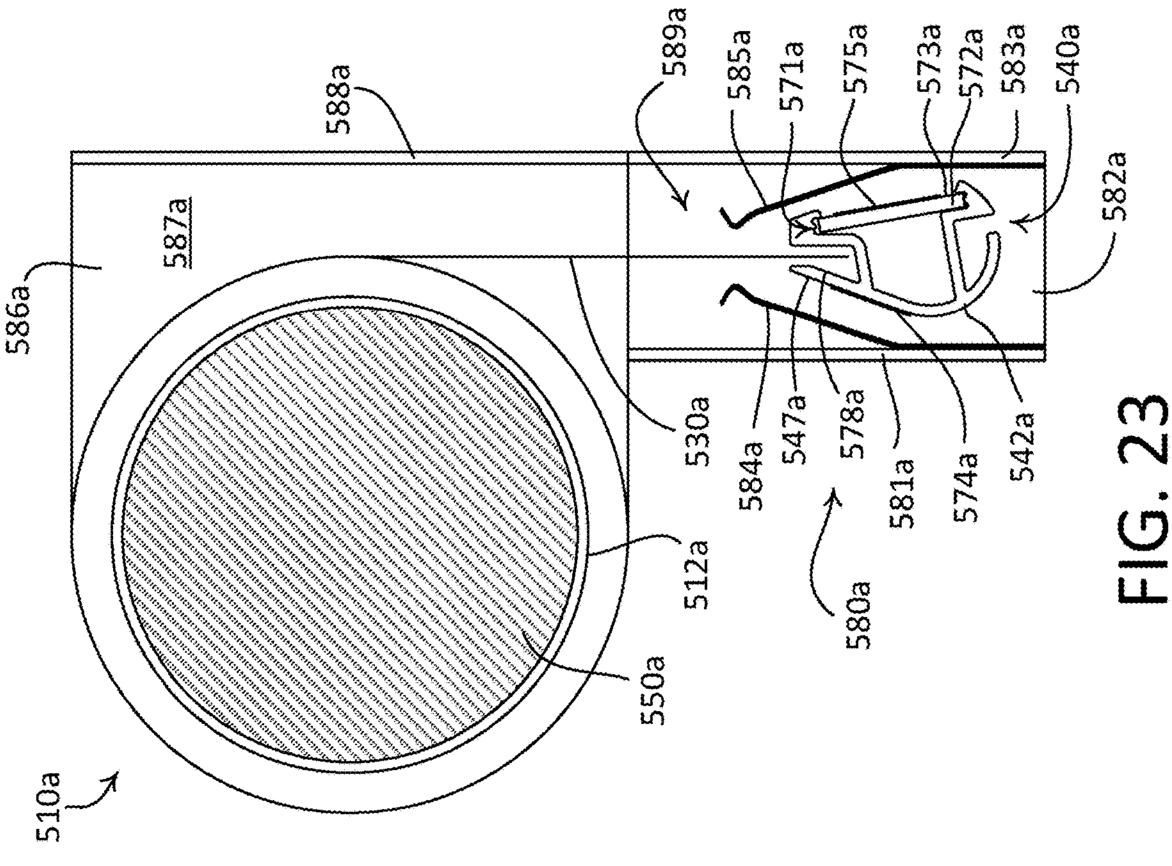
FIG. 23 is a right-side cross-section view of another example window treatment assembly for use in a motorized window treatment showing a bottom bar in an undocked position.

FIGS. 23 and 24 are right-side cross-section views of another example window treatment assembly 510*a* for use in a motorized window treatment, such as the motorized window treatments 150 of the load control system 100 shown in FIG. 1 and/or the motorized window treatment 200 shown in FIG. 2. The window treatment assembly 510*a* may be coupled to (e.g., supported by) mounting brackets (e.g., such as the first and second mounting brackets 220, 222 and/or the first and second mounting brackets 320, 322) that may be configured to be mounted (e.g., wall-mounted and/or ceiling-mounted) to a structure (e.g., a window frame, a wall, or other structure of a building). The window treatment assembly 510*a* may include a roller tube 512*a*, a covering material 530*a*, a bottom bar 540*a*, a motor drive unit 550*a* at a first end of the roller tube 512*a*, and an idler (e.g., the idler 260) at a second end of the roller tube 512*a*. The bottom bar 540*a* may comprise a housing 542*a* that may be secured to a bottom end of the covering material 530*a*, and may be configured (e.g., weighted) to cause the covering material 530*a* to hang vertically (e.g., to cover a window that is proximate to the motorized window treatment 500*a*). While not shown in FIGS. 23 and 24 the bottom end of the covering material 530*a* may be coupled to an elongated member (not shown) that may extend through a cavity 578*a* of the body 542*a* of the bottom bar 540*a* for securing the bottom end of the covering material 530*a* to the bottom bar 540*a*.

The roller tube 512*a* of the window treatment assembly 510*a* may be rotatably mounted to (e.g., rotatably supported by) the mounting brackets as similarly described herein. The covering material 530*a* may be windingly attached to the roller tube 512*a*, such that rotation of the roller tube 512*a* causes the covering material 530*a* to wind around or unwind from the roller tube 512*a* to move the covering material 530*a* between a raised position $P_{RAISED}$ (e.g., a fully-raised position and/or a fully-open position) and a lowered position $P_{LOWERED}$ (e.g., a fully-lowered position and/or a fully-closed position). The motor drive unit 550*a* may be similar to the motor drive unit 250 shown in FIGS. 7 and 8, and may be coupled to the roller tube 512*a* for rotating the roller tube 512*a* to raise and lower the covering material 530*a*.

Figure 25:
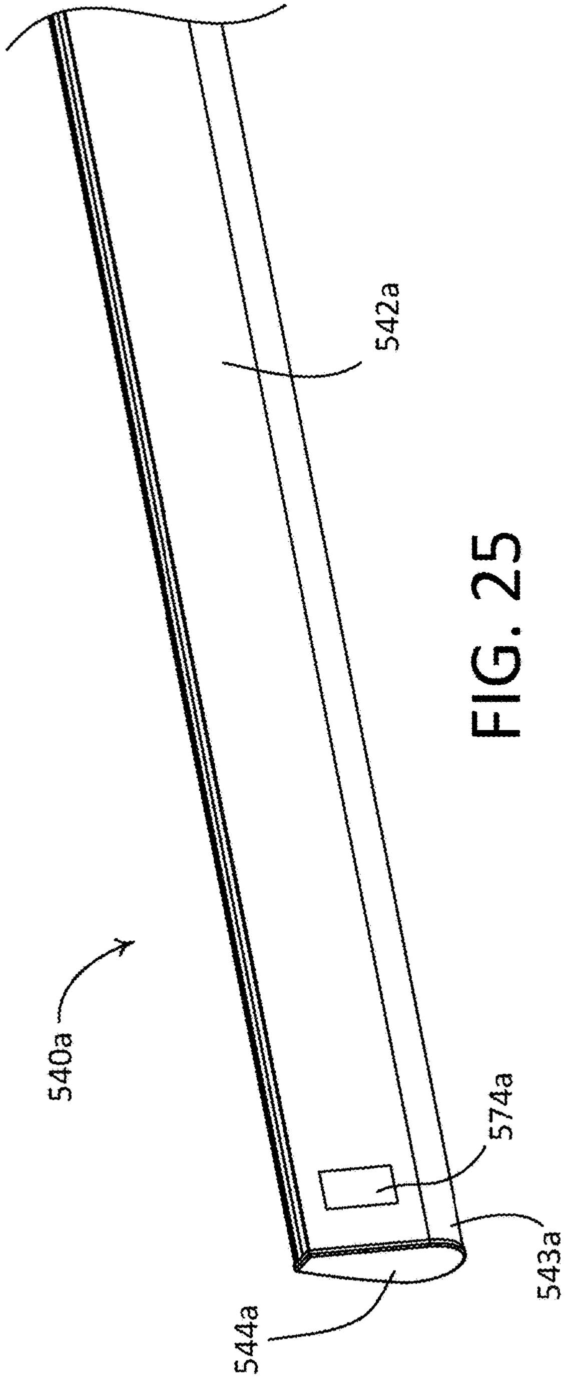
FIG. 25 is a partial enlarged front perspective view of the bottom bar of the window treatment assembly of FIG. 23.
Figure 26:
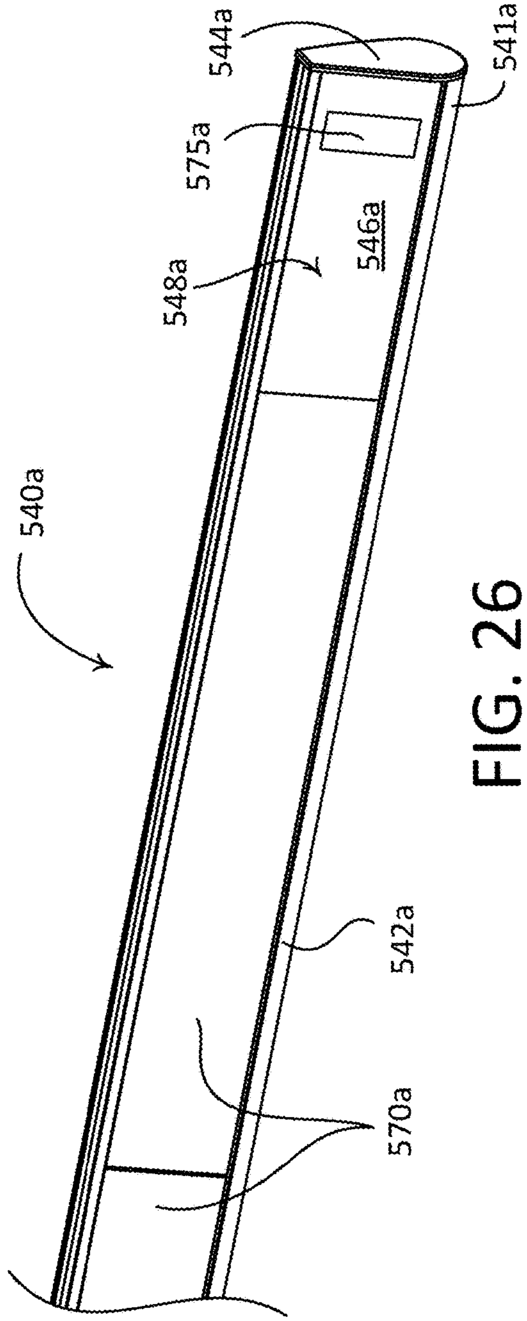
FIG. 26 is a partial enlarged rear perspective view of the bottom bar of the window treatment assembly of FIG. 23.

FIG. 25 is a partial enlarged front perspective view and FIG. 26 is a partial enlarged rear perspective view of the bottom bar 540*a*. The bottom bar 540*a* may extend from a first end 541*a* (e.g., as shown in FIG. 26) to a second end 543*a* (e.g., as shown in FIG. 25). For example, the bottom bar 540*a* may comprise end caps 544*a* connected to the first and second ends 541*a*, 543*a* of the bottom bar 540*a*. The bottom bar 540*a* may comprise one or more solar cells 570*a* (e.g., photovoltaic cells). The solar cells 570*a* may be attached to a rear surface 546*a* of the housing 542*a* of the bottom bar 540*a*, such that the solar cells 570*a* face the window (e.g., that the covering material 530*a* is configured to cover) and are able to receive solar energy from outside the building (e.g., from the sun). The bottom bar 540*a* may comprise a printed circuit board 572*a* configured to be located in a channel 571*a* in the housing 542*a*, such that an outer surface 573*a* of the printed circuit board 572*a* forms at least a portion of the rear surface 546*a* of the bottom bar 540*a*. The solar cells 570*a* may be mounted to the outer surface 573*a* of the printed circuit board 572*a*, and may be located within a recess 548*a* in the housing 542*a*. The rear surface 576*a* of the housing 542*a* of the bottom bar 540*a* may be oriented at an angle from a vertical axis (e.g., such as the angle $\theta_{SC}$ at which the rear surface 246 of the bottom bar 240 is oriented from the vertical axis V as shown in FIG. 6), such that the solar cells 570*a* may be angled up (e.g., towards the sky to maximize the amount of sunlight that may shine on the solar cells 570*a*).

The solar cells 570*a* may be electrically connected to one or more energy storage elements (not shown) contained within the housing 542*a* of the bottom bar 540*a*. For example, the energy storage elements of the bottom bar 540*a* may comprise one or more of rechargeable batteries and/or supercapacitors. The solar cells 570*a* may be configured to convert the received solar energy into a photovoltaic output voltage, which may be used to charge the energy storage elements located within the housing 542*a* of the bottom bar 540*a* (e.g., to generate a storage voltage across the energy storage element). The energy stored in the energy storage elements of the bottom bar 540*a* may be discharged into the motor drive unit 550*a* when the bottom bar 540*a* is close to the motor drive unit 550*a*, for example, when the covering material 530*a* in the raised position $P_{RAISED}$ (e.g., the fully-raised position). For example, the motor drive unit 550*a* may comprise one or more energy storage elements (not shown) configured to charge from the energy storage elements of the bottom bar 540*a* when the covering material 530*a* (e.g., the bottom bar 540*a*) is in the raised position $P_{RAISED}$. For example, the energy storage elements of the motor drive unit 550*a* may comprise one or more of rechargeable batteries and/or supercapacitors.

As shown in FIGS. 23 and 24, the motor drive unit 550*a* may comprise a dock 580*a* that may be configured to facilitate discharging of the energy storage elements of the bottom bar 540*a* into the energy storage elements of the motor drive unit 550*a*, for example, when the covering material 530*a* is in the raised position $P_{RAISED}$ (e.g., when the bottom bar 540*a* is docked). For example, the bottom bar 540*a* may be shown in an undocked position in FIG. 23 and a docked position in FIG. 24. The dock 580*a* may comprise a base portion 582*a* that defines a cavity 589*a* through which the covering material 530*a* may extend, such that the bottom bar 540*a* may be received within the cavity 589*a* of the base portion 582*a* (e.g., as the covering material 530*a* is raised). The bottom bar 540*a* may be configured to be positioned within the cavity 589*a* of the base portion 582*a* of the dock 580*a* when the bottom bar 540*a* is docked, such that the energy storage elements of the bottom bar 540*a* may discharge through the base portion 582*a* of the dock 580*a* into the energy storage elements of the motor drive unit 550*a*.

The dock 580*a* may comprise a first electrical contact 584*a* mechanically connected to a first wall 581*a* (e.g., a front wall) of the base portion 582*a* within the cavity 589*a* and a second electrical contact 585*a* mechanically connected to a second wall 583*a* (e.g., a rear wall) of the base portion 582*a* within the cavity 589*a*. The first and second electrical contacts 584*a*, 585*a* may comprise respective spring contacts that are biased towards the center of the cavity 589*a* of the base portion 582*a* (e.g., towards the covering material 530*a* and/or the bottom bar 540*a*). The dock 580*a* (e.g., the first and second electrical contacts 584*a*, 585*a*) may be electrically coupled to the motor drive unit 550*a*. The base portion 582*a* of the dock 580*a* may be connected to an end portion of the motor drive unit 550*a* via an attachment member 586*a* (e.g., in a similar manner that the attachment members 286, 386 connect the docks 280, 380 to the end portions 255, 355 of the motor drive units 250, 350, respectively). The attachment member 586*a* may comprise a plate 587*a* and an arm 588*a* that is oriented at an angle (e.g., approximately 90°) From the plate 587*a*. For example, the attachment member 586*a* (e.g., the plate 587*a*) may be affixed to and/or formed as a part of (e.g., integral with) the motor drive unit 550*a*. In some examples, the attachment member 586*a* may be affixed to and/or formed as a part of the mounting bracket that supports the motor drive unit 550*a*.

The bottom bar 540*a* may comprise a first electrical contact 574*a* located on a front surface 547*a* of the bottom bar 540*a* (e.g., as shown in FIG. 25) and a second electrical contact 575*a* located on the rear surface 546*a* of the bottom bar 540*a* (e.g., as shown in FIG. 26). Each of the first and second electrical contacts 574*a*, 575*a* on the bottom bar 540*a* may be, for example, a planar piece of conductive material. For example, the first and second electrical contacts 574*a*, 575*a* may each be rectangularly-shaped. When the bottom bar 540*a* is docked, the first and second electrical contacts 584*a*, 585*a* of the dock 580*a* may be configured to contact the first and second electrical contacts 574*a*, 575*a* on the bottom bar 540*a*. The first and second electrical contacts 574*a*, 575*a* on the bottom bar 540*a* may be electrically connected to the energy storage elements in the bottom bar 540*a*, and the first and second electrical contacts 584*a*, 585*a* of the dock 580*a* may be electrically connected to the energy storage elements of the motor drive unit 550*a*. The energy storage elements of the motor drive unit 550*a* may charge from the energy storage elements of the bottom bar 540*a* when the bottom bar 540*a* is docked.

Figure 28:
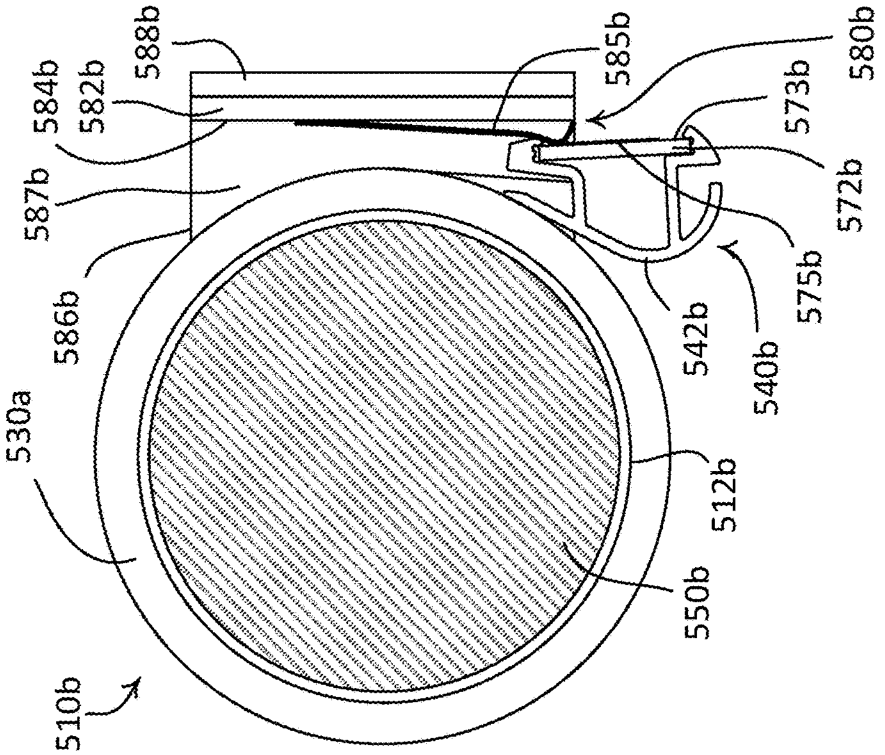
FIG. 28 is a right-side cross-section view of the window treatment assembly of FIG. 27 showing the bottom bar in a docked position.
Figure 27:
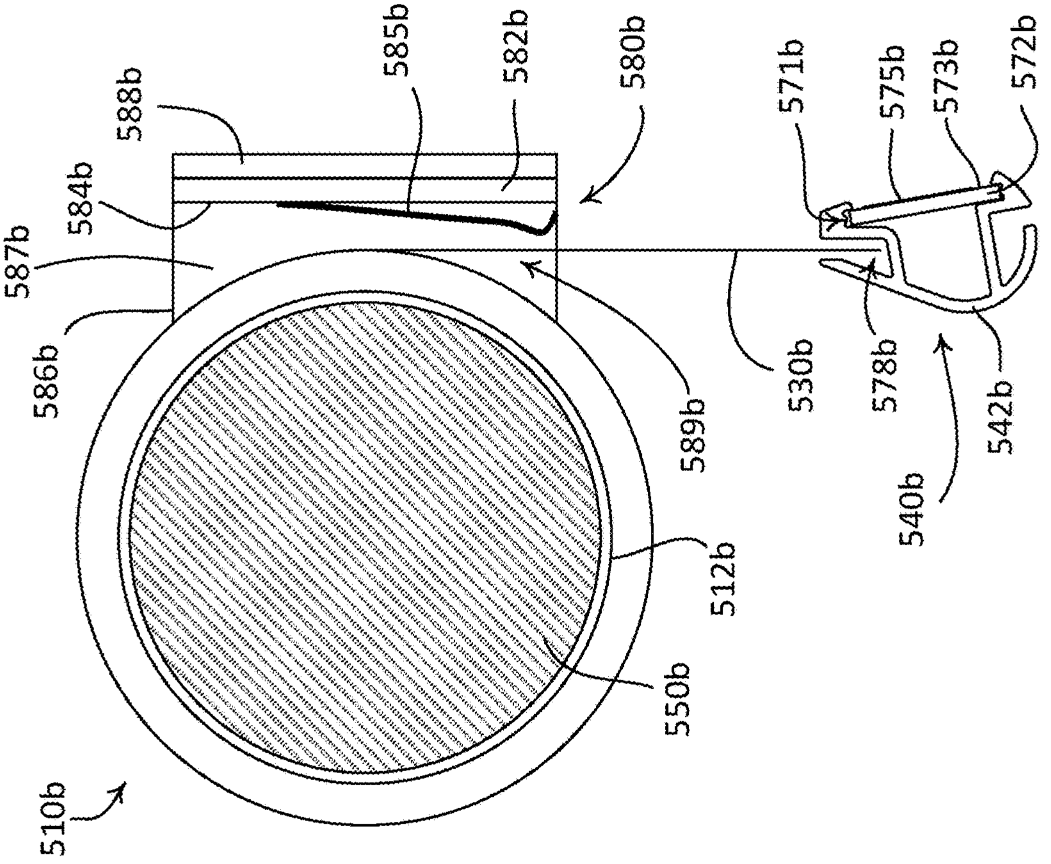
FIG. 27 is a right-side cross-section view of another example window treatment assembly for use in a motorized window treatment showing a bottom bar in an undocked position.

FIGS. 27 and 28 are right-side cross-section views of another example window treatment assembly 510*b* for use in a motorized window treatment, such as the motorized window treatments 150 of the load control system 100 shown in FIG. 1 and/or the motorized window treatment 200 shown in FIG. 2. The window treatment assembly **510*b* may be coupled to (e.g., supported by) mounting brackets (e.g., such as the first and second mounting brackets 220, 222 and/or the first and second mounting brackets 320, 322) that may be configured to be mounted (e.g., wall-mounted and/or ceiling-mounted) to a structure (e.g., a window frame, a wall, or other structure of a building). The window treatment assembly 510*b* may include a roller tube 512*b*, a covering material 530*b*, a bottom bar 540*b*, a motor drive unit 550*b* at a first end of the roller tube 512*b*, and an idler (e.g., the idler 260) at a second end of the roller tube 512*b*. The bottom bar 540*b* may comprise a housing 542*b* that may be secured to a bottom end of the covering material 530*b*, and may be configured (e.g., weighted) to cause the covering material 530*b* to hang vertically (e.g., to cover a window that is proximate to the motorized window treatment 500*b*). While not shown in FIGS. 27 and 28, the bottom end of the covering material 530*b* may be coupled to an elongated member (not shown) that may extend through a cavity 578*b* of the body 542*b* of the bottom bar 540*b* for securing the bottom end of the covering material 530*b* to the bottom bar 540*b***.

The roller tube **512*b* of the window treatment assembly 510*b* may be rotatably mounted to (e.g., rotatably supported by) the mounting brackets. The covering material 530*b* may be windingly attached to the roller tube 512*b*, such that rotation of the roller tube 512*b* causes the covering material 530*b* to wind around or unwind from the roller tube 512*b* to move the covering material 530*b* (e.g., the bottom bar 540*b*) between a raised position $P_{RAISED}$ (e.g., a fully-raised position and/or a fully-open position) and a lowered position $P_{LOWERED}$ (e.g., a fully-lowered position and/or a fully-closed position). The motor drive unit 550*b* may be similar to the motor drive unit 250 shown in FIGS. 7 and 8, and may be coupled to the roller tube 512*b* for rotating the roller tube 512*b* to raise and lower the covering material 530*b***.

Figure 29:
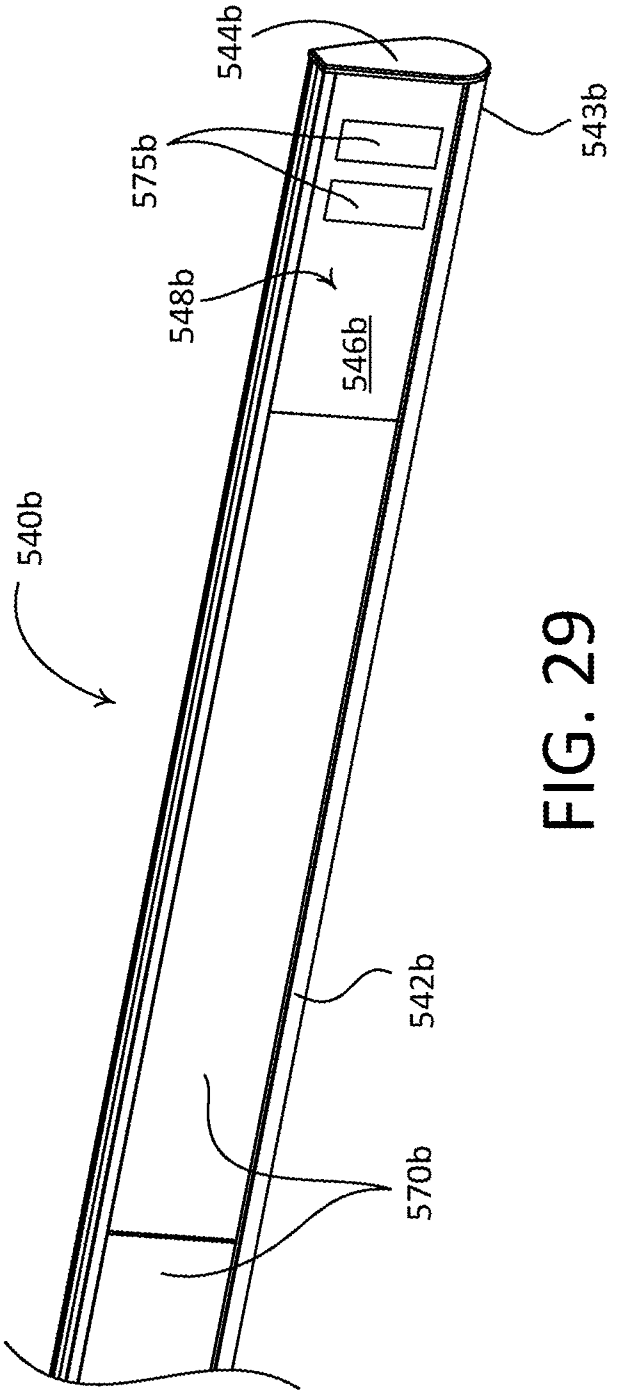
FIG. 29 is a partial enlarged rear perspective view of the bottom bar of the window treatment assembly of FIG. 27.

FIG. 29 is a partial enlarged rear perspective view of the bottom bar **540*b*. The bottom bar 540*b* may extend from a first end (not shown) to a second end 543*b* (e.g., as shown in FIG. 29). For example, the bottom bar 540*b* may comprise end caps 544*b* connected to the first end and the second end 543*b* of the bottom bar 540*b* (the end cap connected to the first end of the bottom bar 540*b* is not shown in FIGS. 27-29). The bottom bar 540*b* may comprise one or more solar cells 570*b* (e.g., photovoltaic cells). The solar cells 570*b* may be attached to a rear surface 546*b* of the housing 542*b* of the bottom bar 540*b*, such that the solar cells 570*b* face the window (e.g., that the covering material 530*b* is configured to cover) and are able to receive solar energy from outside the building (e.g., from the sun). The bottom bar 540*b* may comprise a printed circuit board 572*b* configured to be located in a channel 571*b* in the housing 542*b*, such that an outer surface 573*b* of the printed circuit board 572*b* forms at least a portion of the rear surface 546*b* of the bottom bar 540*b*. The solar cells 570*b* may be mounted to the outer surface 573*b* of the printed circuit board 572*b*, and may be located within a recess 548*b* in the housing 542*b*. The rear surface 576*b* of the housing 542*b* of the bottom bar 540*b* may be oriented at an angle from a vertical axis (e.g., such as the angle $\theta_{SC}$ at which the rear surface 246 of the bottom bar 240 is oriented from the vertical axis V as shown in FIG. 6), such that the solar cells 570*b* may be angled up (e.g., towards the sky to maximize the amount of sunlight that may shine on the solar cells 570*b***).

The solar cells **570*b* may be electrically connected to one or more energy storage elements (not shown) contained within the housing 542*b* of the bottom bar 540*b*. For example, the energy storage elements of the bottom bar 540*b* may comprise one or more of rechargeable batteries and/or supercapacitors. The solar cells 570*b* may be configured to convert the received solar energy into a photovoltaic output voltage, which may be used to charge the energy storage elements located within the housing 542*b* of the bottom bar 540*b* (e.g., to generate a storage voltage across the energy storage element). The energy stored in the energy storage elements of the bottom bar 540*b* may be discharged into the motor drive unit 550*b* when the bottom bar 540*b* is close to the motor drive unit 550*b*, for example, when the covering material 530*b* in the raised position $P_{RAISED}$ (e.g., the fully-raised position). For example, the motor drive unit 550*b* may comprise one or more energy storage elements (not shown) configured to charge from the energy storage elements of the bottom bar 540*b* when the covering material 530*b* is in the raised position $P_{RAISED}$. For example, the energy storage elements of the motor drive unit 550*b*** may comprise one or more of rechargeable batteries and/or supercapacitors.

As shown in FIGS. 27 and 28, the motor drive unit **550*b* may comprise a dock 580*b* that may be configured to facilitate discharging of the energy storage elements of the bottom bar 540*b* into the energy storage elements of the motor drive unit 550*b*, for example, when the covering material 530*b* is in the raised position $P_{RAISED}$ (e.g., when the bottom bar 540*b* is docked). For example, the bottom bar 540*b* may be shown in an undocked position in FIG. 27 and a docked position in FIG. 28. The dock 580*b* may comprise a base portion 582*b* that is located adjacent to a rear surface of the covering material 530*b* (e.g., behind the covering material 530*b* that is wrapped around the roller tube 512*b*). The bottom bar 540*b* may be configured to be positioned adjacent to the base portion 582*b* of the dock 580*b* when the bottom bar 540*b* is docked, such that the energy storage elements of the bottom bar 540*b* may discharge through the base portion 582*b* of the dock 580*b* into the energy storage elements of the motor drive unit 550*b***.

The dock **580*b* may comprise two or more electrical contacts 585*b* (e.g., two electrical contacts) mechanically connected to a surface 584*b* of the base portion 582*b* (e.g., a surface that faces the covering material 530*b*). While only one electrical contact 585*b* can be seen in FIGS. 27 and 28, the electrical contacts 585*b* may be located side-by-side on (e.g., horizontally spaced apart along) the base portion 582*b*. The electrical contacts 585*b* may comprise respective spring contacts that are biased away from the base portion 582*b* (e.g., towards the roller tube 512*b*, the covering material 530*b*, and/or the bottom bar 540*b*). The dock 580*b* (e.g., the electrical contacts 585*b*) may be electrically coupled to the motor drive unit 550*b*. For example, the base portion 582*b* of the dock 580*b* may be electrically coupled to the motor drive unit 550*b* via two or more electrical conductors (e.g., wires) extending between the base portion 582*b* of the dock 580*b* and an end portion of the motor drive unit 550*b*. The base portion 582*b* of the dock 580*a* may be connected to the end portion of the motor drive unit 550*b* via an attachment member 586*b* (e.g., in a similar manner that the attachment members 286, 386 connect the docks 280, 380 to the end portions 255, 355 of the motor drive units 250, 350, respectively). The attachment member 586*b* may comprise a plate 587*b* and an arm 588*b* that is oriented at an angle (e.g., approximately 90°) From the plate 587*b*. For example, the attachment member 586*b* (e.g., the plate 587*b*) may be affixed to and/or formed as a part of (e.g., integral with) the motor drive unit 550***b*. In some examples, the attachment member 586*b* may be affixed to and/or formed as a part of the mounting bracket that supports the motor drive unit 550*b*.

The bottom bar 540*b* may comprise two or more electrical contacts 575*b* located on the rear surface 546*b* of the bottom bar 540*b* (e.g., as shown in FIG. 29). Each of the electrical contacts 575*b* on the bottom bar 540*b* may be, for example, a planar piece of conductive material (e.g., rectangularly shaped). When the bottom bar 540*b* is docked, the electrical contacts 585*b* of the dock 580*b* may be configured to contact the electrical contacts 575*b* on the bottom bar 540*b*. The electrical contacts 575*b* on the bottom bar 540*b* may be electrically connected to the energy storage elements in the bottom bar 540*b*, and the electrical contacts 585*b* of the dock 580*b* may be electrically connected to the energy storage elements of the motor drive unit 550*b*. The energy storage elements of the motor drive unit 550*b* may charge from the energy storage elements of the bottom bar 540*b* when the bottom bar 540*b* is docked. When the bottom bar 540*b* is docked, the electrical contacts 575*b* on the bottom bar 540*b* may be held against the electrical contacts 585*b* of the dock 580*b* due to covering material 530*b* wrapped around the roller tube 512*b* pushing against the bottom bar 540*b* (e.g., as shown in FIG. 28). For example, the bottom bar 540*b* may comprise a wedge shape (e.g., a teardrop shape as shown in FIGS. 27 and 28), such that the bottom bar 540*b* may fit into the space between the covering material 530*b* wrapped around the roller tube 512*b* and the base portion 582*b* of the dock 580*b* (e.g., as shown in FIG. 28). In addition, the bottom bar 540*b* and/or the base portion 582*b* of the dock 580*b* may comprise one or more magnets and/or metallic portions that may be magnetically attracted to each other when the electrical contacts 575*b* on the bottom bar 540*b* are located adjacent to the electrical contacts 585*b* of the dock 580*b* to pull the electrical contacts 575*b*, 585*b* together.

Figure 31:
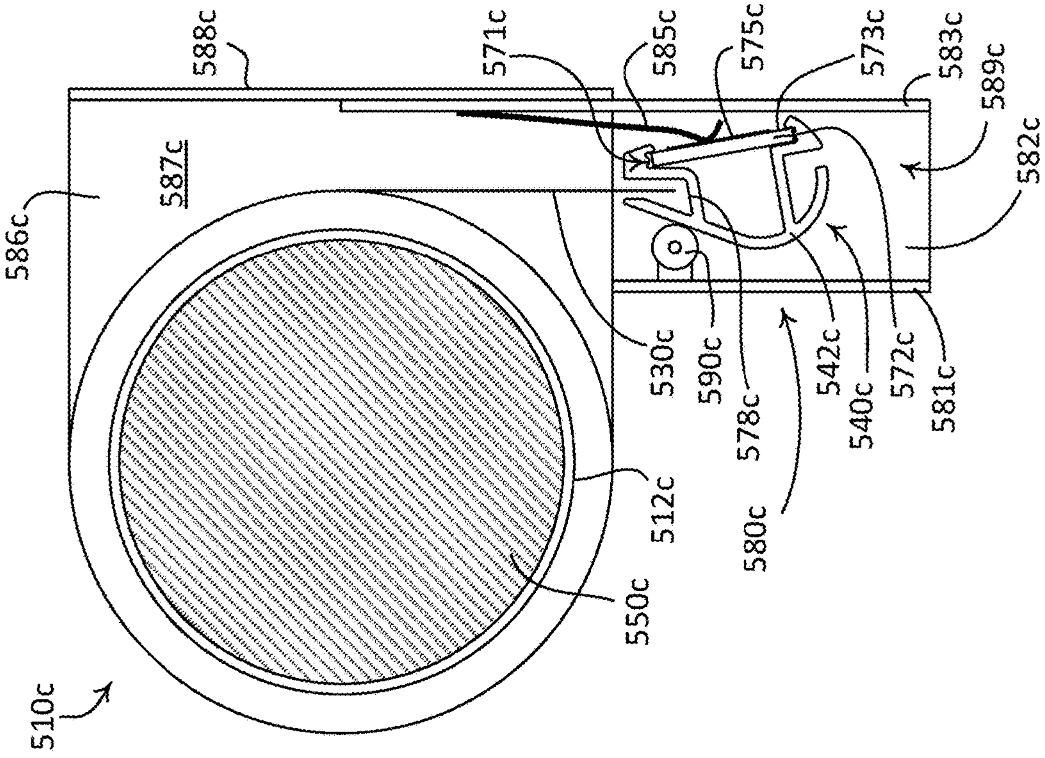
FIG. 31 is a right-side cross-section view of the window treatment assembly of FIG. 29 showing the bottom bar in a docked position.
Figure 30:
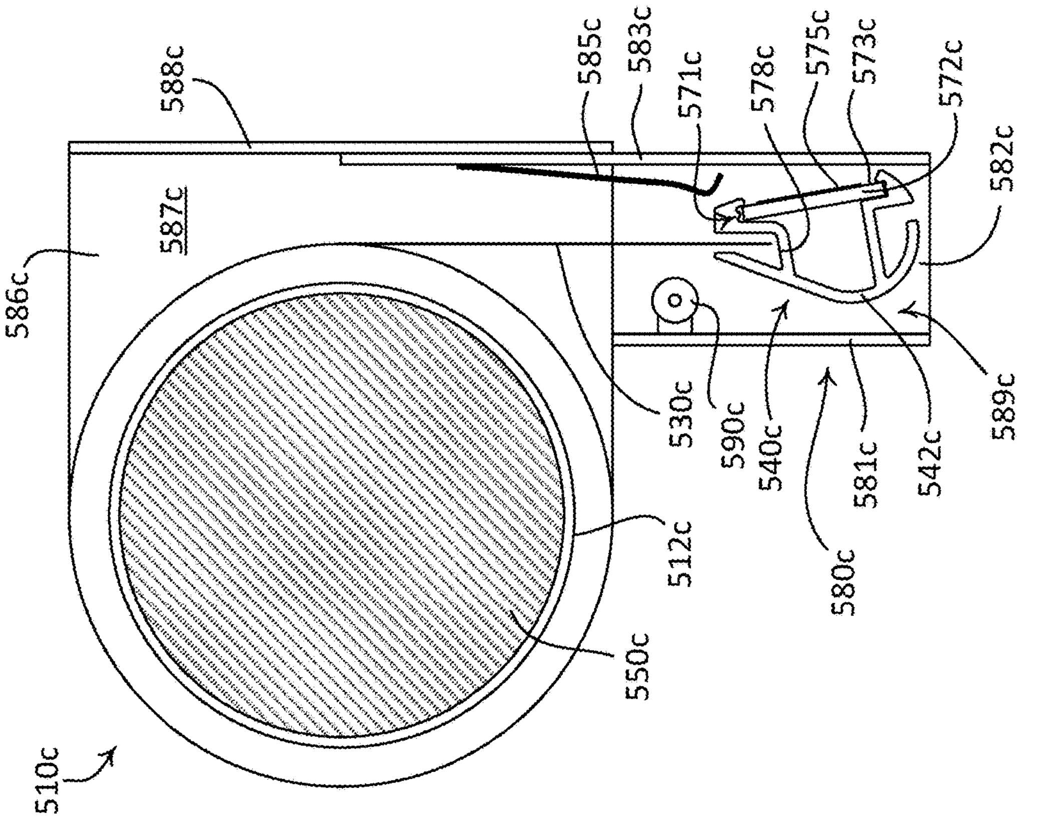
FIG. 30 is a right-side cross-section view of another example window treatment assembly for use in a motorized window treatment showing a bottom bar in an undocked position.

FIGS. 30 and 31 are right-side cross-section views of another example window treatment assembly 510*c* for use in a motorized window treatment, such as the motorized window treatments 150 of the load control system 100 shown in FIG. 1 and/or the motorized window treatment 200 shown in FIG. 2. The window treatment assembly 510*c* may be coupled to (e.g., supported by) mounting brackets (e.g., such as the first and second mounting brackets 220, 222 and/or the first and second mounting brackets 320, 322) that may be configured to be mounted (e.g., wall-mounted and/or ceiling-mounted) to a structure (e.g., a window frame, a wall, or other structure of a building). The window treatment assembly 510*c* may include a roller tube 512*c*, a covering material 530*c*, a bottom bar 540*c*, a motor drive unit 550*c* at a first end of the roller tube 512*c*, and an idler (e.g., the idler 260) at a second end of the roller tube 512*c*. The bottom bar 540*c* may comprise a housing 542*c* that may be secured to a bottom end of the covering material 530*c*, and may be configured (e.g., weighted) to cause the covering material 530*c* to hang vertically (e.g., to cover a window that is proximate to the motorized window treatment 500*b*). While not shown in FIGS. 30 and 31, the bottom end of the covering material 530*c* may be coupled to an elongated member (not shown) that may extend through a cavity 578*c* of the body 542*c* of the bottom bar 540*c* for securing the bottom end of the covering material 530*c* to the bottom bar 540*c*.

The roller tube 512*c* of the window treatment assembly 510*c* may be rotatably mounted to (e.g., rotatably supported by) the mounting brackets. The covering material 530*c* may be windingly attached to the roller tube 512*c*, such that rotation of the roller tube 512*c* causes the covering material 530*c* to wind around or unwind from the roller tube 512*c* to move the covering material 530*c* between a raised position $P_{RAISED}$ (e.g., a fully-raised position and/or a fully-open position) and a lowered position $P_{LOWERED}$ (e.g., a fully-lowered position and/or a fully-closed position). The motor drive unit 550*c* may be similar to the motor drive unit 250 shown in FIGS. 7 and 8, and may be coupled to the roller tube 512*c* for rotating the roller tube 512*c* to raise and lower the covering material 530*c*.

Figure 32:
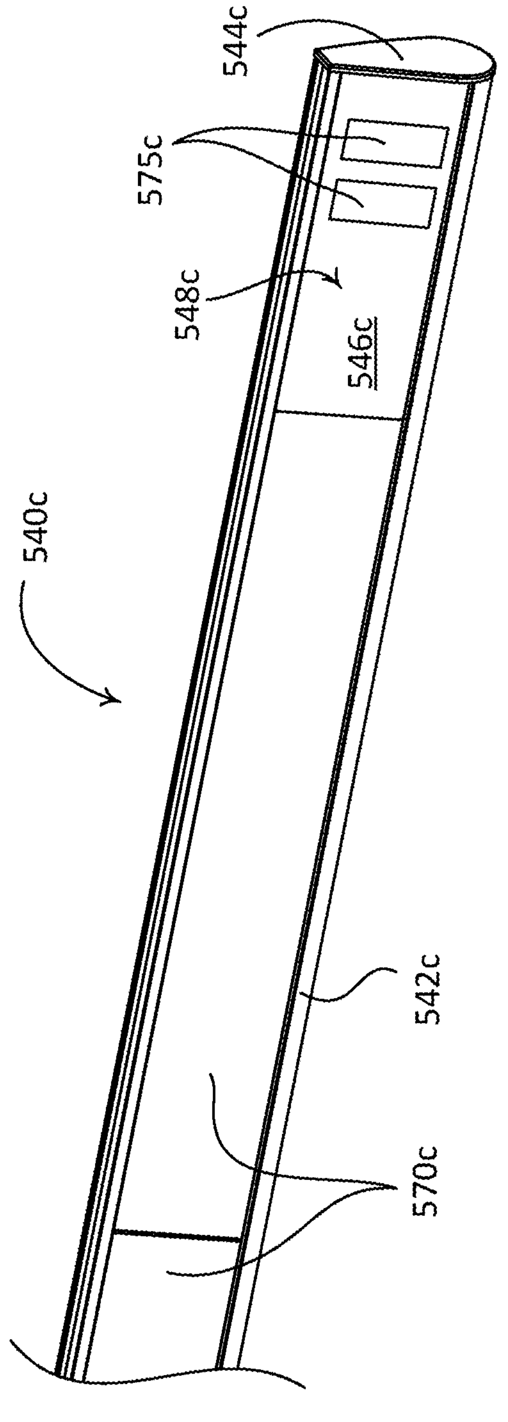
FIG. 32 is a partial enlarged rear perspective view of the bottom bar of the window treatment assembly of FIG. 29.

FIG. 32 is a partial enlarged rear perspective view of the bottom bar 540*c*. The bottom bar 540*c* may extend from a first end (not shown) to a second end 543*c* (e.g., as shown in FIG. 32). For example, the bottom bar 540*c* may comprise end caps 544*c* connected to the first end and the second end 543*c* of the bottom bar 540*c* (the end cap connected to the first end of the bottom bar 540*c* is not shown in FIGS. 30-32). The bottom bar 540*c* may comprise one or more solar cells 570*c* (e.g., photovoltaic cells). The solar cells 570*c* may be attached to a rear surface 546*c* of the housing 542*c* of the bottom bar 540*c*, such that the solar cells 570*c* face the window (e.g., that the covering material 530*c* is configured to cover) and are able to receive solar energy from outside the building (e.g., from the sun). The bottom bar 540*c* may comprise a printed circuit board 572*c* configured to be located in a channel 571*c* in the housing 542*c*, such that an outer surface 573*c* of the printed circuit board 572*c* forms at least a portion of the rear surface 546*c* of the bottom bar 540*c*. The solar cells 570*c* may be mounted to the outer surface 573*c* of the printed circuit board 572*c*, and may be located within a recess 548*c* in the housing 542*c*. The rear surface 576*c* of the housing 542*c* of the bottom bar 540*c* may be oriented at an angle from a vertical axis (e.g., such as the angle $\theta_{SC}$ at which the rear surface 246 of the bottom bar 240 is oriented from the vertical axis V as shown in FIG. 6), such that the solar cells 570*c* may be angled up (e.g., towards the sky to maximize the amount of sunlight that may shine on the solar cells 570*c*).

The solar cells 570*c* may be electrically connected to one or more energy storage elements (not shown) contained within the housing 542*c* of the bottom bar 540*c*. For example, the energy storage elements of the bottom bar 540*c* may comprise one or more of rechargeable batteries and/or supercapacitors. The solar cells 570*c* may be configured to convert the received solar energy into a photovoltaic output voltage, which may be used to charge the energy storage elements located within the housing 542*c* of the bottom bar 540*c* (e.g., to generate a storage voltage across the energy storage element). The energy stored in the energy storage elements of the bottom bar 540*c* may be discharged into the motor drive unit 550*c* when the bottom bar 540*c* is close to the motor drive unit 550*c*, for example, when the covering material 530*c* in the raised position $P_{RAISED}$ (e.g., the fully-raised position). For example, the motor drive unit 550*c* may comprise one or more energy storage elements (not shown) configured to charge from the energy storage elements of the bottom bar 540*c* when the covering material 530*c* is in the raised position $P_{RAISED}$. For example, the energy storage elements of the motor drive unit 550*c* may comprise one or more of rechargeable batteries and/or supercapacitors.

As shown in FIGS. 30 and 31, the motor drive unit 550*c* may comprise a dock 580*c* that may be configured to facilitate discharging of the energy storage elements of the bottom bar 540*c* into the energy storage elements of the motor drive unit 550*c*, for example, when the covering material 530*c* is in the raised position $P_{RAISED}$ (e.g., when the bottom bar 540*c* is docked). For example, the bottom bar 540*c* may be shown in an undocked position in FIG. 30 and a docked position in FIG. 31. The dock 580*c* may comprise a base portion 582*c* that defines a cavity 589*c* through which the covering material 530*c* may extend, such that the bottom bar 540*c* may be received within the cavity 589*c* of the base portion 582*c* (e.g., as the covering material 530*c* is raised). The bottom bar 540*c* may be configured to be positioned within the cavity 589*c* of the base portion 582*c* of the dock 580*c* when the bottom bar 540*c* is docked, such that the energy storage elements of the bottom bar 540*c* may discharge through the base portion 582*c* of the dock 580*c* into the energy storage elements of the motor drive unit 550*c*.

The dock 580*c* may comprise two or more electrical contacts 585*c* (e.g., two electrical contacts) mechanically connected to the base portion 582*c*. While only one electrical contact 585*c* can be seen in FIGS. 30 and 31, the electrical contacts 585*c* may be located side-by-side on (e.g., horizontally spaced apart along) the base portion 582*c*. The electrical contacts 585*c* may comprise respective spring contacts that are biased away from the base portion 582*c* (e.g., towards the roller tube 512*c*, the covering material 530*c*, and/or the bottom bar 540*c*). The dock 580*c* (e.g., the electrical contacts 585*c*) may be electrically coupled to the motor drive unit 550*c*. For example, the base portion 582*c* of the dock 580*c* may be electrically coupled to the motor drive unit 550*c* via two or more electrical conductors (e.g., wires) extending between the base portion 582*c* of the dock 580*c* and an end portion of the motor drive unit 550*c*. The base portion 582*c* of the dock 580*c* may be connected to the end portion of the motor drive unit 550*c* via an attachment member 586*c* (e.g., in a similar manner that the attachment members 286, 386 connect the docks 280, 380 to the end portions 255, 355 of the motor drive units 250, 350, respectively). The attachment member 586*c* may comprise a plate 587*c* and an arm 588*c* that is oriented at an angle (e.g., approximately 90°) From the plate 587*c*. For example, the attachment member 586*c* (e.g., the plate 587*c*) may be affixed to and/or formed as a part of (e.g., integral with) the motor drive unit 550*c*. In some examples, the attachment member 586*c* may be affixed to and/or formed as a part of the mounting bracket that supports the motor drive unit 550*c*.

The bottom bar 540*c* may comprise two or more electrical contacts 575*c* located on the rear surface 546*c* of the bottom bar 540*c* (e.g., as shown in FIG. 32). Each of the electrical contacts 575*c* on the bottom bar 540*c* may be, for example, a planar piece of conductive material (e.g., rectangularly shaped). When the bottom bar 540*c* is docked, the electrical contacts 585*c* of the dock 580*c* may be configured to contact the electrical contacts 575*c* on the bottom bar 540*c*. The electrical contacts 575*c* on the bottom bar 540*c* may be electrically connected to the energy storage elements in the bottom bar 540*c*, and the electrical contacts 585*c* of the dock 580*c* may be electrically connected to the energy storage elements of the motor drive unit 550*c*. The energy storage elements of the motor drive unit 550*c* may charge from the energy storage elements of the bottom bar 540*c* when the bottom bar 540*c* is docked.

The dock 580*c* may comprise one or more biasing members 590*c* extending from a first wall 581*c* (e.g., a front wall) of the base portion 582*c*. The biasing member 590*c* may be configured to push against the bottom bar 540*c* when the bottom bar 540*c* is docked to hold the electrical contacts 575*c* on the bottom bar 540*c* against the electrical contacts 585*c* of the dock 580*c* (e.g., as shown in FIG. 31). For example, the biasing member 590*c* may comprise a roller configured to roll against the bottom bar 540*c*. In addition, the bottom bar 540*c* and/or the base portion the dock 580*c* may comprise one or more magnets and/or metallic portions that may be magnetically attracted to each other when the electrical contacts 575*c* on the bottom bar 540*c* are located adjacent to the electrical contacts 585*c* of the dock 580*c* to pull the electrical contacts 575*c*, 585*c* together.

It should be appreciated that, in some examples, the motor drive unit may be used to charge an energy storage element in the bottom bar, rather than the energy storage element in the bottom bar being used to charge an energy storage element in the motor drive unit from solar energy collected by the one or more solar cells. For example, a motorized window treatment that includes a motor drive unit and a dock, such as the examples shown in FIGS. 2-32 and FIGS. 51-57, may be configured such that the energy storage element in the motor drive unit is used to charge an energy storage element in the bottom bar, for instance, rather than charging an energy storage element in the motor drive unit from solar energy collected by the one or more solar cells. In such a system, the bottom bar may not have any solar cells. For example, the bottom bar may include a control circuit, a communication circuit, and/or a sensor circuit. The control circuit of the bottom bar may be configured to collect data from the sensor circuit and report the data to the motor drive unit. For example, the control circuit of the bottom bar may be configured to collect solar data from a photosensor of the sensor circuit and report the solar data to the motor drive unit. Further, in such systems, the motor drive unit may be used to charge an energy storage element in the bottom bar (e.g., when the bottom bar is docked), for example, so that the circuitry of the bottom bar may be configured to collect data, such as solar data, and communicate such data to the control circuit of the motor drive unit. Accordingly, the motorized window treatments described herein may be configured such that they include a motor drive unit and a dock, and such that the motor drive unit can be configured to charge the energy storage element of motor drive unit from the energy storage element of the bottom bar (e.g., based on energy gathered using solar cells) and/or charge the energy storage element of the bottom bar from the energy storage element of the motor drive unit (e.g., in examples where the motorized window treatment does not include solar cells, but does include a sensor circuit in the bottom bar that is configured to collect data for the control circuit of the motor drive unit).

Figure 33:
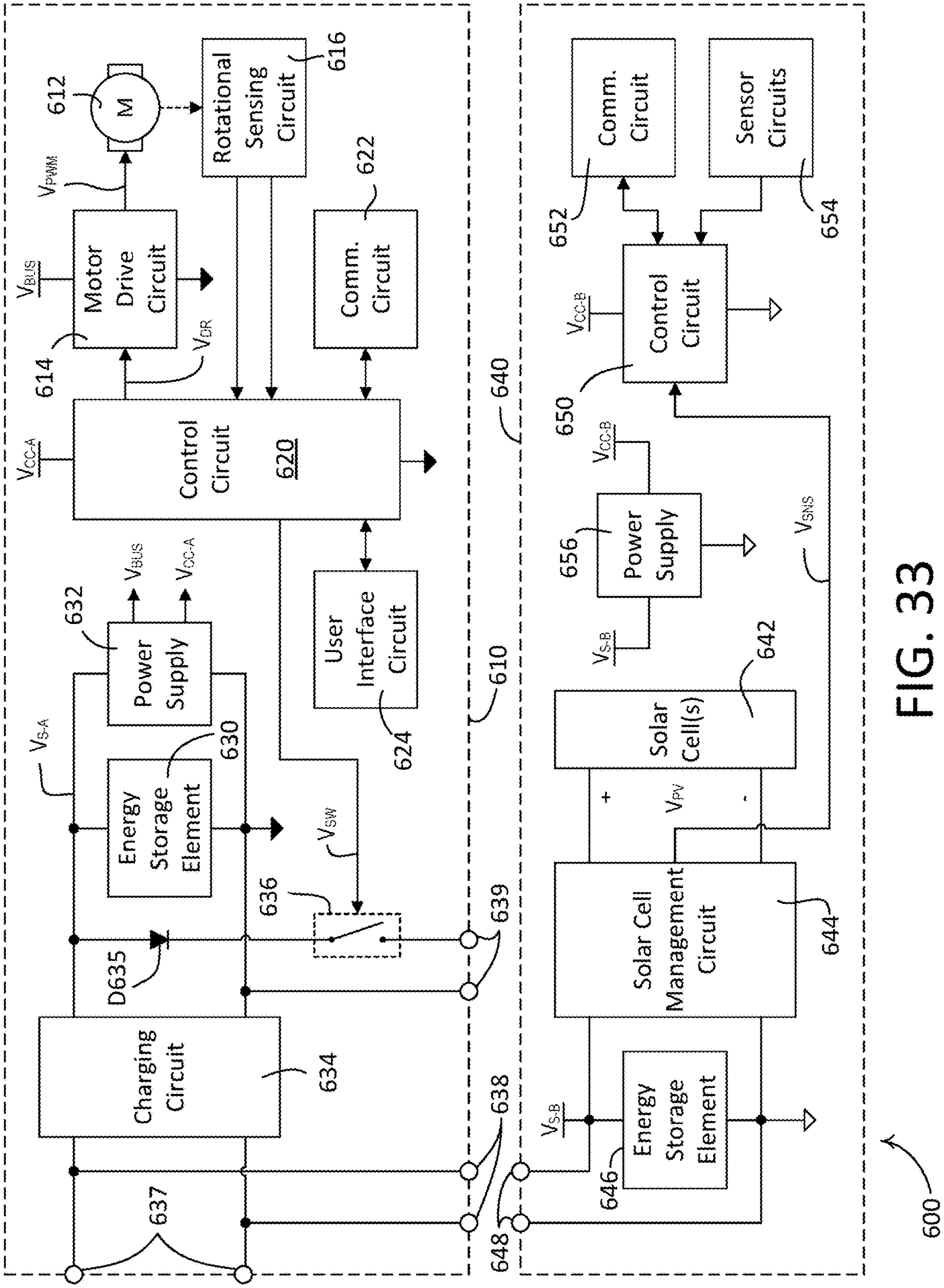
FIG. 33 is a block diagram of an example motor drive unit of a motorized window treatment.

FIG. 33 is a simplified block diagram of a motorized window treatment control system 600 for controlling a motorized window treatment (e.g., the motorized window treatments 150 of the load control system 100, the motorized window treatment 200, the motorized window treatment 300, and/or the motorized window treatment 2400). The motorized window treatment may comprise a covering material (e.g., the covering material 152, 230, 3*b*30) that may be wound around a roller tube (e.g., the roller tubes 212, 312) and may extend to a bottom bar (e.g., the bottom bars 240, 340). The motorized window treatment control system 600 may comprise a motor drive unit 610 (e.g., the motor drive units 156, the motor drive unit 250, and/or the motor drive unit 350) for rotating the roller tube for raising and lowering the covering material to adjust a present position $P_{PRES}$ of the covering material (e.g., the bottom bar). The motor drive unit 610 may include a motor 612 (e.g., a direct-current motor) that may be coupled to the roller tube for rotating the roller tube. The motor drive unit 610 may include a motor drive circuit 614 (e.g., an H-bridge drive circuit) that receives a bus voltage $V_{BUS}$ and may generate a pulse-width modulated (PWM) voltage $V_{PWM}$ for driving the motor 612. For example, the motor drive circuit 614 may comprise an H-bridge drive circuit and/or an H-bridge controller (e.g., an integrated circuit) for controlling the H-bridge drive circuit to generate the PWM voltage $V_{PWM}$ across the motor 612.

The motor drive unit 610 may include a control circuit 620 (e.g., a motor control circuit) for controlling the operation of the motor 612. The control circuit 620 may include, for example, a microprocessor, a programmable logic device (PLD), a microcontroller, an application specific integrated circuit (ASIC), a field-programmable gate array (FPGA), or any suitable processing device or control circuit. The motor drive unit 610 may include instructions (e.g., software instructions) that configure the control circuit 620 to generate at least one drive signal $V_{DR}$ for controlling the motor drive circuit 614. The motor drive circuit 614 may be configured to control the rotational speed and the direction of rotation of the motor 612 in response to the drive signal $V_{DR}$. The control circuit 620 may be configured to control the motor drive circuit 614 to rotate the motor 612 to adjust a present position $P_{PRES}$ of the covering material (e.g., of the bottom bar). The motor drive unit 610 may be configured to control the covering material between a raised position $P_{RAISED}$ (e.g., a fully-raised position and/or a fully-open position) and a lowered position $P_{LOWERED}$ (e.g., a fully-lowered position and/or a fully-closed position). The covering material may be fully wound around the roller tube in the raised position $P_{RAISED}$ and fully extended in the lowered position $P_{LOWERED}$. The control circuit 620 may be configured to set limits (e.g., an upper limit position $P_{UP\text{-}LIMIT}$ and a lower limit position $P_{LO\text{-}LIMIT}$) for limiting a range across which the present position $P_{PRES}$ of the covering material may be adjusted (e.g., to be less than a full range between the raised position $P_{RAISED}$ and lowered position $P_{LOWERED}$.

The motor drive unit 610 may comprise a memory (not shown), e.g., such as a non-volatile memory. The memory may be communicatively coupled to the control circuit 620 for the storage and/or retrieval of, for example, operational settings of the motor drive unit 610. In addition, the memory may be configured to store software for execution by the control circuit 620 to operate the motor drive unit 610 as described herein. The memory may be implemented as an internal circuit of the control circuit 620 or as an external integrated circuit (IC). The memory may comprise a computer-readable storage media or machine-readable storage media that maintains computer-executable instructions for performing one or more of the procedures and/or routines as described herein. For example, the memory may comprise computer-executable instructions or machine-readable instructions that include one or more portions of the procedures and/or routines described herein. The control circuit 620 may access the instructions from memory for being executed to cause the control circuit 620 to operate as described herein, or to operate one or more other devices as described herein. The memory may comprise computer-executable instructions for executing configuration software. In addition, the memory may have stored thereon one or more settings and/or control parameters associated with the motor drive unit 610. The control circuit may store the present position of the covering material and/or limits for controlling the position of the covering material (e.g., the fully-raised position $P_{RAISED}$ and/or the fully-lowered position $P_{LOWERED}$) in the memory. The control circuit 620 may be configured to store a record of a movement of the covering material each time that the control circuit 620 controls the motor 612 to adjust the present position $P_{PRES}$ of the covering material.

The motor drive unit 610 may include a rotational position sensing circuit 616, such as, for example, a Hall effect sensor (HES) circuit, which may be configured to generate first and second rotational position sensing signals $V_{S1}$, $V_{S2}$. The first and second rotational position sensing signals $V_{S1}$, $V_{S2}$ may indicate the rotational speed and/or the direction of rotation of the motor 612 to the control circuit 620. The rotational position sensing circuit 616 may include other suitable position sensors, such as, for example, magnetic, optical, and/or resistive sensors. The control circuit 620 may be configured to determine the rotational position of the motor 612 in response to the first and second rotational position sensing signals $V_{S1}$, $V_{S2}$ generated by the rotational position sensing circuit 616. The control circuit 620 may be configured to determine the present position $P_{PRES}$ of the covering material in response to the rotational position of the motor 612. The operation of a motor drive circuit and a rotational position sensing circuit of a motor drive unit is described in greater detail in commonly-assigned U.S. Pat. No. 5,848,634, issued Dec. 15, 1998, entitled MOTORIZED WINDOW SHADE SYSTEM, and commonly-assigned U.S. Pat. No. 7,839,109, issued Nov. 23, 2010, entitled METHOD OF CONTROLLING A MOTORIZED WINDOW TREATMENT, the entire disclosures of which are hereby incorporated by reference.

The motor drive unit 610 may include a communication circuit 622 that may allow the control circuit 620 to transmit and receive messages (e.g., digital messages) via signals, e.g., wired signals and/or wireless signals, such as radio-frequency (RF) signals. For example, the control circuit 620 may be configured to communication messages via the RF signals using a wireless communication protocol (e.g., a proprietary RF protocol, such as the CLEAR CONNECT protocol (e.g., CLEAR CONNECT TYPE A and/or CLEAR CONNECT TYPE X protocols), and/or a standard protocol, such as one of WIFI, cellular (e.g., 3G, 4G LTE, 5G NR, or other cellular protocol), BLUETOOTH, BLUETOOTH LOW ENERGY (BLE), ZIGBEE, Z-WAVE, THREAD, KNX-RF, ENOCEAN RADIO protocols, or a different standard protocol). The communication circuit 622 may be implemented as an internal circuit of the control circuit 620 or as an external integrated circuit (IC).

The control circuit 620 may be configured to control the motor 612 to control the movement of the covering material in response to a shade movement command received in messages received via the communication circuit 622 from a remote control device. For example, the shade movement command may include a commanded position $P_{CMD}$ to which the control circuit 620 will control the covering material. In addition, the control circuit 620 may be configured to receive messages from external devices. For example, the control circuit 620 may be configured to receive messages including indications of occupancy conditions and/or vacancy conditions in the space in which the motorized window treatment is installed from occupancy sensors and/or vacancy sensors, and messages including indications of an ambient light level in the space in which the motorized window treatment is installed form daylight sensors. Further, the control circuit 620 may be configured to transmit messages including a status of the motorized window treatment control system 600, such as the present position $P_{PRES}$ of the covering material. During a configuration procedure (e.g., an association procedure), the motor drive unit 610 may be associated with a remote control device, such that the control circuit 620 may be responsive to the messages transmitted by the remote control device (e.g., via wireless signals).

The motor drive unit 610 may include a user interface 624 having one or more buttons, for example, that allow a user to provide inputs to the control circuit 620 during setup and/or configuration of the motorized window treatment. The control circuit 620 may be configured to control the motor 612 to control the movement of the covering material in response to a shade movement command received via the communication circuit 622 and/or the user inputs received via the buttons of the user interface 624. The user interface 624 may also include one or more light-emitting diodes (LEDs) that may be illuminated by the control circuit 620, for example, to provide feedback to a user of the motorized window treatment.

The motor drive unit 610 may include a sensor circuit (not shown) coupled to the control circuit 620. For example, the sensor circuit may comprise a photosensor configured to generate a signal that indicates a light level, such as a daylight level $L_{DL}$ outside the window that the motorized window treatment is covering and/or an ambient light level $L_{AMB}$ inside the space in which the motorized window treatment is located. The control circuit 620 to control the motor 612 to control the movement of the covering material in response to the daylight level $L_{DL}$, and/or the ambient light level $L_{AMB}$ indicated by the sensor circuit. In addition, the sensor circuit may comprise an occupancy detection circuit configured to detect when the space in which the motorized window treatment is installed is occupied and/or vacant. For example, the occupancy detection circuit may comprise a passive infrared (PIR) detection circuit for detecting movement of occupants in the space. The control circuit 620 of the motor drive unit 610 may be configured to control the motor 612 to control the movement of the covering material in response to the occupancy condition and/or a vacancy condition detected by the occupancy detection circuit.

The electrical circuitry of the motor drive unit 610 may be powered from a first storage voltage $V_{S-A}$ produced across an energy storage element 630 of the motor drive unit 610. For example, the energy storage element 630 may comprise one or more individual storage elements electrically coupled in parallel. The individual storage elements of the energy storage element 630 may comprise, for example, one or more one or more of rechargeable batteries and/or supercapacitors. In some examples, the energy storage element 630 may be external to the motor drive unit 610 (e.g., external to an enclosure of the motor drive unit 610, such as the enclosure 252 of the motor drive unit 250). The motor drive unit 610 may comprise a power supply 632 configured to receive the first storage voltage $V_{S-A}$ and generate one or more supply voltages for powering the electrical circuitry of the motor drive unit 610. For example, the power supply 632 may be configured to generate a low-voltage supply voltage $V_{CC-A}$ for powering the control circuit 620, the memory, the communication circuit 622, and/or the user interface circuit 624. In addition, the power supply 632 may be configured to generate the bus voltage $V_{BUS}$ for powering the motor drive circuit 614. In some examples, the motor drive circuit 614 may be configured to be powered directly from the first storage voltage $V_{S-A}$ produced across the energy storage element 630. The energy storage element 630 of the motor drive unit 610 may be configured to charge through a charging circuit 634 from a second storage voltage $V_{S-B}$ received via electrical connections 638.

The motor drive unit 610 may further comprise electrical connections 639 that may be connected to a power bus (e.g., the power bus 158 shown in FIG. 1) for coupling the motor drive unit 610 to the motor drive units of other motorized window treatments (e.g., nearby motorized window treatments). For example, the power bus may comprise two electrical conductors (e.g., wires) coupled between the motor drive units, which may be coupled in parallel with each other. The motor drive unit 610 may be configured to provide the storage voltage $V_{S-A}$ produced across the energy storage element 630 at the electrical connections 639 (e.g., to provide the storage voltage $V_{S-A}$ on the power bus). For example, the motor drive unit 610 may comprise a diode D635 coupled in series with a switching circuit 636 between the storage voltage $V_{S-A}$ and one of the electrical connections 639 (e.g., with the other electrical connection 639 coupled to circuit common). The control circuit 630 may be configured to generate a switch control signal $V_{SW}$ for rendering the switching circuit 636 conductive and non-conductive for controllably providing the storage voltage $V_{S-A}$ the electrical connections 639. The control circuit 630 may be configured to generate the switch control signal $V_{SW}$ to render the switching circuit 636 to charge energy storage elements of one or more of the other motor drive units coupled to the power bus.

The motorized window treatment control system 600 may further comprise a bottom bar module 640 that may be located in the bottom bar. For example, the electrical circuitry of the bottom bar module 640 may be mounted to a printed circuit board (e.g., the printed circuit board 272) in the bottom bar. The bottom bar module 640 may comprise one or more solar cells 622 (e.g., photovoltaic cells) that may be mounted to a rear surface of the bottom bar (e.g., such as the solar cells 270, 370, 470, 570*a*, 570*b*, 570*c* are mounted to the bottom bars 240, 340, 440, 540*a*, 540*b*, 540*c* respectively). The solar cells 622 may be configured to convert received solar energy into a photovoltaic output voltage $V_{PV}$. The bottom bar module 640 may also comprise a solar cell management circuit 644 configured to charge an energy storage element 646 of the bottom bar for producing a second storage voltage $V_{S-B}$ across the energy storage element 646. For example, The solar cell management circuit 644 may be configured to control the charging of the energy storage element 646. The energy storage element 646 of the bottom bar module 640 may, for instance, comprise one or more individual storage elements electrically coupled in parallel. The individual storage elements of the energy storage element 646 may comprise, for example, one or more one or more of rechargeable batteries and/or supercapacitors. For example, the solar cell management circuit 644 may comprise a boost converter for generating the second storage voltage $V_{S-B}$ from the photovoltaic output voltage $V_{PV}$. The solar cell management circuit 644 may include, for example, a maximum power point tracking (MPPT) solar charge controller. The solar cell management circuit 644 may be characterized by a duty cycle $DC_{SCM}$ for driving a transistor of the boost converter circuit to generate the second storage voltage $V_{S-B}$ from the photovoltaic output voltage $V_{PV}$. The solar cell management circuit 644 may be configured to adjust the duty cycle $DC_{SCM}$ to track a maximum power point for charging the energy storage element 646.

The bottom bar module 640 may comprise electrical connections 648 configured to be coupled to (e.g., electrically and/or inductively coupled to) the electrical connections 638 of the motor drive unit 610. For example, the electrical connections 638 of the motor drive unit 610 may represent the electrical contacts 285 of the dock 280, the electrical contacts 485 of the dock 480, the electrical contacts 584*a*, 585*a* of the dock 580*a*, the electrical contacts 585*b* of the dock 580*b*, and/or the electrical contacts 585*c* of the dock 580*c*. In addition, the electrical connections 648 of the bottom bar module 640 may represent the electrical contacts 275 of the bottom bar 240, the electrical contacts 475 of the bottom bar 440, the electrical contacts 574*a*, 574*b* of the bottom bar 540*b*, the electrical contacts 575*b* of the bottom bar 540*b*, and/or the electrical contacts 575*c* of the bottom bar 540*c*. In some examples, the motor drive unit 610 and the bottom bar module 640 may not comprise the respective electrical connections 638, 648, but may alternatively comprise respective induction coils (e.g., the first induction coil 375 of the bottom bar 340 and/or the second induction coil 385 of the motor drive unit 350) to facilitate inductive coupling (e.g., magnetic coupling) between the bottom bar module 640 and the motor drive unit 610. When the covering material is in the raised position $P_{RAISED}$ (e.g., when the bottom bar is docked), the electrical connections 648 of the bottom bar module 640 may be coupled to (e.g., electrically and/or inductively coupled to) the electrical connections 638 of the motor drive unit 610, such that the energy storage element 630 of the motor drive unit 610 is configured to charge from the energy storage element 646 of the bottom bar module 640 via the charging circuit 634. While the charging circuit 634 is shown in FIG. 33 as a part of the motor drive unit 610, the charging circuit 634 could alternatively or additionally included in the bottom bar module 640.

The bottom bar module 640 may include a control circuit 650 (e.g., a bottom bar control circuit), which may include, for example, a microprocessor, a programmable logic device (PLD), a microcontroller, an application specific integrated circuit (ASIC), a field-programmable gate array (FPGA), or any suitable processing device or control circuit. The control circuit 650 of the bottom bar module 640 monitor the operation of the solar cells 642 and/or the energy storage element 646. The control circuit 650 of the bottom bar module 640 may be configured to receive one or more sense signals $V_{SNS}$ from the solar cell management circuit 644. The one or more sense signals $V_{SNS}$ received from the solar cell management circuit 644 may indicate, for example, a magnitude of the photovoltaic output voltage $V_{PV}$ generated by the solar cells 642 and/or a magnitude of the second storage voltage $V_{S-B}$ generated across the energy storage element 646. For example, the one or more sense signals $V_{SNS}$ generated by the solar cell management circuit 644 may comprise direct-current (DC) signals having magnitudes that indicate the magnitude of the photovoltaic output voltage $V_{PV}$ and/or the magnitude of the second storage voltage $V_{S-B}$ (e.g., the solar cell management circuit 644 may comprise one or more resistive divider circuits for generating the one or more sense signals $V_{SNS}$). In addition, the one or more sense signals $V_{SNS}$ generated by the solar cell management circuit 644 may comprise messages (e.g., digital messages) including indications of the magnitude of the photovoltaic output voltage $V_{PV}$ and/or the magnitude of the second storage voltage $V_{S-B}$.

In some examples, the bottom bar module 640 may comprise a memory (not shown), e.g., such as a non-volatile memory. The memory may be communicatively coupled to the control circuit 650 for the storage and/or retrieval of, for example, operational settings of the bottom bar module 640. In addition, the memory may be configured to store software for execution by the control circuit 650. The memory may be implemented as an internal circuit of the control circuit 650 or as an external integrated circuit (IC). The memory may comprise a computer-readable storage media or machine-readable storage media that maintains computer-executable instructions for performing one or more of the procedures and/or routines as described herein. For example, the memory may comprise computer-executable instructions or machine-readable instructions that include one or more portions of the procedures and/or routines described herein. The control circuit 650 may access the instructions from memory for being executed to cause the control circuit 620 to operate as described herein, or to operate one or more other devices as described herein. The memory may comprise computer-executable instructions for executing configuration software. In addition, the memory may have stored thereon one or more settings and/or control parameters associated with the motor drive unit 610. The control circuit may store measurements (e.g., the magnitude of the photovoltaic output voltage $V_{PV}$ and/or the magnitude of the second storage voltage $V_{S-B}$) and/or operational characteristics (e.g., the duty cycle $DC_{SCM}$ of the solar cell management circuit 644) in the memory.

The bottom bar module 640 may include a communication circuit 652 that may allow the control circuit 650 to communicate messages (e.g., digital messages) with the communication circuit 622 of the motor drive unit 610 via a communication link, such as a wired communication link and/or a wireless communication link, e.g., a radio-frequency (RF) communication link. The control circuit 650 of the bottom bar module 640 may be configured to communicate messages with the control circuit 620 of the motor drive unit 610, for example, via RF signals using a short-range wireless communication protocol (e.g., the BLUETOOTH LOW ENERGY (BLE) protocol, the Thread wireless communication protocol, etc.). In addition, the communication circuit 622 of the motor drive unit 610 and the communication circuit 652 of the bottom bar module 640 may be coupled together via a wired communication link, for example, when the bottom bar is docked. For example, the communication circuit 622 of the motor drive unit 610 may be coupled to the electrical connections 638 and the communication circuit 652 of the bottom bar module 640 may be coupled to the electrical connections 648, such that the communication circuits 622, 652 are configured to communicate with each other via the electrical connections 638, 648 when the bottom bar is docked. In addition, the motor drive unit 610 and/or the bottom bar module 640 may comprise additional electrical connections to allow the communication circuits 622, 652 to communicate with each other via the wired communication link.

In some examples, the communication circuit 622 and the communication circuit 652 may be configured for infrared (IR) communication. For example, the communication circuit 652 may comprise an IR emitter, and the communication circuit 622 may comprise an IR receiver. As such, the communication circuit 652 may allow the control circuit 650 to communicate messages (e.g., digital messages) with the communication circuit 622 of the motor drive unit 610 via an IR communication link. In some examples, the communication circuit 622 of the motor drive unit 610 may include an IR receiver that be located at an end portion of the motor drive unit 610, and the communication circuit 652 of the bottom bar module 640 may include an IR transmitter that be located at a corresponding (e.g., aligned) end portion of the bottom bar. Alternatively or additionally, the communication circuit 622 of the motor drive unit 610 may be an IR dongle that, for example, may be coupled to the control circuit 620 of the motor drive unit 610 via a Universal Serial Bus (USB) connection.

The control circuit 650 of the bottom bar module 640 may be configured to transmit messages including measurements recorded by the bottom bar module 640 and/or one or more operational characteristics of the bottom bar module 640. For example, the control circuit 650 of the bottom bar module 640 may be configured to transmit a message including an indication of a measurement of the magnitude of the photovoltaic output voltage $V_{PV}$ generated by the solar cells 642 and/or an indication of a measurement of the magnitude of the second storage voltage $V_{S-B}$ generated across the energy storage element 646 to the control circuit 620 of the motor drive unit 610. In addition, the control circuit 650 of the bottom bar module 640 may be configured to transmit a message an indication of an operational characteristic of the solar cell management circuit 644, such as the duty cycle $DC_{SCM}$ of the solar cell management circuit 644.

The bottom bar module 640 may include a sensor circuit 654 coupled to the control circuit 650. For example, the sensor circuit 654 may comprise a photosensor configured to generate a signal that indicates a light level, such as a daylight level $L_{DL}$ outside the window that the motorized window treatment is covering and/or an ambient light level $L_{AMB}$ inside the space in which the motorized window treatment is located. The control circuit 650 of the bottom bar module 640 may be configured to transmit a message including the daylight level $L_{DL}$ and/or the ambient light level $L_{AMB}$ indicated by the sensor circuit 654 to the motor drive unit 610. In addition, the sensor circuit 654 may comprise one or more orientation detection sensors, such as an accelerometer and/or a gyroscope. For example, the control circuit 650 of the bottom bar module 640 may be configured to determine when the motor drive unit 610 is adjusting the present position $P_{PRES}$ (e.g., the bottom bar is moving) in response to the accelerometer and/or the gyroscope of the sensor circuit 654. Further, the sensor circuit 654 may comprise an occupancy detection circuit configured to detect when the space in which the motorized window treatment is installed is occupied and/or vacant. For example, the occupancy detection circuit may comprise a passive infrared (PIR) detection circuit for detecting movement of occupants in the space. The control circuit 650 of the bottom bar module 640 may be configured to transmit a message including an indication of an occupancy condition and/or a vacancy condition to the motor drive unit 610.

The bottom bar module 640 may also comprise a power supply 656 configured to receive the second storage voltage $V_{S-B}$ and generate a low-voltage supply voltage $V_{CC-B}$ for powering the control circuit 650, the memory, the communication circuit 652, and/or the sensor circuit 654.

The control circuit 620 of the motor drive unit 610 and/or the control circuit 650 of the bottom bar module 640 may be configured to determine a magnitude of a solar power $P_{SOLAR}$ being received (e.g., presently being received) by the solar cells 642. The control circuit 620 of the motor drive unit 610 and/or the control circuit 650 of the bottom bar module 640 may be configured to calculate the solar power $P_{SOLAR}$ as a function of the magnitude of the photovoltaic output voltage $V_{PV}$, the magnitude of the second storage voltage $V_{S-B}$, and/or the duty cycle $DC_{SCM}$ of the solar cell management circuit 644 (e.g., as received from the bottom bar module 640).

The control circuit 620 of the motor drive unit 610 may be configured to adjust the present position $P_{PRES}$ of the covering material in response to the magnitude of the solar power $P_{SOLAR}$ being received (e.g., presently being received) by the solar cells 642 of the bottom bar 640. The control circuit 620 of the motor drive unit 610 may be configured to adjust the present position $P_{PRES}$ of the covering material to improve the magnitude of the solar power $P_{SOLAR}$ being received by the solar cells 642. For example, the control circuit 620 of the motor drive unit 610 may be configured to adjust present position $P_{PRES}$ of the covering material to move the bottom bar out of a location of low sunlight to a location of higher sunlight. The control circuit 620 may be configured to compare the magnitude of the solar power $P_{SOLAR}$ being received by the solar cells 642 to a low-power threshold $P_{TH-LP}$ and may be configured to move the covering material until the magnitude of the solar power $P_{SOLAR}$ being received by the solar cells 642 of the bottom bar module 640 has increased above an acceptable-power threshold $P_{TH-ACC}$.

The control circuit 620 of the motor drive unit 610 may be configured to control the motor drive 614 to move the covering material to the raised position $P_{RAISED}$, such that the bottom bar is docked and the electrical connections 648 of the bottom bar module 640 may be coupled to (e.g., electrically and/or inductively coupled to) the electrical connections 638 of the motor drive unit 610. When the control circuit 620 is moving the covering material to dock the bottom bar, the control circuit 620 may control the covering material through a docking movement (e.g., a docking sequence) as the bottom bar nears the dock. For example, the control circuit 620 may ramp down a rotational speed at which the motor is rotating as the bottom bar nears the dock.

The control circuit 620 of the motor drive unit 610 and/or the control circuit 650 of the bottom bar module 640 may be configured to determine that the bottom bar is docked by determining if the electrical connections 638 of the motor drive unit 610 are electrically connected to the electrical connections 648 of the bottom bar module 640. For example, the control circuit 620 of the motor drive unit 610 may be configured to determine that the bottom bar is docked by detecting that the second supply voltage $V_{S-B}$ is present at the electrical connections 638. In addition, the control circuit 650 of the bottom bar module 640 may be configured to determine that the bottom bar is docked by detecting that the motor drive unit 610 is drawing current from the energy storage element 646 via the electrical connections 648. Further, the control circuit 610 of the motor drive unit 610 may be configured to determine that the bottom bar is docked in response to receiving a message from the bottom bar module 640, and the control circuit 650 of the bottom bar module 640 may be configured to determine that the bottom bar is docked in response to receiving a message from the motor drive unit 610. The control circuit 620 of the motor drive unit 610 may be configured to transmit a query message to the bottom bar module 640, and the control circuit 650 of the bottom bar module 650 may be configured to transmit a response to the query message to the motor drive unit 610. For example, the control circuit 620 of the motor drive unit 610 may be configured to transmit the query message to the bottom bar module 650 via a wired communication link (e.g., via the electrical connections 626, 648 and/or via separate electrical connections on the dock) and/or via a wireless communication link (e.g., where the query message may indicate that the bottom bar is docked).

The control circuit 620 of the motor drive unit 610 and/or the control circuit 650 of the bottom bar module 640 may be configured to determine (e.g., automatically determine) when the motor drive unit 610 should dock the bottom bar (e.g., move the covering material to the raised position $P_{RAISED}$) to charge the energy storage element 630 from the energy storage element 646 of the bottom bar module 640. For example, the control circuit 620 of the motor drive unit 610 may be configured to determine that the bottom bar should be docked when the magnitude of the first storage voltage $V_{S-A}$ produced across the energy storage element 630 falls too low (e.g., is less than a low-charge threshold $V_{TH-LC}$). The control circuit 620 of the motor drive unit 610 may be move (e.g., automatically move) the covering material to the raised position $P_{RAISED}$ when the magnitude of the first storage voltage $V_{S-A}$ drops below the low-charge threshold $V_{TH-LC}$. Although described in context of storage voltages, the control circuit 620 of the motor drive unit 610 may be configured to determine whether or not the bottom bar should be docked (e.g., whether to charge the energy storage element of the motor drive unit) based on the state of charge of the energy storage elements of the motorized window treatment, for instance, when the state of charge of the energy storage element 630 falls below a threshold. For example, the control circuit 620 may be configured to calculate the state of charge of the energy storage element 630 based on the first storage voltage $V_{S-A}$. In some examples, the control circuit 620 may use the magnitude of the first storage voltage $V_{S-A}$ as an indication of the state of charge of the energy storage element 630.

In addition, the control circuit 650 of the bottom bar module 640 may be configured to determine that the bottom bar should be docked when the magnitude of the second storage voltage $V_{S-B}$ produced across the energy storage element 646 is greater than a high-charge threshold $V_{TH-HC}$. For example, the control circuit 650 of the bottom bar module 640 may be configured to transmit a message indicating that the bottom bar should be docked to the motor drive unit 610 via the communication circuit 652 when the magnitude of the second storage voltage $V_{S-A}$ rises above the high-charge threshold $V_{TH-HC}$. The control circuit 620 of the motor drive unit 610 may be configured to move the covering material to the raised position $P_{RAISED}$ in response to receiving the message from the bottom bar module 640 via the communication circuit 622. In addition, the control circuit 650 of the bottom bar module 640 may be configured to transmit a message including an indication of the magnitude of the second storage voltage $V_{S-A}$ to the motor drive unit 610, and the motor drive unit may be configured to move the covering material to the raised position $P_{RAISED}$ when the magnitude of the second storage voltage $V_{S-A}$ rises above the high-charge threshold $V_{TH-HC}$.

The control circuit 620 of the motor drive unit 610 may be configured to determine when to dock the bottom bar in response to occupancy conditions or vacancy conditions in the space in which the motorized window treatment is located. The control circuit 620 may receive messages including indications of occupancy conditions and/or vacancy conditions in the space from the bottom bar module 650 (e.g., as determined by the sensor circuit 654) and/or from external occupancy sensors. For example, the control circuit 620 may be configured to dock the bottom bar when the control circuit 620 has determined that the bottom bar should be docked (e.g., when the magnitude of the second storage voltage $V_{S-B}$ has risen below the high-charge threshold $V_{TH-HC}$) and when (e.g., only when) the space is vacant. In addition, the control circuit 620 may be configured to dock the bottom bar when the control circuit 620 has determined that the bottom bar should be docked (e.g., when the magnitude of the first storage voltage $V_{S-A}$ has dropped below the low-charge threshold $V_{TH-LC}$) and when (e.g., only when) the space is vacant. In some examples, the control circuit 620 may be configured to dock the bottom bar when the space is occupied, but the magnitude of the first storage voltage $V_{S-A}$ has dropped below a critical-charge threshold $V_{TH-CRIT}$ (e.g., which may be smaller than the low-charge threshold $V_{TH-LC}$). Further, in some examples, the control circuit 620 may use the status of one or more lighting loads as a proxy or indicator that the space is occupied or vacant. For instance, the control circuit may determine that the space is occupied when the lighting loads are on, and determine that the space is vacant when the lighting loads are off. Alternatively or additionally, the control circuit 620 may determine that the space is occupied or vacant based on external feedback, such as indications as to whether a meeting is scheduled for the space. For instance, the control circuit 620 may receive data from one or more calendar programs (e.g., such as Microsoft® Outlook®), and may determine that the space is vacant based on there not being a meeting scheduled for the space at a particular day and time.

The control circuit 620 of the motor drive unit 610 may be configured to determine when to dock the bottom bar in response to the present day of the week and/or the time of the day. For example, the control circuit 620 may be configured to not dock the bottom bar during a nighttime period (e.g., during a privacy mode, which may be between sunset and sunrise), for example, to maintain the covering material at a lowered position $P_{LOWER}$ to provide privacy for occupants of the space. In addition, the control circuit 620 may be configured to dock the bottom bar at a predetermined docking time. For example, the motor drive unit 610 (e.g., the control circuit 620) may comprise a timeclock for keeping track of the day of the week and/or the time of the day. In addition, the control circuit 620 may be configured to determine the present day of the week and/or the time of the day from messages received via the communication circuit 622 (e.g., from the Internet). Further, the control circuit 650 of the bottom bar 640 may be configured to estimate the time of the day in response to the sensor circuit 654. For example, the control circuit 650 may be configured to determine that the present time of the day is during the nighttime period when the ambient light level $L_{AMB}$ indicated by the sensor circuit 654 is less than a nighttime threshold LTH-NIGHT, and may transmit a message indicating that the present time of the day is during the nighttime period to the motor drive unit 610.

Further, in some examples, the control circuit 620 may schedule one or more docking events (e.g., period and/or reoccurring docking events) based on occupancy and/or vacancy information for the space. The control circuit 620 may be configured to determine the occupancy and vacancy of the space over time, for instance, based on the occupancy or vacant messages received from one or more occupancy or vacancy sensors. As noted herein, the control circuit 620 may receive messages including indications of occupancy conditions and/or vacancy conditions in the space from the bottom bar module 650 (e.g., as determined by the sensor circuit 654) and/or from external occupancy sensors. For instance, the control circuit 620 may determine, over time, that the space is vacant at certain days and/or times (e.g., Sundays from 8-10 am), and may schedule a docking event for those days/times. Further, in some examples, the control circuit 620 may use the status of one or more lighting loads as a proxy or indicator that the space is occupied or vacant. For instance, the control circuit may determine that the space is occupied when the lighting loads are on, and determine that the space is vacant when the lighting loads are off. In some examples, the control circuit 620 may determine that the space is vacant on certain days and/or times (e.g., Sundays from 8-10 am) based on the lighting loads within the space consistently being off during those days and/or times, and may schedule a docking event for those days/ times. Alternatively or additionally, the control circuit 620 may determine that the space is occupied or vacant based on external feedback, such as indications as to whether a meeting is scheduled for the space. For instance, the control circuit 620 may receive data from one or more calendar programs (e.g., such as Microsoft®) Outlook®), and may determine that the space is vacant based on there not being a meeting scheduled for the space at a particular day and time.

In addition, the control circuit 620 of the motor drive unit 610 may be configured to determine when to dock the bottom bar in response to one or more other factors. For example, after determining the control circuit 620 should dock the bottom bar (e.g., based on the magnitude of the first storage voltage $V_{S-A}$, the magnitude of the second storage voltage $V_{S-B}$, the occupancy or vacancy status of the space, and/or the present day of the week and/or the time of the day), the control circuit 620 may also consider one or more factors to determine if the control circuit 620 should dock the bottom bar. For example, the control circuit 620 may determine whether or not to dock the bottom bar based on the position of the sun, for example, if the sun is not shining on a façade on which the motorized window treatment 600 is installed, for instance, to take advance of instances where the solar cells 642 are less likely to be missing out on collecting a relatively large amount of solar energy. In addition, the control circuit 620 may determine whether or not to dock the bottom bar based on weather information (e.g., temperature, cloud coverage, precipitation, barometric pressure, etc.). For example, the control circuit 620 may determine to dock the bottom bar if it is cloudy, for instance, to take advance of instances where the solar cells 642 are less likely to be missing out on collecting a relatively large amount of solar energy. The control circuit may determine whether or not to dock the bottom bar based on feedback from the photosensor of the sensor circuits of the motor drive unit 610. For example, the control circuit 620 may determine to dock the bottom bar if there is less daylight as indicated by the photosensor of the motor drive unit 610, for instance, to take advance of instances where the solar cells 642 are less likely to be missing out on collecting a relatively large amount of solar energy.

The control circuit 620 of the motor drive unit 610 and/or the control circuit 650 of the bottom bar module 640 may be configured to measure and/or collect solar data regarding the operation of the motorized window treatment control system 600. The solar data may comprise one or more measurements recorded by the motor drive unit 610 and/or the bottom bar module 640, and/or one or more operational characteristics of the motor drive unit 610 and/or the bottom bar module 640. For example, the measurements included in the solar data may comprise measurements of the magnitude of the photovoltaic output voltage $V_{PV}$, the magnitude of the second storage voltage $V_{S-B}$, and/or the ambient light level $L_{AMB}$ (e.g., as measured by the sensor circuit 654). For example, the operational characteristics included in the solar data may comprise the duty cycle $DC_{SCM}$ of the solar cell management circuit 644 and/or other operational characteristics of the solar cell management circuit 644. The solar data may also comprise tracking information associated with each of the measurements and/or operational characteristics. For example, the tracking information may include timing information (e.g., a time stamp indicating a time at which the respective measurement and/or operational characteristic was recorded) and/or position information (e.g., the present position $P_{PRES}$ of the covering material at the time at which the respective measurement and/or operational characteristic was recorded).

The control circuit 620 of the motor drive unit 610 and/or the control circuit 650 of the bottom bar module 640 may be configured to determine the solar power $P_{SOLAR}$ (e.g., as received by the solar cells 642) with respect to the position $P_{CM}$ of the covering material (e.g., determine a relationship between the solar power $P_{SOLAR}$ and the position $P_{CM}$ of the covering material). The control circuit 620 of the motor drive unit 610 and/or the control circuit 650 of the bottom bar module 640 may be configured to calculate the solar power $P_{SOLAR}$ using the solar data. For example, the control circuit 620 of the motor drive unit 610 and/or the control circuit 650 of the bottom bar module 640 may be configured to calculate the solar power $P_{SOLAR}$ as a function of the magnitude of the photovoltaic output voltage $V_{PV}$, the magnitude of the second storage voltage $V_{S-B}$, and/or the duty cycle $DC_{SCM}$ of the solar cell management circuit 644. The control circuit 620 of the motor drive unit 610 and/or the control circuit 650 of the bottom bar module 640 may be configured to determine the solar power $P_{SOLAR}$ at each of a plurality of intermediate positions between the raised position $P_{RAISED}$ and the lowered position $P_{LOWERED}$. The control circuit 620 of the motor drive unit 610 and/or the control circuit 650 of the bottom bar module 640 may be configured to store data defining the relationship between the solar power $P_{SOLAR}$ and the position $P_{CM}$ of the covering material in the solar data.

The control circuit 620 of the motor drive unit 610 and/or the control circuit 650 of the bottom bar module 640 to measure and/or collect solar data regarding the operation of the motorized window treatment control system 600 during a configuration procedure of the motorized window treatment control system 600. During the configuration procedure, the control circuit 620 of the motor drive unit 610 and/or the control circuit 650 of the bottom bar module 640 may be configured to measure and/or collect the solar data. In addition, the control circuit 620 of the motor drive unit 610 and/or the control circuit 650 of the bottom bar module 640 may be configured to determine the solar power $P_{SOLAR}$ with respect to the position $P_{CM}$ of the covering material (e.g., the relationship between the solar power $P_{SOLAR}$ and the position $P_{CM}$ of the covering material) during the configuration procedure. For example, the configuration procedure may be completed when the motorized window treatment control system 600 is first installed (e.g., prior to normal operation). In some examples, the control circuit 620 of the motor drive unit 610 may be configured to execute the configuration procedure in response to an actuation of one or more of the buttons of the user interface 624 and/or a message received via the communication circuit 622, and the control circuit 650 of the bottom bar module 650 may be configured to execute the configuration procedure in response to a message received via the communication circuit 652. In addition, the control circuit 620 of the motor drive unit 610 and/or the control circuit 650 of the bottom bar module 640 may be configured to execute the configuration procedure during normal operation (e.g., continuously and/or periodically over time). Further, the control circuit 620 of the motor drive unit 610 and/or the control circuit 650 of the bottom bar module 640 may be configured to execute the configuration procedure in response to determining a change in the solar power $P_{SOLAR}$ received by the solar cells 642 (e.g., as compared to an expected solar power).

When the communication circuit 652 of the bottom bar module 640 is configured to communicate with the communication circuit 622 of the motor drive unit 610 via a wireless communication link (e.g., via RF signals using a short-range wireless communication protocol), the control circuit 650 of the bottom bar module 650 may be configured to periodically transmit the solar data (e.g., one or more measurements and/or operational characteristics) to the control circuit 620 of the motor drive unit 610 at a transmission rate $T_{TX}$. In some examples, the wireless communication link between the control circuit 620 of the motor drive unit 610 and the control circuit 650 of the bottom bar module 650 may be a one-way communication link (e.g., from the control circuit 650 of the bottom bar module 650 to the control circuit 620 of the motor drive unit 610) to facilitate reporting of the solar data to the control circuit 620 of the motor drive unit 610. In some examples, the communication circuit 652 of the bottom bar module 640 may be configured to communicate with the communication circuit 622 of the motor drive unit 610 via a wired communication link (e.g., as described herein). The control circuit 620 of the motor drive unit 610 may be configured to store the solar data received from the control circuit 650 of the bottom bar module 650 in the memory of the motor drive unit 610. For each of the measurements and/or operational characteristics of the solar data, the control circuit 620 of the motor drive unit 610 may be configured to add to the solar data a respective position $P_{DATA}$ of the covering material at the time at which the solar data was received. In some examples, the control circuit may be configured to adjust the transmission rate $T_{TX}$ of the communication circuit 652 based on the magnitude of the second storage voltage $V_{S-B}$ across the energy storage element 646. For example, the control circuit may be configured to decrease the transmission rate $T_{TX}$ when the magnitude of the second storage voltage $V_{S-B}$ is high, such that the control circuit 650 transmits the solar data at a higher rate when the magnitude of the second storage voltage $V_{S-B}$ is high than when the magnitude of the second storage voltage $V_{S-B}$ is low.

When the communication circuit 652 of the bottom bar module 640 is configured to communicate with the communication circuit 622 of the motor drive unit 610 via a wired communication link (e.g., via the electrical connections 638, 648), the control circuit 650 of the bottom bar module 640 may be configured to collect and store the solar data in the memory of the bottom bar module 640, and then transmit the solar data to the communication circuit 622 of the motor drive unit 610 via the wired communication link when the bottom bar is docked. Since the control circuit 650 of the bottom bar module 640 may not have access to the present position $P_{PRES}$ of the covering material (e.g., which is maintained by the control circuit 620 of the motor drive unit 610), the control circuit may be configured to store in the solar data timing information (e.g., a time stamp indicating a time at which the respective measurement and/or operational characteristic was recorded). After receiving the solar data from the control circuit 650 of the bottom bar module 640, the control circuit 620 of the motor drive unit 610 may be determine a respective position $P_{DATA}$ of the covering material for each of the measurements and/or operational characteristics of the solar data by comparing the respective time stamp with the record of movements of the covering material that are stored in the memory of the motor drive unit 610. In some examples, the control circuit 650 of the bottom bar module 640 may be configured to estimate the present position $P_{PRES}$ of the covering material in response to the accelerometer and/or the gyroscope of the sensor circuit 654 and add to the solar data a respective position $P_{DATA}$ of the covering material at the time at which the measurement and/or operational characteristic was recorded.

The control circuit 650 of the bottom bar module 640 may be configured to record the measurements and/or operational characteristics of the solar data at a timing interval $T_{TIM}$. For examples, the transmission rate $T_{TX}$ of the communication circuit communication circuit 652 may be equal to the timing interval $T_{TIM}$, such the control circuit 650 is configured to record the measurements and/or operational characteristics of the solar data and/or transmit the measurements and/or operational characteristics of the solar data at the same time (e.g., at the timing interval $T_{TIM}$). The control circuit 650 may be configured to set the timing interval $T_{TIM}$ based on whether the covering material is moving or not. For example, the control circuit 650 may be configured to increase the timing interval $T_{TIM}$ when the covering material is not moving and decrease the timing interval $T_{TIM}$ when the covering material is moving. The control circuit 650 may be configured to set the timing interval $T_{TIM}$ to an inactive interval value $T_{INACTIVE}$ when the covering material is not moving and to an active interval value $T_{ACTIVE}$ when the covering material is moving, where the inactive interval value $T_{INACTIVE}$ is longer than the active interval value $T_{ACTIVE}$. For example, the control circuit 650 of the bottom bar module 640 may be configured to determine that the covering material is moving in response to the accelerometer and/or the gyroscope of the sensor circuit 654. In addition, the control circuit 650 may be configured to determine that the covering material is moving in response to a message received from the control circuit 620 of the motor drive unit 610 (e.g., which may include an indication that the control circuit 620 is presently moving the covering material).

The control circuit 620 of the motor drive unit 610 may be configured to use the solar data to configure the motor drive unit 610 (e.g., configure the behavior of the motor drive unit 610 during normal operation). For example, the control circuit 620 may be configured to analyze the solar data to determine a charging position $P_{CHRG}$ (e.g., a maximum-solar-power position) at which the solar cells 642 of the bottom bar module 640 may appropriately charge. For example, the charging position $P_{CHRG}$ may be a position at which the solar cells 642 of the bottom bar module 640 may receive a maximum magnitude of solar power $P_{SOLAR}$ between the lowered position $P_{LOWER}$ and the raised position $P_{RAISED}$. The control circuit 620 may be configured to control the covering material to the charging position $P_{CHRG}$ at one or more predetermined times (e.g., when the space is vacant and/or over the weekends). In addition, the control circuit 620 may be configured to analyze the solar data to set an upper limit position $P_{UP-LIMIT}$ of the motorized window treatment. For example, the control circuit 620 may be configured to determine a position between the lowered position $P_{LOWER}$ and the raised position $P_{RAISED}$ above which the solar cells 642 of the bottom bar module 640 may not receive an appropriate amount of sunlight and set that position as the upper limit position $P_{UP-LIMIT}$.

Further, the control circuit 620 may be configured to analyze the solar data to identify one or more dead-bands (e.g., dead regions) between the lowered position $P_{LOWER}$ and the raised position $P_{RAISED}$ (e.g., positions of the covering material between which the solar cells 642 of the bottom bar module 640 may not receive an appropriate amount of sunlight, e.g., below a defined threshold). For example, each dead-band may be characterized by an upper dead-band limit position $P_{DB-UL}$ and a lower dead-band limit position $P_{DB-LL}$. During normal operation, the control circuit 620 may be configured to not maintain the present position $P_{PRES}$ of the covering material within any of the dead regions between the lowered position $P_{LOWER}$ and the raised position $P_{RAISED}$. For example, when a commanded position $P_{CMD}$ of a received message falls between the upper dead-band limit position $P_{DB-UL}$ and the lower dead-band limit position $P_{DB-LL}$ of a dead-band, the control circuit 620 may be configured to adjust the present position $P_{PRES}$ of the covering material to the closet position outside of the respective dead region (e.g., to either and/or the upper dead-band limit position $P_{DB-UL}$ and the lower dead-band limit position $P_{DB-LL}$ of the respective dead-band). In addition, the control circuit may be configured to adjust the present position $P_{PRES}$ of the covering material to a position that is at least an offset amount $\Delta_{OFFSET}$ away from the respective dead-bands (e.g., either $P_{DB-UL}+\Delta_{OFFSET}$ or $P_{DB-LL}-\Delta_{OFFSET}$).

In some examples, the motor drive unit 610 may include electrical terminals 637 that are configured to allow for an external power source to charge the energy storage element 630 of the motor drive unit 610. For example, the energy storage element 630 of the motor drive unit 610 may be charged (e.g., jump started) when the motorized window treatment 600 is first installed and the motor drive unit is first powered up. In addition, the energy storage element 630 of the motor drive unit 610 may be charged (e.g., recharged) when the energy storage element 630 is in a condition in which the energy storage element 630 is not able to properly charge from the energy storage element 646 of the bottom bar module 640 (e.g., if the solar cells 642 are not receiving an appropriate amount of solar energy. In some examples, the electrical terminals 637 may be a standard power supply connector, e.g., such as a universal serial bus (USB) connector. In some example, the motor drive unit 610 (e.g., the energy storage element 630) may be configured to receive power from an external power source via the electrical terminals 637. For example, in the condition that the energy storage element 630 is not able to properly charge from the energy storge element 646 of the bottom bar module 640, the motor drive unit 610 (e.g., the energy storage element 630) may be configured to receive power (e.g., continuously receive power) from an external power source, such as an external power supply and/or an external battery pack.

In some examples, the control circuit 620 of the motor drive unit 610 of the motorized window treatment 600 may be configured to detect trends in storage level of the energy storage element 630 (e.g., based on the magnitude of the first storage voltage $V_{S-A}$). For example, the control circuit 620 may process the storage level (e.g., the first storage voltage $V_{S-A}$) of the energy storage element 630 to determine a trend of any change in the storage level over time. For example, the control circuit 620 may determine whether the storage level of the energy storage element 630 is greater than or less than the storage level over a previous time period. Further, the control circuit 620 may be configured to determine whether a rolling average of the storage level of a predetermined number of previous storage level measurements is increasing or decreasing to, for example, determine whether the energy storage element 630 is starting to degrade (e.g., fail). In some examples, the control circuit 620 may perform an action in response to a determination that the energy storage element 630 is starting to degrade. For instance, the control circuit 620 may send an alert to a mobile device and/or a system controller (e.g., indicating that the motorized window treatment 600 should be serviced). Alternatively or additionally, the control circuit 620 may move the covering material to the raised position $P_{RAISED}$ and start to shut down some of the internal components of the motorized window treatment 600 (e.g., the communication circuit 622). In response, a technician may change out the energy storage element 630, charge the energy storage element 630 (e.g., via the electrical terminals 637 using a USB connector), and/or connect the energy storage element 630 to an external power source, such as an external power supply and/or an external battery pack (e.g., via the electrical terminals 637 using the USB connector).

Figure 34A:
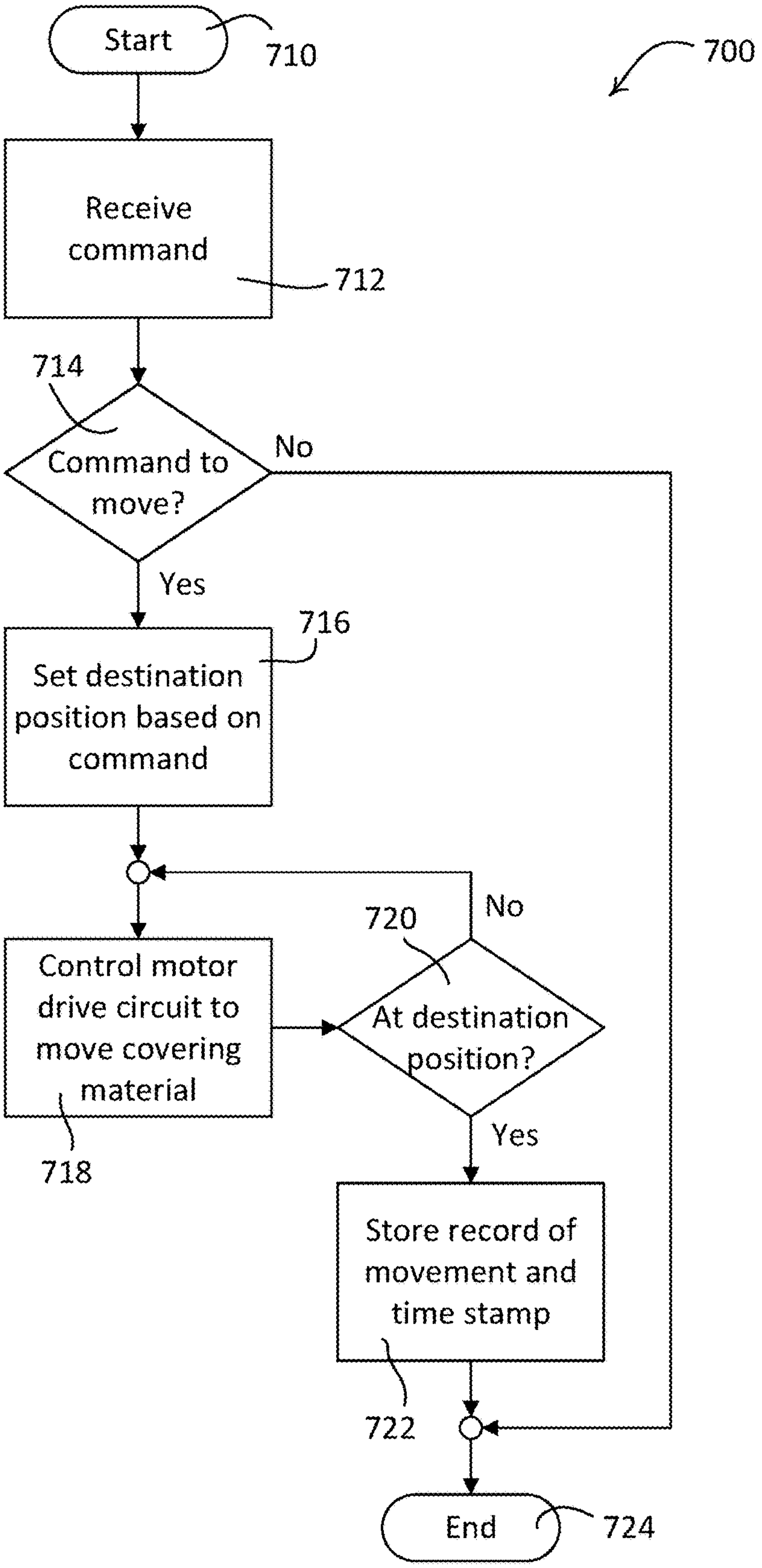
FIG. 34A is a flowchart of an example procedure for adjusting a present position of a covering material of a motorized window treatment.

FIG. 34A is a flowchart of an example procedure 700 for adjusting a present position $P_{PRES}$ of a covering material of a motorized window treatment (e.g., the motorized window treatments of the embodiments shown in FIGS. 1-33 or FIGS. 51-57). The procedure 700 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). For example, the control circuit may execute the procedure 700 periodically starting at 710. In addition, the control circuit may execute the procedure 700 in response to receiving a message via a communication circuit at 710.

At 712, the control circuit of the motor drive unit may receive a command. For example, the control circuit may receive a message including a command via a communication circuit (e.g., the communication circuit 622). The command may be, for example, a command to move the covering material (e.g., a shade movement command to adjust the present position $P_{PRES}$ of the covering material). For example, the command may include a commanded position $P_{CMD}$ to which the control circuit of the motor drive unit should control the present position $P_{PRES}$ of the covering material. In addition, the command may include a command to raise or lower the present position $P_{PRES}$ of the covering material, and the control circuit may be configured to adjust the present position $P_{PRES}$ of the covering material by a predetermined amount $\Delta P$ in response to receiving the command. In some examples, the control circuit may be configured to start raising or lowering the covering material in response to receiving a message including a raise command or a lower command, respectively, and may stop raising or lowering the present position $P_{PRES}$ of the covering material in response to receiving a message including a stop command. Further, the command in the message received at 712 may not be a command to move the covering material, but may be a command to enter a mode (e.g., a configuration mode), a command to transmit status information of the motor drive unit, and/or other commands that are not movement commands. Additionally or alternatively, the command may be received in response to an actuation of one or more of the buttons of the motor drive unit (e.g., the button of the user interface circuit 624). For example, the control circuit may be configured to raise or lower the present position $P_{PRES}$ of the covering material by a predetermined amount $\Delta P$ in response to detecting an actuation of a first button or a second button, respectively, of the motor drive unit. In addition, the control circuit may be configured to start raising or lowering the covering material in response to detecting a first actuation of the first button or the second button, respectively, and may stop raising or lowering the present position $P_{PRES}$ of the covering material in response to detecting a second subsequent actuation of the first button or the second button, respectively.

At 714, the control circuit of the motor drive unit may be configured to determine if the command received at 712 is a command to move the covering material (e.g., a shade movement command). When the command is not a command to move the covering material at 714, the procedure 700 may end at 724. When the command is a command to move the covering material at 714, the control circuit may at 716 set a destination position $P_{DEST}$ for the covering material based on the command in the message received at 712. For example, when the message includes a commanded position $P_{CMD}$, the control circuit may set the destination position $P_{DEST}$ equal to the commanded position $P_{CMD}$ at 716. In addition, when the message includes a raise command or a lower command, the control circuit may set the destination position $P_{DEST}$ to be a predetermined amount ΔP from the present position $P_{PRES}$ before movement of the covering material starts at 716 (e.g., $P_{DEST}=P_{PRES}+\Delta P$ when the command is a raise command or $P_{DEST}=P_{PRES}-\Delta P$ when the command is a lower command).

At 718, the control circuit may control the motor drive circuit to rotate the motor to move the covering material. For example, the control circuit may be configured to generate at least one drive signal (e.g., the at least one drive signal $V_{DR}$) for controlling the motor drive circuit to control the rotational speed and the direction of rotation of the motor. At 720, the control circuit of the motor drive unit may be configured to determine if the covering material is at the destination position $P_{DEST}$. When the control circuit determines that the covering material is not at the destination position $P_{DEST}$ at 720, the control circuit may continue to control the motor drive circuit to move the covering material towards the destination position $P_{DEST}$ at 718. When the control circuit determines that the covering material is the destination position $P_{DEST}$ at 720, the control circuit may stop controlling the motor drive circuit to move the covering material and store a record of the movement of the covering material along with timing information (e.g., a time stamp indicating a time at which the movement occurred) at 722, before the procedure 700 ends at 724.

Figure 34B:
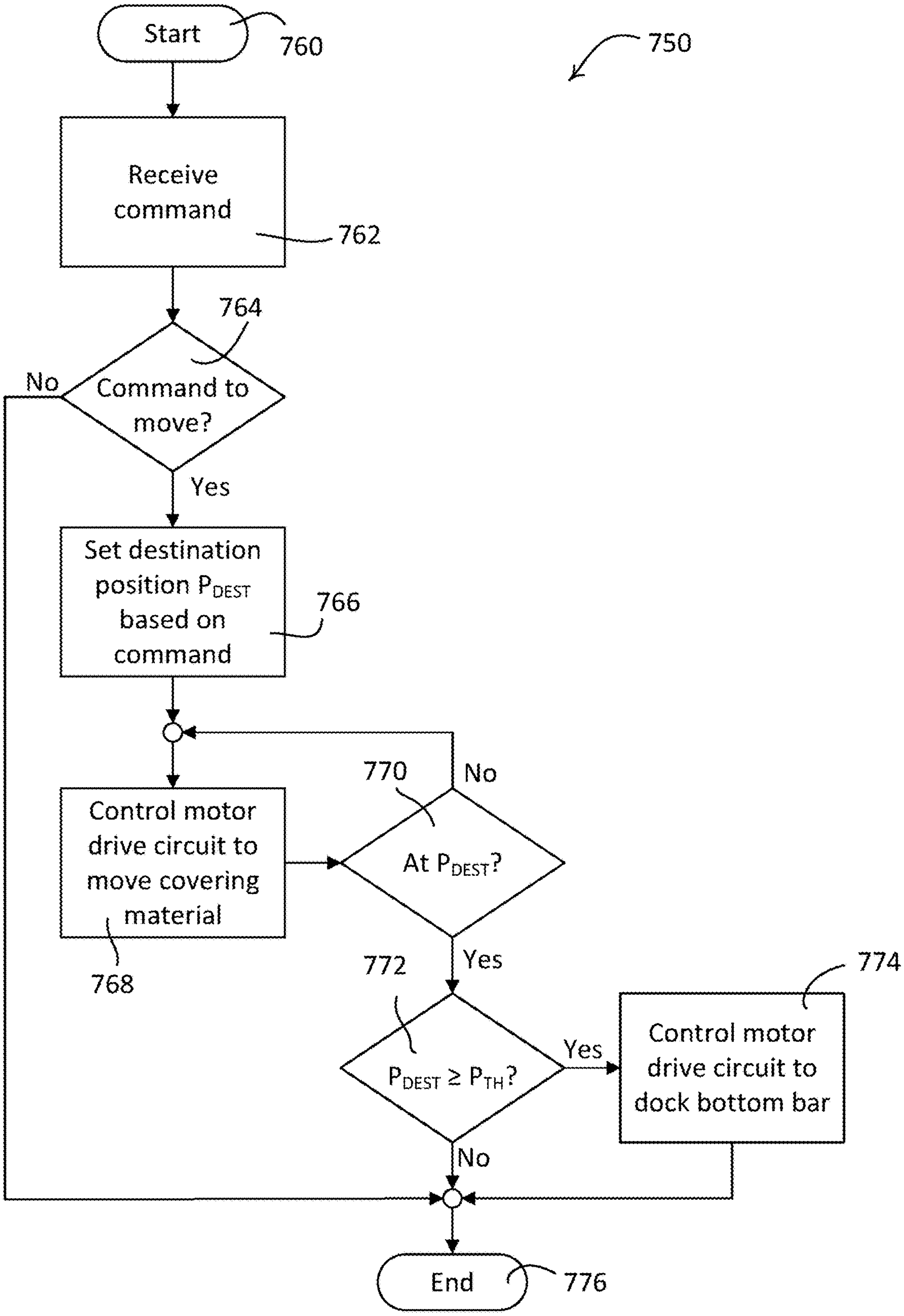
FIG. 34B is a flowchart of an example procedure for adjusting a present position of a covering material of a motorized window treatment.

FIG. 34B is a flowchart of an example procedure 750 for adjusting a present position $P_{PRES}$ of a covering material of a motorized window treatment (e.g., the motorized window treatments of the embodiments shown in FIGS. 1-33 or FIGS. 51-57). The procedure 750 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). For example, the control circuit may execute the procedure 750 periodically starting at 760. In addition, the control circuit may execute the procedure 750 in response to receiving a message via a communication circuit at 760.

At 762, the control circuit of the motor drive unit may receive a command. For example, the control circuit may receive a message including a command via a communication circuit (e.g., the communication circuit 622). The command may be, for example, a command to move the covering material (e.g., a shade movement command to adjust the present position $P_{PRES}$ of the covering material). For example, the command may include a commanded position $P_{CMD}$ to which the control circuit of the motor drive unit should control the present position $P_{PRES}$ of the covering material. In addition, the command may include a command to raise or lower the present position $P_{PRES}$ of the covering material, and the control circuit may be configured to adjust the present position $P_{PRES}$ of the covering material by a predetermined amount ΔP in response to receiving the command. In some examples, the control circuit may be configured to start raising or lowering the covering material in response to receiving a message including a raise command or a lower command, respectively, and may stop raising or lowering the present position $P_{PRES}$ of the covering material in response to receiving a message including a stop command.

In some examples, the command in the message received at 762 may not be a command to move the covering material, but may be a command to enter a mode (e.g., a configuration mode), a command to transmit status information of the motor drive unit, and/or other commands that are not movement commands. Additionally or alternatively, the command may be received in response to an actuation of one or more of the buttons of the motor drive unit (e.g., the button of the user interface circuit 624). For example, the control circuit may be configured to raise or lower the present position $P_{PRES}$ of the covering material by a predetermined amount ΔP in response to detecting an actuation of a first button or a second button, respectively, of the motor drive unit. In addition, the control circuit may be configured to start raising or lowering the covering material in response to detecting a first actuation of the first button or the second button, respectively, and may stop raising or lowering the present position $P_{PRES}$ of the covering material in response to detecting a second subsequent actuation of the first button or the second button, respectively.

At 764, the control circuit of the motor drive unit may be configured to determine if the command received at 762 is a command to move the covering material (e.g., a shade movement command). When the command is not a command to move the covering material at 764, the procedure 750 may end at 776. When the command is a command to move the covering material at 764, the control circuit may set a destination position $P_{DEST}$ for the covering material at 766 based on the command in the message received at 762. For example, when the message includes a commanded position $P_{CMD}$, the control circuit may set the destination position $P_{DEST}$ equal to the commanded position $P_{CMD}$ at 766. In addition, when the message includes a raise command or a lower command, the control circuit may set the destination position $P_{DEST}$ to be a predetermined amount ΔP from the present position $P_{PRES}$ before movement of the covering material starts at 766 (e.g., $P_{DEST}=P_{PRES}+\Delta P$ when the command is a raise command or $P_{DEST}=P_{PRES}-\Delta P$ when the command is a lower command).

At 768, the control circuit may control the motor drive circuit to rotate the motor to move the covering material. For example, the control circuit may be configured to generate at least one drive signal (e.g., the at least one drive signal $V_{DR}$) for controlling the motor drive circuit to control the rotational speed and the direction of rotation of the motor. At 770, the control circuit of the motor drive unit may be configured to determine if the covering material is at the destination position $P_{DEST}$. When the control circuit determines that the covering material is not at the destination position $P_{DEST}$ at 720, the control circuit may continue to control the motor drive circuit to move the covering material towards the destination position $P_{DEST}$ at 768.

When the control circuit determines that the covering material is the destination position $P_{DEST}$ at 770, the control circuit may determine whether destination position $P_{DEST}$ is greater than or equal to a position threshold $P_{TH}$. The position threshold $P_{TH}$ may be between the lowered position $P_{LOWERED}$ and the raised position $P_{RAISED}$ (e.g., a position that is close to the raised position $P_{RAISED}$). For example, the position threshold $P_{TH}$ may be a threshold distance away from the raised position $P_{RAISED}$. If the destination position $P_{DEST}$ is less than the position threshold $P_{TH}$, the control circuit may exit the procedure 750 at 776. However, if the control circuit determines that destination position $P_{DEST}$ is greater than or equal to the position threshold $P_{TH}$, the control circuit may control the motor drive circuit to dock the bottom bar (e.g., move the covering material to the raised position $P_{RAISED}$). For example, the control circuit may control the motor drive unit to dock the bottom bar to charge the energy storage element 630 of the motor drive unit 610 from the energy storage element 646 of the bottom bar module 640 if the destination position $P_{DEST}$ of the covering material is greater than or equal to the position threshold $P_{TH}$ (e.g., the destination position $P_{DEST}$ of the covering material is close to the raised position $P_{RAISED}$). As such, the control circuit may be configured to dock the bottom bar when the covering material is moved to a position (e.g., the destination position $P_{DEST}$) that is close to the raised position $P_{RAISED}$. After controlling the motor drive circuit to dock the bottom bar, the control circuit may exit the procedure 750 at 776.

Figure 35:
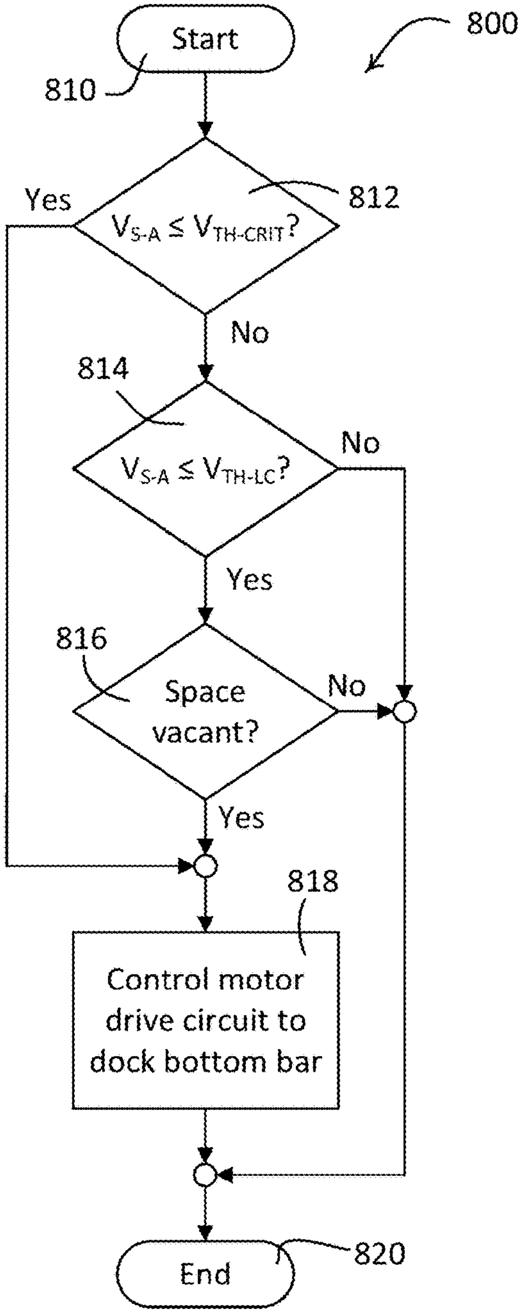
FIG. 35 is a flowchart of an example procedure for determining when to dock a bottom bar of a motorized window treatment.

FIG. 35 is a flowchart of an example procedure 800 for determining when to dock a bottom bar (e.g., the bottom bars 155, 240, 440, 540*a*, 540*b*, 540*c*) of a motorized window treatment (e.g., the motorized window treatments of the embodiments shown in FIGS. 1-33 or FIGS. 51-57). For example, the bottom bar may be connected to a bottom end of a covering material of the motorized window treatment. The procedure 800 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motor drive unit may comprise a dock (e.g., the docks 280, 280*b*, 380, 480, 580*a*, 580*b*, 580*c*) that is configured to facilitate discharging of one or more energy storage elements of the bottom bar into one or more energy storage elements of the motor drive unit, for example, when the bottom bar is located adjacent to the dock (e.g., when the covering material is in the raised position $P_{RAISED}$).

During the procedure 800, the control circuit may determine whether or not to dock the bottom bar in response to a magnitude of a supply voltage generated across the one or more storage element of the motor drive unit (e.g., the first storage voltage $V_{S-A}$ produced across the energy storage element 630 of the motor drive unit 610). The control circuit may be configured to determine to dock the bottom bar when the magnitude of the first storage voltage $V_{S-A}$ is less than (e.g., is less than or equal to) a low-charge threshold $V_{TH-LC}$ and when (e.g., only when) the space is vacant. In addition, the control circuit may be configured to determine to dock the bottom bar when the magnitude of the first storage voltage $V_{S-A}$ has dropped below a critical-charge threshold $V_{TH-CRIT}$ (e.g., independent of whether the space is occupied or vacant). The critical-charge threshold $V_{TH-CRIT}$ may be smaller than the low-charge threshold $V_{TH-LC}$. For example, the control circuit may execute the procedure 800 periodically at 810 to monitor the magnitude of the first storage voltage $V_{S-A}$. Further, it should be appreciated that in some examples, the control circuit may determine not to dock the bottom bar when the magnitude of the supply voltage generated across the one or more storage element of the motor drive unit is above an upper threshold (e.g., irrespective of whether other procedures may suggest that the bottom bar should be docked).

At 812, the control circuit may determine if the magnitude of the first storage voltage $V_{S-A}$ is less than (e.g., less than or equal to) the critical-charge threshold $V_{TH-CRIT}$. If so, the control circuit may control a motor drive circuit of the motor drive unit (e.g., the motor drive circuit 612) to dock the bottom bar (e.g., to adjust the present position $P_{PRES}$ of the covering material to the raised position $P_{RAISED}$) at 818, before the procedure 800 ends at 820. If the magnitude of the first storage voltage $V_{S-A}$ is greater than the critical-charge threshold $V_{TH-CRIT}$ at 812, the control circuit may determine if the magnitude of the first storage voltage $V_{S-A}$ is less than (e.g., less than or equal to) the low-charge threshold $V_{TH-LC}$ at 814. If the magnitude of the first storage voltage $V_{S-A}$ is greater than the low-charge threshold $V_{TH-LC}$ at 814, the procedure 800 may end at 820 (e.g., without docking the bottom bar).

If the magnitude of the first storage voltage $V_{S-A}$ is less than (e.g., less than or equal to) the low-charge threshold $V_{TH-LC}$ at 814, the control circuit may determine if the space is vacant at 816. For example, the control circuit may be configured to determine whether the space is occupied or vacant in response to receiving a message indicating an occupancy condition or a vacancy condition in the space. If the magnitude of the first storage voltage $V_{S-A}$ is less than (e.g., less than or equal to) the low-charge threshold $V_{TH-LC}$ at 814 and the space is vacant at 816, the control circuit may control the motor drive circuit of the motor drive unit to dock the bottom bar (e.g., to adjust the present position $P_{PRES}$ of the covering material to the raised position $P_{RAISED}$) at 818, before the procedure 800 ends at 820. If the magnitude of the first storage voltage $V_{S-A}$ is less than (e.g., less than or equal to) the low-charge threshold $V_{TH-LC}$ at 814 and the space is not vacant at 816, the procedure 800 may end at 820 (e.g., without docking the bottom bar).

Figure 36A:
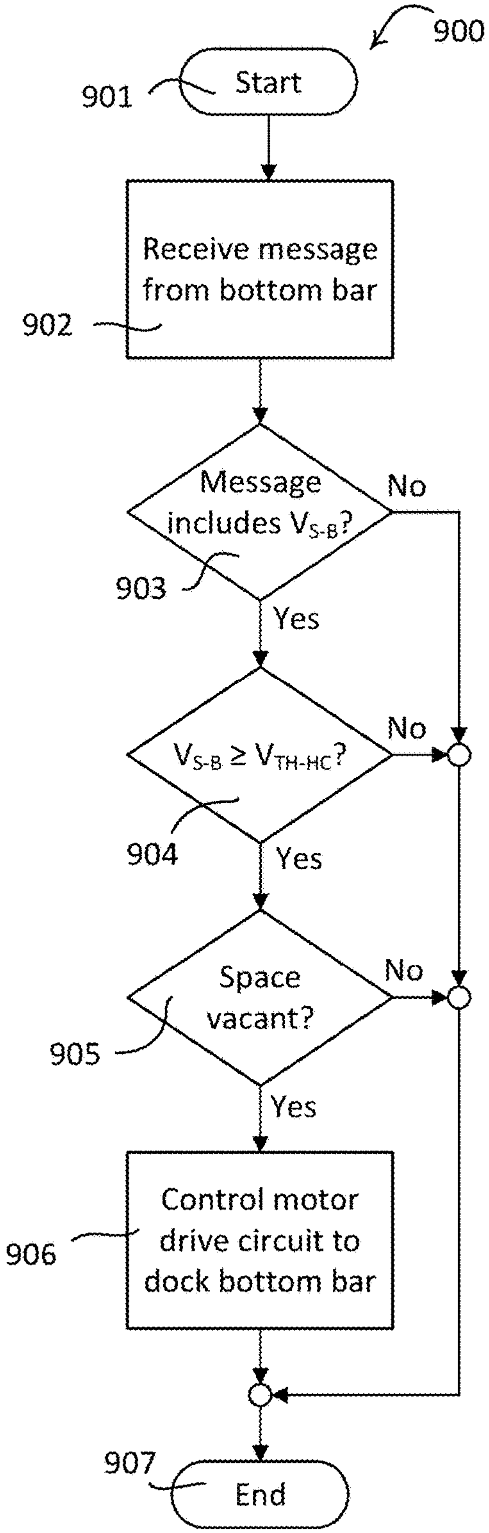
FIGS. 36A-36G are flowcharts of example procedures for determining when to dock a bottom bar of a motorized window treatment.

FIG. 36A is a flowchart of an example procedure 900 for determining when to dock a bottom bar (e.g., the bottom bars 155, 240, 440, 540*a*, 540*b*, 540*c*) of a motorized window treatment (e.g., the motorized window treatments of the embodiments shown in FIGS. 1-33 or FIGS. 51-57). For example, the bottom bar may be connected to a bottom end of a covering material of the motorized window treatment. The procedure 900 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motor drive unit may comprise a dock (e.g., the docks 280, 280*b*, 380, 480, 580*a*, 580*b*, 580*c*) that is configured to facilitate discharging of one or more energy storage elements of the bottom bar into one or more energy storage elements of the motor drive unit, for example, when the bottom bar is located adjacent to the dock (e.g., when the covering material is in the raised position $P_{RAISED}$).

During the procedure 900, the control circuit may determine whether or not to dock the bottom bar in response to a magnitude of a supply voltage generated across the one or more storage elements of the bottom bar (e.g., the second storage voltage $V_{S-B}$ produced across the energy storage element 646 of the bottom bar module 640). The control circuit may be configured to determine to dock the bottom bar when the magnitude of the second storage voltage $V_{S-B}$ is greater than (e.g., is greater than or equal to) a high-charge threshold $V_{TH-HC}$ and when (e.g., only when) the space is vacant. The bottom bar module may be configured to transmit a message including an indication of the magnitude of the second storage voltage $V_{S-B}$ to the motor drive unit. For example, the control circuit may execute the procedure 900 periodically at 901 to monitor the magnitude of the second storage voltage $V_{S-B}$. In addition, the control circuit may execute the procedure 900 in response to receiving a message from the bottom bar module at 901.

At 902, the control circuit may receive a message from the bottom bar module. For example, the message may include an indication of the magnitude of the second storage voltage $V_{S-B}$. If the message includes the magnitude of the second storage voltage $V_{S-B}$ at 903, the control circuit may determine if the magnitude of the second storage voltage $V_{S-B}$ is greater than (e.g., greater than or equal to) the high-charge threshold $V_{TH-HC}$ at 904. If the message does not include the magnitude of the second storage voltage $V_{S-B}$ at 903 or if the magnitude of the second storage voltage $V_{S-B}$ is greater than (e.g., greater than or equal to) the high-charge threshold $V_{TH-HC}$ at 904, the procedure 900 may end at 907.

If the magnitude of the second storage voltage $V_{S-B}$ is greater than (e.g., greater than or equal to) the high-charge threshold $V_{TH-HC}$ at 904, the control circuit may determine if the space is vacant at 905. For example, the control circuit may be configured to determine whether the space is occupied or vacant in response to receiving a message indicating an occupancy condition or a vacancy condition in the space. If the magnitude of the second storage voltage $V_{S-B}$ is greater than (e.g., greater than or equal to) the high-charge threshold $V_{TH-HC}$ at 904 and the space is vacant at 905, the control circuit may control a motor drive circuit of the motor drive unit (e.g., the motor drive circuit 612) to dock the bottom bar (e.g., to adjust the present position $P_{PRES}$ of the covering material to the raised position $P_{RAISED}$) at 906, before the procedure 900 ends at 907. If the magnitude of the second storage voltage $V_{S-B}$ is greater than (e.g., greater than or equal to) the high-charge threshold $V_{TH-LC}$ at 904 and the space is not vacant at 905, the procedure 900 may end at 907 (e.g., without docking the bottom bar).

Rather than transmitting a message that indicates the magnitude of the second storage voltage $V_{S-B}$, the bottom bar module may be configured to determine if the magnitude of the second storage voltage $V_{S-B}$ is greater than (e.g., greater than or equal to) the high-charge threshold $V_{TH-HC}$ and transmit a message indicating that the motor drive unit should dock the bottom bar when the magnitude of the second storage voltage $V_{S-B}$ is greater than (e.g., greater than or equal to) the high-charge threshold $V_{TH-HC}$. In such an example, the control circuit of the motor drive unit may determine if the message includes an indication to dock the bottom bar at 903 of the procedure 900 and the determination of whether the magnitude of the second storage voltage $V_{S-B}$ is greater than (e.g., greater than or equal to) the high-charge threshold $V_{TH-HC}$ at 904 may be omitted.

Figure 36B:
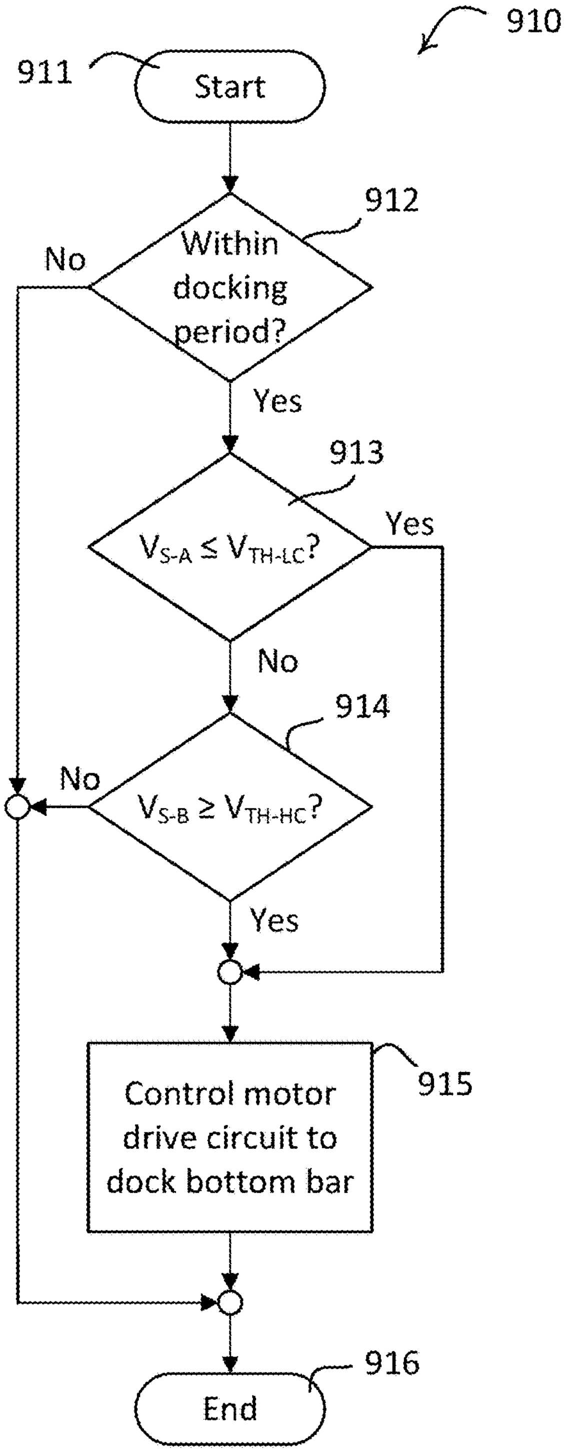

FIG. 36B is a flowchart of an example procedure 910 for determining when to dock a bottom bar (e.g., the bottom bars 155, 240, 440, 540*a*, 540*b*, 540*c*) of a motorized window treatment (e.g., the motorized window treatments of the embodiments shown in FIGS. 1-33 or FIGS. 51-57). For example, the bottom bar may be connected to a bottom end of a covering material of the motorized window treatment. The procedure 910 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motor drive unit may comprise a dock (e.g., the docks 280, 280*b*, 380, 480, 580*a*, 580*b*, 580*c*) that is configured to facilitate discharging of one or more energy storage elements of the bottom bar into one or more energy storage elements of the motor drive unit, for example, when the bottom bar is located adjacent to the dock (e.g., when the covering material is in the raised position $P_{RAISED}$).

During the procedure 910, the control circuit may determine whether or not to dock the bottom bar in response to a docking window (e.g., a docking time period), a magnitude of a supply voltage generated across the one or more energy storage elements of the motor drive unit (e.g., the first storage voltage $V_{S-A}$ produced across the energy storage element 630 of the motor drive unit 610), a magnitude of a supply voltage generated across the one or more storage elements of the bottom bar (e.g., the second storage voltage $V_{S-B}$ produced across the energy storage element 646 of the bottom bar module 640). The docking window may be a scheduled time that, for example, may be configured by the user. The docking window may occur periodically (e.g., at a docking interval), such as every day (e.g., every night at 3:00 am). The control circuit may be configured to determine to dock the bottom bar during the docking window when the magnitude of the first storage voltage $V_{S-A}$ is less than (e.g., is less than or equal to) the low-charge threshold $V_{TH-LC}$ or when the magnitude of the second storage voltage $V_{S-B}$ is greater than (e.g., is greater than or equal to) the high-charge threshold $V_{TH-HC}$. The bottom bar module may be configured to transmit a message including an indication of the magnitude of the second storage voltage $V_{S-B}$ to the motor drive unit. For example, the control circuit may periodically receive a message that indicates the magnitude of the second storage voltage $V_{S-B}$. The control circuit may start the procedure 910 at 911. The control circuit may execute the procedure 910 periodically. In some examples, the control circuit may execute the procedure 910 at a particular time of day (e.g., at the beginning of the docking time period and/or in response to receiving a message (e.g., a message indicating the beginning of the docking time period).

At 912, the control circuit may determine whether the motorized window treatment is within the docking window (e.g., based on a timeclock of the control circuit and/or receiving a message indicating the beginning of the docking window). If the control circuit determines that the present time is not within the docking window, the control circuit may exit the procedure 910. However, if the control circuit determines that the present time is within the docking window, the control circuit may determines whether the first storage voltage $V_{S-A}$ of the energy storage elements in the motor drive unit is less than (e.g., is less than or equal to) the low-charge threshold $V_{TH-LC}$ at 913. If the control circuit determines that the first storage voltage $V_{S-A}$ is less than the low-charge threshold $V_{TH-LC}$ at 913, the control circuit may control a motor drive circuit of the motor drive unit (e.g., the motor drive circuit 612) to dock the bottom bar (e.g., to adjust the present position $P_{PRES}$ of the covering material to the raised position $P_{RAISED}$) at 915, before the procedure 910 ends at 916. As such, if the control circuit determines that the first storage voltage $V_{S-A}$ is less than the low-charge threshold $V_{TH-LC}$ during the docking window, the control circuit may dock the bottom bar (e.g., to charge the storage element of the motor drive unit when the first storage voltage level $V_{S-A}$ is low during the scheduled docking window).

If the control circuit determines that the first storage voltage $V_{S-A}$ is greater than the low-charge threshold $V_{TH-LC}$ at 913, the control circuit may determine whether the magnitude of the second storage voltage $V_{S-B}$ of the energy storage elements in the bottom bar is greater than (e.g., is greater than or equal to) the high-charge threshold $V_{TH-HC}$ at 914. If the control circuit determines that the magnitude of the second storage voltage $V_{S-B}$ is greater than the high-charge threshold $V_{TH-HC}$ at 914, the control circuit may control the motor drive circuit of the motor drive unit to dock the bottom bar at 915, before the procedure 910 ends at 916. As such, if the control circuit determines that the magnitude of the second storage voltage $V_{S-B}$ is greater than the high-charge threshold $V_{TH-HC}$ during the docking window, the control circuit may dock the bottom bar (e.g., to charge the storage element of the motor drive unit and discharge the storage elements of the bottom bar during the scheduled docking window). However, if the control circuit determines that the magnitude of the second storage voltage $V_{S-B}$ is less than the high-charge threshold $V_{TH-HC}$ at 914, the control circuit may exit the procedure 910 at 916 (e.g., without docking the bottom bar), for example, because there is little benefit to moving the docking the bottom bar if the first storage voltage $V_{S-A}$ is greater than the low-charge threshold $V_{TH-LC}$ and the second storage voltage $V_{S-B}$ is less than the high-charge threshold $V_{TH-HC}$.

Figure 36C:
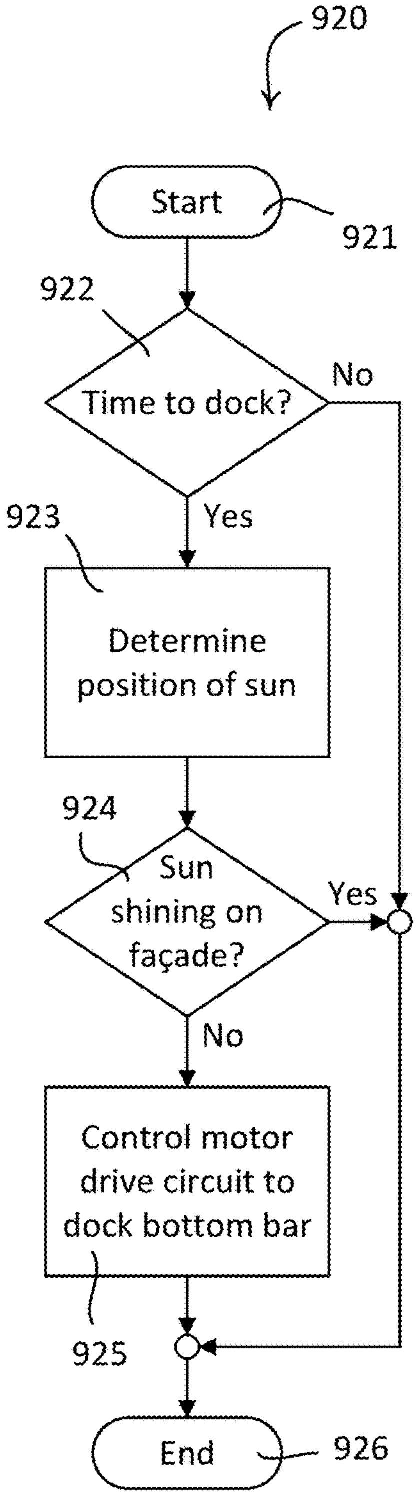

FIG. 36C is a flowchart of an example procedure 920 for determining when to dock a bottom bar (e.g., the bottom bars 155, 240, 440, 540*a*, 540*b*, 540*c*) of a motorized window treatment (e.g., the motorized window treatments of the embodiments shown in FIGS. 1-33 or FIGS. 51-57). For example, the bottom bar may be connected to a bottom end of a covering material of the motorized window treatment. The procedure 920 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motor drive unit may comprise a dock (e.g., the docks 280, 280*b*, 380, 480, 580*a*, 580*b*, 580*c*) that is configured to facilitate discharging of one or more energy storage elements of the bottom bar into one or more energy storage elements of the motor drive unit, for example, when the bottom bar is located adjacent to the dock (e.g., when the covering material is in the raised position $P_{RAISED}$).

During the procedure 920, the control circuit may determine whether or not to dock the bottom bar based on the position of the sun. For example, the control circuit may determine to dock the bottom bar if the sun is not shining on a façade on which the motorized window treatment is installed, for instance, to take advance of instances where the solar cells are less likely to be missing out on collecting a relatively large amount of solar energy. The control circuit (e.g., and/or a system controller that is in communication with the control circuit) may be configured to calculate a predicted position of the sun at a plurality of discrete times in a day. The position of the sun in the sky may be defined by a solar altitude angle $a_t$ and a solar azimuth angle $a_S$. The control circuit may determine the solar altitude angle $a_t$ and the solar azimuth angle $a_s$ as functions of the date (e.g., a Julian date) and time (e.g., the standard time $t_s$), as well as the position (e.g., longitude λ and latitude ϕ) of the building in which the window and/or motorized window treatment is located.

For example, the system controller and/or the control circuit may be configured to calculate the solar altitude angle $a_t$ and the solar azimuth angle $a_s$ using the following equations. The difference in a solar time $t_{solar}$ (e.g., a time as given by a sundial) and a standard time $t_s$ (e.g., a time as given by a clock) due to the obliquity of the Earth's axis of rotation may be defined by an equation of time ET. The equation of time ET can be determined as a function of the present Julian date J using, for example, the equation:

$$ET = 0.1644 \cdot \sin(A) - 0.1273 \cdot \cos(B), \quad \text{(Equation 1)}$$

where A=[4π·(J−81.6)]/365.25 and B=[2π·(J−2.5)]/365.25. The Julian date J may be a decimal number representing the present day in the year. For example, the Julian date J may equal one for January 1, two for January 2, three for January 3, and so on. The solar time $t_{solar}$ may be calculated as a function of the standard time $t_s$, the equation of time ET, a standard meridian SM of the time zone of the location of the building, and the longitude λ, for example, using the equation:

$$t_{solar} = t_s + ET + [12 \cdot (SM - \lambda)]/\pi. \quad \text{(Equation 2)}$$

The standard meridian SM may be determined from the time zone of the location of the building. Each time zone may have a unique standard meridian, which may define a particular line of latitude within the time zone. There may be approximately 15° between the standard meridians of adjacent time zones. The solar altitude angle $a_s$ and the solar azimuth angle $a_z$ may be determined from a solar declination δ. The solar declination δ may define an angle of incidence of the rays of the sun on the equatorial plane of the Earth. The solar declination δ may be determined using, for example, the equation:

$$\delta = 0.4093 \cdot \sin[2\pi \cdot (J - 81)/368]. \quad \text{(Equation 3)}$$

The solar altitude angle $a_t$ at the standard time is may be calculated as a function of the solar time $t_{solar}$, the solar declination δ, and the local latitude Φ using, for example, the equation:

$$a_t = \arcsin[\sin(\Phi) \cdot \sin(\delta) - \cos(\Phi) \cdot \cos(\delta) \cdot \cos(\pi \cdot t_{solar}/12)]. \quad \text{(Equation 4)}$$

The solar azimuth angle $a_s$ at the standard time is may be calculated as a function of the solar time $t_{solar}$, the solar declination δ, and the local latitude Φ using, for example, the equation:

$$a_s = \arctan[-\cos(\delta) \cdot \sin(\pi \cdot t_{solar}/12)/C], \quad \text{(Equation 5)}$$

$$\text{where } C = -[\cos(\phi) \cdot \sin(\delta) + \sin(\phi) \cdot \cos(\delta) \cdot \cos(\pi \cdot t_{solar}/12)].$$

An example of a motorized window treatment that is configured to determine the position of the sun is described in U.S. Patent Pub. No. 2021/0180399, which is hereby incorporated by reference in its entirety.

The procedure 920 may start at 921. At 922, the control circuit may determine whether it is time to dock the bottom bar of the motorized window treatment. For example, the control circuit may determine whether it is time to dock the bottom bar using one or more of the methods described herein, such as based on the reception of an instruction to dock, a timeclock, a docking window or interval, the charge of the energy storage elements of the motor drive unit and/or the bottom bar, etc. If the control circuit determines that it is not time to dock, the procedure 920 may exit at 926. In some examples, the determination of whether or not to dock at 922 may be omitted.

If the control circuit determines that it is time to dock, the control circuit may determine the position of the sun at 923. For example, the control circuit may calculate the position of the sun based on a predicted position of the sun. Alternatively, the control circuit may receive an indication of the predicted position of the sun from a system controller. At 924, the control circuit may determine whether the sun may be shining on a façade of the building of which the motorized window treatment is installed. Since there may be cloud cover or another obstruction between the façade and the sun, the predicted position of the sun may indicate whether there is potentially sun shining on the façade of the building of which the motorized window treatment is installed. For example, the control circuit may be configured to determine whether the sun may be shining on the façade of which the motorized window treatment is installed at 923 by comparing the calculated solar altitude angle $a_t$ and/or the calculated solar azimuth angle $a_s$ to one or more thresholds to determine if the calculated solar altitude angle $a_t$ and/or the calculated solar azimuth angle $a_s$ are within ranges that indicate that the sun may be shining on the façade. If the control circuit determines that the sun may be shining on the façade, the procedure 920 may exit at 926.

If the control circuit determines that the sun is not shining on the façade at 924, the control circuit may control the motor drive circuit to dock the bottom bar at 925, before the procedure 920 exits at 926. For instance, the control circuit may control a motor drive circuit of the motor drive unit (e.g., the motor drive circuit 612) to dock the bottom bar (e.g., to adjust the present position $P_{PRES}$ of the covering material to the raised position $P_{RAISED}$) at 925, before the procedure 920 ends at 926. As such, if the control circuit determines that the sun is not shining on the façade, the control circuit may dock the bottom bar because the solar cells of the bottom bar are unlikely to be receiving solar energy (e.g., or significant solar energy) from the sun at that moment in time. Therefore, docking the bottom bar when the sun is not shining on the façade will allow the bottom bar to dock when there is a lower likelihood or probability that the solar cells would be missing out on collecting a relatively large amount of solar energy.

Figure 36D:
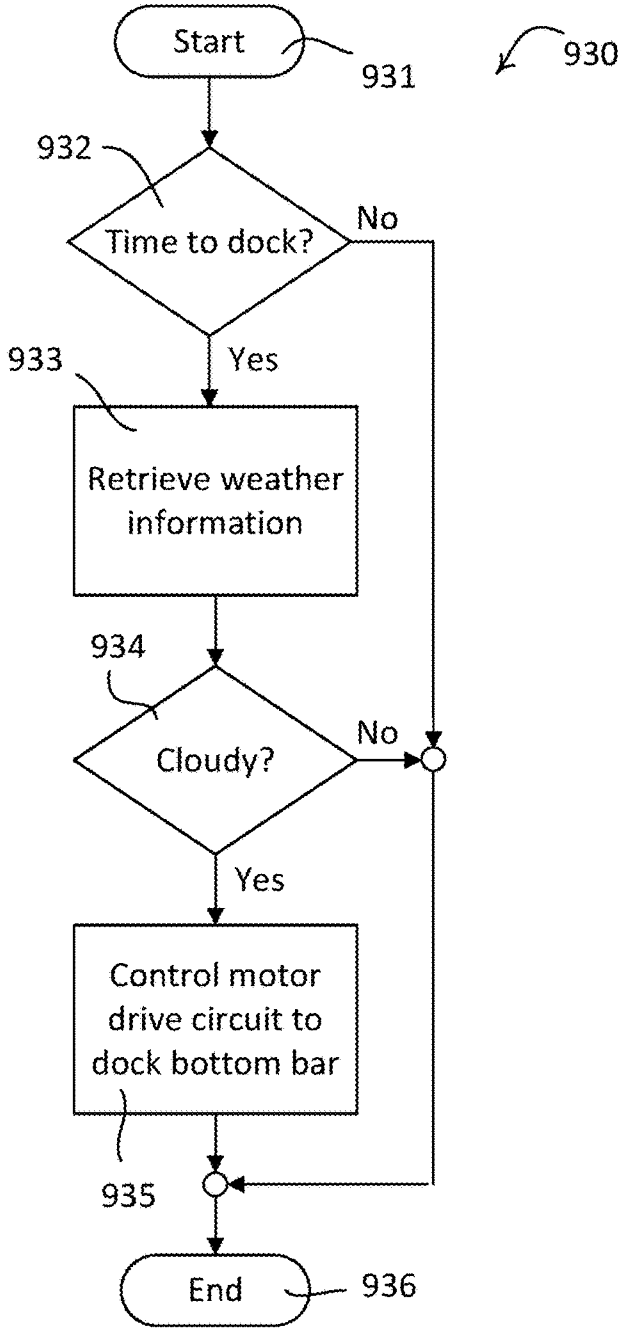

FIG. 36D is a flowchart of an example procedure 930 for determining when to dock a bottom bar (e.g., the bottom bars 155, 240, 440, 540*a*, 540*b*, 540*c*) of a motorized window treatment (e.g., the motorized window treatments of the embodiments shown in FIGS. 1-33 or FIGS. 51-57). For example, the bottom bar may be connected to a bottom end of a covering material of the motorized window treatment. The procedure 930 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motor drive unit may comprise a dock (e.g., the docks 280, 280*b*, 380, 480, 580*a*, 580*b*, 580*c*) that is configured to facilitate discharging of one or more energy storage elements of the bottom bar into one or more energy storage elements of the motor drive unit, for example, when the bottom bar is located adjacent to the dock (e.g., when the covering material is in the raised position $P_{RAISED}$).

During the procedure 930, the control circuit may determine whether or not to dock the bottom bar based on weather information (e.g., temperature, cloud coverage, precipitation, barometric pressure, etc.). For example, the control circuit may determine to dock the bottom bar if it is cloudy, for instance, to take advance of instances where the solar cells are less likely to be missing out on collecting a relatively large amount of solar energy. The control circuit (e.g., and/or a system controller that is in communication with the control circuit) may be configured to determine the weather in the location of the motorized window treatment from an external source, such as a weather service (e.g., via the Internet), a weather application, and/or a weather application programming interface (API).

The procedure 930 may start at 931. At 932, the control circuit may determine whether it is time to dock the bottom bar of the motorized window treatment. For example, the control circuit may determine whether it is time to dock the bottom bar using one or more of the methods described herein, such as based on the reception of an instruction to dock, a timeclock, a docking window or interval, the charge of the energy storage elements of the motor drive unit and/or the bottom bar, etc. If the control circuit determines that it is not time to dock, the procedure 930 may exit at 936. In some examples, the determination of whether or not to dock at 932 may be omitted.

If the control circuit determines that it is time to dock, the control circuit may retrieve weather information at 933. For example, the control circuit may retrieve the weather information (e.g., directly or indirectly, via a system controller) from a weather application. At 934, the control circuit may determine whether it is cloudy at the location of the motorized window treatment. If the control circuit determines that it is not cloudy, the procedure 930 may exit at 936.

If the control circuit determines that it is cloudy at 934, the control circuit may control the motor drive circuit to dock the bottom bar at 935, before the procedure 930 exits at 936. For instance, the control circuit may control a motor drive circuit of the motor drive unit (e.g., the motor drive circuit 612) to dock the bottom bar (e.g., to adjust the present position $P_{PRES}$ of the covering material to the raised position $P_{RAISED}$) at 935, before the procedure 930 ends at 936. As such, if the control circuit determines that it is cloudy at the location of the motorized window treatment, the control circuit may dock the bottom bar because the solar cells of the bottom bar are unlikely to be receiving solar energy (e.g., or significant solar energy) from the sun at that moment in time. Therefore, docking the bottom bar when it is cloudy will allow the bottom bar to dock when there is a lower likelihood or probability that the solar cells would be missing out on collecting a relatively large amount of solar energy.

Figure 36E:
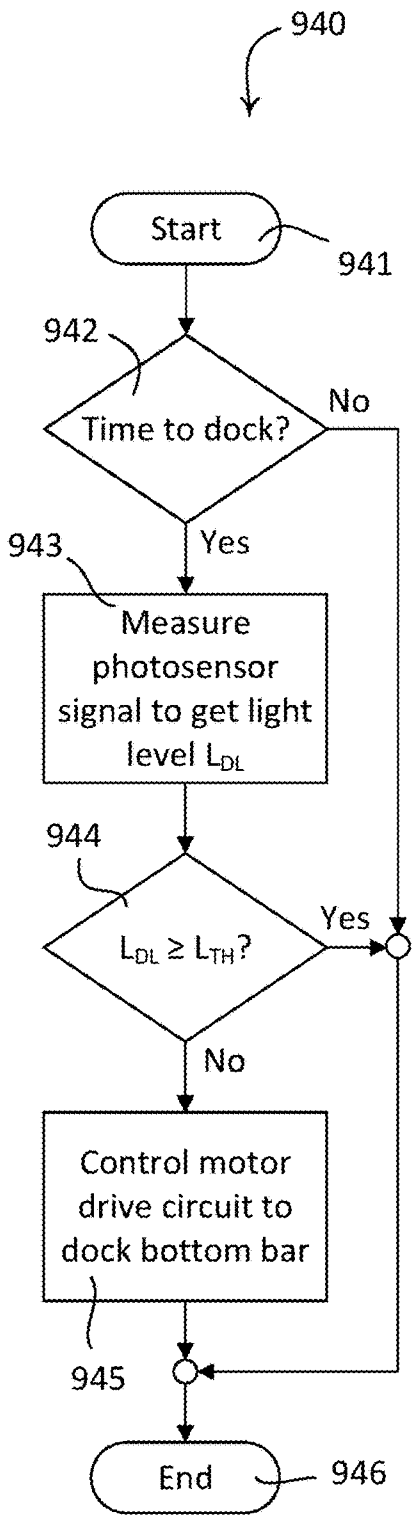

FIG. 36E is a flowchart of an example procedure 940 for determining when to dock a bottom bar (e.g., the bottom bars 155, 240, 440, 540*a*, 540*b*, 540*c*) of a motorized window treatment (e.g., the motorized window treatments of the embodiments shown in FIGS. 1-33 or FIGS. 51-57). For example, the bottom bar may be connected to a bottom end of a covering material of the motorized window treatment. The procedure 940 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motor drive unit may comprise a dock (e.g., the docks 280, 280*b*, 380, 480, 580*a*, 580*b*, 580*c*) that is configured to facilitate discharging of one or more energy storage elements of the bottom bar into one or more energy storage elements of the motor drive unit, for example, when the bottom bar is located adjacent to the dock (e.g., when the covering material is in the raised position $P_{RAISED}$).

During the procedure 940, the control circuit may determine whether or not to dock the bottom bar based on feedback from a photosensor. For instance, in some examples, the motorized window treatment (e.g., the motor drive unit and/or the bottom bar) may include a photosensor that is configured to measure light and generate a signal indicating the amount of light. As such, the control circuit may receive an indication of the amount of light from the photosensor and determine a light level $L_{DL}$. The photosensor may be oriented such that it faces towards the window to measure the amount of light (e.g., sunlight) hitting the window (e.g., which may be an indicator of the amount of light directed towards the solar cells of the motorized window treatment). For example, the control circuit may determine to dock the bottom bar if there is less light, for instance, to take advance of instances where the solar cells are less likely to be missing out on collecting a relatively large amount of solar energy.

The procedure 940 may start at 941. At 942, the control circuit may determine whether it is time to dock the bottom bar of the motorized window treatment. For example, the control circuit may determine whether it is time to dock the bottom bar using one or more of the methods described herein, such as based on the reception of an instruction to dock, a timeclock, a docking window or interval, the charge of the energy storage elements of the motor drive unit and/or the bottom bar, etc. If the control circuit determines that it is not time to dock, the procedure 940 may exit at 946. In some examples, the determination of whether or not to dock at 942 may be omitted.

If the control circuit determines that it is time to dock, the control circuit may measure the signal from the photosensor to determine the light level $L_{DL}$ at 943. For example, the photosensor may be oriented such that it faces towards the window, and as such, the light level $L_{DL}$ may indicate the amount of light (e.g., sunlight) hitting the window (e.g., which may be an indicator of the amount of light directed towards the solar cells of the motorized window treatment). At 944, the control circuit may determine whether the light level $L_{DL}$ is greater than or equal to a threshold light level $L_{TH}$. If the control circuit determines that the light level $L_{DL}$ is greater than or equal to the threshold light level $L_{TH}$, the procedure 940 may exit at 946.

If the control circuit determines that the light level $L_{DL}$ is less than the threshold light level $L_{TH}$ at 944, the control circuit may control the motor drive circuit to dock the bottom bar at 945, before the procedure 940 exits at 946. For instance, the control circuit may control a motor drive circuit of the motor drive unit (e.g., the motor drive circuit 612) to dock the bottom bar (e.g., to adjust the present position $P_{PRES}$ of the covering material to the raised position $P_{RAISED}$) at 945, before the procedure 940 ends at 946. As such, if the control circuit determines that the light level $L_{DL}$ is less than the threshold light level $L_{TH}$, the control circuit may dock the bottom bar because the solar cells of the bottom bar are unlikely to be receiving solar energy (e.g., or significant solar energy) from the sun at that moment in time. Therefore, docking the bottom bar when the photosensor measures lower light levels will allow the bottom bar to dock when there is a lower likelihood or probability that the solar cells would be missing out on collecting a relatively large amount of solar energy.

Figure 36F:
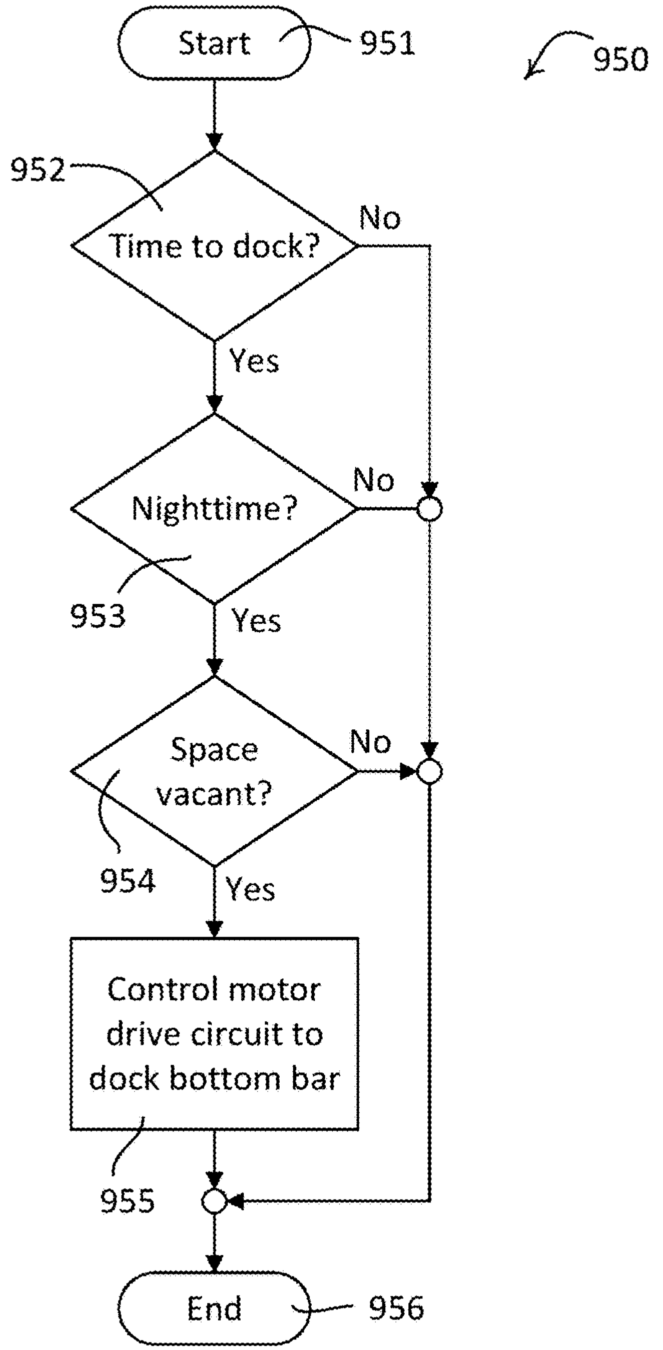

FIG. 36F is a flowchart of an example procedure 950 for determining when to dock a bottom bar (e.g., the bottom bars 155, 240, 440, 540*a*, 540*b*, 540*c*) of a motorized window treatment (e.g., the motorized window treatments of the embodiments shown in FIGS. 1-33 or FIGS. 51-57). For example, the bottom bar may be connected to a bottom end of a covering material of the motorized window treatment. The procedure 950 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motor drive unit may comprise a dock (e.g., the docks 280, 280*b*, 380, 480, 580*a*, 580*b*, 580*c*) that is configured to facilitate discharging of one or more energy storage elements of the bottom bar into one or more energy storage elements of the motor drive unit, for example, when the bottom bar is located adjacent to the dock (e.g., when the covering material is in the raised position $P_{RAISED}$).

During the procedure 950, the control circuit may determine whether or not to dock the bottom bar based on whether it is nighttime and/or the space is vacant. The control circuit may determine it is nighttime based on a timeclock (e.g., nighttime may be defined as between an hour range, such as between 9 pm and 5 am). The control circuit may determine the space is vacant based on feedback from one or more occupancy and/or vacancy sensors (e.g., directly or indirectly by way of a system controller). The control circuit may determine to dock the bottom bar if it is nighttime and the space is vacant, for instance, because nobody is in the space (e.g., it will cause less disruption to the user) and to take advance of instances where the solar cells are less likely to be missing out on collecting a relatively large amount of solar energy.

The procedure 950 may start at 951. At 952, the control circuit may determine whether it is time to dock the bottom bar of the motorized window treatment. For example, the control circuit may determine whether it is time to dock the bottom bar using one or more of the methods described herein, such as based on the reception of an instruction to dock, a timeclock, a docking window or interval, the charge of the energy storage elements of the motor drive unit and/or the bottom bar, etc. If the control circuit determines that it is not time to dock, the procedure 950 may exit at 956. In some examples, the determination of whether or not to dock at 952 may be omitted.

If the control circuit determines that it is time to dock, the control circuit may determine whether it is nighttime at 953. For example, the control circuit may determine that it is nighttime based on a timeclock and/or based on a message received from a system controller. In some examples, the control circuit may determine that it is nighttime when it is between an hour range, such as between 9 pm and 5 am, and/or based on times of sunset and sunrise for the location of the motorized window treatment and at the particular time of the year (e.g., when the timeclock is an astronomical timeclock). If the control circuit determines that it is not nighttime, the procedure 950 may exit at 956.

If the control circuit determines that it is nighttime at 953, the control circuit may determine whether the space is vacant at 954. For example, the control circuit may receive an occupied command and/or a vacant command from an occupancy sensor (e.g., directly, or indirectly via a system controller). In some examples, the occupancy sensor may be located on the bottom bar. Alternatively or additionally, the control circuit may be configured to determine that the space is vacant based on data received from one or more calendar programs (e.g., no meeting is scheduled in the space at that time). If the control circuit determines that the space is not vacant, the procedure 950 may exit at 956.

If the control circuit determines that the space is vacant at 954, the control circuit may control the motor drive circuit to dock the bottom bar at 955, before the procedure 950 exits at 956. For instance, the control circuit may control a motor drive circuit of the motor drive unit (e.g., the motor drive circuit 612) to dock the bottom bar (e.g., to adjust the present position $P_{PRES}$ of the covering material to the raised position $P_{RAISED}$) at 955, before the procedure 950 ends at 956. As such, if the control circuit determines that it is nighttime and that the space is vacant, the control circuit may dock the bottom bar because the movement of the bottom bar will not bother the user (e.g., in the case of a commercial building) and the solar cells of the bottom bar are unlikely to be receiving solar energy (e.g., or significant solar energy) from the sun at that moment in time.

Figure 36G:
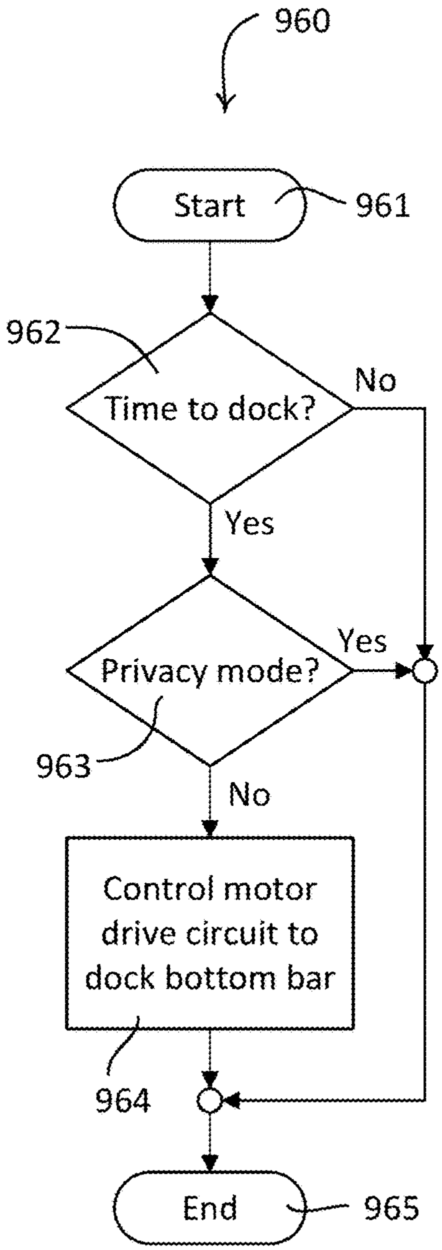

FIG. 36G is a flowchart of an example procedure 960 for determining when to dock a bottom bar (e.g., the bottom bars 155, 240, 440, 540*a*, 540*b*, 540*c*) of a motorized window treatment (e.g., the motorized window treatments of the embodiments shown in FIGS. 1-33 or FIGS. 51-57). For example, the bottom bar may be connected to a bottom end of a covering material of the motorized window treatment. The procedure 960 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motor drive unit may comprise a dock (e.g., the docks 280, 280*b*, 380, 480, 580*a*, 580*b*, 580*c*) that is configured to facilitate discharging of one or more energy storage elements of the bottom bar into one or more energy storage elements of the motor drive unit, for example, when the bottom bar is located adjacent to the dock (e.g., when the covering material is in the raised position $P_{RAISED}$).

During the procedure 960, the control circuit may determine whether or not to dock the bottom bar based on whether the motorized window treatment is in privacy mode. The motorized window treatment may be configured to enter a privacy mode where, for example, the covering material will remain in the lowered position $P_{LOWERED}$. The privacy mode may be defined by a timeclock schedule (e.g., the privacy mode may be activated and deactivated based on the timeclock schedule). For example, the control circuit may determine that it is nighttime based on a timeclock and/or based on a message received from a system controller. For instance, privacy mode may be defined by one or more time periods (e.g., a time period during the morning, such as between 6-8 am, and a time period at night, such as between 8-10 pm). In some examples, the time periods defined by the privacy mode may be based on sunrise and/or sunset times for the location of the motorized window treatment and at the particular time of the year (e.g., via an astronomical timeclock). When in the privacy mode, the control circuit of the motor drive unit may ensure that the covering material is in the lowered position $P_{LOWERED}$ to ensure that the user has privacy. In some examples, during the privacy mode, the control circuit may disable certain docking movements and/or procedures to ensure that the covering material does not move from the lowered position $P_{LOWERED}$ (e.g., unless a direct command from the user is received). The control circuit may determine not to dock the bottom bar if the motorized window treatment is in privacy mode to, for example, ensure that the covering material remains in the lowered position $P_{LOWERED}$.

The procedure 960 may start at 961. At 962, the control circuit may determine whether it is time to dock the bottom bar of the motorized window treatment. For example, the control circuit may determine whether it is time to dock the bottom bar using one or more of the methods described herein, such as based on a timeclock, a docking window or interval, the charge of the energy storage elements of the motor drive unit and/or the bottom bar, etc. If the control circuit determines that it is not time to dock, the procedure 960 may exit at 965. In some examples, the determination of whether or not to dock at 962 may be omitted.

If the control circuit determines that it is time to dock, the control circuit may determine whether it is in privacy mode at 963. The privacy mode may be defined by a timeclock schedule. For instance, privacy mode may be defined by one or more time periods (e.g., a time period during the morning, such as between 6-8 am, and a time period at night, such as between 8-10 pm). In some examples, the time periods defined by the privacy mode may be based on sunrise and/or sunset times for the location of the motorized window treatment and at the particular time of the year (e.g., via astronomical timeclock).

If the control circuit determines that it is not in privacy mode at 963, the control the motor drive circuit to dock the bottom bar at 964, before the procedure 960 exits at 965. For instance, the control circuit may control a motor drive circuit of the motor drive unit (e.g., the motor drive circuit 612) to dock the bottom bar (e.g., to adjust the present position $P_{PRES}$ of the covering material to the raised position $P_{RAISED}$) at 964, before the procedure 960 ends at 965. If the control circuit determines that it is in privacy mode at 963, the procedure 960 may exit at 965. As such, even though the control circuit determines that it is time to dock at 962, the control circuit will not dock if the control circuit determines that it is in privacy mode at 963.

Figure 37A:
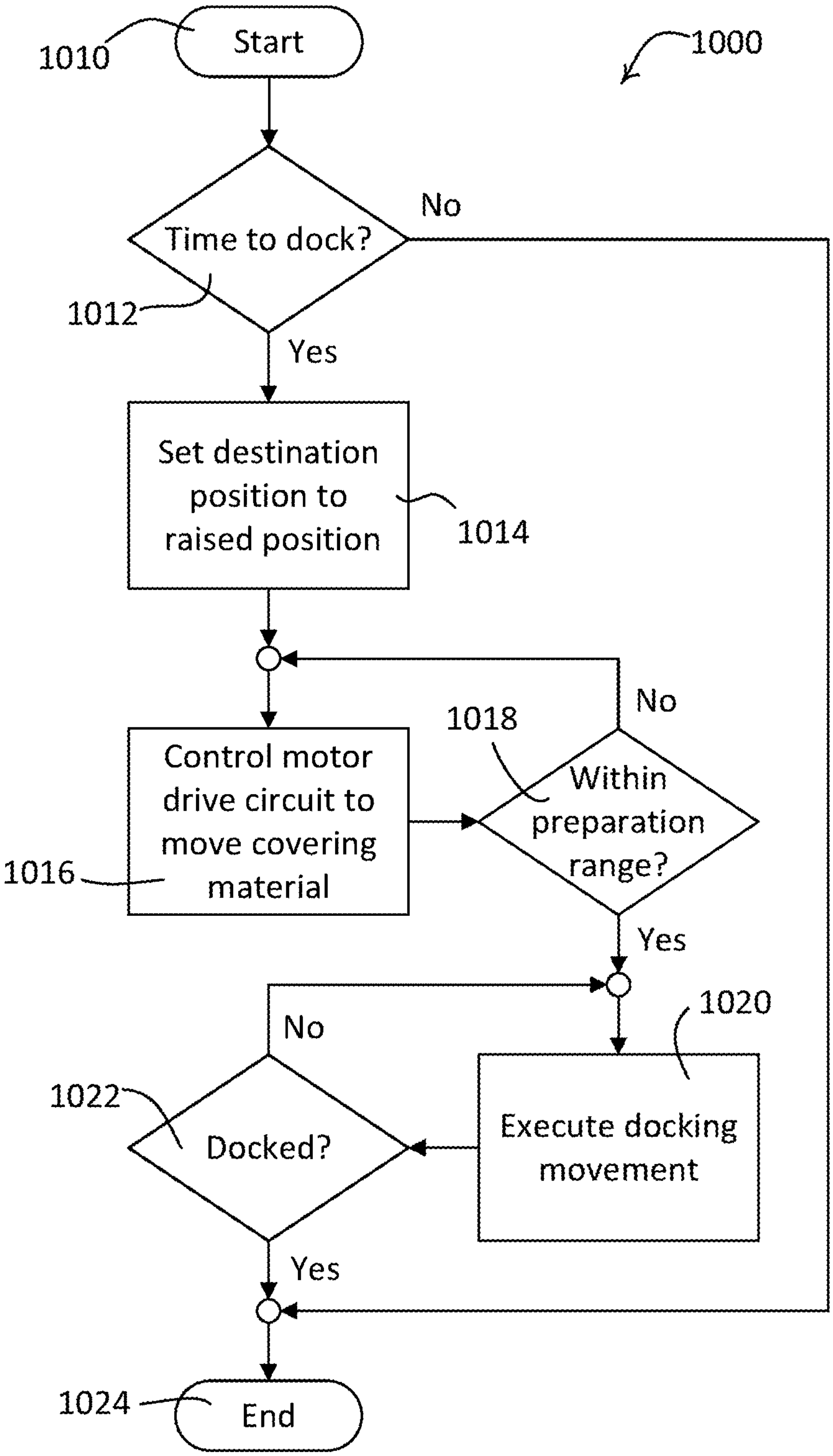
FIG. 37A is a flowchart of an example procedure for docking a bottom bar of a motorized window treatment.

FIG. 37A is a flowchart of an example procedure 1000 for docking a bottom bar (e.g., the bottom bars 155, 240, 440, 540*a*, 540*b*, 540*c*) of a motorized window treatment (e.g., the motorized window treatments of the embodiments shown in FIGS. 1-33 or FIGS. 51-57). For example, the bottom bar may be connected to a bottom end of a covering material of the motorized window treatment. The procedure 1000 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motor drive unit may be configured to control a present position $P_{PRES}$ of the covering material. The motor drive unit may comprise a dock (e.g., the docks 280, 280*b*, 380, 480, 580*a*, 580*b*, 580*c*) that is configured to facilitate discharging of one or more energy storage elements of the bottom bar into one or more energy storage elements of the motor drive unit, for example, when the bottom bar is located adjacent to the dock (e.g., when the covering material is in the raised position $P_{RAISED}$). For example, the control circuit may execute the procedure 1000 periodically at 1010 to determine if the bottom bar should be docked (e.g., should control the present position $P_{PRES}$ of the covering material to the raised position $P_{RAISED}$).

At 1012, the control circuit of the motor drive unit may be configured to determine if the motor drive unit should presently dock the bottom bar. For example, the control circuit may be configured to determine that the bottom bar should be docked when the space in which the motorized window treatment is installed is vacant and the magnitude of a first storage voltage $V_{S-A}$ produced across an energy storage element of the motor drive unit is less than a low-charge threshold $V_{TH-LC}$, and/or the space is occupied and the magnitude of the first storage voltage $V_{S-A}$ produced across the energy storage element of the motor drive unit is less than a critical-charge threshold $V_{TH-CRIT}$ (e.g., as shown in FIG. 35). In addition, the control circuit may determine to that the bottom bar should be docked when the magnitude of a second storage voltage $V_{S-A}$ produced across an energy storage element of the bottom bar module is greater than a high-charge threshold $V_{TH-HC}$ (e.g., as shown in FIG. 36A). Further, the control circuit of the motor may be configured to determine that the bottom bar should be docked in response to the present day of the week and/or the time of the day. When the control circuit determines that the motor drive unit should not presently dock the bottom bar at 1012, the procedure 1000 may end at 1024.

When the control circuit determines that the motor drive unit should presently dock the bottom bar at 1012, the control circuit may set a destination position $P_{DEST}$ to the raised position $P_{RAISED}$ at 1014 and control the motor drive circuit to rotate the motor to move the covering material at 1016. For example, the control circuit may be configured to generate at least one drive signal (e.g., the at least one drive signal $V_{DR}$) for controlling the motor drive circuit to control the rotational speed and the direction of rotation of the motor at 1016.

In some examples, even if the control circuit determines that the motor drive unit should dock the bottom bar at 1012, the control circuit may skip the docking event. For example, the control circuit may skip the docking event if the magnitude of the first storage voltage $V_{S-A}$ produced across the energy storage element of the motor drive unit is above a charge threshold (e.g., the energy storage element of the motor drive unit has sufficient charge). Further, in some examples, even if the control circuit determines that the motor drive unit should dock the bottom bar at 1012, the control circuit may send a message (e.g., via email, text, an alert via a mobile app, etc.) to a user, and wait to dock until a confirmation is received from the user that the motor drive unit should dock the bottom bar.

At 1018, the control circuit of the motor drive unit may determine if the present position $P_{PRES}$ of is within a docking preparation range. For example, the docking preparation range may extend a predetermined distance from the raised position $P_{RAISE}$. When the covering material is not within the docking preparation range 1018, the control circuit may continue to control the motor drive circuit to rotate the motor to move the covering material at 1016. When the covering material is within the docking preparation range at 1018, the control circuit may control the motor through a docking movement (e.g., a docking sequence) at 1020. For example, the control circuit may ramp down the rotational speed at which the motor is rotating as the bottom bar nears the dock as part of the docking movement.

At 1022, the control circuit of the motor drive unit may determine if the bottom bar is docked. For example, the control circuit may be configured to determine if the bottom bar is docked by determining if electrical connections of the dock of the motor drive unit are electrically connected to the electrical connections of the bottom bar module at 1022. For example, the control circuit may be configured to determine that the bottom bar is docked by detecting that the second supply voltage $V_{S-B}$ is present at the electrical connection of the dock (e.g., the electrical connections 638). When the control circuit determines that the bottom bar is not presently docked at 1022, the control circuit may continue to control the motor through the docking movement at 1020. When the control circuit determines that the bottom bar is presently docked at 1022, the procedure 1000 may end at 1024.

Figure 37B:
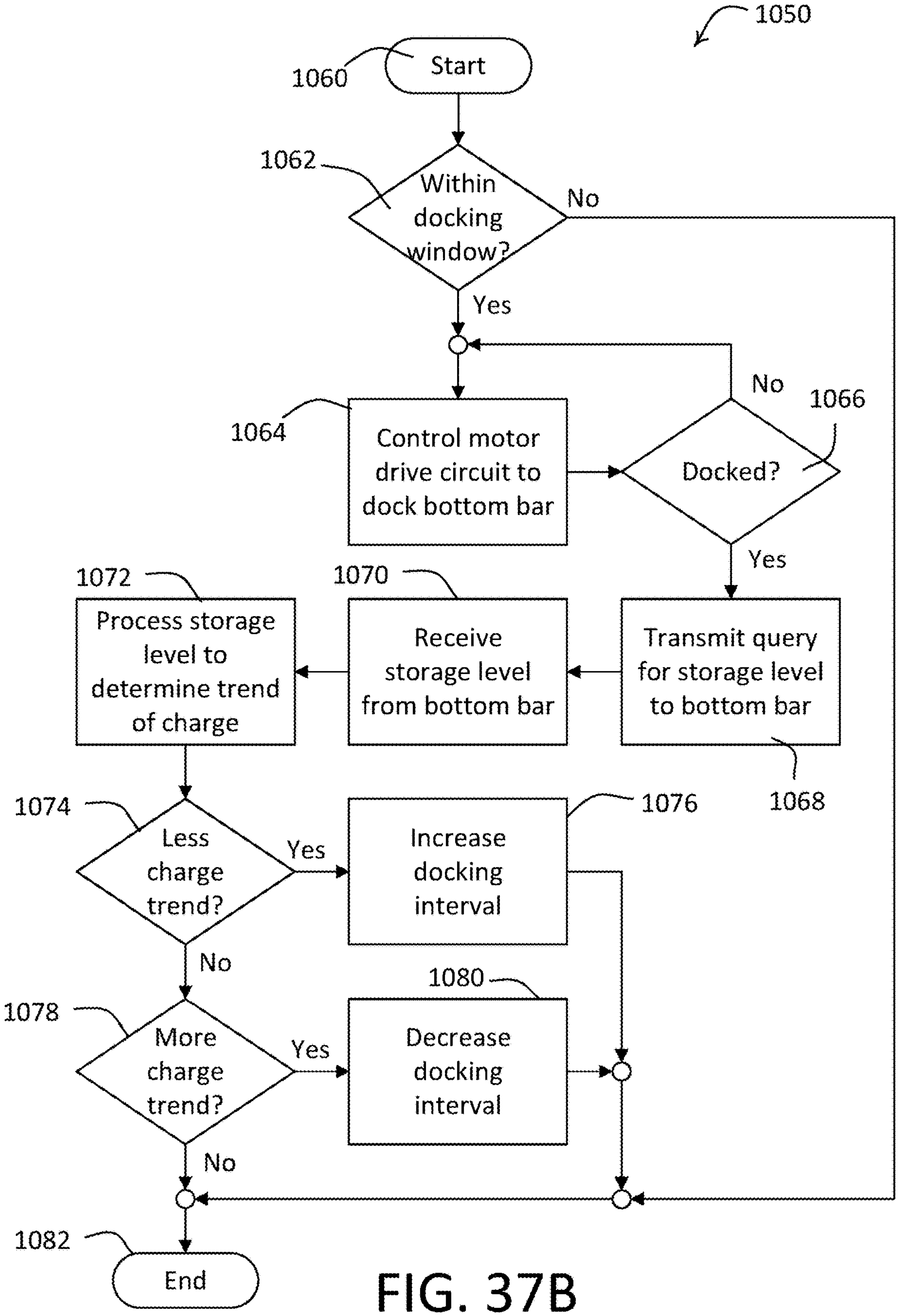
FIG. 37B is a flowchart of an example procedure for docking a bottom bar of a motorized window treatment.

FIG. 37B is a flowchart of an example procedure 1050 for docking a bottom bar (e.g., the bottom bars 155, 240, 440, 540*a*, 540*b*, 540*c*) of a motorized window treatment (e.g., the motorized window treatments of the embodiments shown in FIGS. 1-33 or FIGS. 51-57). For example, the bottom bar may be connected to a bottom end of a covering material of the motorized window treatment. The procedure 1050 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motor drive unit may be configured to control a present position $P_{PRES}$ of the covering material. The motor drive unit may comprise a dock (e.g., the docks 280, 280*b*, 380, 480, 580*a*, 580*b*, 580*c*) that is configured to facilitate discharging of one or more energy storage elements of the bottom bar into one or more energy storage elements of the motor drive unit, for example, when the bottom bar is located adjacent to the dock (e.g., when the covering material is in the raised position $P_{RAISED}$). For example, the control circuit may execute the procedure 1050 periodically at 1060 to determine if a docking interval should be increased or decreased. The docking interval may indicate a scheduled time or interval of time at the conclusion of which the control circuit is configured to dock the bottom bar. In some examples, the docking interval may indicate the beginning of a docking window during which the window treatment may dock. The docking interval may be configured by the user and/or stored in memory of the motorized window treatment. The docking interval could be set to end on a periodic basis, such as at a particular time every day (e.g., every night at 3:00 am). The procedure 1050 may be used in embodiments where the there is no wireless communication between the motor drive unit and hembar, and docking is performed at a scheduled time (e.g., according to the docking interval). The procedure 1050 may be implemented to ensure that the energy storage elements of the bottom bar and/or of the motor drive unit do not overcharge (e.g., to extend the life of the energy storage elements).

At 1062, the control circuit of the motor drive unit may be configured to determine whether it is the end of the docking interval based on a timeclock (e.g., whether it is time for the control circuit to dock the bottom bar). In some examples, the control circuit may consider other factors when determining whether to dock the bottom bar (e.g., as described with reference to FIGS. 35, 36A, and 36B). If the control circuit determines that it is not the end of the docking interval, the control circuit may return to 1062 and continue to monitor the timeclock to determine whether it is the end of the docking interval. If the control circuit determines that it is the end of the docking interval, the control circuit may control the motor drive circuit of the motor drive unit (e.g., the motor drive circuit 612) to dock the bottom bar (e.g., to adjust the present position $P_{PRES}$ of the covering material to the raised position $P_{RAISED}$) at 1066.

At 1066, the control circuit of the motor drive unit may be configured to determine if the bottom bar is docked. When the control circuit determines that the bottom bar is not docked at 1066, the control circuit may continue to control the motor drive circuit to move the covering material towards the raised position $P_{RAISED}$ to dock the bottom bar at 1064. When the control circuit determines that the bottom bar is docked at 1066, the control circuit may transmit a query message at 1068 that includes the magnitude of the second storage voltage $V_{S-B}$ generated across the energy storage element of the bottom bar. The control circuit may transmit the query message via a wired communication link (e.g., via the electrical connections 638, 648 and/or via separate electrical connections on the dock). At 1070, the control circuit may receive the storage level of the energy storage element of the bottom bar (e.g., the magnitude of the second storage voltage $V_{S-B}$).

At 1072, the control circuit may process the storage level of the energy storage element of the bottom bar to determine a trend of any change in the storage level over time. For example, the control circuit may determine whether the storage level of the energy storage element of the bottom bar is greater than or less than the storage level the last time the bottom bar docked. Further, the control circuit may be configured to determine whether a rolling average of the storage level of a predetermined number of previous storage level measurements is increasing or decreasing to, for example, determine whether the motor drive unit would benefit from more frequent or less frequent docking events.

At 1074, the control circuit may determine whether the determined trend of the storage level indicates that the motor drive unit would benefit from less frequent charging at 1074. As an example, the control circuit may determine that the trend indicates that the motor drive unit would benefit from less frequent charging when the trend indicates that the storage level is decreasing as compared to prior docking events (e.g., the trend is a "less charge" trend). Since the storage level is decreasing, the control circuit (e.g., the motor drive unit) is not receiving as much charge for each docking event as it could if it were to dock less frequently. As such, if the control circuit determines that the trend indicates that the motor drive unit would benefit from less frequent charging at 1074, the control circuit may increase the docking interval at 1076, and the procedure 1050 may exit at 1082.

If the control circuit determine that the trend does not indicate that the motor drive unit would benefit from less frequent charging at 1074, the control circuit may determine whether the trend indicates that the motor drive unit would benefit from more frequent charging at 1078. As an example, the control circuit may determine that the trend indicates that the motor drive unit would benefit from more frequent charging when the trend indicates that the storage level is increasing as compared to prior docking events (e.g., the trend is a "more charge" trend). Since the energy storage element of the bottom bar has a limit charge capacity and since the storage level is increasing, the control circuit (e.g., the motor drive unit) could be receiving charge more often if the bottom bar were to dock more frequently. As such, if the control circuit determines that the trend indicates that the motor drive unit would benefit from more frequent charging at 1078, the control circuit may decrease the docking interval at 1080, and the procedure 1050 may exit at 1082.

Figure 37C:
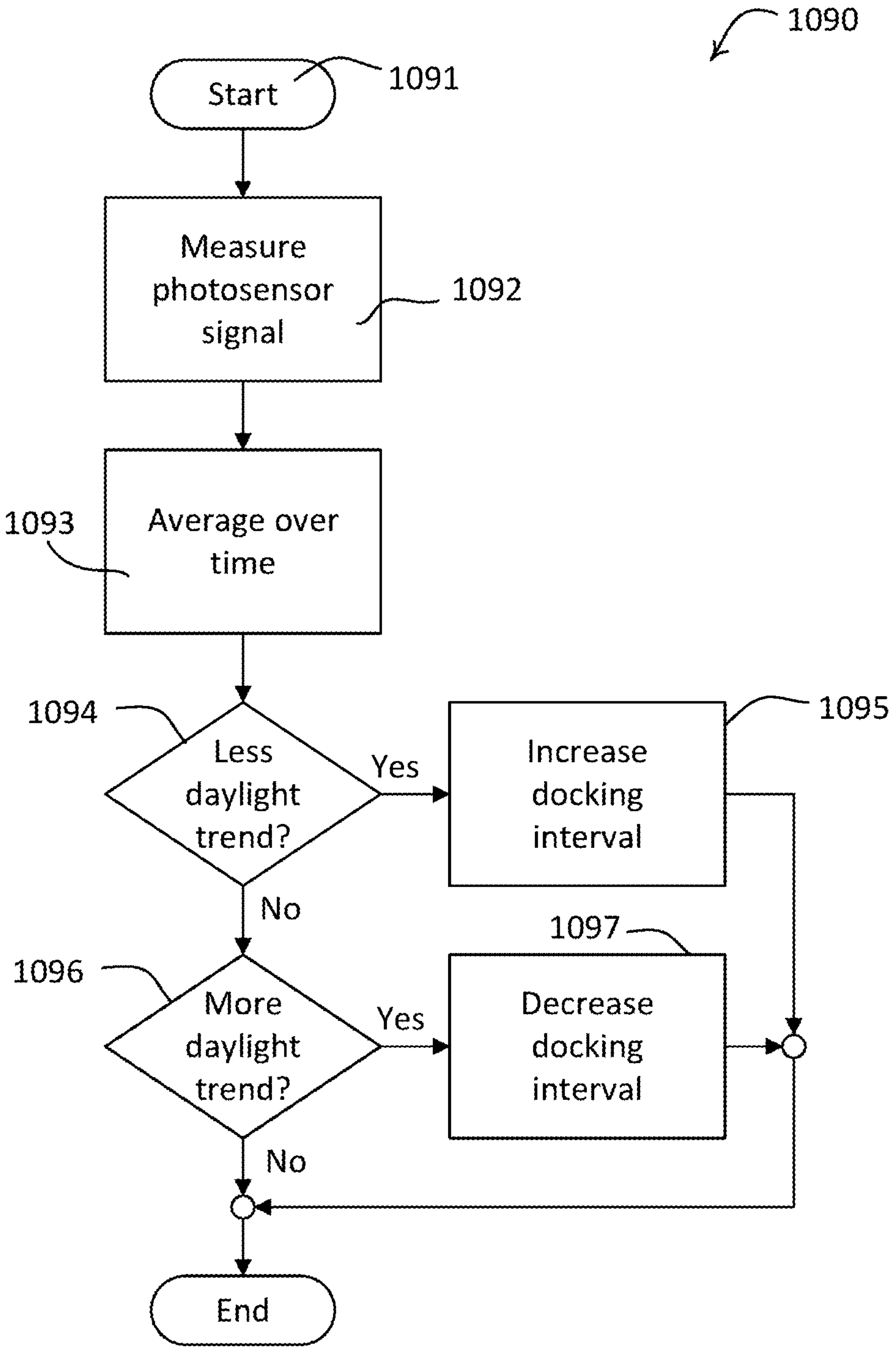
FIG. 37C is a flowchart of an example procedure for docking a bottom bar of a motorized window treatment.

FIG. 37C is a flowchart of an example procedure 1090 for docking a bottom bar (e.g., the bottom bars 155, 240, 440, 540*a*, 540*b*, 540*c*) of a motorized window treatment (e.g., the motorized window treatments of the embodiments shown in FIGS. 1-33 or FIGS. 51-55). For example, the bottom bar may be connected to a bottom end of a covering material of the motorized window treatment. The procedure 1090 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-55. The motor drive unit may be configured to control a present position $P_{PRES}$ of the covering material. The motor drive unit may comprise a dock (e.g., the docks 280, 280*b*, 380, 480, 580*a*, 580*b*, 580*c*) that is configured to facilitate discharging of one or more energy storage elements of the bottom bar into one or more energy storage elements of the motor drive unit, for example, when the bottom bar is located adjacent to the dock (e.g., when the covering material is in the raised position $P_{RAISED}$). For example, the control circuit may execute the procedure 1090 periodically, at 1091, to determine if a docking interval should be increased or decreased. The docking interval may indicate a scheduled time or interval of time at the conclusion of which the control circuit is configured to dock the bottom bar (e.g., during the procedure 910 of FIG. 36B and/or the procedure 1050 of FIG. 37B). The docking interval may be configured by the user and/or stored in memory of the motorized window treatment. The docking interval could be set to end on a periodic basis, such as at a particular time every day (e.g., every night at 3:00 am). The procedure 1090 may be used in embodiments where the there is no wireless communication between the motor drive unit and hembar, and docking is performed at a scheduled time (e.g., according to the docking interval).

The procedure 1090 may begin at 1091, At 1092, the control circuit may measure a photosensor signal. As described herein, the motor drive unit may include a photosensor circuit (e.g., the sensor circuit 654) coupled to the control circuit. For example, the photosensor circuit may be configured to generate a signal that indicates an ambient light level $L_{AMB}$ in the space in which the motorized window treatment is located. The control circuit of the bottom bar module may be configured to transmit a message including the ambient light level $L_{AMB}$ indicated by the sensor circuit to the motor drive unit (e.g., when docked). At 1093, the control circuit may be configured to determine an average amount of ambient light measurement by the photosensor circuit. For example, the control circuit may determine an average, a rolling average, etc.

At 1094, the control circuit may determine whether the trend indicates that the bottom bar (e.g., the solar cells coupled to the bottom bar) is exposed to less sunlight than before. As an example, the control circuit may determine that the trend indicates that the bottom bar is exposed to more sunlight when the average of the ambient light measurement of the photosensor circuit is increasing over time, and that the trend indicates that the bottom bar is exposed to less sunlight when the average of the ambient light measurement of the photosensor circuit is decreasing over time. If the control circuit determines that the trend indicates that the bottom bar is exposed to less sunlight at 1094, the control circuit may increase the docking interval at 1095, and the procedure 1090 may exit.

If the control circuit determines that the trend does not indicate that the bottom bar is exposed to less sunlight at 1094, the control circuit may determine whether the trend indicates that the bottom bar is exposed to more sunlight at 1096. If the control circuit determines that the trend indicates that the bottom bar is not exposed to more sunlight at 1096 (e.g., the trend has not changed), the procedure 1090 may exit. If the control circuit determines that the trend indicates that the bottom bar is exposed to more sunlight at 1096, the control circuit may decrease the docking interval at 1095, and the procedure 1090 may exit. Accordingly, the control circuit may determine that the trend indicates that the bottom bar would benefit from less frequent docking when the trend indicates that the bottom bar is exposed to less sunlight than before (e.g., the trend is a "less daylight" trend). Since the solar cells of the bottom bar may be receiving less sunlight, the control circuit may control the bottom bar to dock less frequently. Conversely, the control circuit may determine that the trend indicates that the bottom bar would benefit from more frequent docking when the trend indicates that the bottom bar is exposed to more sunlight than before (e.g., the trend is a "more daylight" trend). Since the solar cells of the bottom bar may be receiving more sunlight, the control circuit may control the bottom bar to dock more frequently.

Figure 38:
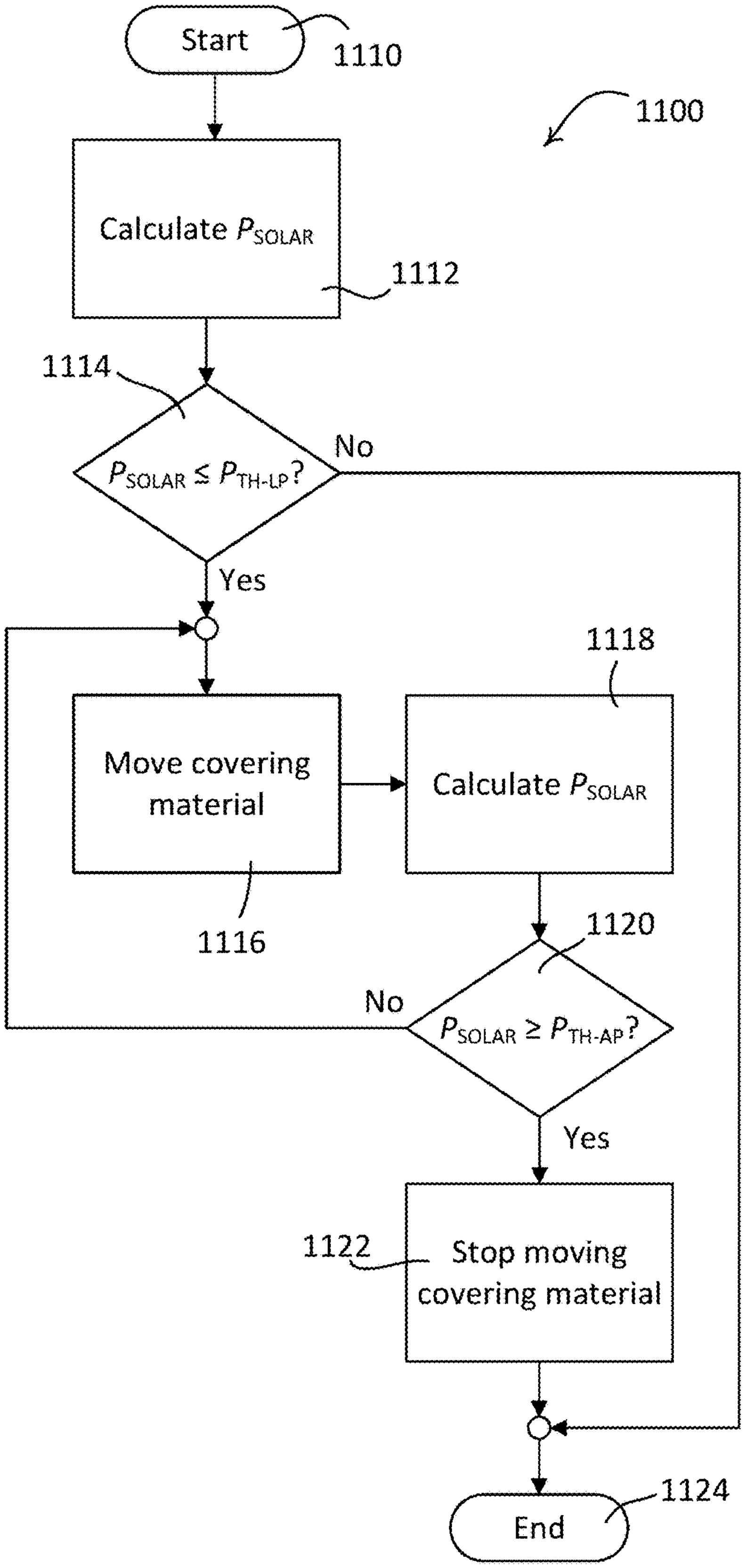
FIG. 38 is a flowchart of an example procedure for adjusting a present position of a covering material of a motorized window treatment in response to a solar power being received by one or more solar cells of the motorized window treatment.

FIG. 38 is a flowchart of an example procedure 1100 for adjusting a present position $P_{PRES}$ of a covering material of a motorized window treatment (e.g., the motorized window treatments of the embodiments shown in FIGS. 1-33 or FIGS. 51-57) in response to a solar power $P_{SOLAR}$ being received by one or more solar cells (e.g., the solar cells 270, 370, 470, **570*a*, 570*b*, 570*c*, 642) of the motorized window treatment. For example, the solar cells may be located on a bottom bar (e.g., the bottom bar 640) of the motorized window treatment, and the bottom bar may be connected to a bottom end of the covering material of the motorized window treatment. The bottom bar may comprise a bottom bar module having a solar cell management circuit configured to charge an energy storage element of the bottom bar (e.g., the energy storage element 646). The procedure 1100 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). For example, the control circuit may execute the procedure 1100 periodically at 1110** to monitor the solar power $P_{SOLAR}$ being received by one or more solar cells.

At 1112, the control circuit may be configured to calculate the solar power $P_{SOLAR}$ being received by one or more solar cells. For example, the control circuit may be configured to calculate the solar power $P_{SOLAR}$ as a function of a magnitude of a photovoltaic output voltage $V_{PV}$ of the one or more solar cells, a magnitude of a storage voltage of an energy storage element of the bottom bar (e.g., the second storage voltage $V_{S-B}$), and/or a duty cycle $DC_{SCM}$ of the solar cell management circuit of the bottom bar (e.g., which may be received in one or more message from the bottom bar module). At 1114, the control circuit may determine if the magnitude of the solar power $P_{SOLAR}$ is less than (e.g., less than or equal to) a low-power threshold $P_{TH-LP}$. When the magnitude of the solar power $P_{SOLAR}$ is greater than the low-power threshold $P_{TH-LP}$ at 1114, the procedure 1100 may end at 1124.

When the magnitude of the solar power $P_{SOLAR}$ is less than (e.g., less than or equal to) the low-power threshold $P_{TH-LP}$ at 1114, the control circuit may start moving the covering material at 1116 to adjust the present position $P_{PRES}$ of the covering material. For example, the control circuit may be configured to adjust the present position $P_{PRES}$ of the covering material in a direction (e.g., either raise or lower) that may move the bottom bar into direct sunlight, which may be determined from the solar data. At 1118, the control circuit may be configured to calculate the solar power $P_{SOLAR}$ being received by one or more solar cells at the new present position $P_{PRES}$ of the covering material (e.g., an adjusted position of the covering material as compared to when the solar power $P_{SOLAR}$ was calculated at 1112). At 1120, the control circuit may determine if the magnitude of the solar power $P_{SOLAR}$ is greater than (e.g., greater than or equal to) an acceptable-power threshold $P_{TH-AP}$. When the magnitude of the solar power $P_{SOLAR}$ is less than the acceptable-power threshold $P_{TH-AP}$ at 1120, the control circuit may continue to move the covering material at 1116 to adjust the present position $P_{PRES}$ of the covering material and to calculate the solar power $P_{SOLAR}$ being received by one or more solar cells at 1118. When the magnitude of the solar power $P_{SOLAR}$ is greater than (e.g., greater than or equal to) the acceptable-power threshold $P_{TH-AP}$ at 1120, the control circuit may stop moving the covering material at 1122 and the procedure 1100 may end at 1124.

Figure 39A:
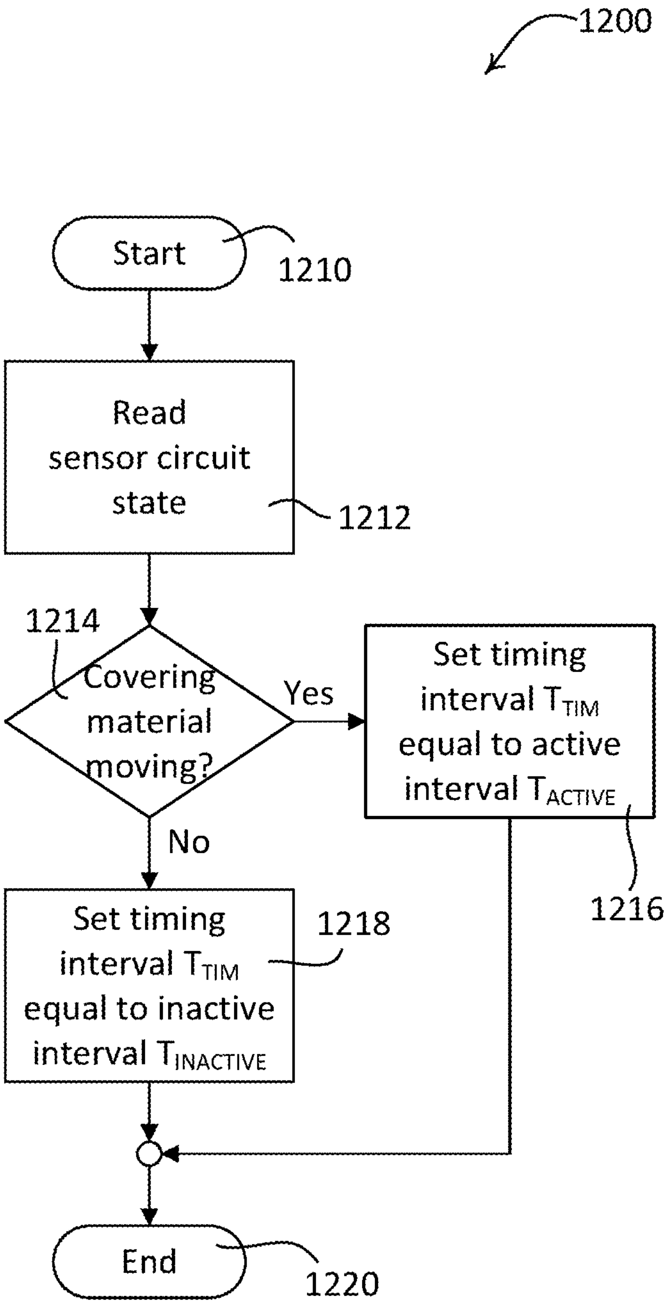
FIG. 39A is a flowchart of an example procedure for configuring a motorized window treatment.

FIG. 39A is a flowchart of an example procedure 1200 for configuring a motorized window treatment (e.g., the motorized window treatments of the embodiments shown in FIGS. 1-33 or FIGS. 51-57). The procedure 1200 may be executed by a control circuit of a bottom bar module of a bottom bar of the motorized window treatment (e.g., the control circuit 650 of the bottom bar module 640 shown in FIG. 33 and/or control circuits of the bottom bars shown in FIGS. 1-32 or FIGS. 51-57). The motorized window treatment may also comprise a motor drive unit for adjusting a present position $P_{PRES}$ of a covering material, and one or more solar cells located on the bottom bar. The bottom bar may be connected to a bottom end of the covering material of the motorized window treatment. For example, the control circuit may execute the procedure 1200 to adjust a timing interval $T_{TIM}$ at which the control circuit may collect and/or transmit one or more measurements and/or operational characteristics of the bottom bar module to the motor drive unit of the motorized window treatment. The control circuit may be configured to adjust the timing interval $T_{TIM}$ to one of two predetermined values based on whether the motor drive unit is adjusting the present position $P_{PRES}$ of the covering material or not. The control circuit may be configured to adjust the timing interval $T_{TIM}$ in response to a sensor circuit of the bottom bar (e.g., an accelerometer and/or a gyroscope) to determine if the covering material is moving (e.g., if the motor drive unit is presently adjusting the present position $P_{PRES}$ of the covering material). For example, the control circuit may execute the procedure 1200 periodically at 1210.

At 1212, the control circuit may determine a state of an output of the sensor circuit (e.g., the accelerometer and/or the gyroscope) to determine if the covering material is moving. If the covering material is moving (e.g., if the motor drive unit is presently adjusting the present position $P_{PRES}$ of the covering material) at 1214, the control circuit may set the timing interval $T_{TIM}$ to an active interval value $T_{ACTIVE}$ at 1216, before the procedure 1200 ends at 1220. If the covering material is not moving (e.g., if the motor drive unit is not presently adjusting the present position $P_{PRES}$ of the covering material) at 1214, the control circuit may set the timing interval $T_{TIM}$ to an inactive interval value $T_{INACTIVE}$ at 1218, before the procedure 1200 ends at 1220. For example, the inactive interval value $T_{INACTIVE}$ may be longer than the active interval value $T_{ACTIVE}$, such that the control circuit collects and/or transmits solar data at a lower rate when then covering material is not moving than when the covering material is moving (e.g., to conserve power).

Figure 39B:
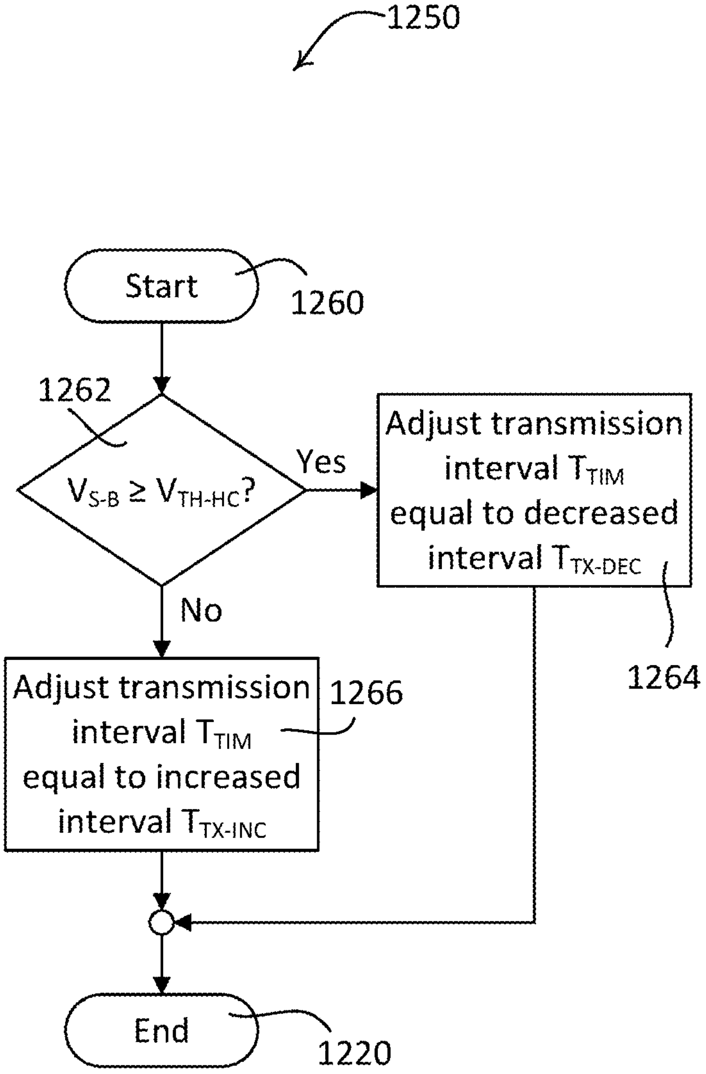
FIG. 39B is a flowchart of an example procedure 1250 for configuring a motorized window treatment (e.g., the motorized window treatments of the embodiments shown in FIGS. 1-33 or FIGS. 51-55).

FIG. 39B is a flowchart of an example procedure 1250 for configuring a motorized window treatment (e.g., the motorized window treatments of the embodiments shown in FIGS. 1-33 or FIGS. 51-55). The procedure 1200 may be executed by a control circuit of a bottom bar module of a bottom bar of the motorized window treatment (e.g., the control circuit 650 of the bottom bar module 640 shown in FIG. 33 and/or control circuits of the bottom bars shown in FIG. 1-32 or FIGS. 51-55). The motorized window treatment may also comprise a motor drive unit for adjusting a present position $P_{PRES}$ of a covering material, and one or more solar cells located on the bottom bar. The bottom bar may be connected to a bottom end of the covering material of the motorized window treatment. For example, the control circuit may execute the procedure 1250 to adjust a transmission interval $T_{TX}$ at which the control circuit may transmit messages to the motor drive unit of the motorized window treatment. For example, the control circuit may be configured to transmit messages include one or more measurements and/or operational characteristics of the bottom bar module to the motor drive unit of the motorized window treatment. The control circuit may be configured to adjust the transmission interval $T_{TX}$ to one of two predetermined values based on a magnitude of a supply voltage generated across the one or more storage elements of the bottom bar (e.g., the second storage voltage $V_{S-B}$ produced across the energy storage element 646 of the bottom bar module 640). For example, the control circuit may execute the procedure 1220 periodically at 1260.

At 1262, the control circuit may determine if the magnitude of the second storage voltage $V_{S-B}$ is greater than (e.g., greater than or equal to) a transmission threshold $V_{TH-TX}$. If the second storage voltage $V_{S-B}$ is greater than (e.g., greater than or equal to) the transmission threshold $V_{TH-TX}$ at 1262, the control circuit may decrease the transmission interval $T_{TX}$ at 1264, before the procedure 1250 ends at 1268. For example, the control circuit may set the transmission interval $T_{TX}$ to a decreased interval value $T_{TX-DEC}$ at 1264. If the second storage voltage $V_{S-B}$ is no greater than (e.g., greater than or equal to) the transmission threshold $V_{TH-TX}$ (e.g., is less that the transmission threshold $V_{TH-TX}$) at 1262, the control circuit may increase the transmission interval $T_{TX}$ at 1266, before the procedure 1200 ends at 1268. For example, the control circuit may set the transmission interval $T_{TX}$ to an increased interval value $T_{TX-INC}$ at 1266. For example, the decreased interval value $T_{TX-DEC}$ may be shorter than the increased interval value $T_{TX-INC}$, such that the control circuit transmits solar data at a higher rate when the second storage voltage $V_{S-B}$ is high than when the second storage voltage $V_{S-B}$ is low.

Figure 40:
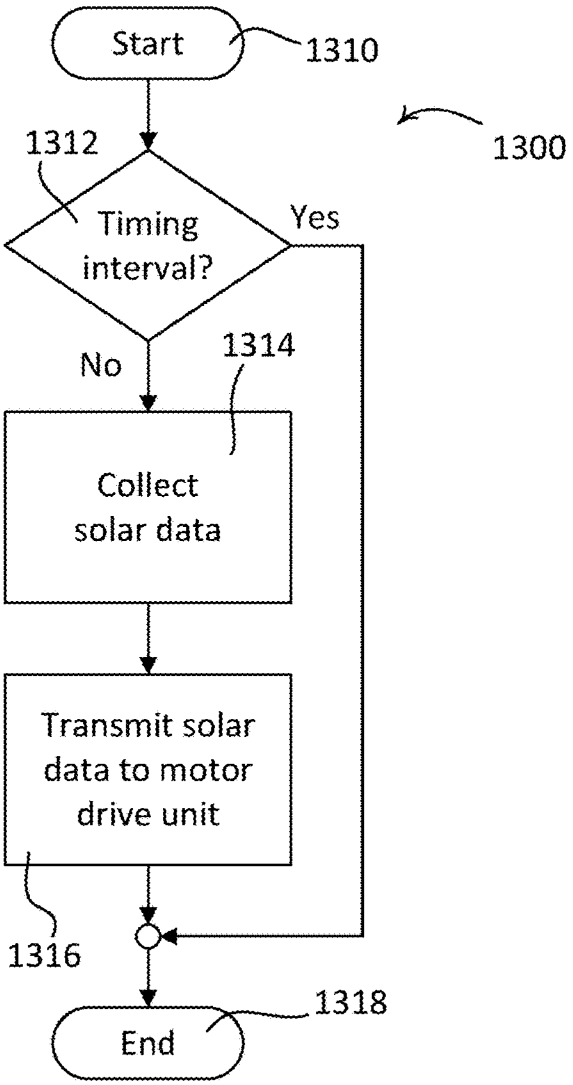
FIGS. 40 and 41 are flowcharts of example procedures for collecting solar data for a motorized window treatment when a motor drive unit is configured to communicate with a bottom bar module via a wireless communication link.

FIG. 40 is a flowchart of an example procedure 1300 for collecting solar data for a motorized window treatment (e.g., the motorized window treatments of the embodiments shown in FIGS. 1-33 or FIGS. 51-57). The procedure 1300 may be executed by a control circuit of a bottom bar module of a bottom bar of the motorized window treatment (e.g., the control circuit 650 of the bottom bar module 640 shown in FIG. 33 and/or control circuits of the bottom bars shown in FIGS. 1-32 or FIGS. 51-57). The motorized window treatment may also comprise a motor drive unit for adjusting a present position $P_{PRES}$ of a covering material, and one or more solar cells located on the bottom bar. The bottom bar may be connected to a bottom end of the covering material of the motorized window treatment. For example, the control circuit may execute the procedure 1400 to collect solar data, such as one or more measurements and/or operational characteristics of the bottom bar module of the bottom bar, at a plurality of intermediate positions of the covering material between a raised position $P_{RAISED}$ and a lowered position $P_{LOWERED}$. The bottom bar module may be configured to communicate with the motor drive unit via a wireless communication link (e.g., via RF signals using a short-range wireless communication protocol). The control circuit bottom bar module may be configured to periodically collect and transmit the solar data to the motor drive unit (e.g., at the timing interval $T_{TIM}$ set in the procedure 1200). For example, the control circuit may execute the procedure 1300 periodically at 1310.

The control circuit may be configured to collect and transmit the solar data at the timing interval $T_{TIM}$ (e.g., at the active interval value $T_{ACTIVE}$ or the inactive interval value $T_{INACTIVE}$ as set in the procedure 1200). When the control circuit detects the end of the timing interval $T_{TIM}$ at 1312, the control circuit may collect the solar data at 1314. For example, the solar data may comprise measurements, such as a magnitude of a photovoltaic output voltage of the solar cells (e.g., the photovoltaic output voltage $V_{PV}$) and/or a magnitude of a storage voltage of an energy storage element of the bottom bar module (e.g., the second storage voltage $V_{S-B}$). In addition, the solar data may comprise operational characteristics of the bottom bar module, such as a duty cycle of solar cell management circuit (e.g., the solar cell management circuit 644). For example, the control circuit may collect the solar data by sampling one or more sense signals of the bottom bar module (e.g., the sense signals $V_{SNS}$ from the solar cell management circuit 644) and/or receiving one or more messages including measurements and/or operational characteristics of the bottom bar module (e.g., messages from the solar cell management circuit 644). At 1316, the control circuit may transmit messages including collected solar data to the motor drive unit in one or more wireless signals (e.g., via the communication circuit 652), before the procedure 1300 ends at 1318.

Figure 41:
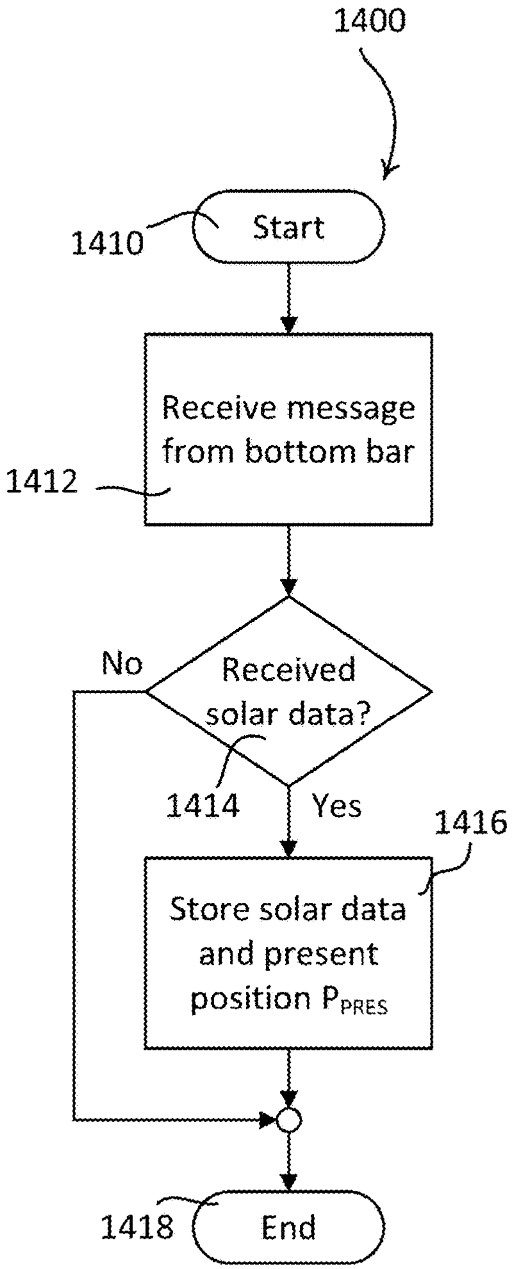

FIG. 41 is an example procedure 1400 for collecting solar data for a motorized window treatment (e.g., the motorized window treatments of the embodiments shown in FIGS. 1-33 or FIGS. 51-57). The procedure 1400 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motorized window treatment may comprise a covering material, a bottom bar connected to a bottom end of the covering material, and one or more solar cells located on the bottom bar. The motor drive unit may be configured to control a present position $P_{PRES}$ of the covering material. For example, the control circuit may execute the procedure 1400 to store solar data, such as one or more measurements and/or operational characteristics of the bottom bar module, at a plurality of intermediate positions of the covering material between a raised position $P_{RAISED}$ and a lowered position $P_{LOWERED}$. The bottom bar module may be configured to communicate with the motor drive unit via a wireless communication link (e.g., via RF signals using a short-range wireless communication protocol). The bottom bar module may be configured to periodically collect and transmit the solar data to the motor drive unit (e.g., at the timing interval $T_{TIM}$ set in the procedure 1200). For example, the control circuit may execute the procedure 1400 periodically at 1410. In addition, the control circuit may execute the procedure 1400 in response to receiving a message from the bottom bar module at 1410.

At 1412, the control circuit may receive a message from the bottom bar module. For example, the message may include solar data (e.g., one or more measurements and/or operational characteristics of the bottom bar module). If the received message does not include solar data at 1414, the procedure 1400 may end at 1418. When the received message includes solar data at 1414, the control circuit may at 1416 store the solar data in memory of the motor drive unit along with the present position $P_{PRES}$ of the covering material at the time that the message was received. In some examples, the control circuit may also store the present time in memory along with the present position $P_{PRES}$ of the covering material at 1416. For example, the control circuit may store the present position $P_{PRES}$ of the covering material (e.g., and/or the present time) for each of the one or more measurements and/or operational characteristics of the solar data received from the bottom bar module. After the control circuit stores the solar data at 1416, the procedure 1400 may end at 1418.

Figure 42:
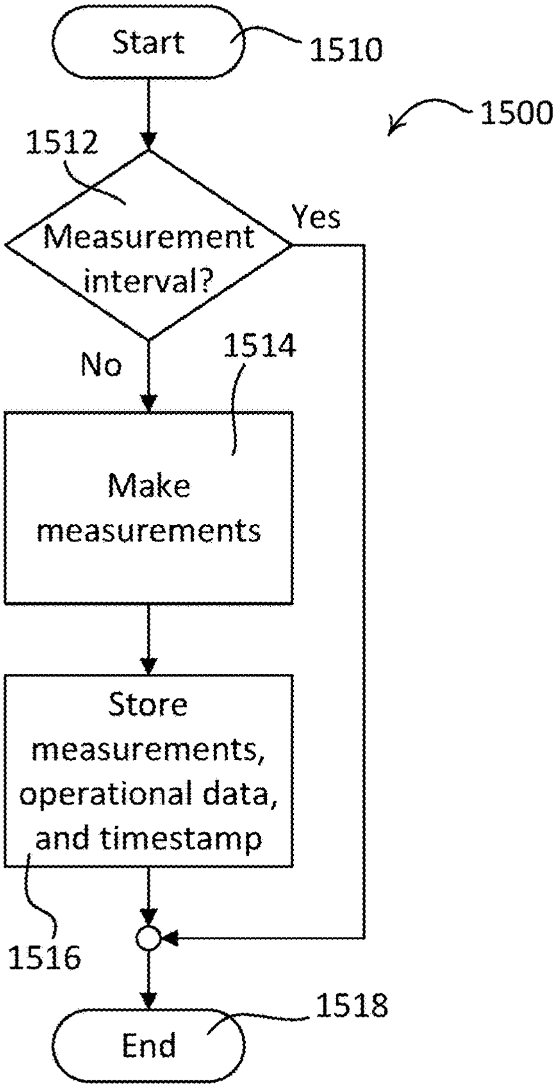
FIGS. 42-45 are flowcharts of example procedures for collecting solar data for a motorized window treatment when a motor drive unit is configured to communicate with a bottom bar module via a wired communication link when a bottom bar of the motorized window treatment is docked.

FIG. 42 is an example procedure 1500 for collecting solar data for a motorized window treatment (e.g., the motorized window treatments of the embodiments shown in FIGS. 1-33 or FIGS. 51-57). The procedure 1500 may be executed by a control circuit of a bottom bar module of a bottom bar of the motorized window treatment (e.g., the control circuit 650 of the bottom bar module 640 shown in FIG. 33 and/or control circuits of the bottom bars shown in FIGS. 1-32 or FIGS. 51-57). The motorized window treatment may also comprise a motor drive unit for adjusting a present position $P_{PRES}$ of a covering material, and one or more solar cells located on the bottom bar. The bottom bar may be connected to a bottom end of the covering material of the motorized window treatment. For example, the control circuit may execute the procedure 1400 to collect solar data, such as one or more measurements and/or operational characteristics of a bottom bar module of the bottom bar, at a plurality of intermediate positions of the covering material between a raised position $P_{RAISED}$ and a lowered position $P_{LOWERED}$. The bottom bar module may be configured to communicate with the motor drive unit via a wired communication link (e.g., via the electrical connections 638, 648) when the bottom bar is docked. The control circuit of the bottom bar module may be configured to collect and store the solar data in memory of the bottom bar module (e.g., at the timing interval $T_{TIM}$ set in the procedure 1200), and then transmit the solar data to the motor drive unit via the wired communication link when the bottom bar is docked. For example, the control circuit may execute the procedure 1500 periodically at 1510.

The control circuit may be configured to collect the solar data at the timing interval $T_{TIM}$ (e.g., at the active interval value $T_{ACTIVE}$ or the inactive interval value $T_{INACTIVE}$ as set in the procedure 1200). When the control circuit detects the end of the timing interval $T_{TIM}$ at 1512, the control circuit may collect the solar data at 1514. For example, the solar data may comprise measurements, such as a magnitude of a photovoltaic output voltage of the solar cells (e.g., the photovoltaic output voltage $V_{PV}$) and/or a magnitude of a storage voltage of an energy storage element of the bottom bar module (e.g., the second storage voltage $V_{S-B}$). In addition, the solar data may comprise operational characteristics of the bottom bar module, such as a duty cycle of solar cell management circuit (e.g., the solar cell management circuit 644). For example, the control circuit may collect the solar data by sampling one or more sense signals of the bottom bar module (e.g., the sense signals $V_{SNS}$ from the solar cell management circuit 644) and/or receiving one or more messages including measurements and/or operational characteristics of the bottom bar module (e.g., messages from the solar cell management circuit 644). At 1516, the control circuit may store the collected solar data in memory of the bottom bar module, before the procedure 1500 ends at 1518. For example, the control circuit may store each of the measurements and/or operational characteristics of the solar data in memory at 1516 along with timing information (e.g., a time stamp indicating a time at which the respective measurement and/or operational characteristic was recorded).

Figure 43:
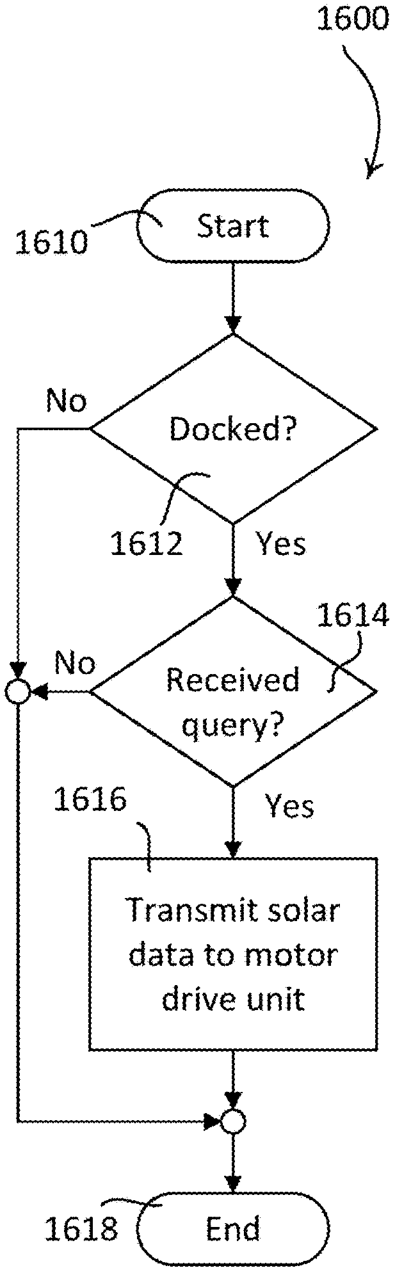

FIG. 43 is an example procedure 1600 for transmitting solar data of a motorized window treatment (e.g., the motorized window treatments of the embodiments shown in FIGS. 1-33 or FIGS. 51-57). The procedure 1600 may be executed by a control circuit of a bottom bar module of a bottom bar of the motorized window treatment (e.g., the control circuit 650 of the bottom bar module 640 shown in FIG. 33 and/or control circuits of the bottom bars shown in FIGS. 1-32 or FIGS. 51-57). The motorized window treatment may also comprise a motor drive unit for adjusting a present position $P_{PRES}$ of a covering material, and one or more solar cells located on the bottom bar. The bottom bar may be connected to a bottom end of the covering material of the motorized window treatment. For example, the control circuit may execute the procedure 1500 to collect solar data, such as one or more measurements and/or operational characteristics of a bottom bar module of the bottom bar, at a plurality of intermediate positions of the covering material between a raised position $P_{RAISED}$ and a lowered position $P_{LOWERED}$. The motor drive unit may comprise a dock (e.g., the docks 280, 280*b*, 380, 480, 580*a*, 580*b*, 580*c*) that is configured to facilitate discharging of one or more energy storage elements of the bottom bar into one or more energy storage elements of the motor drive unit, for example, when the bottom bar is located adjacent to the dock (e.g., when the covering material is in the raised position $P_{RAISED}$). The bottom bar module may be configured to communicate with the motor drive unit via a wired communication link (e.g., via the electrical connections 638, 648) when the bottom bar is docked. The control circuit of the bottom bar module may be configured to collect and store the solar data in memory of the bottom bar module at a timing interval (e.g., during the procedure 1500 shown in FIG. 42), and then transmit the solar data to the motor drive unit via the wired communication link when the bottom bar is docked. For example, the control circuit may execute the procedure 1600 periodically at 1610.

At 1612, the control circuit may determine if the bottom bar is docked. For example, the control circuit may be configured to determine that the bottom bar is docked by detecting that the motor drive unit is drawing current from an energy storage element of the bottom bar module (e.g., from the energy storage element 646 via the electrical connections 638, 648). Additionally and/or alternatively, the control circuit may be configured to determine that the bottom bar is docked in response to receiving a message from the motor drive unit. For example, the control circuit may be configured to determine that the bottom bar is docked in response to receiving a query message from the motor drive unit via a wired communication link (e.g., via the electrical connections 638, 648 and/or via separate electrical connections on the dock) and/or via a wireless communication link (e.g., where the message may indicate that the bottom bar is docked).

Figure 44:
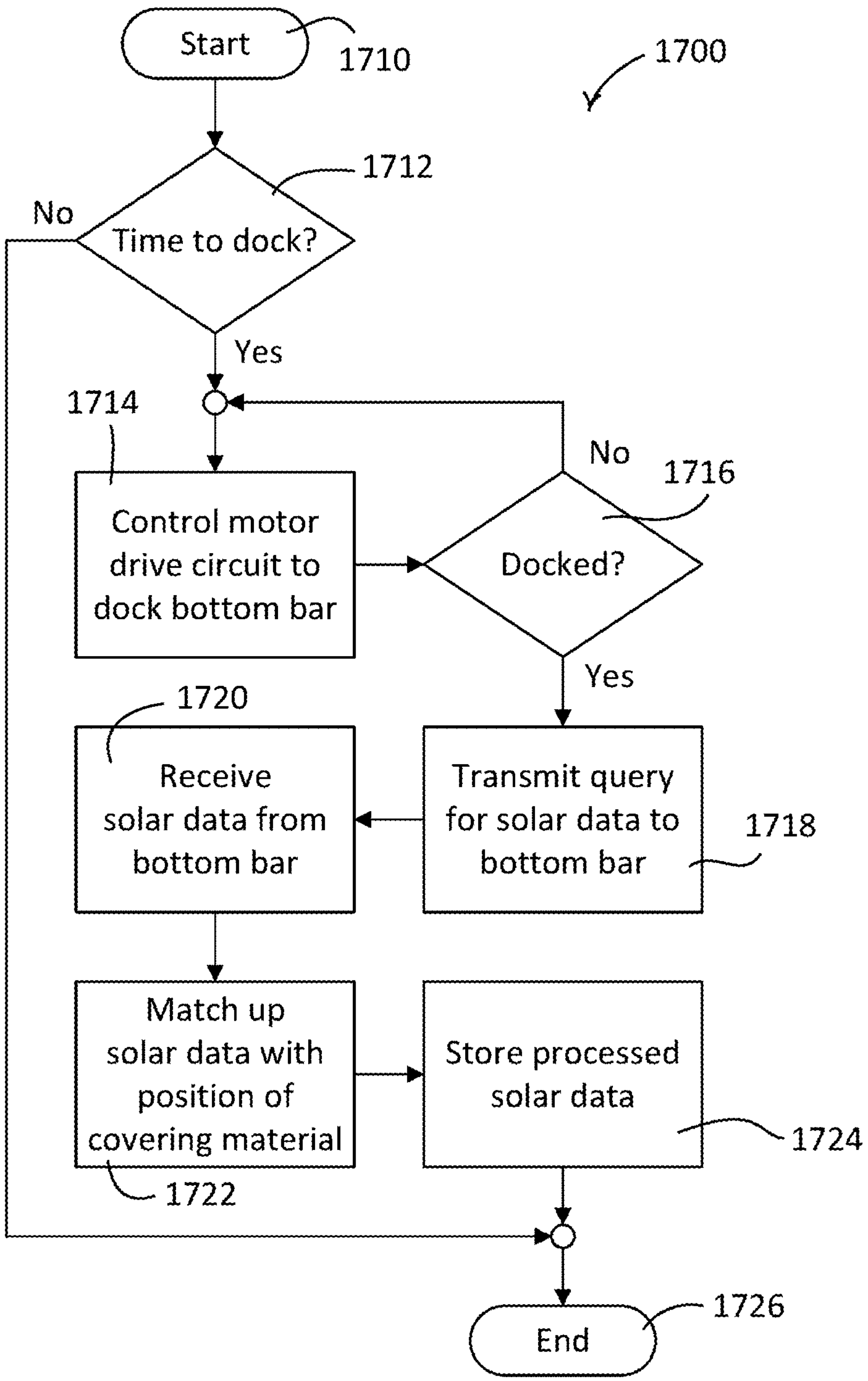

FIG. 44 is an example procedure 1700 for collecting solar data for a motorized window treatment (e.g., the motorized window treatments of the embodiments shown in FIGS. 1-33 or FIGS. 51-57). The procedure 1700 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motorized window treatment may comprise a covering material, a bottom bar connected to a bottom end of the covering material, and one or more solar cells located on the bottom bar. The motor drive unit may be configured to control a present position $P_{PRES}$ of the covering material. For example, the control circuit may execute the procedure 1700 to store solar data, such as one or more measurements and/or operational characteristics of the bottom bar module, at a plurality of intermediate positions of the covering material between a raised position $P_{RAISED}$ and a lowered position $P_{LOWERED}$. The bottom bar module may be configured to communicate with the motor drive unit via a wireless communication link (e.g., via RF signals using a short-range wireless communication protocol). The bottom bar module may be configured to periodically collect and transmit the solar data to the motor drive unit (e.g., at the timing interval $T_{TIM}$ set in the procedure 1200). For example, the control circuit may execute the procedure 1700 periodically at 1710.

At 1712, the control circuit of the motor drive unit may be configured to determine if the motor drive unit should presently dock the bottom bar. For example, the control circuit may be configured to determine that the bottom bar should be docked when the space in which the motorized window treatment is installed is vacant and the magnitude of a first storage voltage $V_{S-A}$ produced across an energy storage element of the motor drive unit is less than a low-charge threshold $V_{TH-LC}$, and/or the space is occupied and the magnitude of the first storage voltage $V_{S-A}$ produced across the energy storage element of the motor drive unit is less than a critical-charge threshold $V_{TH-CRIT}$ (e.g., as shown in FIG. 35). In addition, the control circuit may determine to that the bottom bar should be docked when the magnitude of a second storage voltage $V_{S-A}$ produced across an energy storage element of the bottom bar module is greater than a high-charge threshold $V_{TH-HC}$ (e.g., as shown in FIG. 36A). Further, the control circuit of the motor may be configured to determine that the bottom bar should be docked in response to the present day of the week and/or the time of the day. When the control circuit determines that the motor drive unit should not presently dock the bottom bar at 1712, the procedure 1700 may end at 1726.

When the control circuit determines that the motor drive unit should presently dock the bottom bar at 1712, the control circuit may control a motor drive circuit to control a motor of the motor drive unit to dock the bottom bar at 1714. For example, the control circuit may control the motor adjust the present position $P_{PRES}$ of the covering material to the raised position $P_{RAISED}$ at 1714. In addition, the control circuit may control the covering material through a docking movement (e.g., a docking sequence) as the bottom bar nears the dock at 1714 (e.g., as shown in FIG. 37A). At 1716, the control circuit may be configured to determine if the bottom bar is docked. For example, the control circuit may be configured to determine if the bottom bar is docked by determining if electrical connections of the dock of the motor drive unit are electrically connected to the electrical connections of the bottom bar module at 1716. When the control circuit determines that the bottom bar is not presently docked at 1716, the control circuit may continue to control the motor to dock the bottom bar at 1714.

When the control circuit of the motor drive unit determines that the bottom bar is docked at 1716, the control circuit may transmit to the bottom bar module a query message that includes a request for solar data at 1718. At 1720, the control circuit of the motor drive unit may receive the solar data from the bottom bar module (e.g., as transmitted in response to the bottom bar module receiving the query message transmitted by the motor drive unit at 1718). At 1722, the control circuit of the motor drive unit may be configured to match up each of the measurements and/or operational characteristics of the solar data with a respective position $P_{DATA}$ of the covering material at the time that the measurement was made. For example, the solar data received from the bottom bar may include timing information (e.g., a time stamp indicating a time at which the respective measurement and/or operational characteristic was recorded) for each of the measurements and/or operational characteristics. The control circuit may be configured to determine the respective position $P_{DATA}$ of the covering material for each of the measurements and/or operational characteristics of the solar data at 1722 by comparing the respective time stamp with the record of movements of the covering material that are stored in the memory of the motor drive unit. Alternatively or additionally, the control circuit of the bottom bar module may be configured to wirelessly communicate the solar data while the covering material is moving (e.g., using a wireless communication link, such as an IR communication link) to the control circuit of the motor drive unit. At 1724, the control circuit of the motor drive unit may store the processed solar data by storing the respective position $P_{DATA}$ of the covering material (e.g., as determined at 1722) along with each of the measurements and/or operational characteristics in the solar data, before the procedure 1700 ends.

Figure 45:
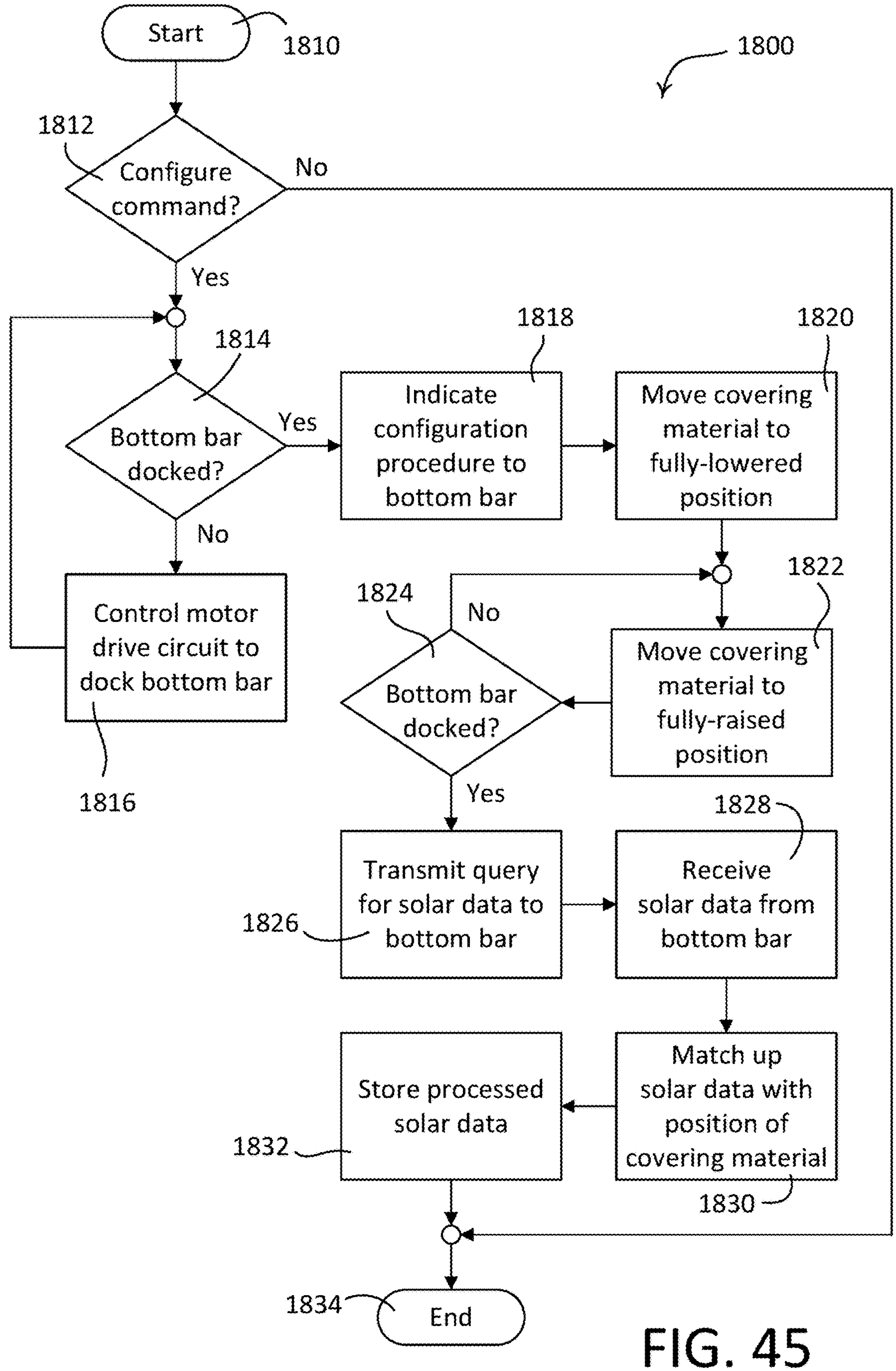

FIG. 45 is an example procedure 1800 for collecting solar data for a motorized window treatment (e.g., the motorized window treatments of the embodiments shown in FIGS. 1-33 or FIGS. 51-57). The procedure 1800 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motorized window treatment may comprise a covering material, a bottom bar connected to a bottom end of the covering material, and one or more solar cells located on the bottom bar. The motor drive unit may be configured to control a present position $P_{PRES}$ of the covering material.

The control circuit may be configured to execute the procedure 1800 as part of a configuration procedure of the motorized window treatment (e.g., at the time of installation of the motorized window treatment). For example, the control circuit may execute the procedure 1800 to store solar data, such as one or more measurements and/or operational characteristics of the bottom bar module, at a plurality of intermediate positions of the covering material between a raised position $P_{RAISED}$ and a lowered position $P_{LOWERED}$. The bottom bar module may be configured to communicate with the motor drive unit via a wired communication link (e.g., via the electrical connections 638, 648) when the bottom bar is docked. The control circuit of the bottom bar module may be configured to collect and store the solar data in memory of the bottom bar module (e.g., at the timing interval $T_{TIM}$ set in the procedure 1200), and then transmit the solar data to the motor drive unit via the wired communication link when the bottom bar is docked. For example, the control circuit may execute the procedure 1800 periodically at 1810. In addition, the control circuit may execute the procedure 1800 at 1810 in response to receiving a message from the bottom bar module and/or in response to detecting an actuation of a button of the motor drive unit.

At 1812, the control circuit may determine if a command to configure the motor drive unit has been received. For example, the control circuit may receive the command to configure the motor drive unit in a message received via the communication circuit and/or in response to an actuation of a button of the motor drive unit. When the control circuit determines that a command to configure the motor drive unit has not been received at 1812, the procedure 1800 may end at 1832. When the control circuit determines that a command to configure the motor drive unit has been received at 1812, the control circuit may be configured to determine if the bottom bar is docked at 1814. For example, the control circuit may be configured to determine if the bottom bar is docked by determining if electrical connections of the dock of the motor drive unit are electrically connected to the electrical connections of the bottom bar module at 1814. When the control circuit determines that the bottom bar is not presently docked at 1814, the control circuit may control a motor drive circuit to control a motor of the motor drive unit to dock the bottom bar at 1816. For example, the control circuit may control the motor to adjust the present position $P_{PRES}$ of the covering material to the raised position $P_{RAISED}$ at 1816. In addition, the control circuit may control the covering material through a docking movement (e.g., a docking sequence) as the bottom bar nears the dock at 1816 (e.g., as shown in FIG. 37A).

When the control circuit of the motor drive unit determines that the bottom bar is presently docked at 1814, the control circuit may indicate to the bottom bar module that the control circuit is going to be executing the configuration procedure at 1818. For example, the control circuit by transmit a message to the bottom bar module indicating the execution of the configuration procedure. At 1820, the control circuit may initialize the present position $P_{PRES}$ of the covering material for the configuration procedure by adjusting the present position $P_{PRES}$ of the covering material to the lowered position $P_{LOWERED}$. At 1822, the control circuit may control the motor drive circuit to adjust the present position $P_{PRES}$ of the covering material from the raised position $P_{RAISED}$ to the lowered position $P_{LOWERED}$ so that the bottom bar module is able to record one or more measurements and/or operational characteristics of the bottom bar at the raised position $P_{RAISED}$, the lowered position $P_{LOWERED}$, and/or multiple intermediate positions between the raised position $P_{RAISED}$ and the lowered position $P_{LOWERED}$. For example, the bottom bar module may be configured to record the one or more measurements and/or operational characteristics of the bottom bar in response to receiving the indication of the configuration procedure transmitted by the control circuit of the motor dive unit at 1818.

At 1824, the control circuit of the motor dive unit may determine if the bottom bar is docked. When the bottom bar is not docked at 1824, the control circuit may control the motor drive circuit at 1822 to adjust the present position $P_{PRES}$ of the covering material from the lowered position $P_{LOWERED}$ to the raised position $P_{RAISED}$, for example, to dock the bottom bar. In some examples, the bottom bar module may also record one or more measurements and/or operational characteristics of the bottom bar multiple intermediate positions between the lowered position $P_{LOWERED}$ and the raised position $P_{RAISED}$ while the control circuit is adjusting the present position $P_{PRES}$ of the covering material from the lowered position $P_{LOWERED}$ to the raised position $P_{RAISED}$ at 1822.

When the control circuit determines that the bottom bar is docked at 1824, the control circuit may transmit to the bottom bar module a query message that includes a request for solar data at 1826. At 1828, the control circuit of the motor drive unit may receive the solar data from the bottom bar module (e.g., as transmitted in response to the bottom bar module receiving the query message transmitted by the motor drive unit at 1826). At 1830, the control circuit of the motor drive unit may be configured to match up each of the measurements and/or operational characteristics of the solar data with a respective position $P_{DATA}$ of the covering material at the time that the measurement was made. For example, the solar data received from the bottom bar may include timing information (e.g., a time stamp indicating a time at which the respective measurement and/or operational characteristic was recorded) for each of the measurements and/or operational characteristics. The control circuit may be configured to determine the respective position $P_{DATA}$ of the covering material for each of the measurements and/or operational characteristics of the solar data at 1830 by comparing the respective time stamp with the record of movements of the covering material that are stored in the memory of the motor drive unit. At 1832, the control circuit of the motor drive unit may store the processed solar data by storing the respective position $P_{DATA}$ of the covering material (e.g., as determined at 1830) along with each of the measurements and/or operational characteristics in the solar data, before the procedure 1800 ends at 1824.

Figure 46A:
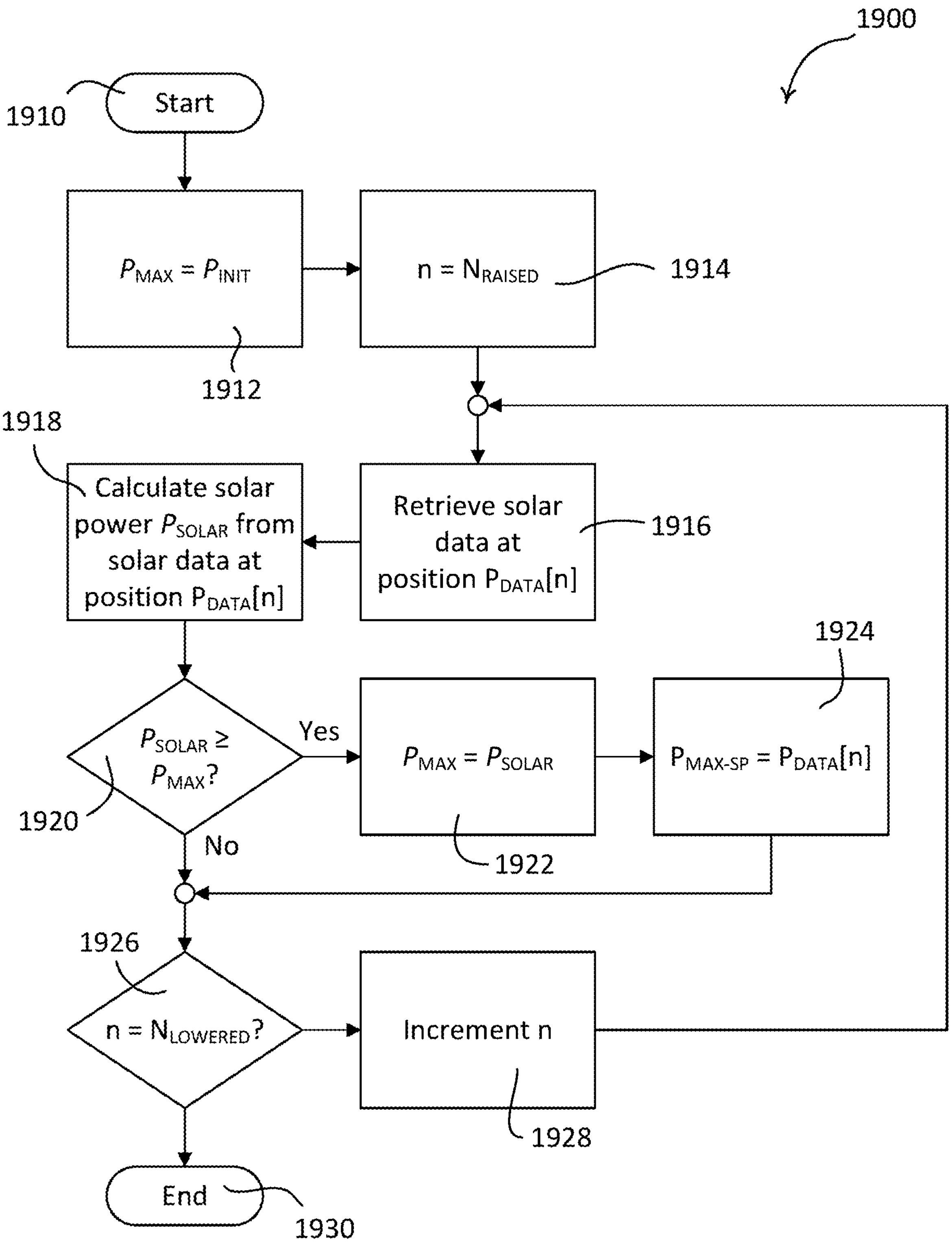
FIGS. 46A-46D are flowcharts of example procedures for configuring a motorized window treatment.

FIG. 46A is a flowchart of an example procedure 1900 for configuring a motorized window treatment (e.g., the motorized window treatments of the embodiments shown in FIGS. 1-33 or FIGS. 51-57). The procedure 1900 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motorized window treatment may comprise a covering material, a bottom bar connected to a bottom end of the covering material, and one or more solar cells located on the bottom bar.

The motor drive unit may be configured to control a present position $P_{PRES}$ of the covering material. The motor drive unit may have stored in memory solar data, such as one or more measurements and/or operational characteristics of a bottom bar module of the bottom bar at a plurality of intermediate positions of the covering material between a raised position $P_{RAISED}$ and a lowered position $P_{LOWERED}$ (e.g., as described above). For example, the control circuit may execute the procedure 1900 to determine a maximum magnitude $P_{MAX}$ of solar power $P_{SOLAR}$ that is received by the solar cells on the bottom bar as indicated by the solar data between the raised position $P_{RAISED}$ and the lowered position $P_{LOWERED}$. The control circuit may also execute the procedure 1900 to determine a maximum-solar-power position $P_{MAX-SP}$ at which the solar cells of the bottom bar may receive the maximum magnitude $P_{MAX}$ of the solar power $P_{SOLAR}$. For example, the control circuit may execute the procedure 1900 periodically at 1910. In addition, the control circuit may execute the procedure 1900 at 1910 in response to receiving a message including a command to configure the motor drive unit.

At 1912, the control circuit of the motor drive unit may initialize the maximum magnitude $P_{MAX}$ of the solar power $P_{SOLAR}$ to an initial solar power $P_{INIT}$ (e.g., zero Watts). At 1914, the control circuit may initialize a variable n to a raised-position value $N_{RAISED}$, which may identify measurements and/or operational characteristics of the solar data that are recorded at the raised position $P_{RAISED}$. At 1916, the control circuit may retrieve the solar data at the position $P_{DATA}[n]$ (e.g., the measurements and/or operational characteristics recorded at the position $P_{DATA}[n]$ during one or more of the procedures 1400, 1700, 1800). For example, the control circuit may retrieve a magnitude of a photovoltaic output voltage of the solar cells of the bottom bar (e.g., the photovoltaic output voltage $V_{PV}$), a magnitude of a storage voltage of the bottom bar module (e.g., the second storage voltage $V_{S-B}$), and/or a duty cycle of a solar cell management circuit of the bottom bar module (e.g., the duty cycle $DC_{SCM}$ of the solar cell management circuit 644) that are recorded at the position $P_{DATA}[n]$. At 1918, the control circuit may calculate the magnitude of the solar power $P_{SOLAR}$ at the position $P_{DATA}[n]$. For example, the control circuit may calculate the magnitude of the solar power $P_{SOLAR}$ as a function of the magnitude of the photovoltaic output voltage of the solar cells of the bottom bar, the magnitude of the storage voltage of the bottom bar module, and/or the duty cycle of the solar cell management circuit of the bottom bar module. In some examples, the control circuit may calculate the magnitude of the solar power $P_{SOLAR}$ at each of the positions between the raised position $P_{RAISED}$ and the lowered position $P_{LOWERED}$ and store the calculated solar power $P_{SOLAR}$ in the solar data for each of the positions between the raised position $P_{RAISED}$ and the lowered position $P_{LOWERED}$, so that during the procedure 1900, the control circuit needs to retrieve the solar power $P_{SOLAR}$ at the position $P_{DATA}[n]$ at 1916 (e.g., calculation of the solar power $P_{SOLAR}$ at the position $P_{DATA}[n]$ at 1918 may be omitted from the procedure 1900).

At 1920, the control circuit may determine if the magnitude of the solar power $P_{SOLAR}$ at the position $P_{DATA}[n]$ is greater than (e.g., greater than or equal to) the maximum magnitude $P_{MAX}$. When the magnitude of the solar power $P_{SOLAR}$ at the position $P_{DATA}[n]$ is greater than (e.g., greater than or equal to) the maximum magnitude $P_{MAX}$ at 1920, the control circuit may update the maximum magnitude $P_{MAX}$ to be equal to the magnitude of the solar power $P_{SOLAR}$ at the position $P_{DATA}[n]$ at 1922 and set the maximum-solar-power position $P_{MAX\text{-}SP}$ to be equal to the position $P_{DATA}[n]$ at 1924, before determining at 1926 if the variable n is equal to a lowered-position value $N_{LOWERED}$, which may identify measurements and/or operational characteristics of the solar data that recorded at the lowered position $P_{LOWERED}$. When the magnitude of the solar power $P_{SOLAR}$ at the position $P_{DATA}[n]$ is less than the maximum magnitude $P_{MAX}$ at 1920, the control determine if the variable n is equal to the lowered-position value $N_{LOWERED}$ at 1926 (e.g., without updating the maximum magnitude $P_{MAX}$ at 1922 or setting the maximum-solar-power position $P_{MAX\text{-}SP}$ at 1924). When the variable n is not equal to the lowered-position value $N_{LOWERED}$ at 1926, the control circuit may increment the variable n at 1928 and calculate the magnitude of the solar power $P_{SOLAR}$ at the next position $P_{DATA}[n]$ at 1918. When the variable n is equal to the lowered-position value $N_{LOWERED}$ at 1926, the procedure 1900 may end at 1930 (e.g., with the maximum magnitude $P_{MAX}$ at last updated at 1922 and the maximum-solar-power position $P_{MAX\text{-}SP}$ as last set at 1924).

Figure 46B:
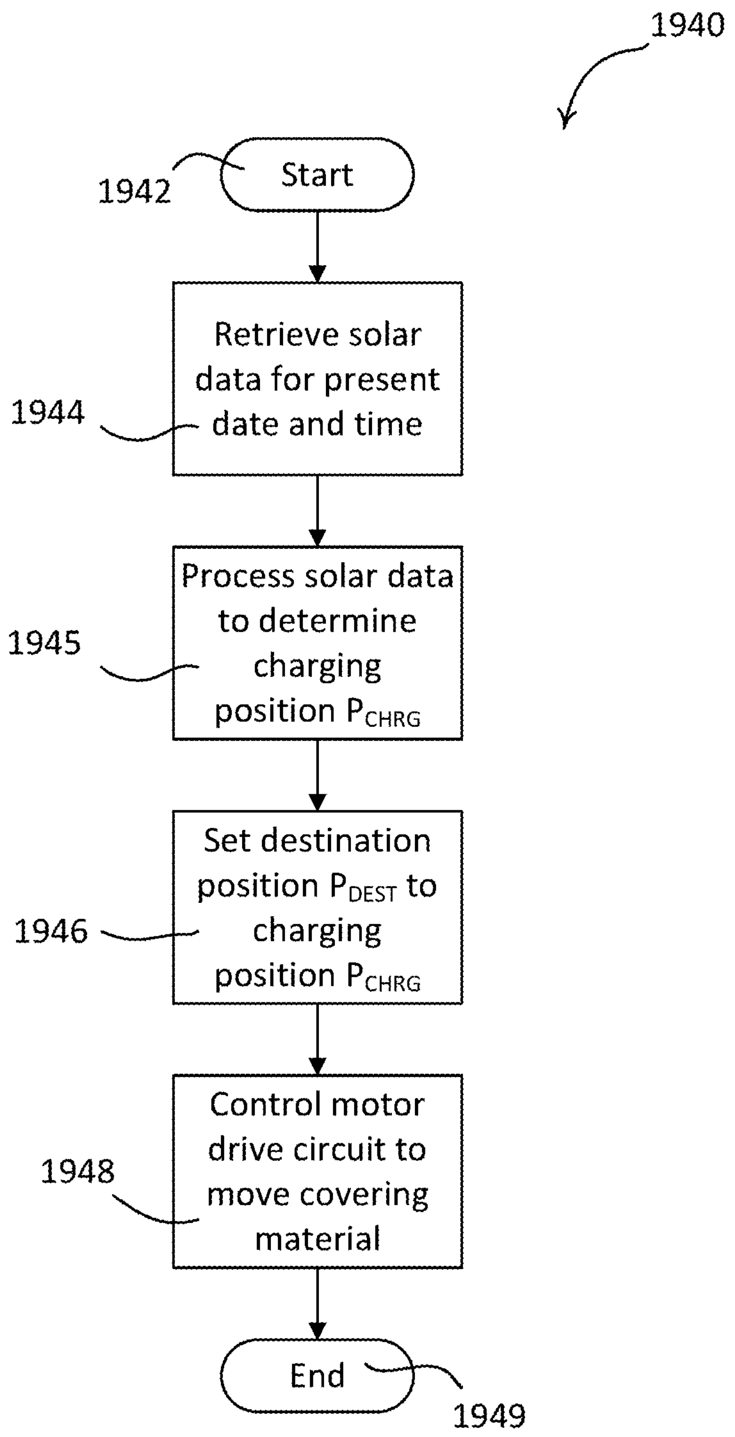

FIG. 46B is a flowchart of an example procedure 1940 for controlling a motorized window treatment (e.g., the motorized window treatments of the embodiments shown in FIGS. 1-33 or FIGS. 51-57). The procedure 1940 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motorized window treatment may comprise a covering material, a bottom bar connected to a bottom end of the covering material, and one or more solar cells located on the bottom bar. The control circuit may execute the procedure 1940 periodically.

The procedure 1940 may start at 1942. At 1944, the control circuit may retrieve solar data for the present date and/or time (e.g., and location of the motorized window treatment). For example, the control circuit may receive solar data from the bottom bar. For instance, the control circuit of the bottom bar module may be configured to collect and store the solar data in memory of the bottom bar module (e.g., at the timing interval $T_{TIM}$ set in the procedure 1200), and then transmit the solar data to the motor drive unit via a wired or wireless communication link. When the control circuit receives the solar data from the bottom bar module, the control circuit may store the solar data in memory at that time, and then retrieve the solar data from memory at 1944.

At 1945, the control circuit may process the solar data to determine a charging position $P_{CHRG}$ of the bottom bar based on the solar data. For example, the control circuit may determine the position of the bottom bar that is most likely to lead to the solar cells receiving the most sunlight and/or charge. In some examples, the control circuit may determine the charging position $P_{CHRG}$ of the bottom bar using the procedure 1900. Alternatively or additionally, the control circuit may store the solar data from various positions (e.g., over a period of time, such as a year), and the control circuit may determine the charging position $P_{CHRG}$ based on the saved solar data (e.g., and the present day and/or time).

At 1946, the control circuit may set the destination position $P_{DEST}$ for the bottom bar to the charging position $P_{CHRG}$. For example, the control circuit may set the position of the bottom bar to be at the position where the solar cells are most likely to receive the most sunlight and/or charge. At 1948, the control circuit may control the motor drive circuit to move the covering material to the destination position $P_{DEST}$, and the procedure 1940 may exit at 1949. For example, the control circuit may be configured to generate at least one drive signal (e.g., the at least one drive signal $V_{DR}$) for controlling the motor drive circuit to control the rotational speed and the direction of rotation of the motor until the covering material is at the destination position $P_{DEST}$. As such, using the procedure 1940, the control circuit may determine the ideal charging position for the solar cells, and then move the bottom bar accordingly.

Figure 46C:
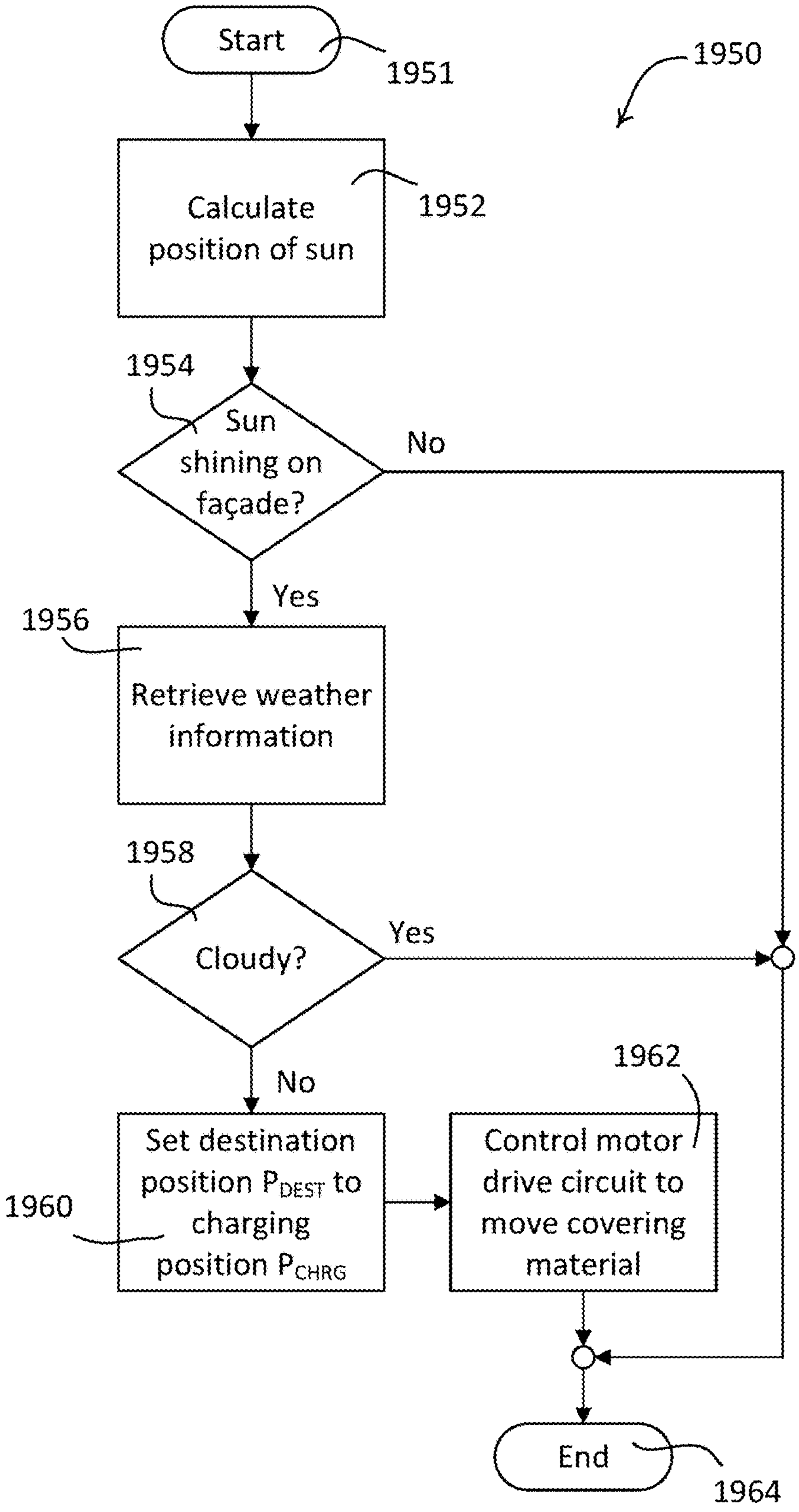

FIG. 46C is a flowchart of an example procedure 1950 for configuring a motorized window treatment (e.g., the motorized window treatments of the embodiments shown in FIGS. 1-33 or FIGS. 51-57). The procedure 1950 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motorized window treatment may comprise a covering material, a bottom bar connected to a bottom end of the covering material, and one or more solar cells located on the bottom bar. The control circuit may execute the procedure 1950 periodically.

The procedure 1950 may start at 1951. At 1952, the control circuit may determine the position of the sun, for example, as described herein. The control circuit may calculate the position of the sun based on a predicted position of the sun. Alternatively, the control circuit may receive an indication of the predicted position of the sun from a system controller. At 1954, the control circuit may determine whether the sun may be shining on a façade of the building of which the motorized window treatment is installed. Since there may be cloud cover or another obstruction between the façade and the sun, the predicted position of the sun may indicate whether there is potentially sun shining on the façade of the building of which the motorized window treatment is installed, for instance, as described herein. For example, the control circuit may be configured to determine whether the sun may be shining on the façade of which the motorized window treatment is installed at 1952 by comparing the calculated solar altitude angle $a_t$ and/or the calculated solar azimuth angle $a_s$ to one or more thresholds to determine if the calculated solar altitude angle $a_t$ and/or the calculated solar azimuth angle $a_s$ are within ranges that indicate that the sun may be shining on the façade. If the control circuit determines that the sun is not shining on the façade, the procedure 1950 may exit at 1964.

If the control circuit determines that the sun may be shining on the façade, the control circuit may retrieve weather information (e.g., temperature, cloud coverage, precipitation, barometric pressure, etc.) at 1956. For example, the control circuit may retrieve the weather information (e.g., directly or indirectly, via a system controller) from a weather service (e.g., via the Internet), a weather application, and/or a weather application programming interface (API). At 1958, the control circuit may determine whether it is cloudy at the location of the motorized window treatment based on the weather information. If the control circuit determines that it is cloudy at 1958, the procedure 1950 may exit at 1964.

If the control circuit determines that it is not cloudy at 1958, the control circuit may set the destination position $P_{DEST}$ for the bottom bar to the charging position $P_{CHRG}$ at 1960. For example, the control circuit may set the position of the bottom bar to be at the position where the solar cells are most likely to receive the most sunlight and/or charge (e.g., as shown at 1944 and 1945 of procedure 1940 shown in FIG. 46B). At 1962, the control circuit may control the motor drive circuit to move the covering material to the destination position $P_{DEST}$, and the procedure 1950 may exit at 1964. For example, the control circuit may be configured to generate at least one drive signal (e.g., the at least one drive signal $V_{DR}$) for controlling the motor drive circuit to control the rotational speed and the direction of rotation of the motor until the covering material is at the destination position $P_{DEST}$. As such, using the procedure 1950, the control circuit may move the bottom bar (e.g., and solar cells) to the charging position $P_{CHRG}$ if the sun is shining on the façade of the building and/or if there are no clouds. Accordingly, the control circuit may move the bottom bar (e.g., and solar cells) to the charging position $P_{CHRG}$ if the solar cells are likely to receive a relatively high amount of sunlight.

Figure 46D:
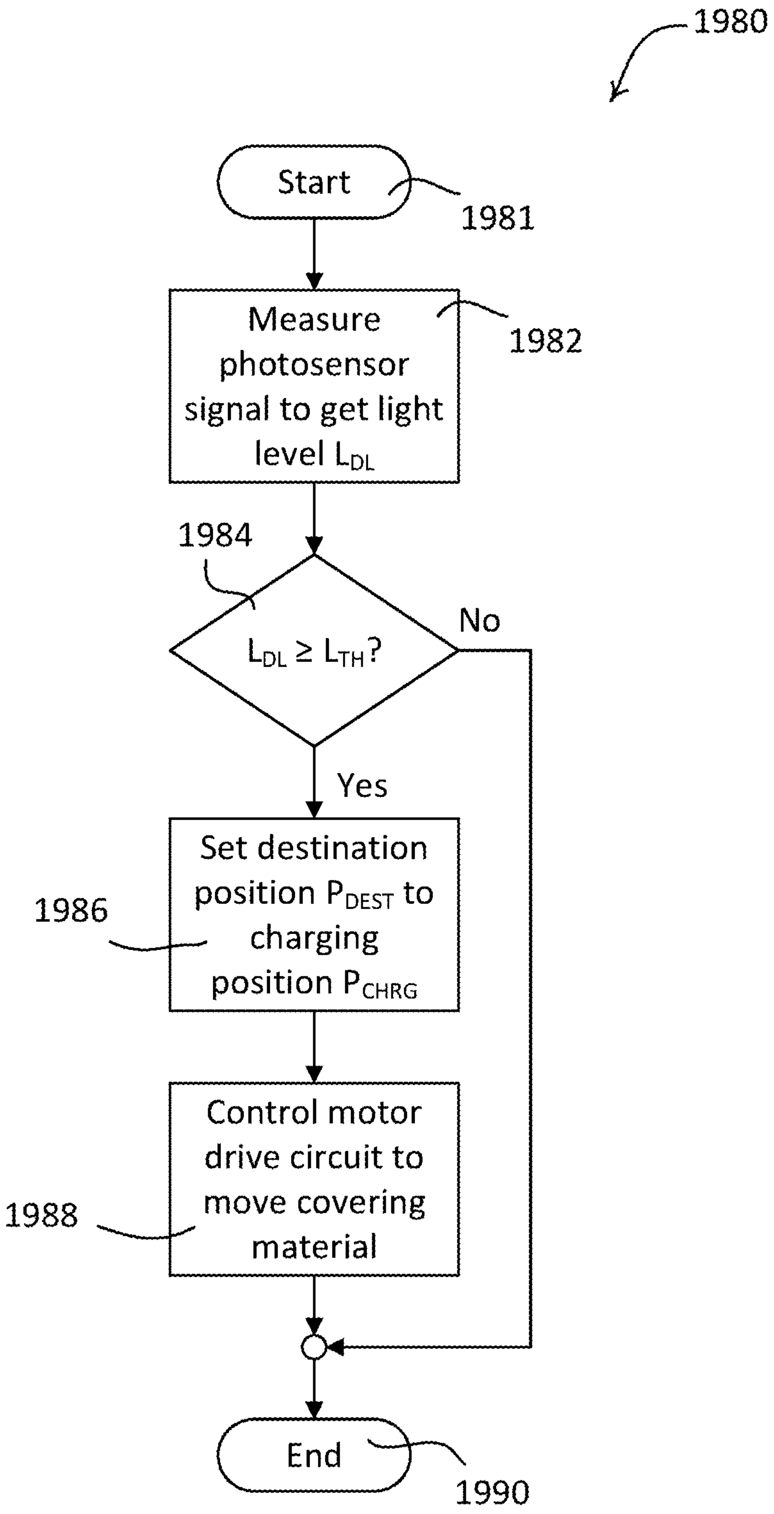

FIG. 46D is a flowchart of an example procedure 1980 for configuring a motorized window treatment (e.g., the motorized window treatments of the embodiments shown in FIGS. 1-33 or FIGS. 51-57). The procedure 1980 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motorized window treatment may comprise a covering material, a bottom bar connected to a bottom end of the covering material, and one or more solar cells located on the bottom bar. The control circuit may execute the procedure 1980 periodically.

The procedure 1980 may start at 1981. At 1982, the control circuit may measure a signal from a photosensor to determine a light level $L_{DL}$. As noted herein, in some examples, the motorized window treatment (e.g., the motor drive unit and/or the bottom bar) may include a photosensor that is configured to measure light and generate a signal indicating the amount of light. As such, the control circuit may receive an indication of the amount of light from the photosensor and determine a light level $L_{DL}$. The photosensor may be oriented such that it faces towards the window to measure the amount of light (e.g., sunlight) hitting the window (e.g., which may be an indicator of the amount of light directed towards the solar cells of the motorized window treatment).

At 1984, the control circuit may determine whether the light level $L_{DL}$ is greater than or equal to a threshold light level $L_{TH}$. If the control circuit determines that the light level $L_{DL}$ is less than the threshold light level $L_{TH}$, the procedure 1980 may exit at 1990. If the control circuit determines that the light level $L_{DL}$ is greater than or equal to the threshold light level $L_{TH}$ at 1984, the control circuit may set the destination position $P_{DEST}$ for the bottom bar to the charging position $P_{CHRG}$ at 1986. For example, the control circuit may set the position of the bottom bar to be at the position where the solar cells are most likely to receive the most sunlight and/or charge (e.g., as shown at 1944 and 1945 of procedure 1940 shown in FIG. 46B). At 1988, the control circuit may control the motor drive circuit to move the covering material to the destination position $P_{DEST}$, and the procedure 1980 may exit at 1990. For example, the control circuit may be configured to generate at least one drive signal (e.g., the at least one drive signal $V_{DR}$) for controlling the motor drive circuit to control the rotational speed and the direction of rotation of the motor until the covering material is at the destination position $P_{DEST}$.

As such, if the control circuit determines that the light level $L_{DL}$ is greater than or equal to the threshold light level $L_{TH}$ (e.g., it is sunny out), the control circuit may move the bottom bar (e.g., and solar cells) to the charging position $P_{CHRG}$, for example, so that the solar cells are likely to receive a relatively high amount of sunlight.

Figure 47:
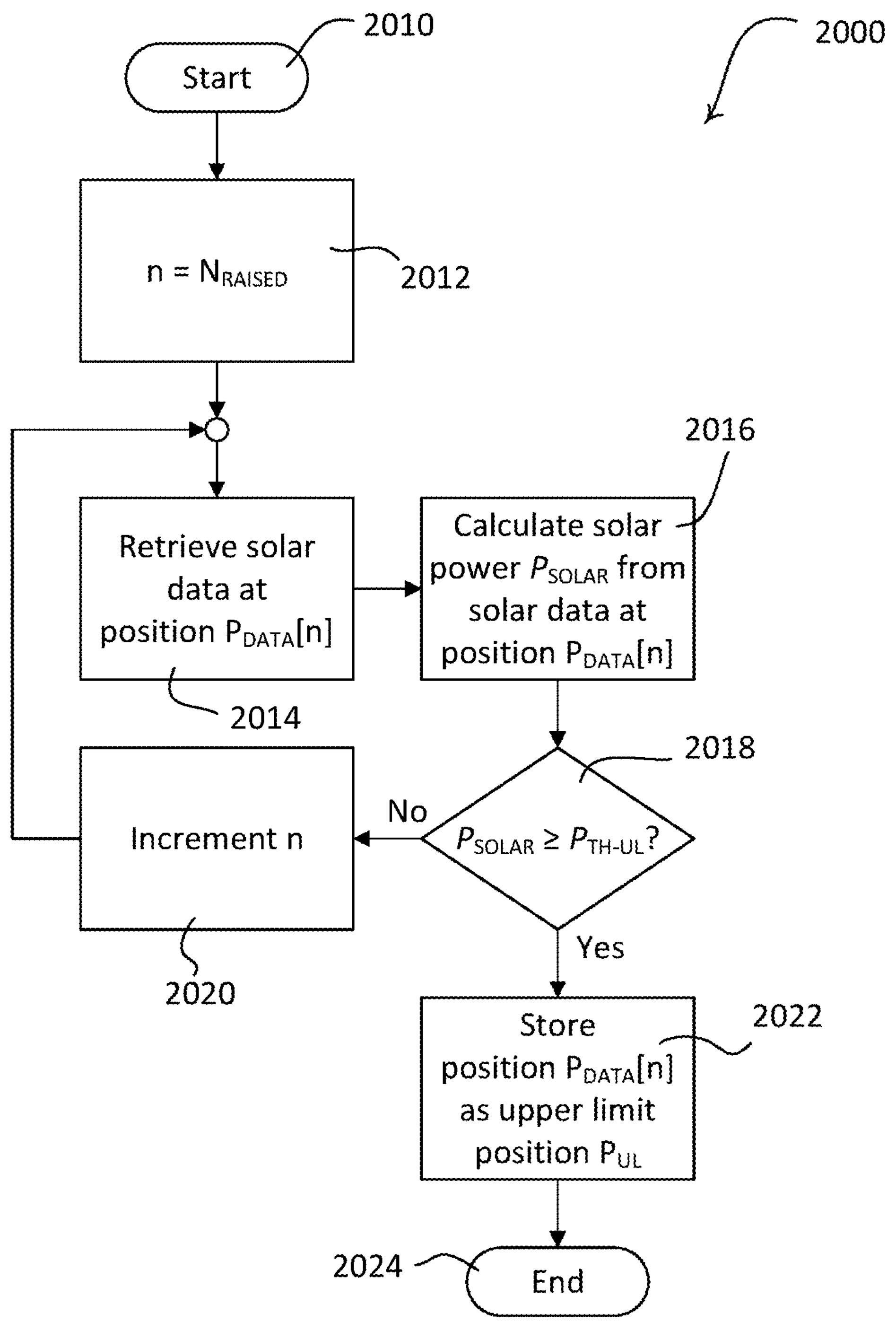
FIGS. 47 and 48 are flowcharts of example procedures for configuring a motorized window treatment.

FIG. 47 is a flowchart of an example procedure 2000 for configuring a motorized window treatment (e.g., the motorized window treatments of the embodiments shown in FIGS. 1-33 or FIGS. 51-57). The procedure 2000 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motorized window treatment may comprise a covering material, a bottom bar connected to a bottom end of the covering material, and one or more solar cells located on the bottom bar. The motor drive unit may be configured to control a present position $P_{PRES}$ of the covering material. The motor drive unit may have stored in memory solar data, such as one or more measurements and/or operational characteristics of a bottom bar module of the bottom bar at a plurality of intermediate positions of the covering material between a raised position $P_{RAISED}$ and a lowered position $P_{LOWERED}$. The control circuit may execute the procedure 2000 to, for example, set an upper limit position $P_{UP-LIMIT}$ of the motorized window treatment. For example, the control circuit may execute the procedure 2000 periodically at 2010. In addition, the control circuit may execute the procedure 2000 at 2010 in response to receiving a message including a command to configure the motor drive unit.

At 2012, the control circuit may initialize a variable n to a raised-position value $N_{RAISED}$, which may identify measurements and/or operational characteristics of the solar data that recorded at the raised position $P_{RAISED}$. At 2014, the control circuit may retrieve the solar data at the position $P_{DATA}[n]$ (e.g., the measurements and/or operational characteristics recorded at the position $P_{DATA}[n]$). For example, the control circuit may retrieve a magnitude of a photovoltaic output voltage of the solar cells of the bottom bar (e.g., the photovoltaic output voltage $V_{PV}$), a magnitude of a storage voltage of the bottom bar module (e.g., the second storage voltage $V_{S-B}$), and/or a duty cycle of a solar cell management circuit of the bottom bar module (e.g., the duty cycle $DC_{SCM}$ of the solar cell management circuit 644) that are recorded at the position $P_{DATA}[n]$.

At 2016, the control circuit may calculate the magnitude of the solar power $P_{SOLAR}$ at the position $P_{DATA}[n]$. For example, the control circuit may calculate the magnitude of the solar power $P_{SOLAR}$ as a function of the magnitude of the photovoltaic output voltage of the solar cells of the bottom bar, the magnitude of the storage voltage of the bottom bar module, and/or the duty cycle of the solar cell management circuit of the bottom bar module. In some examples, the control circuit may calculate the magnitude of the solar power $P_{SOLAR}$ at each of the positions between the raised position $P_{RAISED}$ and the lowered position $P_{LOWERED}$ and store the calculated solar power $P_{SOLAR}$ in the solar data for each of the positions between the raised position $P_{RAISED}$ and the lowered position $P_{LOWERED}$, so that during the procedure 2000, the control circuit needs to (e.g., only needs to) retrieve the solar power $P_{SOLAR}$ at the position $P_{DATA}$[n] at 2014 (e.g., calculation of the solar power $P_{SOLAR}$ at the position $P_{DATA}$[n] at 2016 may be omitted from the procedure 2000).

At 2018, the control circuit may determine if the solar power $P_{SOLAR}$ at the position $P_{DATA}$[n] is greater than (e.g., greater than or equal to) an upper-limit threshold $P_{TH-UL}$. For example, the upper-limit threshold $P_{TH-UL}$ may be a predetermined value that represents an acceptable amount of solar power that is received by the solar cells of the bottom bar to allow for appropriate charging of the energy storage element of the bottom bar. When the solar power $P_{SOLAR}$ at the position $P_{DATA}$[n] is less than the upper-limit threshold $P_{TH-UL}$ at 2018, the control circuit may increment the variable n at 2020 and calculate the magnitude of the solar power $P_{SOLAR}$ at the next position $P_{DATA}$[n] at 2016. When the solar power $P_{SOLAR}$ at the position $P_{DATA}$[n] is greater than (e.g., greater than or equal to) the upper-limit threshold $P_{TH-UL}$ at 2018, the control circuit may store the position $P_{DATA}$[n] as the upper limit position $P_{UP-LIMIT}$ at 2022, and the procedure 2000 may end at 2024.

Figure 48:
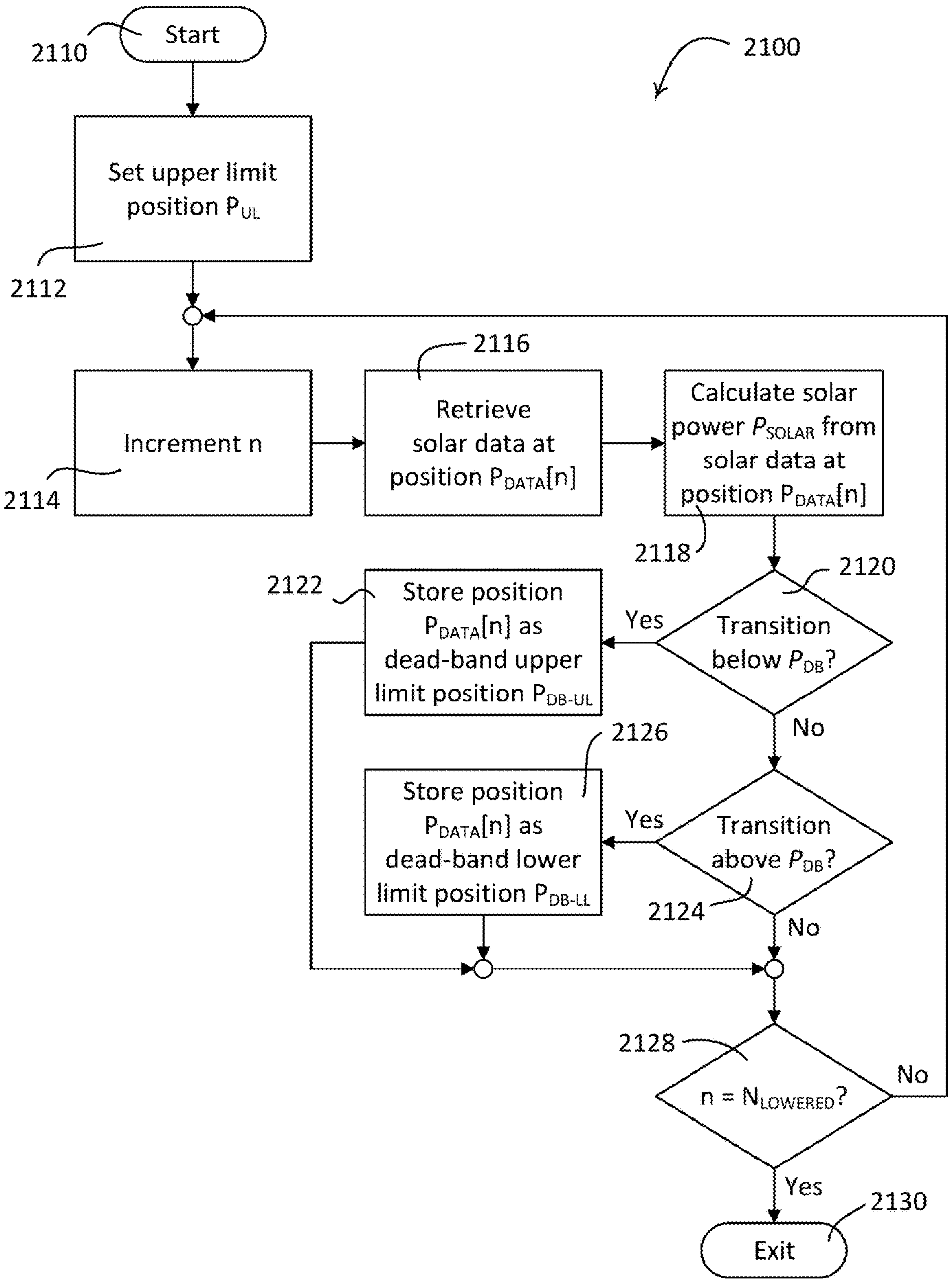

FIG. 48 is a flowchart of an example procedure 2100 for configuring a motorized window treatment (e.g., the motorized window treatments of the embodiments shown in FIGS. 1-33 or FIGS. 51-57). The procedure 2100 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motorized window treatment may comprise a covering material, a bottom bar connected to a bottom end of the covering material, and one or more solar cells located on the bottom bar. The motor drive unit may be configured to control a present position $P_{PRES}$ of the covering material. The motor drive unit may have stored in memory solar data, such as one or more measurements and/or operational characteristics of a bottom bar module of the bottom bar at a plurality of intermediate positions of the covering material between a raised position $P_{RAISED}$ and a lowered position $P_{LOWERED}$. The control circuit may execute the procedure 2100 to, for example, configure one or more dead-bands (e.g., dead regions) between the lowered position $P_{LOWER}$ and the raised position $P_{RAISED}$. The control circuit may be configured to store a dead-band upper limit position $P_{DB-UL}$ and/or a dead-band lower limit position $P_{DB-LL}$ for each of the dead-bands. For example, the control circuit may execute the procedure 2100 periodically at 2110. In addition, the control circuit may execute the procedure 2100 at 2110 in response to receiving a message including a command to configure the motor drive unit.

At 2112, the control circuit of the motor drive unit may set an upper-limit position $P_{UL}$ for the covering material. For example, the control circuit may execute the procedure 2000 (e.g., as shown in FIG. 47) at 2112. At 2114, the control circuit may increment a variable n. For example, the variable n may be initialized and/or updated at 2112 (e.g., during the procedure 2000). At 2116, the control circuit may retrieve the solar data at the position $P_{DATA}$[n] (e.g., the measurements and/or operational characteristics recorded at the position $P_{DATA}$[n]). For example, the control circuit may retrieve a magnitude of a photovoltaic output voltage of the solar cells of the bottom bar (e.g., the photovoltaic output voltage $V_{PV}$), a magnitude of a storage voltage of the bottom bar module (e.g., the second storage voltage $V_{S-B}$), and/or a duty cycle of a solar cell management circuit of the bottom bar module (e.g., the duty cycle $DC_{SCM}$ of the solar cell management circuit 644) that are recorded at the position $P_{DATA}$[n]. At 2118, the control circuit may calculate the magnitude of the solar power $P_{SOLAR}$ at the position $P_{DATA}$[n]. For example, the control circuit may calculate the magnitude of the solar power $P_{SOLAR}$ as a function of the magnitude of the photovoltaic output voltage of the solar cells of the bottom bar, the magnitude of the storage voltage of the bottom bar module, and/or the duty cycle of the solar cell management circuit of the bottom bar module. In some examples, the control circuit may calculate the magnitude of the solar power $P_{SOLAR}$ at each of the positions between the raised position $P_{RAISED}$ and the lowered position $P_{LOWERED}$ and store the calculated solar power $P_{SOLAR}$ in the solar data for each of the positions between the raised position $P_{RAISED}$ and the lowered position $P_{LOWERED}$, so that during the procedure 2100, the control circuit needs to (e.g., only needs to) retrieve the solar power $P_{SOLAR}$ at the position $P_{DATA}$[n] at 2116 (e.g., calculation of the solar power $P_{SOLAR}$ at the position $P_{DATA}$[n] at 2118 may be omitted from the procedure 2100).

At 2120, the control circuit may determine if a transition below a dead-band power threshold $P_{DB}$ has occurred. For example, the control circuit may be configured to determine that a transition below the dead-band power threshold $P_{DB}$ has occurred when the solar power $P_{SOLAR}$ at the position $P_{DATA}$[n] is less than the dead-band power threshold $P_{DB}$ and the solar power $P_{SOLAR}$ at the previous position $P_{DATA}$[n−1] is greater than the dead-band power threshold $P_{DB}$. For example, the dead-band power threshold $P_{DB}$ may be a predetermined value that represents an acceptable amount of solar power that is received by the solar cells of the bottom bar to allow for appropriate charging of the energy storage element of the bottom bar (e.g., equal to and/or similar to the upper-limit threshold $P_{TH-UL}$). When the control circuit has determined that a transition below the dead-band power threshold $P_{DB}$ has occurred at 2120, the control circuit may store the position $P_{DATA}$[n] as the dead-band upper limit position $P_{DB-UL}$ for the present dead-band at 2122.

When the control circuit has determined that a transition below the dead-band power threshold $P_{DB}$ has not occurred at 2120, the control circuit may determine if a transition above the dead-band power threshold $P_{DB}$ has occurred at 2124. For example, the control circuit may be configured to determine that a transition above the dead-band power threshold $P_{DB}$ has occurred when the solar power $P_{SOLAR}$ at the position $P_{DATA}$[n] is greater than the dead-band power threshold $P_{DB}$ and the solar power $P_{SOLAR}$ at the previous position $P_{DATA}$[n−1] is less than the dead-band power threshold $P_{DB}$. When the control circuit has determined that a transition above the dead-band power threshold $P_{DB}$ has occurred at 2124, the control circuit may store the position $P_{DATA}$[n] as the dead-band lower limit position $P_{DB-LL}$ for the present dead-band at 2126. When the control circuit has not determined that a transition below or above the dead-band power threshold $P_{DB}$ has occurred at 2120 or 2124, respectively, or after setting the dead-band upper limit position $P_{DB}$-CL at 2122 or the dead-band lower limit position $P_{DB-LL}$ at 2126, the control circuit may determine at 2128 if the variable n is equal to a lowered-position value $N_{LOWERED}$, which may identify measurements and/or operational characteristics of the solar data that recorded at the lowered position $P_{LOWERED}$. When the variable n is not equal to the lowered-position value $N_{LOWERED}$ at 2128, the control circuit may increment the variable n at 2114 and calculate the magnitude of the solar power $P_{SOLAR}$ at the next position $P_{DATA}[n]$ at 2118. When the variable n is equal to the lowered-position value $N_{LOWERED}$ at 2128, the procedure 2100 may end at 2130.

Figure 49:
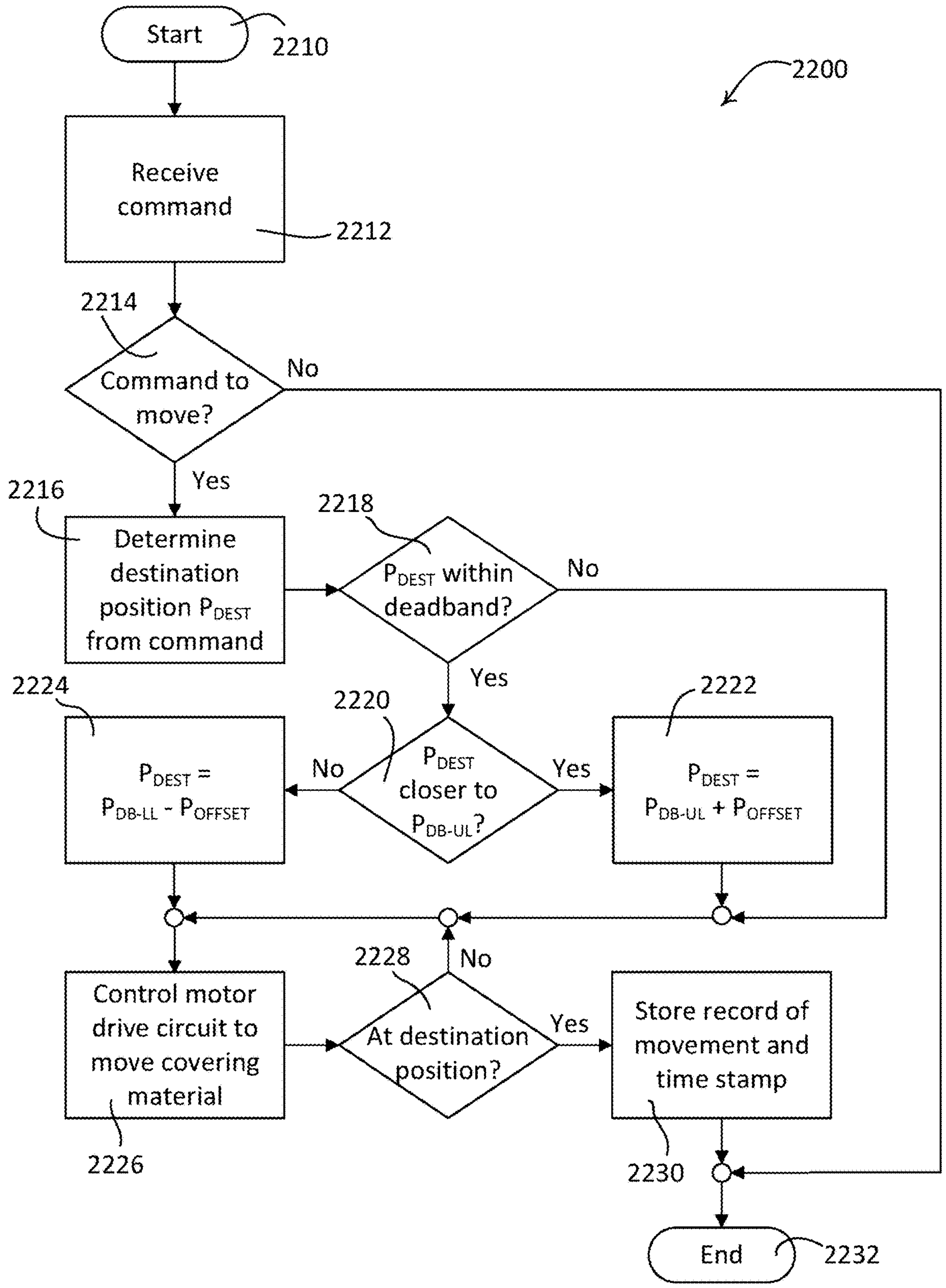
FIGS. 49 and 50 are flowcharts of example procedures for adjusting a present position $P_{PRES}$ of a covering material of a motorized window treatment.

FIG. 49 is a flowchart of an example procedure 2200 for adjusting a present position $P_{PRES}$ of a covering material of a motorized window treatment (e.g., the motorized window treatments of the embodiments shown in FIGS. 1-33 or FIGS. 51-57). The procedure 2200 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motorized window treatment may comprise a bottom bar connected to a bottom end of the covering material and one or more solar cells located on the bottom bar. The motor drive unit may be configured to control a present position $P_{PRES}$ of the covering material. The control circuit of the motor drive unit may execute the procedure 2200 to adjust the present position $P_{PRES}$ of the covering material while avoiding one or more dead-bands (e.g., dead regions) between the lowered position $P_{LOWER}$ and the raised position $P_{RAISED}$. For example, the control circuit may execute the procedure 2200 periodically at 2210. In addition, the control circuit may execute the procedure 2200 in response to receiving a message via a communication circuit at 2210.

At 2212, the control circuit of the motor drive unit may receive a command. For example, the control circuit may receive a message including a command via a communication circuit (e.g., the communication circuit 622). The command may be, for example, a command to move the covering material (e.g., a shade movement command to adjust the present position $P_{PRES}$ of the covering material). For example, the command may include a commanded position $P_{CMD}$ to which the control circuit of the motor drive unit should control the present position $P_{PRES}$ of the covering material. In addition, the command may include a command to raise or lower the present position $P_{PRES}$ of the covering material, and the control circuit may be configured to adjust the present position $P_{PRES}$ of the covering material by a predetermined amount $\Delta P$ in response to receiving the command. In some examples, the control circuit may be configured to start raising or lowering the covering material in response to receiving a message including a raise command or a lower command, respectively, and may stop raising or lowering the present position $P_{PRES}$ of the covering material in response to receiving a message including a stop command. Further, the command in the message received at 2212 may not be a command to move the covering material, but may be a command to enter a mode (e.g., a configuration mode), a command to transmit status information of the motor drive unit, and/or other commands that are not movement commands. Additionally or alternatively, the command may be received in response to an actuation of one or more of the buttons of the motor drive unit (e.g., the button of the user interface circuit 624). For example, the control circuit may be configured to raise or lower the present position $P_{PRES}$ of the covering material by a predetermined amount $\Delta P$ in response to detecting an actuation of a first button or a second button, respectively, of the motor drive unit. In addition, the control circuit may be configured to start raising or lowering the covering material in response to detecting a first actuation of the first button or the second button, respectively, and may stop raising or lowering the present position $P_{PRES}$ of the covering material in response to detecting a second subsequent actuation of the first button or the second button, respectively.

At 2214, the control circuit of the motor drive unit may be configured to determine if the command received at 2212 is a command to move the covering material (e.g., a shade movement command). When the command is not a command to move the covering material at 2214, the procedure 2200 may end at 2232. When the command is a command to move the covering material at 2214, the control circuit may at 2216 determine a destination position $P_{DEST}$ for the covering material based on the command in the message received at 2212. For example, when the message includes a commanded position $P_{CMD}$, the control circuit may set the destination position $P_{DEST}$ equal to the commanded position $P_{CMD}$ at 2216. In addition, when the message includes a raise command or a lower command, the control circuit may set the destination position to be a predetermined amount $\Delta P$ from the present position $P_{PRES}$ before movement of the covering material starts at 2216 (e.g., $P_{DEST}=P_{PRES}+\Delta P$ when the command is a raise command or $P_{DEST}=P_{PRES}-\Delta P$ when the command is a lower command).

At 2218, the control circuit may determine if the destination position $P_{DEST}$ falls within a dead-band. For example, the control circuit may determine if the destination position $P_{DEST}$ is less than (e.g., less than or equal to) a dead-band upper limit position $P_{DB\text{-}UL}$ of one of the dead-bands and/or is greater than (e.g., greater than or equal to) a dead-band lower limit position $P_{DB\text{-}LL}$ of that same dead-band at 2218. When the destination position $P_{DEST}$ falls within a dead-band at 2218, the control circuit may determine if the destination position $P_{DEST}$ is closer to the dead-band upper limit position $P_{DB\text{-}UL}$ at 2220 (e.g., if the destination position $P_{DEST}$ is closer to the dead-band upper limit position $P_{DB\text{-}UL}$ than the dead-band lower limit position $P_{DB\text{-}LL}$). If so, the control circuit may set the destination position $P_{DEST}$ equal to the dead-band upper limit position $P_{DB\text{-}UL}$ plus an offset amount $P_{OFFSET}$ at 2222. If the destination position $P_{DEST}$ is closer to the dead-band lower limit position $P_{DB\text{-}LL}$ than the dead-band upper limit position $P_{DB\text{-}UL}$ at 2220, the control circuit may set the destination position $P_{DEST}$ equal to the dead-band lower limit position $P_{DB\text{-}LL}$ minus the offset amount $P_{OFFSET}$ at 2224.

After updating the value of the destination position $P_{DEST}$ at 2222 or 2224, or when the destination position $P_{DEST}$ does not fall within a dead-band at 2218, the control circuit may control the motor drive circuit to rotate the motor to move the covering material towards the destination position $P_{DEST}$ at 2226. For example, the control circuit may be configured to generate at least one drive signal (e.g., the at least one drive signal $V_{DR}$) for controlling the motor drive circuit to control the rotational speed and the direction of rotation of the motor. At 2228, the control circuit of the motor drive unit may be configured to determine if the covering material is at the destination position $P_{DEST}$. When the control circuit determines that the covering material is not at the destination position $P_{DEST}$ at 2228, the control circuit may continue to control the motor drive circuit to move the covering material towards the destination position $P_{DEST}$ at 2226. When the control circuit determines that the covering material is the destination position $P_{DEST}$ at 2228, the control circuit may stop controlling the motor drive circuit to move the covering material and store a record of the movement of the covering material along with timing information (e.g., a time stamp indicating a time at which the movement occurred) at 2230, before the procedure 2200 ends at 2232.

Figure 50:
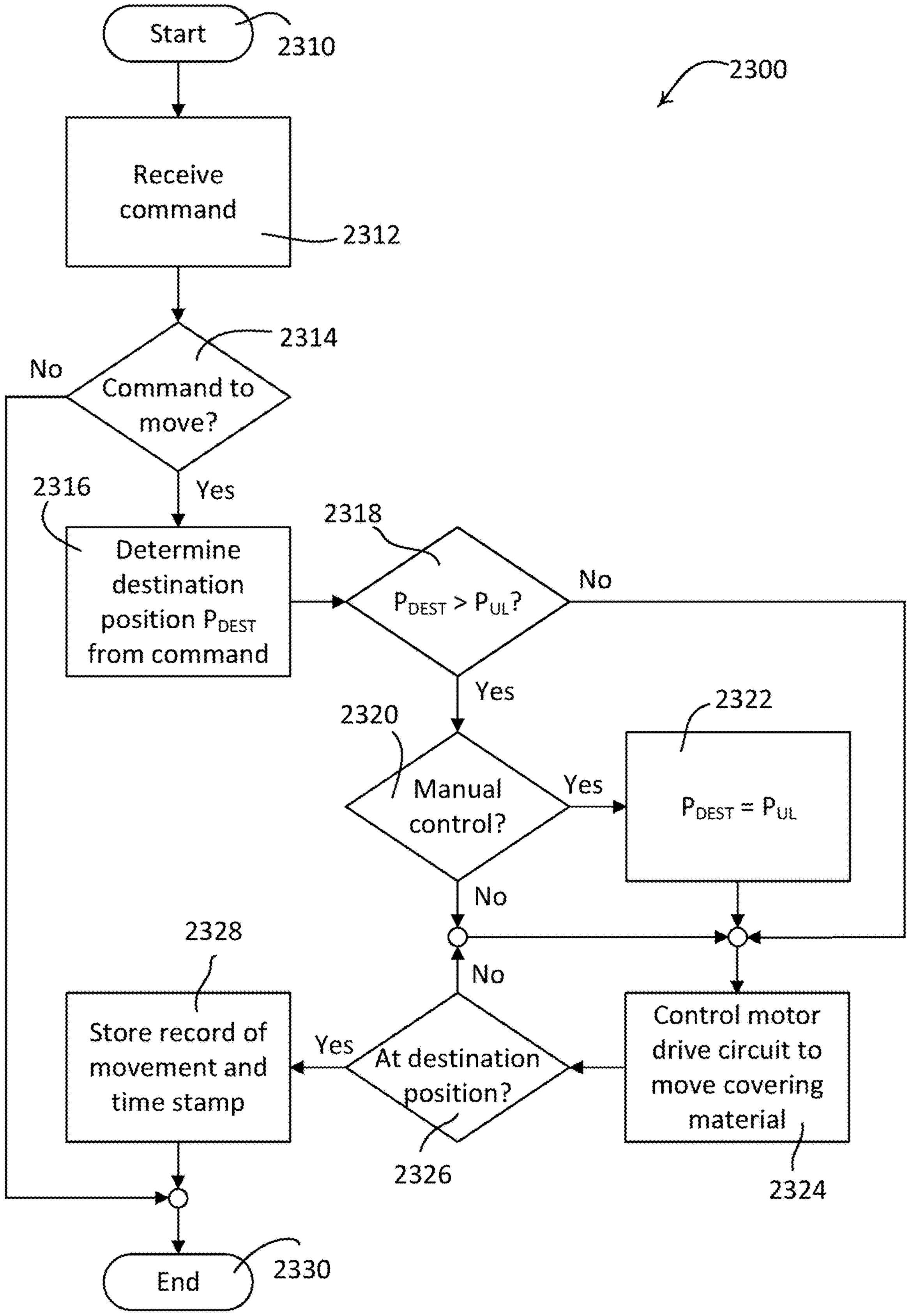

FIG. 50 is a flowchart of an example procedure 2300 for adjusting a present position $P_{PRES}$ of a covering material of a motorized window treatment (e.g., the motorized window treatments of the embodiments shown in FIGS. 1-33 or FIGS. 51-57). The procedure 2300 may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motorized window treatment may comprise a bottom bar connected to a bottom end of the covering material and one or more solar cells located on the bottom bar. The motor drive unit may be configured to control a present position $P_{PRES}$ of the covering material. The control circuit of the motor drive unit may execute the procedure 2300 to adjust the present position $P_{PRES}$ of the covering material while allowing a user to manually adjust the covering material above an upper limit position $P_{UP\text{-}LIMIT}$ of the motorized window treatment. For example, the control circuit may execute the procedure 2300 periodically at 2310. In addition, the control circuit may execute the procedure 2300 in response to receiving a message via a communication circuit at 2310.

At 2312, the control circuit of the motor drive unit may receive a command. For example, the control circuit may receive a message including a command via a communication circuit (e.g., the communication circuit 622). The command may be, for example, a command to move the covering material (e.g., a shade movement command to adjust the present position $P_{PRES}$ of the covering material). For example, the command may include a commanded position $P_{CMD}$ to which the control circuit of the motor drive unit should control the present position $P_{PRES}$ of the covering material. In addition, the command may include a command to raise or lower the present position $P_{PRES}$ of the covering material, and the control circuit may be configured to adjust the present position $P_{PRES}$ of the covering material by a predetermined amount $\Delta P$ in response to receiving the command. In some examples, the control circuit may be configured to start raising or lowering the covering material in response to receiving a message including a raise command or a lower command, respectively, and may stop raising or lowering the present position $P_{PRES}$ of the covering material in response to receiving a message including a stop command. Further, the command in the message received at 2312 may not be a command to move the covering material, but may be a command to enter a mode (e.g., a configuration mode), a command to transmit status information of the motor drive unit, and/or other commands that are not movement commands. Additionally or alternatively, the command may be received in response to an actuation of one or more of the buttons of the motor drive unit (e.g., the button of the user interface circuit 624). For example, the control circuit may be configured to raise or lower the present position $P_{PRES}$ of the covering material by a predetermined amount $\Delta P$ in response to detecting an actuation of a first button or a second button, respectively, of the motor drive unit. In addition, the control circuit may be configured to start raising or lowering the covering material in response to detecting a first actuation of the first button or the second button, respectively, and may stop raising or lowering the present position $P_{PRES}$ of the covering material in response to detecting a second subsequent actuation of the first button or the second button, respectively.

At 2314, the control circuit of the motor drive unit may be configured to determine if the command received at 2312 is a command to move the covering material (e.g., a shade movement command). When the command is not a command to move the covering material at 2314, the procedure 2300 may end at 2330. When the command is a command to move the covering material at 2314, the control circuit may at 2316 determine a destination position $P_{DEST}$ for the covering material based on the command in the message received at 2312. For example, when the message includes a commanded position $P_{CMD}$, the control circuit may set the destination position $P_{DEST}$ equal to the commanded position $P_{CMD}$ at 2316. In addition, when the message includes a raise command or a lower command, the control circuit may set the destination position to be a predetermined amount $\Delta P$ from the present position $P_{PRES}$ before movement of the covering material starts at 2316 (e.g., $P_{DEST}=P_{PRES}+\Delta P$ when the command is a raise command or $P_{DEST}=P_{PRES}-\Delta P$ when the command is a lower command).

At 2318, the control circuit may determine if the destination position $P_{DEST}$ is above (e.g., is greater than) the upper limit position $P_{UP\text{-}LIMIT}$. When the destination position $P_{DEST}$ is above (e.g., is greater than) the upper limit position $P_{UP\text{-}LIMIT}$, the control circuit may determine at 2320 if the command was received at 2312 via manual control (e.g., in response a manual input provided by a user of the motorized window treatment, such as a button press, rather than automated control). When the control circuit determines that the command was not received via manual control at 2320, the control circuit may limit the present position $P_{PRES}$ of the covering material to be less than (e.g., less than or equal to) the upper limit position $P_{UP\text{-}LIMIT}$ by setting the destination position $P_{DEST}$ equal to the upper limit position $P_{UP\text{-}LIMIT}$ at 2322. When the control circuit determines that the command was received via manual control at 2320, the control circuit maintains the destination position $P_{DEST}$ as determined from the command at 2316.

After limiting the destination position $P_{DEST}$ to the upper limit position $P_{UP\text{-}LIMIT}$ at 2322 or maintaining the destination position $P_{DEST}$ as determined from the command at 2316, the control circuit may control the motor drive circuit to rotate the motor to move the covering material towards the destination position $P_{DEST}$ at 2324. For example, the control circuit may be configured to generate at least one drive signal (e.g., the at least one drive signal $V_{DR}$) for controlling the motor drive circuit to control the rotational speed and the direction of rotation of the motor. At 2326, the control circuit of the motor drive unit may be configured to determine if the covering material is at the destination position $P_{DEST}$. When the control circuit determines that the covering material is not at the destination position $P_{DEST}$ at 2326, the control circuit may continue to control the motor drive circuit to move the covering material towards the destination position $P_{DEST}$ at 2324. When the control circuit determines that the covering material is the destination position $P_{DEST}$ at 2326, the control circuit may stop controlling the motor drive circuit to move the covering material and store a record of the movement of the covering material along with timing information (e.g., a time stamp indicating a time at which the movement occurred) at 2328, before the procedure 2300 ends at 2330.

Although features and elements may be described herein in particular combinations, each feature or element may be used alone or in any combination with the other features and elements. While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

While the motorized window treatment systems described herein have included window treatment assemblies having roller tubes and respective covering materials wrapped around the roller tubes, the features and elements may be described herein may be applied to other types of motorized window treatment systems, such as motorized cellular shade systems, Roman shade systems, and Venetian blind systems.

Finally, although the motorized window treatment systems described herein are described with reference to the processing and/or procedures (e.g., the procedures described with reference to FIG. 34-50) being performed by the control circuit of the motor drive unit and/or the control circuit of the bottom bar of the motorized window treatment, in some examples, the processing and/or procedures may be performed by a system controller (e.g., the system controller 110). In such examples, the control circuit of the bottom bar may be configured to send one or more messages to the system controller that indicates measurements recorded by the bottom bar module and/or one or more operational characteristics of the bottom bar module (e.g., measurement of the magnitude of the photovoltaic output voltage $V_{PV}$ generated by the solar cells of the bottom bar, measurement of the magnitude of the second storage voltage $V_{S-B}$ generated across the energy storage element of the bottom bar, operational characteristic of the solar cell management circuit, such as the duty cycle $DC_{SCM}$ of the solar cell management circuit, etc.).

Figure 51:
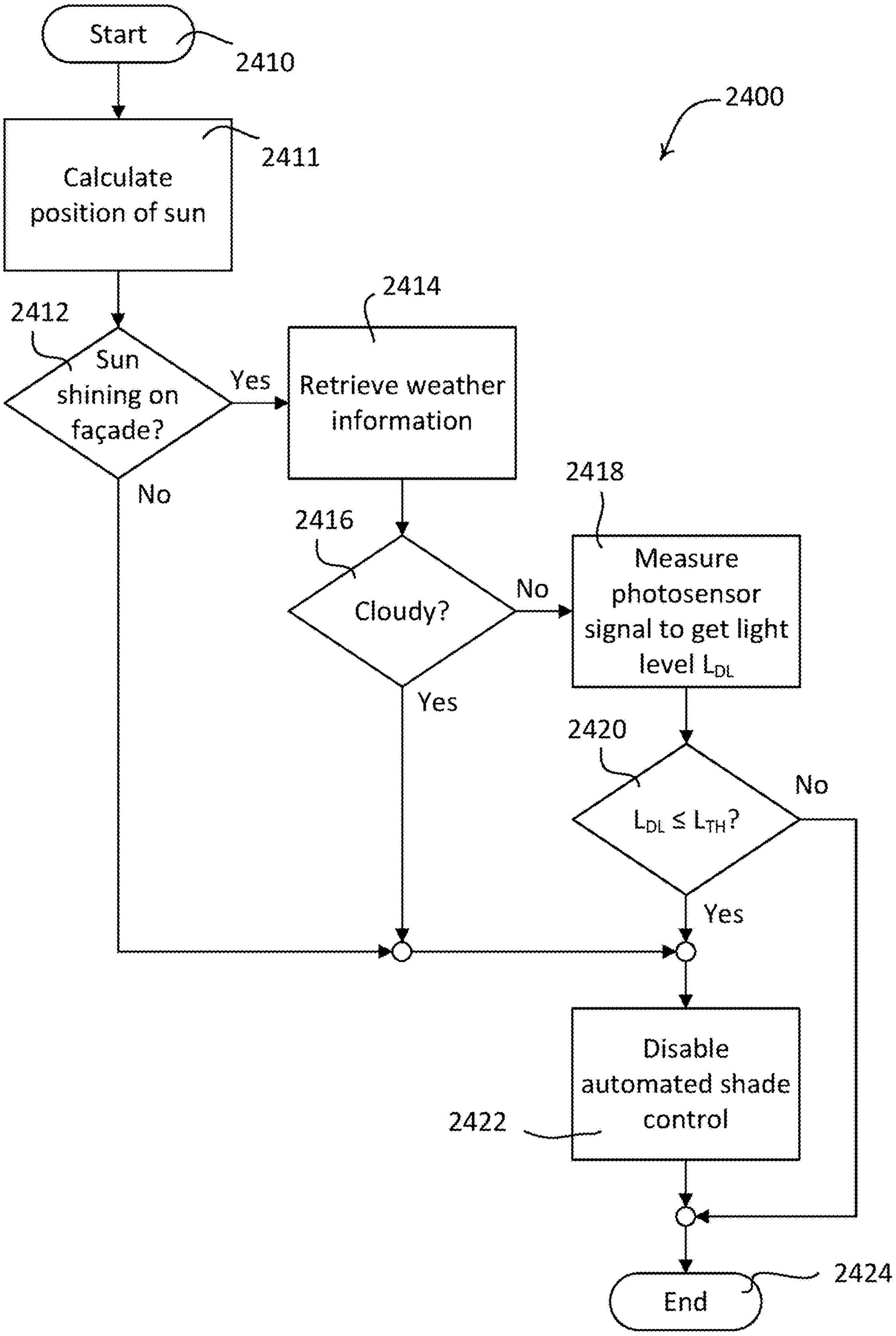
FIG. 51 is a flowchart of an example procedure that may be executed by a control circuit of a motor drive unit of the motorized window treatment.

FIG. 51 is a flowchart of an example procedure 2400 that may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motorized window treatment may comprise a bottom bar connected to a bottom end of the covering material and one or more solar cells located on the bottom bar. As described herein, in some examples, the motor drive unit of multiple the motorized window treatments may be coupled together via a power bus (e.g., a DC power bus). The control circuit may execute the procedure 2400 to disable automated shade control (e.g., disable automated movements of the bottom bar by the motor drive unit in response to, for example, timeclock schedules). The control circuit may execute the procedure 2400 periodically.

The procedure 2400 may start at 2410. At 2412, the control circuit may calculate the position of the sun, for example, as described herein. The control circuit may calculate the position of the sun based on a predicted position of the sun. Alternatively, the control circuit may receive an indication of the predicted position of the sun from a system controller. At 2412, the control circuit may determine whether the sun may be shining on a façade of the building of which the motorized window treatment is installed. Since there may be cloud cover or another obstruction between the façade and the sun, the predicted position of the sun may indicate whether there is potentially sun shining on the façade of the building of which the motorized window treatment is installed, for instance, as described herein. For example, the control circuit may be configured to determine whether the sun may be shining on the façade of which the motorized window treatment is installed at 2412 by comparing the calculated solar altitude angle $a_t$ and/or the calculated solar azimuth angle as to one or more thresholds to determine if the calculated solar altitude angle $a_t$ and/or the calculated solar azimuth angle $a_s$ are within ranges that indicate that the sun may be shining on the façade.

If the control circuit determines that the sun is not shining on the façade, the control circuit may disable automated shade control at 2422, and the procedure 2400 may exit at 2424. If the control circuit determines that the sun is not shining on the façade, the control circuit may ignore or disable any scheduled movements of the bottom bar (e.g., based on one or more timeclocks), for example, to allow the bottom bar to dock while it is not likely capturing much solar energy via the solar cells.

If the control circuit determines that the sun may be shining on the façade at 2412, the control circuit may retrieve weather information (e.g., temperature, cloud coverage, precipitation, barometric pressure, etc.) at 2414. For example, the control circuit may retrieve the weather information (e.g., directly or indirectly, via a system controller) from a weather service (e.g., via the Internet), a weather application, and/or a weather application programming interface (API). At 2416, the control circuit may determine whether it is cloudy at the location of the motorized window treatment based on the weather information. If the control circuit determines that it is cloudy at 2416, the control circuit may disable automated shade control at 2422, and the procedure 2400 may exit at 2424.

If the control circuit determines that it is not cloudy at 2416, the control circuit may determine whether the light level $L_{DL}$ is less than or equal to a threshold light level $L_{TH}$ at 2420 If the control circuit determines that the light level $L_{DL}$ is greater than the threshold light level $L_{TH}$, the procedure 2400 may exit at 2424. If the control circuit determines that the light level $L_{DL}$ is less than or equal to the threshold light level $L_{TH}$ at 2420, the control circuit may disable automated shade control at 2422, and the procedure 2400 may exit at 2424.

As such, if the control circuit determines that the sun is not shining on the façade, it is cloudy, and/or the light level $L_{DL}$ is less than or equal to the threshold light level $L_{TH}$ (e.g., it is not sunny out), the control circuit may disable automated shade control, for example, so that the bottom bar can dock while it is not likely capturing much solar energy via the solar cells.

Figure 52A:
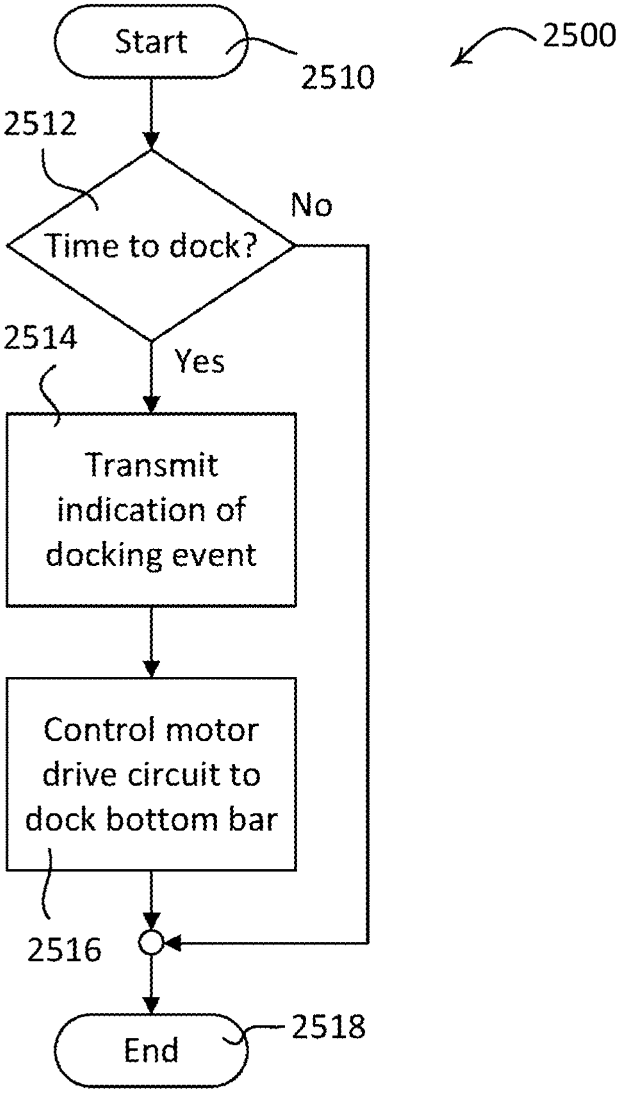
FIGS. 52A-52B are flowcharts of example procedures that may be executed by a control circuit of a motor drive unit of the motorized window treatment.

FIG. 52A is a flowchart of an example procedure 2500 that may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motorized window treatment may comprise a bottom bar connected to a bottom end of the covering material and one or more solar cells located on the bottom bar. The motorized window treatment may be installed along a façade of a building with one or more other motorized window treatments. In such installations, it may be desirable to align the position of the covering materials of the motorized window treatments so that the bottom bars are aligned with each other along the façade of the building. Further, it might be beneficial for the motorized window treatments to all receive solar data at substantially the same position. The control circuit of the motorized window treatment may perform the procedure 2500 to communicate docking events to other motorized window treatments (e.g., other motorized window treatments that are along the same façade of a building and that have docks and solar cells). The control circuit may execute the control procedure 2500 periodically, in response to receiving a command to dock, and/or in response to a docking events, such as a timeclock event/schedule and/or in response to the energy storage element of a motor drive unit rising above or falling below a preconfigured level.

The procedure 2500 may start at 2510. At 2512, the control circuit of the motor drive unit may be configured to determine if the motor drive unit should presently dock the bottom bar. For example, the control circuit may be configured to determine that the bottom bar should be docked when the space in which the motorized window treatment is installed is vacant and the magnitude of a first storage voltage $V_{S-A}$ produced across an energy storage element of the motor drive unit is less than a low-charge threshold $V_{TH-LC}$, and/or the space is occupied and the magnitude of the first storage voltage $V_{S-A}$ produced across the energy storage element of the motor drive unit is less than a critical-charge threshold $V_{TH-CRIT}$ (e.g., as shown in FIG. 35). In addition, the control circuit may determine to that the bottom bar should be docked when the magnitude of a second storage voltage $V_{S-A}$ produced across an energy storage element of the bottom bar module is greater than a high-charge threshold $V_{TH-HC}$ (e.g., as shown in FIG. 36A). Further, the control circuit of the motor may be configured to determine that the bottom bar should be docked in response to the present day of the week and/or the time of the day. In addition, the control circuit of the motor may be configured to determine when the bottom bar should be docked as shown in any of the procedures in FIGS. 36B-36G). When the control circuit determines that the motor drive unit should not presently dock the bottom bar at 2512, the procedure 2500 may end at 2518.

If the control circuit determines that the motor drive unit should presently dock the bottom bar at 2512, the control circuit may transmit (e.g., via the communication circuit) an indication of the docking event to one or more other motorized window treatments and/or a system controller at 2514. For example, the control circuit may transmit the indication, which may announce to other motorized window treatments that the control circuit is going to control the position of the covering material to dock the bottom bar. In some examples, in response to the reception of the indication of the docking event, other motorized window treatment may be configured to dock their respective bottom bars at the same time (e.g., if those motorized window treatments are along the same façade of the building as the motorized window treatment that transmitted the indication of the docking event). For instance, the motorized window treatments along the same façade of a building may be grouped together during a commissioning procedure (e.g., by a system controller) and, for example, may be assigned a façade number so that the grouped motorized window treatments may dock their respective bottom bars together. In some instances, the façade information could be entered when the motorized window treatments are installed (e.g., using a configuration application running on a mobile device, such as the mobile device 180).

At 2516, the control circuit may control a motor drive circuit of the motor drive unit (e.g., the motor drive circuit 612) to dock the bottom bar (e.g., to adjust the present position $P_{PRES}$ of the covering material to the raised position $P_{RAISED}$), before the procedure 2500 ends at 2518.

Figure 52B:
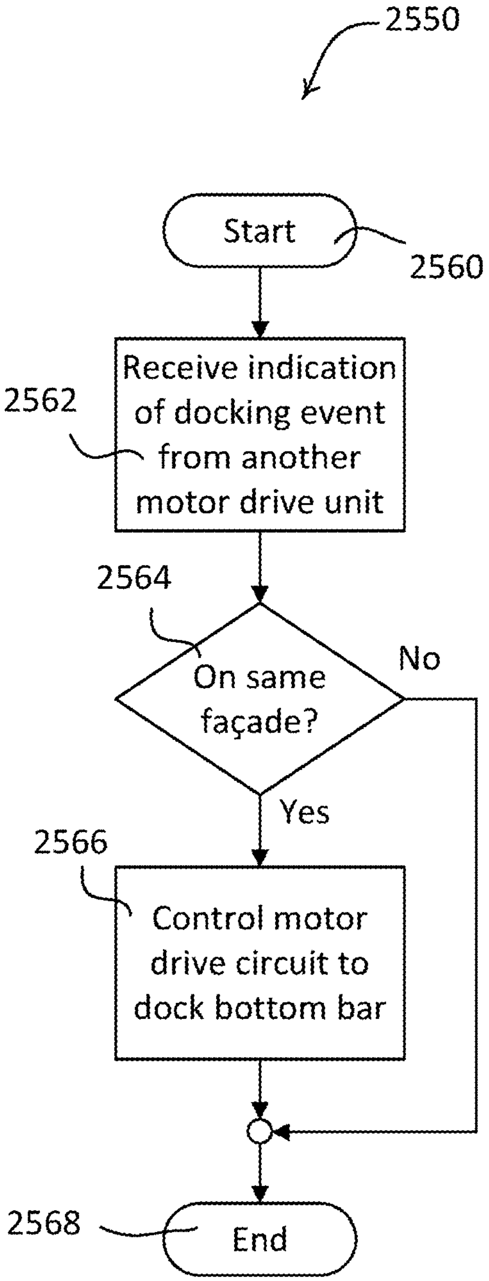

FIG. 52B is a flowchart of an example procedure 2550 that may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motorized window treatment may comprise a bottom bar connected to a bottom end of the covering material and one or more solar cells located on the bottom bar. The motorized window treatment may be installed along a façade of a building with one or more other motorized window treatments. As noted herein, in such installations, it may be desirable to align the position of the covering materials of the motorized window treatments so that they are aligned along the façade of the building. Further, it might be beneficial for the motorized window treatments to all receive solar data at substantially the same position. The control circuit of the motorized window treatment may perform the procedure 2550 to coordinate its docking event with the docking events of other motorized window treatments (e.g., other motorized window treatments that are along the same façade of a building and that have docks and solar cells). The control circuit may execute the control procedure 2550 in response to receiving an indication of a docking event of another motorized window treatment.

The procedure 2550 may start at 2560. At 2562, the control circuit may receive an indication of a docking event of another motorized window treatment. As described herein, another motorized window treatment may transmit an indication of a docking event to the motorized window treatment (e.g., directly, or indirectly via a system controller).

At 2564, the control circuit may determine whether it is on the same façade as the motorized window treatment that transmitted the indication of the docking event. For example, the indication may include a façade number, and the control circuit may determine whether the motorized window treatment is assigned the same façade number as the indication. As noted herein, in some examples, the motorized window treatments along the same façade of a building may be grouped together during a commissioning procedure (e.g., by a system controller) and, for example, may be assigned the same façade number so that the grouped motorized window treatments dock together. In some instances, the façade information could be entered when the motorized window treatments are installed.

If the control circuit determines that the motorized window treatment is not on the same façade as the motorized window treatment that transmitted the indication, the control circuit may exit the procedure 2550 at 2568. If the control circuit determines that the motorized window treatment is on the same façade as the motorized window treatment that transmitted the indication, the control circuit may control a motor drive circuit of the motor drive unit (e.g., the motor drive circuit 612) to dock the bottom bar (e.g., to adjust the present position $P_{PRES}$ of the covering material to the raised position $P_{RAISED}$), before the procedure 2550 ends at 2568.

In some examples, the system may include a façade manager that is configured to control (e.g., orchestrate) the docking (e.g., and/or other movements) of a plurality of motorized window treatments installed along the façade of a building. The façade manager may be a system controller, a dedicated façade controller, and/or one of the motorized window treatments may be assigned as the master device. The façade manager may be configured to receive and store the storage levels of the motor drive units of the motorized window treatments along the façade, and send messages to control the position of the bottom bars of the motorized window treatments along the façade based on the storage levels (e.g., dock the bottom bars of the motorized window treatments along the façade). Further, in some examples, the façade manager may be configured to receive and storage the solar data from all of the motorized window treatments along the façade, and determine the position of the bottom bars of the motorized window treatments along the façade based on the solar data such that the bottom bars of the motorized window treatments are aligned along the façade (e.g., at the same position along the façade). For instance, the façade manager could determine the position for the bottom bars of the motorized window treatments based on an average of the positions where each of the motorized window treatments collected the maximum solar data. The façade manager may be configured to perform one or more of the procedures described herein to control the position of the bottom bars of the motorized window treatments along the façade. For instance, the façade manager could perform the procedure 800, 900, 910, 920, 930, 940, 950, 960, 1940, 1950, 1980, 2000, and/or 2100 for a plurality of motorized window treatments along a façade, to list a few, non-limiting examples.

Figure 53:
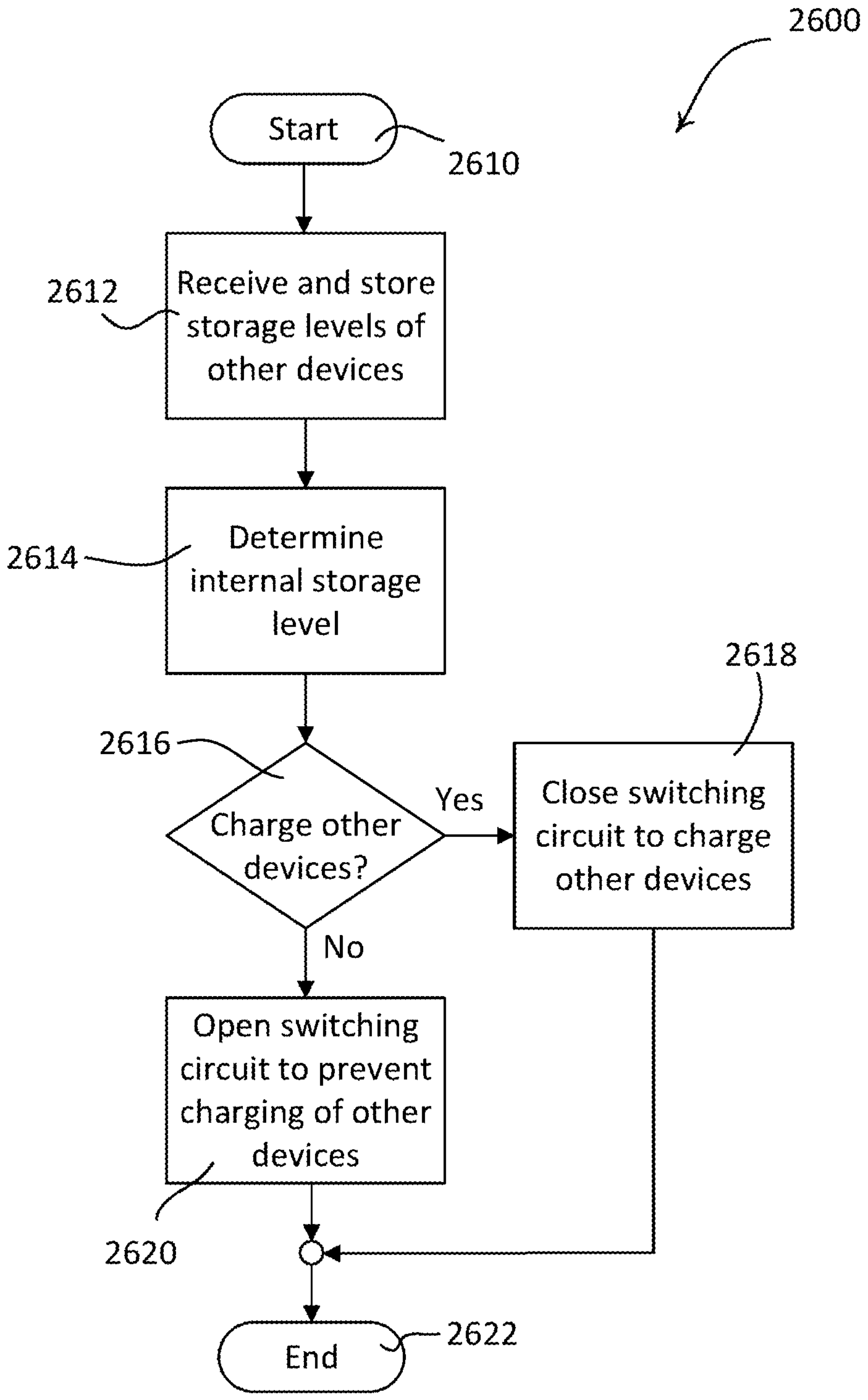
FIG. 53 is a flowchart of an example procedure that may be executed by a control circuit of a motor drive unit of the motorized window treatment to share load between motorized window treatments that are couple to a power bus.

FIG. 53 is a flowchart of an example procedure 2600 that may be executed by a control circuit of a motor drive unit of the motorized window treatment (e.g., the control circuit 620 of the motor drive unit 610 shown in FIG. 33 and/or control circuits of the motor drive units shown in FIGS. 1-32 or FIGS. 51-57). The motorized window treatment may comprise a bottom bar connected to a bottom end of the covering material and one or more solar cells located on the bottom bar. As described herein, in some examples, the motor drive unit of multiple the motorized window treatments may be coupled together via a power bus (e.g., a DC power bus). The motor drive units of the motorized window treatments may be configured to charge the energy storage elements of the motor drive unit of one or more of the other motorized window treatments via the power bus. The power bus may be electrically coupled to the motor drive units in a daisy-chain configuration (e.g., with the motor drive units coupled in parallel). The power bus may comprise two electrical conductors (e.g., wires) across which the storage voltage of the energy storage element of the motor drive unit of one or more of the motorized window treatments may be coupled for charging the energy storage elements of the motor drive units of the one or more other motorized window treatments. The control circuit may execute the procedure 2600 in response to receiving a message along the power bus. The control circuit may execute the control procedure 2600 periodically. In addition, the control circuit may start the control procedure 2600, for example, in response to a timeclock event/schedule and/or in response to the energy storage element of a motor drive unit reaching a preconfigured level.

The procedure 2600 may start at 2610. At 2612, the control circuit may receive and store the storage levels of one or more other motor drive units that are coupled to the power bus. At 2614, the control circuit may determine the storage level of the energy storage element of the motorized window treatment, for example, by sampling the first storage voltage $V_{S-A}$ produced across the energy storage element of the motor drive unit.

At 2616, the control circuit may determine if the motorized window treatment should charge an energy storage element of another motorized window treatment coupled to the power bus. When determining whether to charge another motorized window treatment, the control circuit may, for example, consider any combination of the storage level of the other devices, which other device has the lowest storage level, a message received from the system controller, a message received from another device, whether another device is charging from the power bus, whether another device is in use (e.g., whether another device is experiencing a high-power demand event), a timeclock schedule, and/or a history of usage events of the other devices (e.g., whether another device has an upcoming energy usage event).

If the control circuit determines that the load control device should not charge an energy storage element of another motorized window treatment connected to the power bus, the control circuit may render controllable switching circuit non-conductive at 2620 and exit the control procedure 2600 at 2622.

If the control circuit determines that the load control device should charge another device in the DC power distribution system at 2616, the control circuit may render a controllable switching circuit (e.g., the switching circuit 636) of the motorized window treatment conductive at 2618 (e.g., for a predetermined amount of time). By rendering the controllable switching circuit conductive, the control circuit may bypass the charging circuit (e.g., the charging circuit 352 and the diode D354) and allow its internal energy storage element to charge energy storage element(s) of other devices coupled to the DC power bus. As described herein, the motorized window treatment may include a switching circuit coupled between the storage voltage $V_{S-A}$ and one of the electrical connections, and the control circuit may be configured to generate a switch control signal $V_{SW}$ for rendering the switching circuit conductive and non-conductive for controllably providing the storage voltage $V_{S-A}$ the electrical connections. The control circuit may be configured to generate the switch control signal $V_{SW}$ to render the switching circuit conductive to charge energy storage elements of one or more of the other motor drive units coupled to the power bus. After the control circuit renders the controllable switching circuit conductive at 2618, the control circuit may exit the control procedure 2600 at 2622.

Figure 54A:
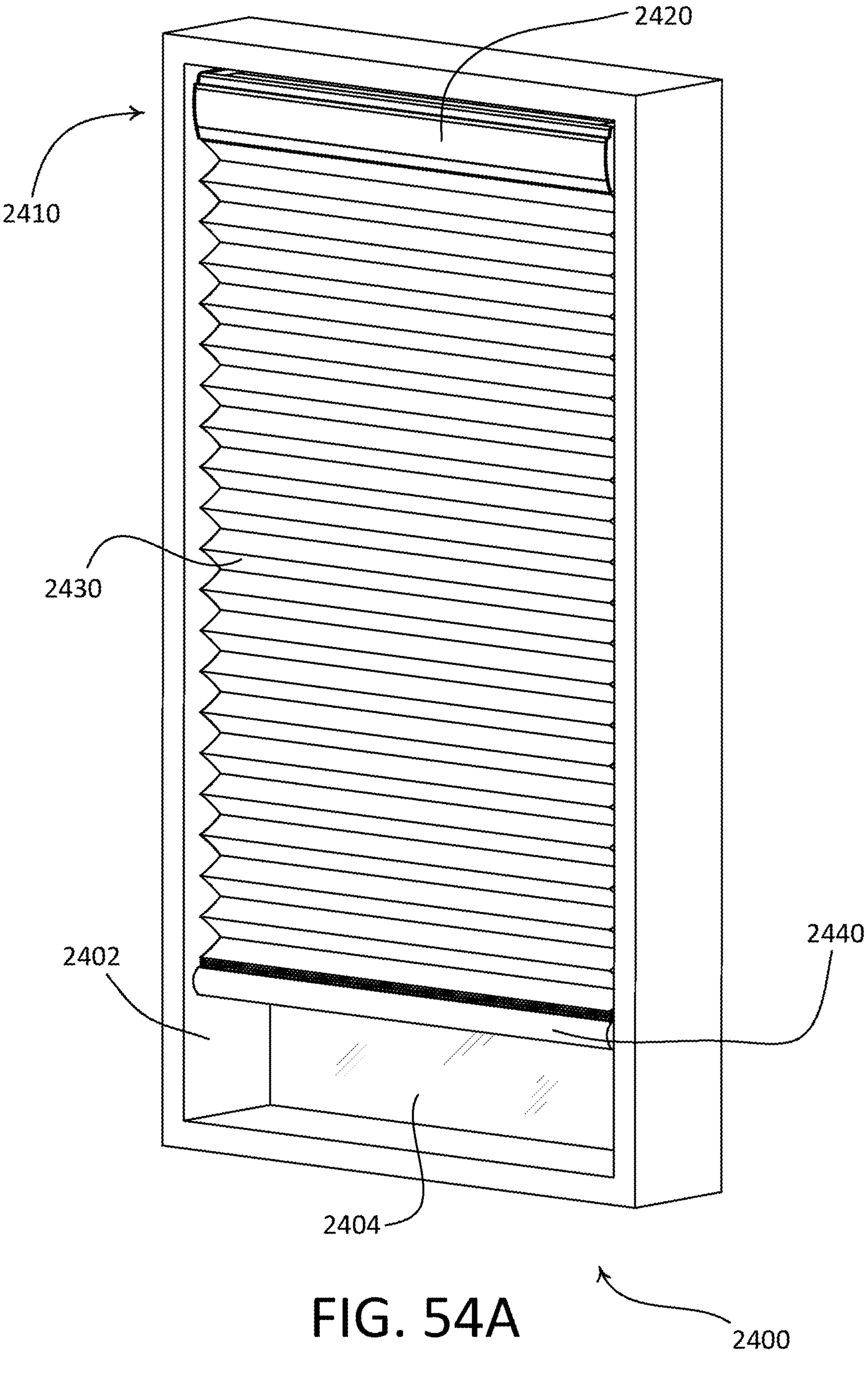
FIG. 54A is a perspective view of an example motorized window treatment having a motorized window treatment mounted in an opening.

FIG. 54A is a perspective view of a motorized window treatment 2400 having a motorized window treatment 2410 mounted in an opening 2402, for example, in front of a window 2404. The motorized window treatment 2410 comprises a covering material 2412, for example, a cellular shade fabric as shown in FIG. 54A. For example, the covering material 2412 may comprise a plurality of cells that are formed when two sheets of fabric are attached to each other. The cells of the covering material 2412 may extend horizontally across the width of the covering material 2412. The covering material 2412 has a top end connected to a headrail 2420 and a bottom end connected to a bottom bar 2416. The bottom bar 2416 may be a weighted bar (e.g., a hembar) attached to the bottom end of the covering material 2412. The bottom bar 2416 may include a bottom bar module (e.g., the bottom bar module 640) that includes a control circuit (e.g., the control circuit 650).

The covering material 2412 may hang in front of the window 2404. The motorized window treatment 2410 may be configured to adjust the covering material 2412 between a raised position $P_{RAISED}$ (e.g., a fully-raised position and/or a fully-open position) and a lowered position $P_{LOWERED}$ (e.g., a fully-lowered position and/or a fully-closed position) to control the amount of daylight entering a room or space. The cells of the covering material 2412 may successively expand and contract when the covering material 2412 is operated between the raised position $P_{RAISED}$ and the lowered position $P_{LOWERED}$. Alternatively, the motorized window treatment 2410 could be mounted externally to the opening 2402 (e.g., above the opening) with the covering material 2412 hanging in front of the opening and the window 2404. In addition, the motorized window treatment 2410 could alternatively comprise other types of covering materials, such as, for example, a plurality of horizontally-extending slats (e.g., a Venetian or Persian blind system).

Figure 54B:
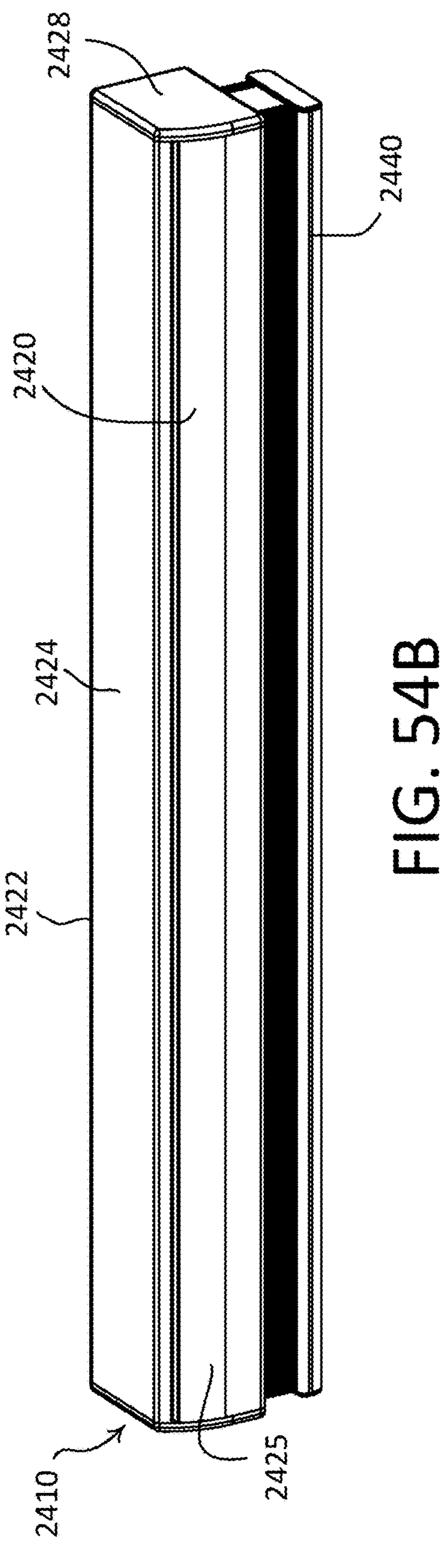
FIG. 54B is a front perspective view of the motorized window treatment of FIG. 54A with the covering material in the raised position.
Figure 54C:
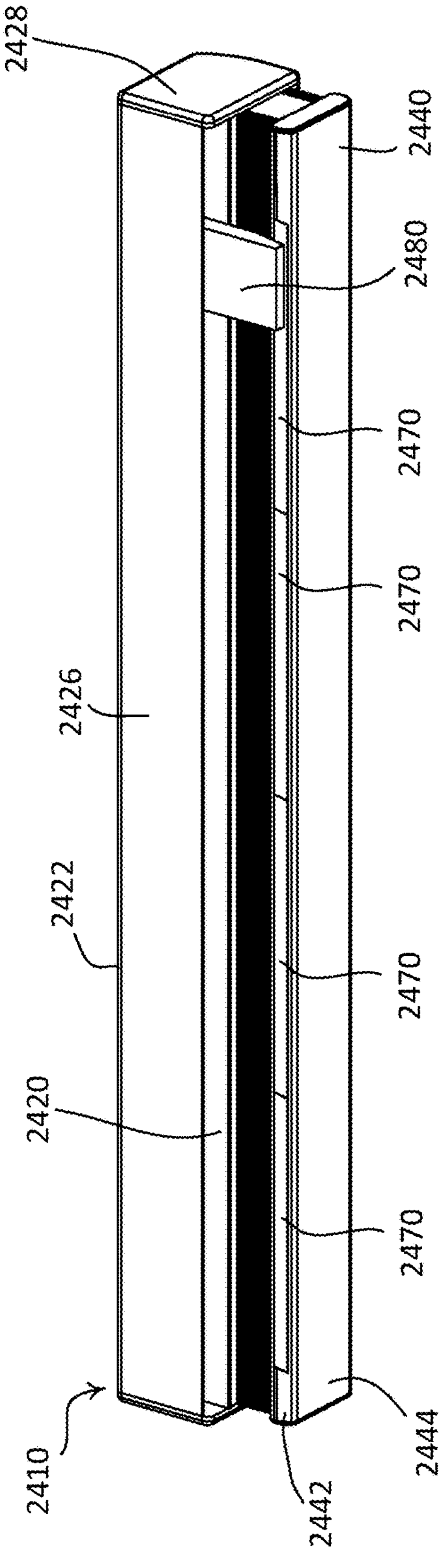
FIG. 54C is a rear perspective view of the motorized window treatment of FIG. 54A with the covering material in the raised position.
Figure 54D:
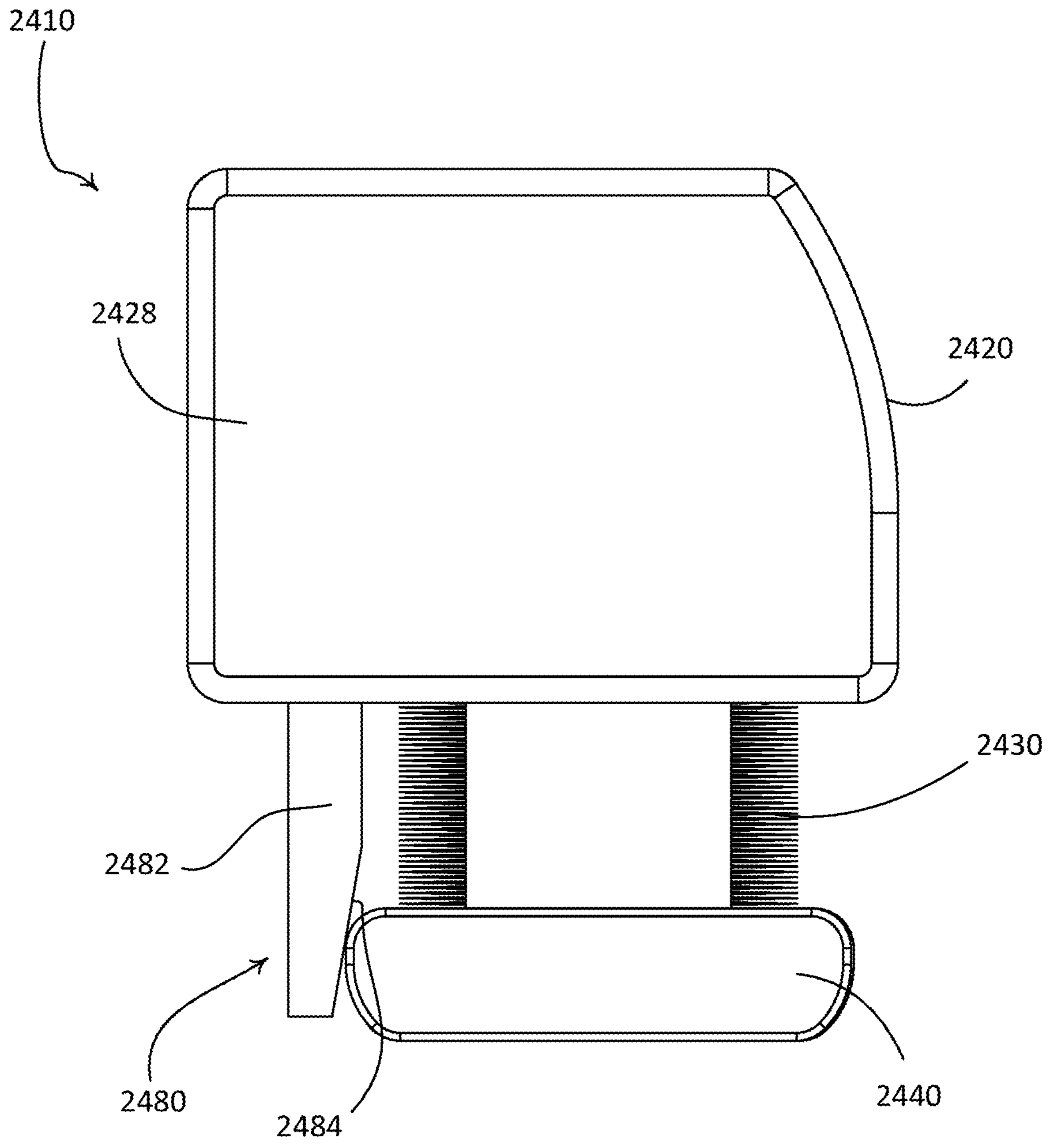
FIG. 54D is a left side view of the motorized window treatment of FIG. 54A with the covering material in the raised position.
Figure 54E:
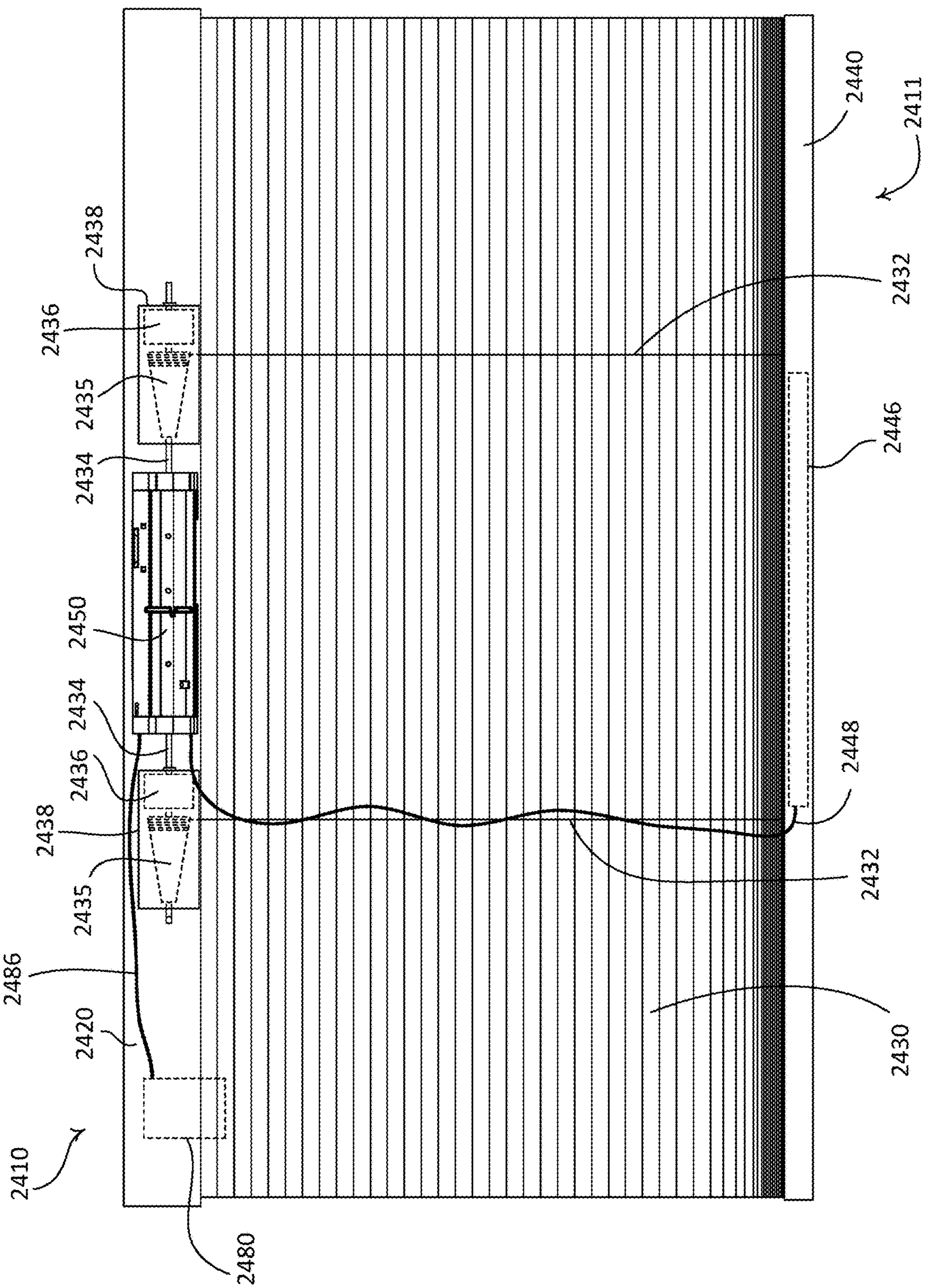
FIG. 54E is a front view of the motorized window treatment of FIG. 54A with a front portion of the headrail removed and the covering material in a lowered position.

FIG. 54B is a front perspective view, FIG. 54C is a rear perspective view, and FIG. 54D is a left side view of the motorized window treatment 2410 with the covering material 2412 in the raised position $P_{RAISED}$. FIG. 54E is a front view of the motorized window treatment 2410 with a front portion 2425 of the headrail 2414 removed and the covering material 2412 in a lowered position (e.g., a partially-lowered position or the lowered position $P_{LOWERED}$). The motorized window treatment 2410 may comprise a motor drive unit 2420 for raising and lowering the bottom bar 2416 and the covering material 2412 between the raised position $P_{RAISED}$ and the lowered position $P_{LOWERED}$. By controlling the amount of the window 2404 being covered by the covering material 2412, the motorized window treatment 2410 is able to control the amount of daylight entering the room. The motor drive unit 2420 may be an example of the motor drive unit 610. The motor drive unit 2420 may include a control circuit (e.g., the control circuit 620).

The motorized window treatment 2410 may comprise lift cords 2432 that extend from the headrail 2420 to the bottom bar 2440 for allowing the motor drive unit 2450 to raise and lower the bottom bar (e.g., control the covering material between the fully-raised position and fully-lowered position). The motor drive unit 2450 may include an internal motor (not shown) that may be coupled to drive shafts 2434 that extend from the motor drive unit 2450 on each side of the motor drive unit 2450 and are each coupled to a respective lift cord spool 2435. The motor 612 of the motor drive unit 610 may be an example of an internal motor of the motor drive unit 2450. The lift cords 2432 may be windingly received around the lift cord spools 2435 and fixedly attached to the bottom bar 2440, such that the motor drive unit 2450 is able to rotate the drive shafts 2434 to raise and lower the weighting element. The motorized window treatment 2410 may further comprise two constant-force spring assist assemblies 2436, which are each coupled to the drive shafts 2434 adjacent to one of the two lift cord spools 2434. Each of the lift cord spools 2435 and the adjacent constant-force spring assist assembly 2436 may be housed in a respective lift cord spool enclosure 2438 as shown in FIG. 54E. Alternatively, the motor drive unit 2450 could be located at either end of the headrail 2420 and the motorized window treatment 2410 could comprise a single drive shaft that extends along the length of the headrail and is coupled to both of the lift cord spools 2435.

The motorized window treatment 2410 may comprise a cover 2422. The cover 2422 may be configured to enclose at least a portion of the headrail 2420 and may allow for mounting of the headrail 2420 to a surface. The cover 2440 may be metallic (e.g., at least partially metallic). The cover 2422 may comprise a top plate 2424 and a rear plate 2426. The top plate 2424 may extend substantially perpendicular to the rear plate 2426. The top plate 2424 may be configured to extend over an upper portion of the headrail 2420. The rear plate 2426 may be configured to extend over a rear portion of the headrail 2420. The rear portion of the headrail may face the structure. The motorized window treatment 2410 may comprise end covers 2428. The end covers 2428 may be configured to be removably attached to respective ends of the headrail 2420. The end covers 2428 may be configured to enclose openings at the respective ends of the headrail 2420.

The motorized window treatment 2410 may comprise a window treatment assembly 2411. The window treatment assembly 2411 may comprise the headrail 2420, the covering material 2430, the motor drive unit 2450, the lift cord(s) 2432, the drive shaft(s) 2434, the lift cord spool(s) 2435, the lift cord spool enclosure(s) 2438, the bottom bar 2440, and/or the end covers 2428.

As shown in FIG. 54C, the bottom bar 2440 may comprise one or more solar cells 2470 (e.g., photovoltaic cells, such as the solar cells 270 or the solar cells 642). The solar cells 2470 may be attached to a rear surface 2442 of a housing 2444 of the bottom bar 2440, such that the solar cells 2470 face the window (e.g., that the covering material 2430 is configured to cover) and are able to receive solar energy from outside the building (e.g., from the sun). For example, the solar cells 2470 may be located within a recess (e.g., such as the recess 248) in the housing 2444 of the bottom bar 2440. The rear surface 2442 of the housing 2474 of the bottom bar 2440 may be oriented at an angle from a vertical axis, such that the solar cells 2470 may be angled up (e.g., towards the sky to maximize the amount of sunlight that may shine on the solar cells 2470).

The solar cells 2470 of the bottom bar 2440 may be electrically connected to one or more energy storage elements (not shown) contained within the housing 2444 of the bottom bar 2440. The energy storage elements of the bottom bar 2440 may comprise, for example, one or more of rechargeable batteries and/or supercapacitors. The energy storage element 646 of the bottom bar module 640 may be an example of the energy storage elements of the bottom bar 2440. The solar cells 2470 may be configured to convert the received solar energy into a photovoltaic output voltage, which may be used to charge the energy storage elements located within the housing 2444 of the bottom bar 2440 (e.g., to generate a storage voltage across the energy storage element). The energy stored in the energy storage elements of the bottom bar 2440 may be discharged into the motor drive unit 2450 when the bottom bar 2440 is close to the motor drive unit 2450, for example, when the bottom bar 2440 in the raised position $P_{RAISED}$ (e.g., the fully-raised position). For example, the motor drive unit 2450 may comprise one or more energy storage elements (not shown) configured to charge from the energy storage elements of the bottom bar 2440 when the covering material 2430 is in the raised position $P_{RAISED}$. For example, the energy storage elements of the motor drive unit 2450 may comprise one or more of rechargeable batteries and/or supercapacitors. The energy storage elements 630 of the motor drive unit 610 may be an example of the energy storage elements of the motor drive unit 2450.

The motorized window treatment 2400 (e.g., the headrail 2420) may comprise a dock 2480 that is configured to facilitate discharging of the energy storage elements of the bottom bar 2440 into the energy storage elements of the motor drive unit 2450, for example, when the covering material 2430 is in the raised position $P_{RAISED}$ (e.g., when the bottom bar 2440 is docked). The dock 2480 may be coupled to the motor drive unit 2450 via a cable 2486 that may facilitate energy transfer between the dock 2480 and the motor drive unit 2450. The dock 2480 may comprise a base portion 2482 that may be located adjacent to a rear surface of the covering material 2430 (e.g., adjacent to the window). The bottom bar 2440 may be configured to be positioned adjacent to the base portion 2482 of the dock 2480 when the covering material 2430 is in the raised position $P_{RAISED}$, such that the energy storage elements of the bottom bar 2440 may discharge through the base portion 2482 of the dock 2480 into the energy storage elements of the motor drive unit 2450. The base portion 2482 of the dock 2480 may define a contact surface 2484 that may be configured to abut against the rear surface 2442 of the bottom bar 2440 when the bottom bar 2440 is docked (e.g., when the covering material 2430 is in the raised position $P_{RAISED}$). The contact surface 284 of the base portion 2482 may be oriented at approximately an angle from the vertical axis (e.g., to match the rear surface 2442 of the bottom bar 2440). Although illustrated as the dock 2480, in other examples the motorized window treatment 2400 may comprise an alternative dock, such as the dock 280 of FIGS. 6-14, the dock 280*a* of FIG. 15, the dock 380 of FIGS. 17-18, dock 480 of FIGS. 19-22, the dock 580*a* of FIGS. 23-24, the dock 580*b* of FIG. 27-28, or the dock 580*c* of FIGS. 30-31.

In some examples, the bottom bar 2440 may include a bottom bar module 2446 (e.g., such as the bottom bar module 640) that may be located in the bottom bar 2440. For example, the electrical circuitry of the bottom bar module 2446 may be mounted to a printed circuit board (e.g., the printed circuit board 272) in the bottom bar. The bottom bar module 2446 may comprise one or more solar cells 2470 (e.g., photovoltaic cells) that may be mounted to a rear surface of the bottom bar 2440, for example, as shown in FIG. 54C. The solar cells 2470 may be configured to convert received solar energy into a photovoltaic output voltage $V_{PV}$. The bottom bar module 2446 may comprise electrical connections (e.g., the electrical connections 648) that are configured to be coupled to (e.g., electrically and/or inductively coupled to) the electrical connections of the motor drive unit 2450.

The bottom bar module 2446 may include a control circuit (e.g., the control circuit 650), memory, a communication circuit (e.g., the communication circuit 652), a sensor circuit (e.g., the sensor circuit 654), and/or a power supply (e.g., the power supply 656). The control circuit may include, for example, a microprocessor, a programmable logic device (PLD), a microcontroller, an application specific integrated circuit (ASIC), a field-programmable gate array (FPGA), or any suitable processing device or control circuit. The control circuit of the bottom bar module 2446 monitor the operation of the solar cells 2470 and/or an energy storage element of the bottom bar module 2446. The control circuit of the bottom bar module 2446 may be configured to receive one or more sense signals $V_{SNS}$ from a solar cell management circuit. The memory may be communicatively coupled to the control circuit for the storage and/or retrieval of, for example, operational settings of the bottom bar module 2446. The power supply may be configured to receive the second storage voltage $V_{S-B}$ and generate a low-voltage supply voltage $V_{CC-B}$ for powering the control circuit, the memory, the communication circuit, and/or the sensor circuit of the bottom bar module 2446.

The communication circuit may allow the control circuit to communicate messages (e.g., digital messages) with the communication circuit of the motor drive unit 2450 via a communication link, such as a cable 2448 that includes a wired communication link (e.g., a wired communication bus), and/or a wireless communication link, e.g., a radio-frequency (RF) communication link. For example, the control circuit of the bottom bar module 2446 may be configured to transmit messages including measurements recorded by the bottom bar module 2446 and/or one or more operational characteristics of the bottom bar module 2446. For example, the control circuit of the bottom bar module 2446 may be configured to transmit a message including an indication of a measurement of the magnitude of the photovoltaic output voltage $V_{PV}$ generated by the solar cells 2470 and/or an indication of a measurement of the magnitude of the second storage voltage $V_{S-B}$ generated across the energy storage element to the control circuit of the motor drive unit 2450. In addition, the control circuit of the bottom bar module 2446 may be configured to transmit a message an indication of an operational characteristic of the solar cell management circuit, such as the duty cycle $DC_{SCM}$ of the solar cell management circuit. Further, the cable 2448 may be configured to allow a wired connector to charge the motor drive unit 2450 via the bottom bar module 2446. For instance, rather than using the dock 2480, the bottom bar module 2446 may be electrically connected (e.g., directly electrically connected) to the motor drive unit via two electrical connections in the cable 2448. In some examples, the two electrical connections in the cable 2448 may be a wired bus, for example, where the wired bus may include a power bus for charging the motor drive unit from the bottom bar.

Further, as noted herein, the control circuit of the motor drive unit 2420 and/or the control circuit of the bottom bar may be configured to perform any combination of the procedures described herein (e.g., with reference to at least FIGS. 34A-53), such as those that describe the procedures to move a covering material of a motorized window treatment, dock a bottom bar of a motorized window treatment, collect (e.g., send and/or receive) solar data from the bottom bar, determine ideal positioning of the bottom bar, determine one or more dead bands between the raised position and the lowered position, etc.

Figure 55A:
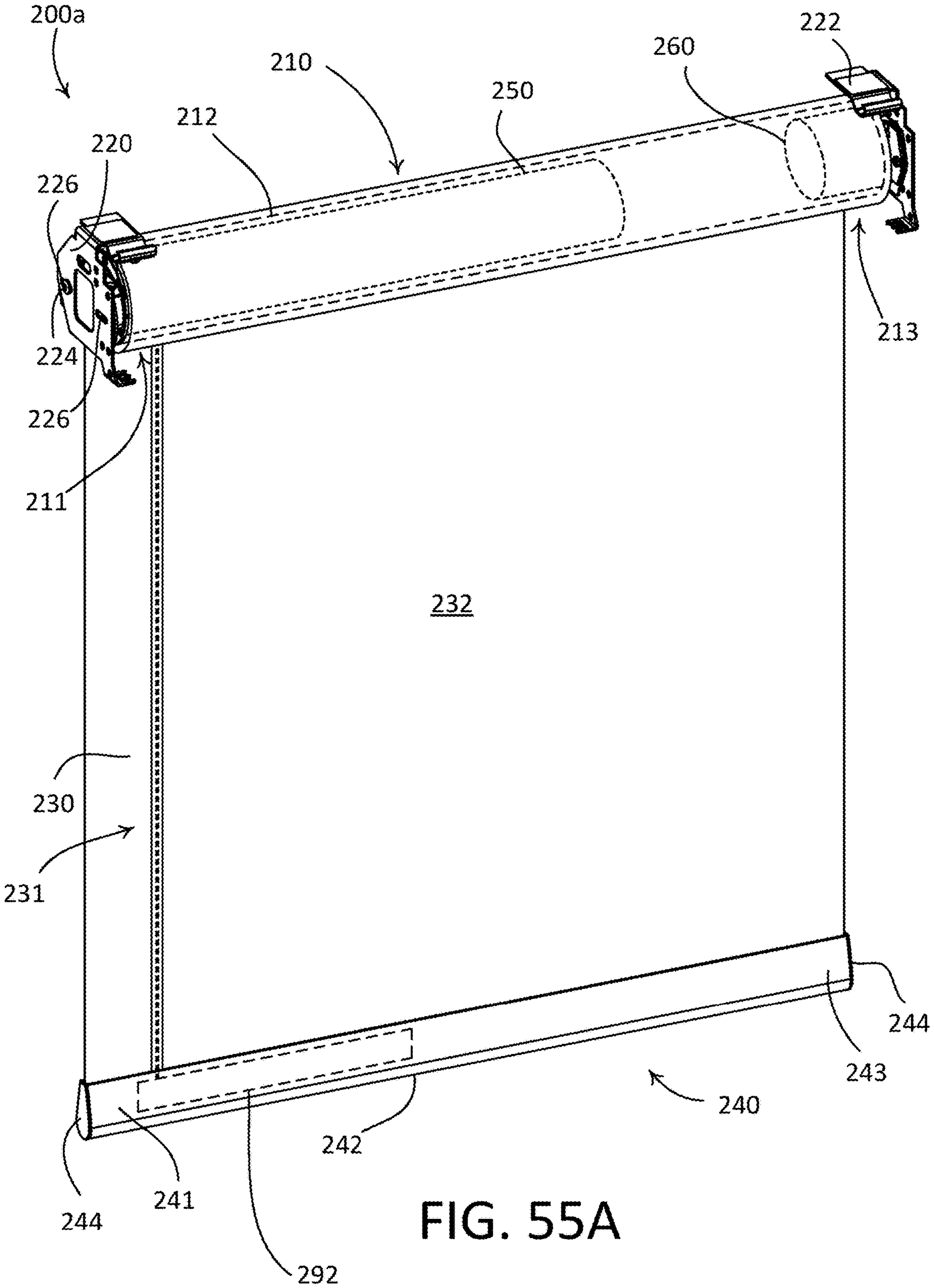
FIG. 55A is a front view of an example motorized window treatment with the bottom bar hardwired to the motor drive unit and the covering material in a lowered position.
Figure 55B:
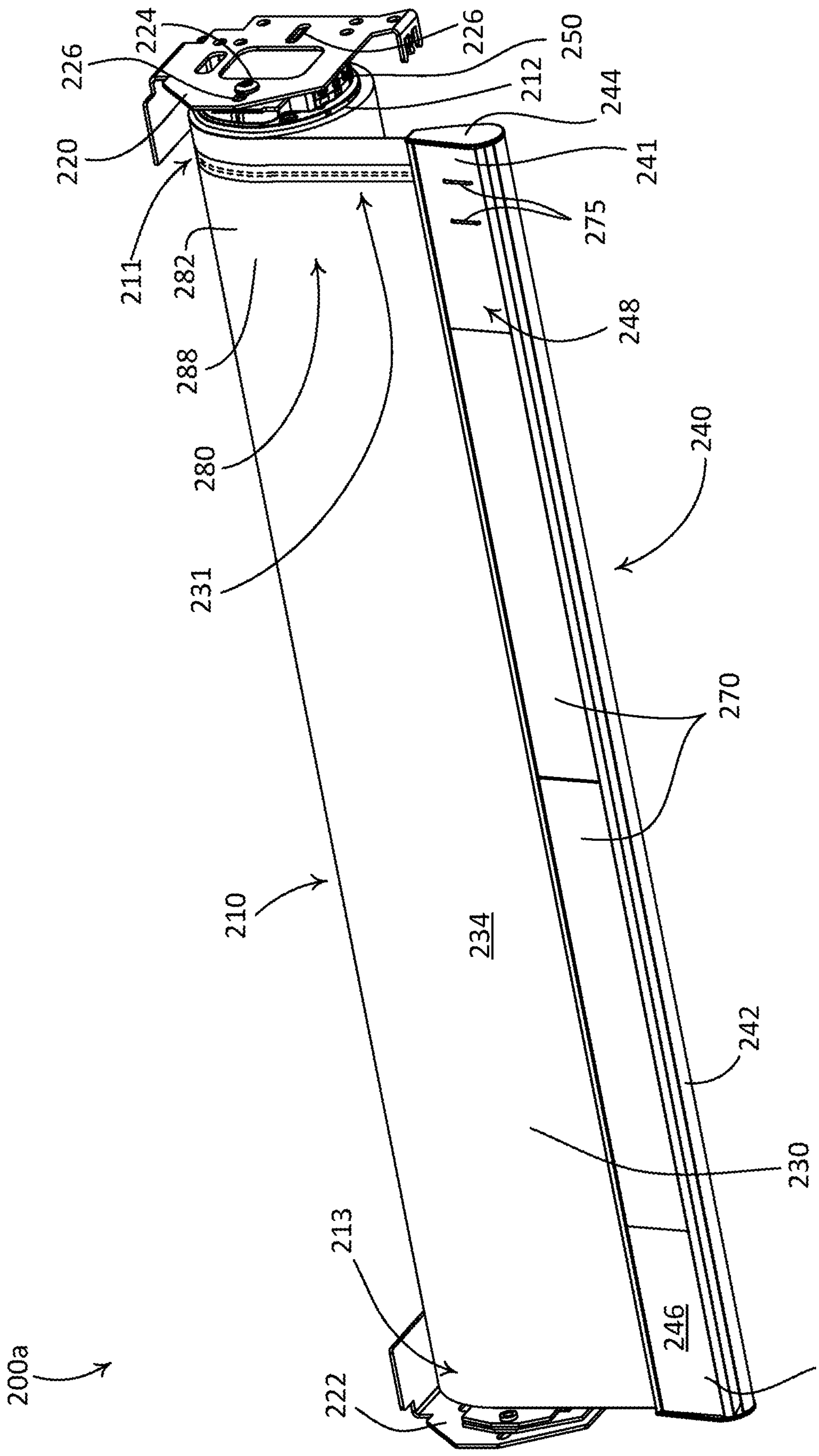
FIG. 55B is a rear perspective view of the motorized window treatment of FIG. 55A with the covering material in the raised position.

FIG. 55A is a front view of an example motorized window treatment 200*a* with the bottom bar 240 hardwired to the motor drive unit 250 and the covering material 230 in a lowered position. FIG. 55B is a rear perspective view of the motorized window treatment 200*a* of FIG. 55A with the covering material 230 in the raised position. The motorized window treatment 200*a* may be substantially identical to the motorized window treatment 200 of FIGS. 2-13 except that the motorized window treatment 200*a* may not include a dock (e.g., such as the dock 280), and the covering material 230 of the motorized window treatment 200*a* may comprise an electrical connection, such as a wired bus 231, that allow for an electrical connection between the bottom bar 240 (e.g., a printed circuit board of the bottom bar and/or a bottom bar module 292) and the motor drive unit 250. The motorized window treatment 200*a* may include a bottom bar module 292 (e.g., that includes a printed circuit board, such as the printed circuit board 272). One example of the bottom bar module 292 is the bottom bar module 640 of FIG. 33.

The wired bus 231 may include one or more wires, that for example, are embedded within or secured externally to the covering material 230. In some examples, the wired bus 231 may be two wires that embedded within tape that is secured to the front surface 232 of the covering material 230 (e.g., as shown in FIG. 55A) and/or the rear surface 234 of the covering material 230 (e.g., as shown in FIG. 55B). In other examples, the wired bus 231 may be wound through the fabric of the covering material 230, or the fabric of the covering material 230 may be conductive such that the fabric creates the wired bus 231.

The wired bus 231 of the motorized window treatment 200*a* may facilitate discharging of the energy storage elements of the bottom bar 240 into the energy storage elements of the motor drive unit 250 without having to dock the bottom bar 240 (e.g., without having the raise the bottom bar 240 into the raised position $P_{RAISED}$). Further, the bottom bar module 292 may include a communication circuit that may allow a control circuit of the bottom bar module 292 to communicate messages (e.g., digital messages) with a communication circuit of the motor drive unit 250 via the wired bus 231 without having to dock the bottom bar 240. For example, the bottom bar module 292 may be configured to transmit messages including measurements recorded by the bottom bar module 292 and/or one or more operational characteristics of the bottom bar module 292. For example, of the bottom bar module 292 may be configured to transmit a message via the wired bus 231 that includes an indication of a measurement of the magnitude of the photovoltaic output voltage $V_{PV}$ generated by the solar cells 270 and/or an indication of a measurement of the magnitude of the second storage voltage $V_{S\text{-}B}$ generated across the energy storage element of the bottom bar module 292 to the motor drive unit 250. In addition, the bottom bar module 292 may be configured to transmit a message via the wired bus 231 an indication of an operational characteristic of the solar cell management circuit of the bottom bar module 292, such as the duty cycle $DC_{SCM}$ of the solar cell management circuit, to the motor drive unit 250.

Figure 56:
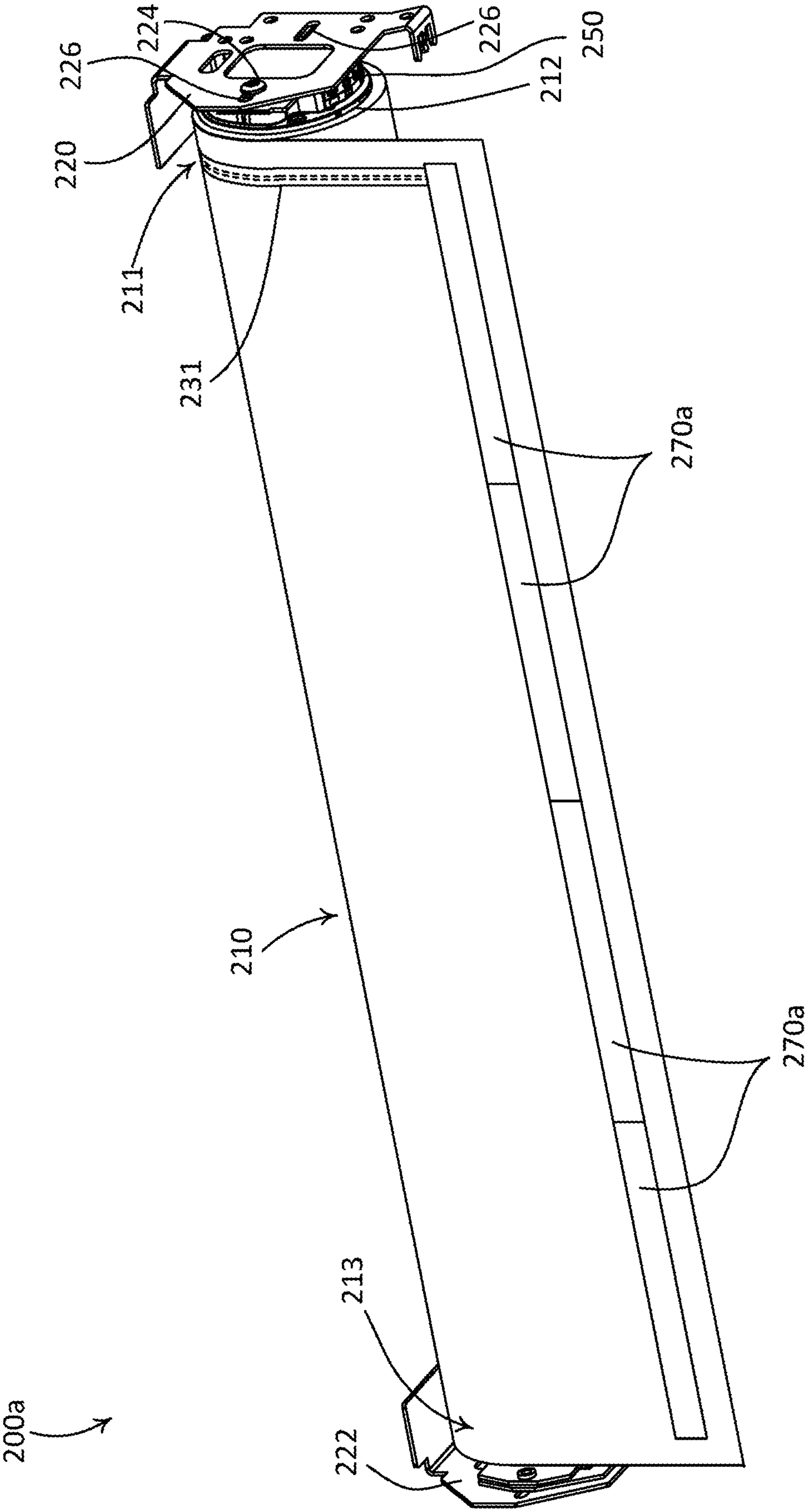
FIG. 56 is a rear perspective view of an example motorized window treatment with solar cells mounted to the shade fabric and the covering material in the raised position.

FIG. 56 is a rear perspective view of an example motorized window treatment with solar cells mounted to the shade fabric and the covering material in the raised position. The motorized window treatment 200*a* may be substantially identical to the motorized window treatment 200 of FIGS. 2-13 except that the covering material 230 of the motorized window treatment 200*a* may have one or more solar cells 270*a* (e.g., the solar cells 270) mounted directly to the covering material 230. The motorized window treatment 200*a* may enable energy transfer between the solar cells 270*a* and the motor drive unit 250 using a wired bus (e.g., the wired bus 231). Further, in some examples, the covering material 230 of the motorized window treatment 200*a* may be a conductive fabric such that the covering material 230 may provide a wired communication link to enable the solar cells 270*a* to discharge stored energy into the energy storage elements of the motor drive unit 250. As shown, in some examples, the motorized window treatment 200*a* may not include a dock, such as the dock 280. However, in other examples, the motorized window treatment 200*a* may include a dock, and the solar cells 270*a* may discharge stored energy into the energy storage elements of the motor drive unit 250 when the covering material 230 is in the raised position $P_{RAISED}$ and the solar cells 270*a* (e.g., or an electrical contact that is coupled to the bottom end of the covering material 230 and coupled to the solar cells 270*a*) is in contact with the dock. In some examples, the solar cells 270*a* may comprise a thin-film solar cell located across a larger area of the bottom portion of the covering material 230. In addition, the solar cells 270*a* may also comprise at least a portion of a smart fabric that may be located at least at the bottom of the covering material 230 and may be configured to receive the solar energy.

Figure 57:
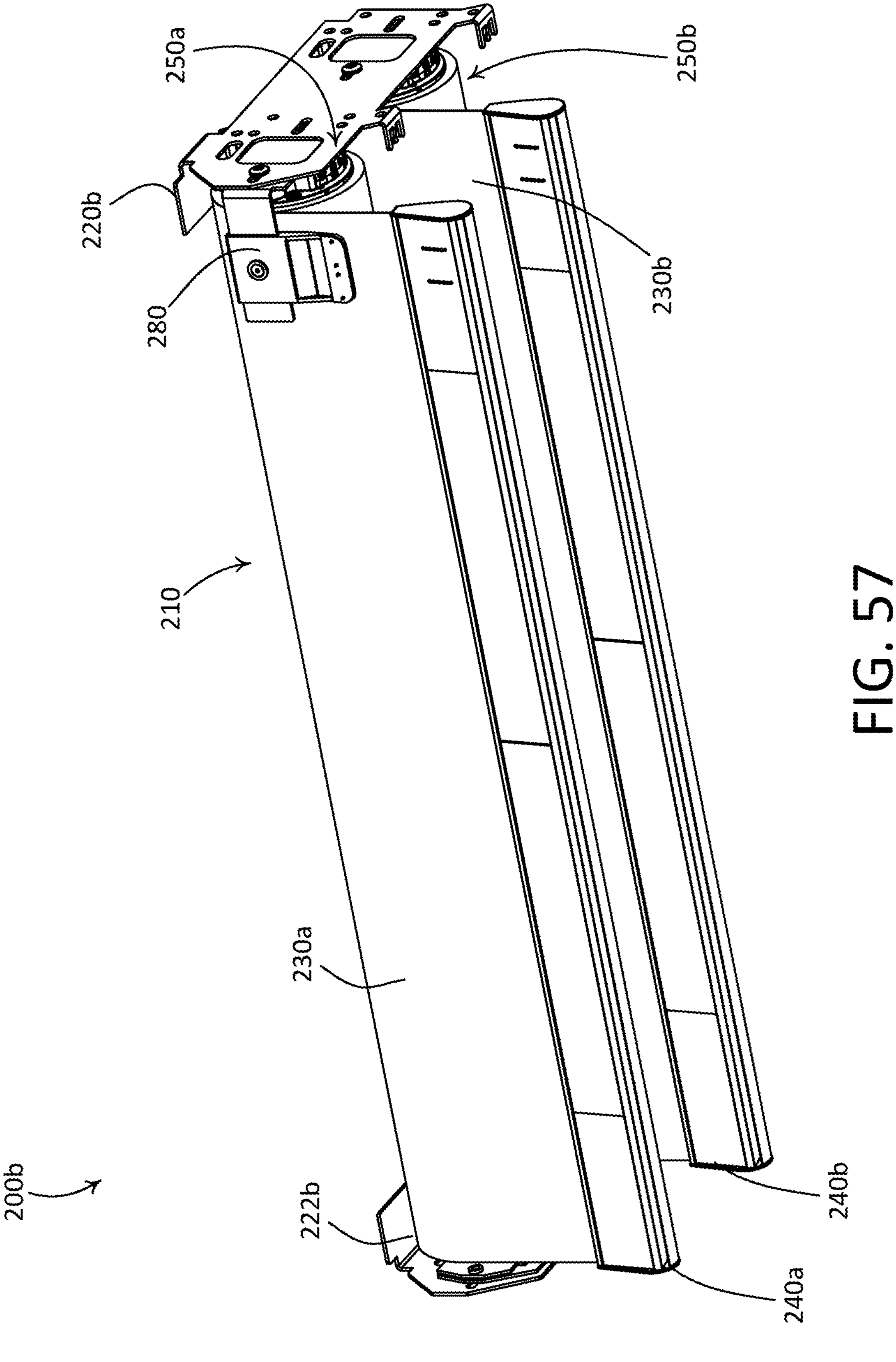
FIG. 57 is a rear perspective view of an example motorized window treatment with two motor drive units and two covering material in the raised position.

FIG. 57 is a rear perspective view of an example motorized window treatment with two motor drive units and two covering material in the raised position. The motorized window treatment 200*b* may be substantially identical to the motorized window treatment 200 of FIGS. 2-13 except that the motorized window treatment 200*b* may have two motor drive units 250*a*, 250*b*, two bottom bars 230*a*, 230*b*, two covering materials 230*a*, 230*b*, and brackets 220*b*, 222*b* that are suited to support the two motor drive units 250*a*, 250*b*. The motorized window treatment 200*b* may include a dock 280 (e.g., a single dock 280) that may be configured to connect to the bottom bar 230*a*. In some examples, the bottom bar 240*b* may not include any electronic circuitry, but the bottom bar 240*a* is similar to the bottom bar 240 described above. In such examples, only one of the bottom bars (e.g., the bottom bar 230*a*) may include solar cells 270, and may be configured to connect to the dock 280 to discharge energy from the energy storage element of the bottom bar into the energy storage element of the motorized window treatment. However, it should be appreciated and in some other examples, the motorized window treatment 200*b* may include two docks 280, and both of the bottom bar 240*a*, 240*b* may include solar cells 270 and may be configured to discharge energy from the energy storage element of the bottom bar into the energy storage element of the motorized window treatment.

While the motor drive unit (e.g., the motor drive unit 250, 350, 450, 550*a*, 550*b*, 550*c*, 610) having the dock (e.g., the dock 280 shown in FIGS. 2-32) has been shown with the bottom mar having solar cells, the motor drive unit could also be used with motorized window treatments without solar cells in order to charge an energy storage element (e.g., the energy storage element 646) in the bottom bar (e.g., in the bottom bar module 640), rather than charging an energy storage element (e.g., the energy storage element 630) in the motor drive unit from solar energy collected by one or more solar cells (e.g., the solar cells 642), for example, as described herein. In such a system, the bottom bar may not have any solar cells (e.g., the bottom bar module 640 may simply include the control circuit 650, the communication circuit 652, and/or the sensor circuits 654). For example, the motor drive unit may be configured to dock the bottom bar to charge the energy storage element of the bottom bar from the energy storage element of the motor drive unit. The control circuit 650 of the bottom bar module 640 may be configured to collect data from the sensor circuits 654 and report the data to the motor drive unit 610. For example, the control circuit 650 of the bottom bar module 640 may be configured to collect solar data from a photosensor of the sensor circuits 654 and report the solar data to the motor drive unit 610.

What is claimed is:

1. A motorized window treatment configured to be mounted to a structure, the motorized window treatment comprising:
- first and second mounting brackets configured to be mounted to the structure;
- a window treatment assembly configured to be supported by the first and second mounting brackets, the window treatment assembly comprising a covering material that extends from a top end to a bottom end and is operable between a raised position and a lowered position, the window treatment assembly further comprising:
  - a bottom bar comprising:
    - a housing attached to the bottom end of the covering material, wherein the housing comprises a surface;
    - at least one solar cell attached to the bottom bar;
    - a first plurality of electrical contacts located on the surface of the housing of the bottom bar; and
    - a first energy storage element located in the housing of the bottom bar, wherein the first energy storage element is electrically coupled to the at least one solar cell;
- a motor drive unit comprising a motor configured to rotate to adjust the covering material between the raised position and the lowered position;
- a second energy storage element that powers the motor of the motor drive unit; and
- a dock comprising a base portion, wherein the base portion comprises:
  - a contact surface; and
  - a second plurality of electrical contacts located on the contact surface;
- wherein the motor drive unit is configured to control the motor to position the bottom bar adjacent to the base portion of the dock when the covering material is in the raised position, such that the first plurality of electrical contacts of the bottom bar electrically couple to the second plurality of electrical contacts of the base portion of the dock to enable the first energy storage element of the bottom bar to discharge through the first plurality of electrical contacts of the bottom bar and the second plurality of electrical contacts of the base portion of the dock into the second energy storage element.

2. The motorized window treatment of claim 1, wherein the window treatment assembly further comprises a roller tube that extends from a first end to a second end, the roller tube configured to be rotatably supported by the first mounting bracket at the first end of the roller tube and by the second mounting bracket at the second end of the roller tube;

wherein the top end of the covering material is attached to the roller tube and the bottom bar is attached to the bottom end of the covering material; and wherein the motor drive unit is received in the roller tube at the first end of the roller tube and supported by the first mounting bracket, the motor of the motor drive unit to rotate the roller tube to adjust the covering material between the raised position and the lowered position.

3. The motorized window treatment of claim 1, wherein the motor drive unit comprises a control circuit configured to control the motor to adjust a present position of the covering material between the raised position and the lowered position.

4. The motorized window treatment of claim 3, wherein the bottom bar comprises a bottom bar module that has a control circuit configured to collect solar data in response to the at least one solar cell at a plurality of intermediate positions between the lowered position and the raised position, and the control circuit of the motor drive unit is configured to store the solar data in a memory of the motor drive unit.

5. The motorized window treatment of claim 4, wherein the solar data comprises one or more measurements or operational characteristics of the bottom bar module, and wherein the control circuit of the bottom bar module is configured to periodically collect at least one of the one or more measurements or operational characteristics of the bottom bar at a timing interval.

6. The motorized window treatment of claim 5, wherein the timing interval has a first value when the covering material is not being adjusted and a second value when the covering material is being adjusted.

7. The motorized window treatment of claim 6, wherein the bottom bar module further comprises a sensor circuit, wherein the control circuit of the bottom bar module is configured to use the sensor circuit to determine when the bottom bar is moving, and wherein the sensor circuit comprises at least one of an accelerometer or a gyroscope.

8. The motorized window treatment of claim 6, wherein the control circuit of the bottom bar module is configured to determine that the covering material is being adjusted in response to a message received from the motor drive unit.

9. The motorized window treatment of claim 4, wherein the bottom bar module comprises a solar cell management circuit to charge the first energy storage element from a photovoltaic output voltage generated by the at least one solar cell for generating a storage voltage across the first energy storage element of the bottom bar.

10. The motorized window treatment of claim 9, wherein the solar data comprises at least one of a magnitude of the photovoltaic output voltage generated by the at least one solar cell or a magnitude of the storage voltage generated across the first energy storage element of the bottom bar.

11. The motorized window treatment of claim 9, wherein the solar cell management circuit is characterized by a duty cycle required to generate the storage voltage across the first energy storage element of the bottom bar from the photovoltaic output voltage, and wherein the solar data comprises the duty cycle of the solar cell management circuit.

12. The motorized window treatment of claim 5, wherein the bottom bar module comprises a communication circuit to transmit messages to the motor drive unit via a wired communication link when the bottom bar is docked to discharge the first energy storage element into the second energy storage element, the control circuit of the bottom bar module further to store the at least one of the one or more measurements or operational characteristics of the bottom bar in the solar data in a memory of the bottom bar along with a time stamp defining a time at which the at least one of the one or more measurements or operational characteristics of the bottom bar is collected.

13. The motorized window treatment of claim 12, wherein the control circuit of the bottom bar module is configured to transmit the solar data to the control circuit of the motor drive unit via the communication circuit when the bottom bar is docked.

14. The motorized window treatment of claim 13, wherein the control circuit of the motor drive unit is configured to store a record of a respective movement of the covering material each time that the control circuit of the motor drive unit controls the motor to adjust the present position of the covering material; and wherein the control circuit of the motor drive unit is configured to use time stamps in the solar data to determine respective positions of the covering material from the stored records of the respective movements, and to store in the solar data in the memory of the motor drive unit the respective positions of the covering material.

15. The motorized window treatment of claim 5, wherein the bottom bar module comprises a communication circuit to transmit messages to the motor drive unit via wireless signals, wherein the control circuit of the bottom bar module is further configured to periodically transmit via the communication circuit at least one of the one or more measurements or operational characteristics of the bottom bar to the motor drive unit.

16. The motorized window treatment of claim 15, wherein the control circuit of the motor drive unit is configured to store the at least one of the one or more measurements or operational characteristics of the bottom bar in the solar data in the memory along with respective positions of the covering material.

17. The motorized window treatment of claim 4, wherein the control circuit of the motor drive unit is configured to use the solar data to configure the motor drive unit.

18. The motorized window treatment of claim 17, wherein the control circuit of the motor drive unit is configured to use the solar data to determine at least one of an optimum position for reception of solar power by the at least one solar cell, to determine an upper limit position for controlling the covering material, or to determine one or more dead zones between the lowered position and the raised position.

19. The motorized window treatment of claim 3, wherein the control circuit is configured to dock the bottom bar by adjusting the covering material to the raised position to enable the first energy storage element of the bottom bar to discharge through the first plurality of electrical contacts of the bottom bar and the second plurality of electrical contacts of the base portion of the dock into the second energy storage element.

20. The motorized window treatment of claim 19, wherein the control circuit is configured to automatically determine when to dock the bottom bar.

21. The motorized window treatment of claim 20, wherein the control circuit is configured to determine to dock the bottom bar when a space in which the motorized window treatment is located is vacant.

22. The motorized window treatment of claim 21, wherein the motor drive unit comprises a communication circuit to receive messages, and the control circuit is configured to receive a message indicating that the space is vacant via the communication circuit.

23. The motorized window treatment of claim 22, wherein the bottom bar comprises a bottom bar module having a sensor circuit to detect at least one of an occupancy condition or a vacancy condition in the space, the bottom bar module comprising a control circuit configured to use the sensor circuit to determine that the space is vacant and to transmit the message indicating that the space is vacant to the motor drive unit.

24. The motorized window treatment of claim 22, wherein the control circuit is configured to receive the message indicating that the space is vacant from an external occupancy sensor.

25. The motorized window treatment of claim 20, wherein the control circuit is configured to determine to dock the bottom bar when a magnitude of a storage voltage of the second energy storage element is less than a first threshold.

26. The motorized window treatment of claim 25, wherein the control circuit is configured to determine to dock the bottom bar when a space in which the motorized window treatment is located is vacant and the magnitude of the storage voltage of the second energy storage element of the motor drive unit is less than the first threshold.

27. The motorized window treatment of claim 26, wherein the control circuit is configured to determine to dock the bottom bar when the space in which the motorized window treatment is located is occupied and when the magnitude of the storage voltage of the second energy storage element is less than a second threshold that is lower than the first threshold.

28. The motorized window treatment of claim 20, wherein the control circuit is configured to determine to dock the bottom bar when a magnitude of a storage voltage of the first energy storage element of the bottom bar is greater than a threshold.

29. The motorized window treatment of claim 28, wherein the bottom bar comprises a bottom bar module comprising a control circuit configured to transmit a message indicating the magnitude of the storage voltage of the first energy storage element, and the control circuit of the motor drive unit is configured to receive the message indicating the magnitude of the storage voltage of the first energy storage element and to determine to dock the bottom bar when the magnitude of the storage voltage of the first energy storage element is greater than the threshold.

30. The motorized window treatment of claim 28, wherein the bottom bar comprises a bottom bar module comprising a control circuit configured to transmit a message with an indication to dock the bottom bar to the motor drive unit in response to determining that the magnitude of the storage voltage of the first energy storage element is greater than the threshold, and the control circuit of the motor drive unit is configured to determine to dock the bottom bar in response to receiving the message from the bottom bar module.

31. The motorized window treatment of claim 3, wherein the control circuit is configured to determine a magnitude of a solar power received by the at least one solar cell of the bottom bar and to determine to adjust the present position of the covering material when the magnitude of the solar power received by the at least one solar cell of the bottom bar is less than a first threshold.

32. The motorized window treatment of claim 31, wherein, after determining to adjust the present position of the covering material, the control circuit is further configured to adjust the present position of the covering material until the magnitude of the solar power received by the at least one solar cell of the bottom bar is greater than a second threshold.

33. The motorized window treatment of claim 1, wherein the first plurality of electrical contacts of the bottom bar comprise a first plurality of elongated conductive elements and the second plurality of electrical contacts of the dock comprise a second plurality of elongated conductive elements, and wherein the first plurality of elongated conductive elements is oriented perpendicular to the second plurality of elongated conductive elements, respectively.

34. The motorized window treatment of claim 33, wherein the first plurality of elongated conductive elements is oriented vertically, and the second plurality of elongated conductive elements is oriented horizontally; or wherein the first plurality of elongated conductive elements is oriented horizontally, and the second plurality of elongated conductive elements is oriented vertically.

35. The motorized window treatment of claim 33, wherein the dock comprises at least one magnet to magnetically attract the bottom bar.

36. The motorized window treatment of claim 1, wherein the first plurality of electrical contacts of the bottom bar comprise a first plurality of planar pieces of conductive material and the second plurality of electrical contacts of the dock comprises a second plurality of spring contacts that are biased towards the first plurality of planar pieces of conductive material, respectively, when the bottom bar is docked to discharge the first energy storage element into the second energy storage element.

37. The motorized window treatment of claim 36, wherein the window treatment assembly further comprises a roller tube that extends from a first end to a second end, the roller tube configured to be rotatably supported by the first mounting bracket at the first end of the roller tube and by the second mounting bracket at the second end of the roller tube; and wherein, when the bottom bar is docked, the second plurality of spring contacts are held against the first plurality of planar pieces of conductive material, respectively, due to the covering material wrapped around the roller tube pushing against the bottom bar.

38. The motorized window treatment of claim 36, wherein the dock comprises a biasing member to push against the bottom bar when the bottom bar is docked to hold the second plurality of spring contacts against the first plurality of planar pieces of conductive material, respectively.

39. The motorized window treatment of claim 1, wherein a first electrical contact of the first plurality of electrical contacts of the bottom bar comprises a first planar piece of conductive material located on a front surface of the housing of the bottom bar and a second electrical contact of the first plurality of electrical contacts of the bottom bar comprises a second planar piece of conductive material located on a rear surface of the housing of the bottom bar, and wherein a first electrical contact of the second plurality of electrical contacts of the dock comprises a first spring contact that extends from a front wall of the dock and is biased towards the bottom bar when the bottom bar is docked to discharge the first energy storage element into the second energy storage element and a second electrical contact of the second plurality of electrical contacts of the dock comprises a second spring contact that extends from a rear wall of the dock and is biased towards the bottom bar when the bottom bar is docked.

40. The motorized window treatment of claim 1, wherein the first plurality of electrical contacts of the bottom bar are located within a recess of the bottom bar, and the base portion of the dock is configured to be located within the recess of the bottom bar when the bottom bar is docked to discharge the first energy storage element into the second energy storage element.

41. The motorized window treatment of claim 1, wherein the surface of the housing of the bottom bar is a rear surface of the housing of the bottom bar, wherein the rear surface of the housing of the bottom bar is oriented at an angle from a vertical axis of the motorized window treatment, and the contact surface of the base portion is oriented at approximately the angle at which the rear surface of the housing of the bottom bar is oriented.

42. The motorized window treatment of claim 1, wherein the motor drive unit comprises an end portion to be supported by the first mounting bracket, and the dock comprises an attachment member extending from the end portion of the motor drive unit to the base portion.

43. The motorized window treatment of claim 42, wherein the attachment member comprises a plate attached to the end portion of the motor drive unit and an arm that is oriented at an angle from the plate, the base portion attached to the arm such that the base portion is located adjacent to a rear surface of the covering material.

44. The motorized window treatment of claim 1, wherein the at least one solar cell of the bottom bar is oriented at an angle from a vertical axis of the motorized window treatment, such that the at least one solar cell is directed towards the sky when the motorized window treatment is mounted to the structure.

45. The motorized window treatment of claim 1, wherein the dock is integral with the motor drive unit.

46. The motorized window treatment of claim 1, wherein the motor drive unit comprises a control circuit that is configured to control the motor to adjust a present position of the covering material to the raised position to position the bottom bar adjacent to the base portion of the dock based on a determination that sun is not shining on a façade of which the motorized window treatment is installed.

47. The motorized window treatment of claim 1, wherein the motor drive unit comprises a control circuit that is configured to control the motor to adjust a present position of the covering material to the raised position to position the bottom bar adjacent to the base portion of the dock based on a determination that weather information indicates that it is cloudy at a location of the motorized window treatment.

48. The motorized window treatment of claim 1, wherein the motor drive unit comprises a control circuit that is configured to control the motor to adjust a present position of the covering material to the raised position to position the bottom bar adjacent to the base portion of the dock based on feedback from a photosensor indicating that a light level is less than a threshold light level.

49. The motorized window treatment of claim 1, wherein the surface of the housing of the bottom bar is a rear surface of the housing of the bottom bar, wherein the rear surface faces a window when the motorized window treatment is mounted to the structure.

50. The motorized window treatment of claim 49, wherein the base portion is located adjacent to a rear surface of the covering material when the motorized window treatment is mounted to the structure.

51. The motorized window treatment of claim 50, wherein the at least one solar cell is attached to the rear surface of the housing of the bottom bar.

52. The motorized window treatment of claim 51, wherein the at least one solar cell is located within a recess of the housing of the bottom bar.

53. The motorized window treatment of claim 50, wherein the surface of the housing of the bottom bar abuts the contact surface of the base portion when the bottom bar is docked to discharge the first energy storage element into the second energy storage element.

54. The motorized window treatment of claim 50, wherein the rear surface of the housing of the bottom bar is oriented at an angle from a vertical axis of the motorized window treatment, and wherein the contact surface of the base portion is oriented at approximately the angle at which the rear surface of the housing of the bottom bar is oriented.

55. The motorized window treatment of claim 54, wherein the at least one solar cell is oriented at the angle.

56. The motorized window treatment of claim 55, wherein the angle is in the range of approximately 5° to 75°.

57. The motorized window treatment of claim 1, wherein the first plurality of electrical contacts comprises a first pair of electrical contacts, and wherein the second plurality of electrical contacts comprises a second pair of electrical contacts.

58. The motorized window treatment of claim 1, wherein the surface of the housing of the bottom bar is oriented at an angle from a vertical axis of the motorized window treatment, and wherein the contact surface of the base portion is oriented at approximately the angle at which the surface of the housing of the bottom bar is oriented.

59. The motorized window treatment of claim 1, wherein the dock comprises an attachment member that supports the base portion; and wherein the attachment member is affixed to or forms part of the motor drive unit, or the attachment member is affixed to or forms part of the first or second mounting bracket.

60. The motorized window treatment of claim 59, wherein the attachment member extends between the motor drive unit and the base portion.

61. The motorized window treatment of claim 59, wherein the attachment member comprises a plate and an arm, wherein the plate is attached to the arm and the arm is attached to the base portion, and wherein the arm is oriented at an angle from the plate.

62. The motorized window treatment of claim 61, wherein the plate is attached to the arm and the arm is attached to the base portion such that the base portion is located adjacent to a rear surface of the covering material.

63. The motorized window treatment of claim 62, wherein the angle is approximately a 90 degree angle.

64. The motorized window treatment of claim 62, wherein the plate comprises one or more openings for one or more fasteners to extend through to couple the window treatment assembly to the first or the second mounting bracket.

65. The motorized window treatment of claim 1, wherein the at least one solar cell is attached to the surface of the housing of the bottom bar.

66. The motorized window treatment of claim 1, wherein the at least one solar cell is located within a recess in the housing of the bottom bar.

67. The motorized window treatment of claim 66, wherein the bottom bar comprises a printed circuit board having an outer surface that forms at least a portion of the surface of the housing of the bottom bar, wherein the at least one solar cell is located on the outer surface of the printed circuit board.

68. The motorized window treatment of claim 1, wherein at least one of the first plurality of electrical contacts are biased away from the surface of the housing of the bottom bar or the second plurality of electrical contacts are biased away from the contact surface of the base portion.

69. The motorized window treatment of claim 68, wherein at least one of the first plurality of electrical contacts are spring-loaded such that they are biased away from the surface of the housing of the bottom bar or the second plurality of electrical contacts are spring-loaded such that they are biased away from the contact surface of the base portion.

70. The motorized window treatment of claim 1, wherein the bottom bar comprises a bottom bar module, and the bottom bar module comprises a solar cell management circuit, wherein the at least one solar cell is electrically coupled to the first energy storage element via the solar cell management circuit, and wherein the solar cell management circuit is configured to charge the first energy storage element from a photovoltaic output voltage generated by the at least one solar cell for generating a storage voltage across the first energy storage element.

* * * * *